(12) United States Patent
Ichikawa et al.

(10) Patent No.: US 10,501,605 B2
(45) Date of Patent: *Dec. 10, 2019

(54) CARBON FIBER-REINFORCED RESIN COMPOSITION, METHOD FOR MANUFACTURING CARBON FIBER-REINFORCED RESIN COMPOSITION, MOLDING MATERIAL, METHOD FOR MANUFACTURING MOLDING MATERIAL, AND CARBON FIBER-REINFORCED RESIN MOLDED ARTICLE

(71) Applicant: TORAY INDUSTRIES, INC., Tokyo (JP)

(72) Inventors: Tomoko Ichikawa, Iyo-gun (JP); Atsuki Tsuchiya, Iyo-gun (JP); Makoto Endo, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 14/435,793

(22) PCT Filed: Aug. 6, 2013

(86) PCT No.: PCT/JP2013/071274
§ 371 (c)(1),
(2) Date: Apr. 15, 2015

(87) PCT Pub. No.: WO2014/061336
PCT Pub. Date: Apr. 24, 2014

(65) Prior Publication Data
US 2015/0247025 A1    Sep. 3, 2015

(30) Foreign Application Priority Data

Oct. 18, 2012  (JP) ................................ 2012-230466
Dec. 21, 2012  (JP) ................................ 2012-279139
(Continued)

(51) Int. Cl.
*C08K 9/04* (2006.01)
*C08J 5/04* (2006.01)
(Continued)

(52) U.S. Cl.
CPC ................ *C08K 9/04* (2013.01); *B29B 7/002* (2013.01); *B29B 11/16* (2013.01); *B29B 15/105* (2013.01);
(Continued)

(58) Field of Classification Search
CPC ............ B29K 2307/04; B29K 2063/00; B29C 70/06; B29B 15/105; B29B 11/16;
(Continued)

(56) References Cited

U.S. PATENT DOCUMENTS 3,957,716 A   5/1976  Weldy
4,420,512 A   12/1983 Ogawa et al.
(Continued)

FOREIGN PATENT DOCUMENTS

CN    1829839 A    9/2006
CN    104011288 A  8/2014
(Continued)

OTHER PUBLICATIONS

Machine Translation of JP 2005-213687. 2005.*
(Continued)

*Primary Examiner* — Brian Handville
(74) *Attorney, Agent, or Firm* — Birch, Stewart, Kolasch & Birch LLP

(57) ABSTRACT

A carbon fiber-reinforced resin composition of the present invention includes: sizing agent-coated carbon fibers in which carbon fibers are coated with a sizing agent; and a matrix resin. The sizing agent includes at least an aliphatic epoxy compound (A) and an aromatic epoxy compound (B1) as an aromatic compound (B). The sizing agent-coated
(Continued)

carbon fibers have a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent measured by X-ray photoelectron spectroscopy at a photoelectron takeoff angle of 15°.

18 Claims, 1 Drawing Sheet

(30) Foreign Application Priority Data

| Jan. 29, 2013 | (JP) | 2013-014681 |
|---|---|---|
| Jan. 29, 2013 | (JP) | 2013-014682 |
| Jan. 29, 2013 | (JP) | 2013-014686 |

(51) Int. Cl.

| C08J 5/06 | (2006.01) |
|---|---|
| C08J 5/24 | (2006.01) |
| D06M 13/11 | (2006.01) |
| D06M 15/55 | (2006.01) |
| B29B 7/00 | (2006.01) |
| B29B 11/16 | (2006.01) |
| B29B 15/10 | (2006.01) |
| C09C 3/08 | (2006.01) |
| B29C 70/06 | (2006.01) |
| D06M 101/40 | (2006.01) |
| B29K 63/00 | (2006.01) |
| B29K 307/04 | (2006.01) |

(52) U.S. Cl.
CPC ............... *C08J 5/042* (2013.01); *C08J 5/06* (2013.01); *C08J 5/24* (2013.01); *C09C 3/08* (2013.01); *D06M 13/11* (2013.01); *D06M 15/55* (2013.01); *B29C 70/06* (2013.01); *B29K 2063/00* (2013.01); *B29K 2307/04* (2013.01); *D06M 2101/40* (2013.01); *Y10T 428/2918* (2015.01)

(58) Field of Classification Search
CPC .. B29B 7/002; C09C 3/08; C08J 5/042; C08J 5/06; C08J 5/24; C08K 9/04; D06M 13/11; D06M 15/55; D06M 2101/40; Y10T 428/2918; C08L 101/00
USPC ....... 428/220, 367; 427/398.1, 412; 524/109
See application file for complete search history.

(56) References Cited

U.S. PATENT DOCUMENTS

| 4,555,446 | A |   | 11/1985 | Sumida et al. |   |
|---|---|---|---|---|---|
| 5,462,799 | A | * | 10/1995 | Kobayashi | D01F 11/14 423/447.1 |
| 6,392,064 | B2 | * | 5/2002 | Lee | C07D 303/22 549/514 |
| 2004/0191511 | A1 |   | 9/2004 | Sugiura et al. |   |
| 2010/0159243 | A1 | * | 6/2010 | Inoue | C03C 25/285 428/378 |
| 2013/0089736 | A1 |   | 4/2013 | Nakayama et al. |   |
| 2014/0329075 | A1 |   | 11/2014 | Ichikawa et al. |   |

FOREIGN PATENT DOCUMENTS

| EP | 2799616 A1 | 11/2014 |
|---|---|---|
| EP | 2878617 A1 | 6/2015 |
| EP | 2886590 A1 | 6/2015 |
| JP | 57-128266 A | 8/1982 |
| JP | 57-171767 A | 10/1982 |
| JP | 58-41973 A | 3/1983 |
| JP | 59-71479 A | 4/1984 |
| JP | 61-28074 A | 2/1986 |
| JP | 62-33872 A | 2/1987 |
| JP | 63-14114 A | 3/1988 |
| JP | 1-272867 A | 10/1989 |
| JP | 2-307979 A | 12/1990 |
| JP | 4-361619 A | 12/1992 |
| JP | 7-9444 A | 1/1995 |
| JP | 7-279040 A | 10/1995 |
| JP | 8-113876 A | 5/1996 |
| JP | 2000-336577 A | 12/2000 |
| JP | 2002-173873 A | 6/2002 |
| JP | 2002-309487 A | 10/2002 |
| JP | 2005-179826 A | 7/2005 |
| JP | 2005-213687 A | 8/2005 |
| JP | 2005-256226 A | 9/2005 |
| JP | 2005-280124 A | 10/2005 |
| JP | 2008-280624 A | 11/2008 |
| KR | 10-2004-0021649 A | 3/2004 |
| MX | 2014007830 A | 8/2014 |
| TW | 201213635 A1 | 4/2012 |
| WO | WO 03/010383 A1 | 2/2003 |
| WO | WO2005082982 A1 * | 9/2005 |
| WO | WO 2013/099707 A1 | 7/2013 |

OTHER PUBLICATIONS

Machine Translation of JP 2005-179826. 2005.*
Machine Translation of WO2005082982A1. Sep. 2005.*
Extended European Search Report dated Aug. 11, 2015, for European Application No. 13847900.1.
Tawainese Office Action and Search Report dated Apr. 10, 2015, for Tawainese Application No. 102134031.
The Chinese Office Action and Search Report, dated Nov. 4, 2015, for Chinese Application No. 201380053979.2 is provided.
The Korean Notice of Allowance, dated Nov. 27, 2015, for Korean Application No. 10-2015-7009733 is provided.
International Search Report, issued in PCT/JP2013/071274, dated Oct. 8, 2013.
Written Opinion of the International Searching Authority, issued in PCT/JP2013/071274, dated Oct. 8, 2013.
Mexican Office Action, dated Jun. 6, 2016, for corresponding Mexican Application No. MX/a/2015/004661.

* cited by examiner

CARBON FIBER-REINFORCED RESIN COMPOSITION, METHOD FOR MANUFACTURING CARBON FIBER-REINFORCED RESIN COMPOSITION, MOLDING MATERIAL, METHOD FOR MANUFACTURING MOLDING MATERIAL, AND CARBON FIBER-REINFORCED RESIN MOLDED ARTICLE

FIELD

The present invention relates to a carbon fiber-reinforced resin composition, a method for manufacturing a carbon fiber-reinforced resin composition, a molding material, a method for manufacturing a molding material, and a carbon fiber-reinforced resin molded article preferably used for aircraft members, spacecraft members, automobile members, ship members, and the like.

BACKGROUND

Carbon fibers are lightweight but are excellent in strength and elastic modulus, and thus are combined with various matrix resins to form composite materials, which are used in various fields including aircraft members, spacecraft members, automobile members, ship members, constructional materials, and sporting goods. In a composite material formed by using carbon fibers, excellent interfacial adhesion between the carbon fibers and a matrix resin is important in order to impart excellent characteristics of the carbon fiber.

In order to improve the interfacial adhesion between the carbon fibers and the matrix resin, an oxidation process such as gas phase oxidation and liquid phase oxidation is usually applied to carbon fibers to introduce oxygen-containing functional groups to the surface of the carbon fiber. For example, a method for improving interlaminar shear strength that is an index of the interfacial adhesion by carrying out electrolytic treatment to carbon fibers is disclosed (refer to Patent Literature 1). However, as required characteristics of composite materials have become higher in recent years, the interfacial adhesion achieved by such oxidation alone has become insufficient.

On the other hand, the carbon fibers are brittle and poor in bindability and abrasion resistance and thus easily generate fluffs or broken threads in a high-order processing step. To solve these disadvantages, a method for coating carbon fibers with a sizing agent is disclosed (refer to Patent Literatures 2 and 3).

For example, as a sizing agent, an aliphatic compound having a plurality of epoxy groups is disclosed (refer to Patent Literatures 4, 5, and 6). A method for coating carbon fibers with an epoxy adduct of polyalkylene glycol as a sizing agent is disclosed (refer to Patent Literatures 7, 8, and 9).

A method for coating carbon fibers with a diglycidyl ether of bisphenol A as an aromatic sizing agent is disclosed (refer to Patent Literatures 2 and 3). A method for coating carbon fibers with a polyalkylene oxide adduct of bisphenol A as a sizing agent is disclosed (refer to Patent Literatures 10 and 11). A method for coating carbon fibers with a sizing agent that is obtained by adding an epoxy group to a polyalkylene oxide adduct of bisphenol A is disclosed (refer to Patent Literatures 12 and 13).

Although the sizing agents described above can impart adhesion and bindability to the carbon fibers, the sizing agent including one epoxy compound is insufficient, and thus, in recent years, a technique of using two or more epoxy compounds in combination has been developed depending on required functions.

For example, a sizing agent including two or more epoxy compounds having defined surface energies is disclosed (refer to Patent Literatures 14 to 17). Patent Literature 14 discloses a combination of an aliphatic epoxy compound and an aromatic epoxy compound. Patent Literature 14 describes that the sizing agent existing in the outer layer in a large amount has an effect of shielding the sizing agent component existing in the inner layer in a large amount from air, and this prevents the epoxy group from opening its ring by moisture in air. Patent Literature 14 also describes that the sizing agent preferably contains the aliphatic epoxy compound and the aromatic epoxy compound in a ratio of 10/90 to 40/60, and the aromatic epoxy compound is preferably contained in a larger amount.

Patent Literatures 16 and 17 disclose a sizing agent formed by using two or more epoxy compounds having different surface energies. Patent Literatures 16 and 17 aim to improve adhesion to a matrix resin and thus do not limit the combination of two or more epoxy compounds to the combination of an aromatic epoxy compound and an aliphatic epoxy compound, and describe no typical example of the aliphatic epoxy compound selected from the viewpoint of adhesion.

A sizing agent containing a bisphenol A epoxy compound and an aliphatic polyepoxy resin in a mass ratio of 50/50 to 90/10 is disclosed (refer to Patent Literature 18). However, the sizing agent disclosed in Patent Literature 18 also contains the bisphenol A epoxy compound as an aromatic epoxy compound in a large amount.

As a sizing agent specifying the combination of an aromatic epoxy compound and an aliphatic epoxy compound, a combination of a multifunctional aliphatic compound on the surfaces of carbon fiber bundles and an epoxy resin, a condensate of an alkylene oxide adduct with an unsaturated dibasic acid, and an alkylene oxide adduct of phenols on the surface of the multifunctional aliphatic compound is disclosed (refer to Patent Literature 19).

As a combination of two or more epoxy compounds, a combination of an aliphatic epoxy compound and a bisphenol A epoxy compound as an aromatic epoxy compound is disclosed. The aliphatic epoxy compound is a cyclic aliphatic epoxy compound and/or a long chain aliphatic epoxy compound (refer to Patent Literature 20).

A combination of epoxy compounds having different properties is also disclosed. A combination of two epoxy compounds that are liquid and solid at 25° C. is disclosed (refer to Patent Literature 21). Furthermore, a combination of epoxy resins having different molecular weights and a combination of a monofunctional aliphatic epoxy compound and an epoxy resin are disclosed (see Patent Literatures 22 and 23).

However, the sizing agents (for example, Patent Literatures 20 to 23) containing two or more components practically provide insufficient improvement of physical properties of the molding material containing a sizing agent-coated carbon fibers and a matrix resin such as a thermoplastic resin. The following two requirements are needed to be satisfied in order to satisfy high adhesion between carbon fibers and the thermoplastic resin. However, it is supposed that sizing agents made of conventional combinations of any epoxy resins have failed to satisfy these requirements. In the two requirements, the first is that an epoxy component having high adhesion exists in the inner side (a carbon fiber side) of a sizing layer, and the carbon fibers and the epoxy compound interact strongly and the second is that the surface layer (a side of a thermoplastic resin as a matrix resin) of the sizing agent requires a chemical composition capable of strongly interacting with the epoxy compound having high adhesion to the carbon fibers existing in the inner layer and a thermoplastic resin in the outer layer.

For example, Patent Literature 14 discloses a sizing agent having a gradient structure for improving the adhesion between carbon fibers and a sizing agent. However, Patent Literature 14 and any other literatures (for example, Patent Literatures 15 to 18) have no idea that, in a molding material containing a sizing agent-coated carbon fibers and a thermoplastic resin, the interfacial adhesion between the carbon fibers and the thermoplastic resin is improved by arranging a component having high adhesion in the inner layer of the sizing layer and arranging a component having high interaction with the thermoplastic resin in a surface layer of the sizing layer.

Patent Literature 19 discloses a sizing agent in which a multifunctional aliphatic compound exists in an inner layer of the sizing agent and an aromatic epoxy resin and an aromatic reaction product each having low reactivity exist in an outer layer. However, the aliphatic compound and the aromatic compound are separated and thus high adhesion is difficult to achieve.

As described above, in conventional techniques, when a thermoplastic resin is particularly used as a matrix resin, the interfacial adhesion between the thermoplastic resin and the carbon fibers is poor and a further interfacial adhesion improvement technique is required.

CITATION LIST

Patent Literature

Patent Literature 1: Japanese Patent Application Laid-open No. 04-361619
Patent Literature 2: U.S. Pat. No. 3,957,716, description
Patent Literature 3: Japanese Patent Application Laid-open No. 57-171767
Patent Literature 4: Japanese Examined Patent Application Publication No. 63-14114
Patent Literature 5: Japanese Patent Application Laid-open No. 07-279040
Patent Literature 6: Japanese Patent Application Laid-open No. 08-113876
Patent Literature 7: Japanese Patent Application Laid-open No. 57-128266
Patent Literature 8: U.S. Pat. No. 4,555,446, description
Patent Literature 9: Japanese Patent Application Laid-open No. 62-033872
Patent Literature 10: Japanese Patent Application Laid-open No. 07-009444
Patent Literature 11: Japanese Patent Application Laid-open No. 2000-336577
Patent Literature 12: Japanese Patent Application Laid-open No. 61-028074
Patent Literature 13: Japanese Patent Application Laid-open No. 01-272867
Patent Literature 14: Japanese Patent Application Laid-open No. 2005-179826
Patent Literature 15: Japanese Patent Application Laid-open No. 2005-256226
Patent Literature 16: International Publication WO 03/010383
Patent Literature 17: Japanese Patent Application Laid-open No. 2008-280624
Patent Literature 18: Japanese Patent Application Laid-open No. 2005-213687
Patent Literature 19: Japanese Patent Application Laid-open No. 2002-309487
Patent Literature 20: Japanese Patent Application Laid-open No. 02-307979
Patent Literature 21: Japanese Patent Application Laid-open No. 2002-173873
Patent Literature 22: Japanese Patent Application Laid-open No. 59-71479
Patent Literature 23: Japanese Patent Application Laid-open No. 58-41973

SUMMARY

Technical Problem

The present invention is achieved for solving the above-described problems. The purpose of the present invention is to provide a carbon fiber-reinforced resin composition having excellent interfacial adhesion between carbon fibers and a matrix resin and having excellent mechanical properties under humid conditions, a method for manufacturing the carbon fiber-reinforced resin composition, a molding material, a method for manufacturing the molding material, and a carbon fiber-reinforced resin molded article.

Solution to Problem

In order to solve the above-described problems and to achieve the purpose, the present invention employs the following aspects. A carbon fiber-reinforced resin composition according to the present invention includes: sizing agent-coated carbon fibers in which carbon fibers are coated with a sizing agent; and a matrix resin comprising a thermoplastic resin or a radical polymerizable resin. The sizing agent comprises at least an aliphatic epoxy compound (A) and an aromatic epoxy compound (B1) as an aromatic compound (B), and the sizing agent-coated carbon fibers have a ratio (a)/(b) of 0.50 to 0.90 where (a) is a height (cps) of a component having a binding energy (284.6 eV) attributed to CHx, C—C, and C=C and (b) is a height (cps) of a component having binding energy (286.1 eV) attributed to C—O in a $C_{1s}$ core spectrum of a surface of the sizing agent of the sizing agent-coated carbon fibers measured by X-ray photoelectron spectroscopy using $AlK\alpha_{1,2}$ as an X-ray source at a photoelectron takeoff angle of 15°.

In the above-described carbon fiber-reinforced resin composition according to the present invention, a water content of the sizing agent-coated carbon fibers is 0.010% by mass to 0.030% by mass.

In the above-described carbon fiber-reinforced resin composition according to the present invention, a mass ratio of the aliphatic epoxy compound (A) and the aromatic epoxy compound (B1) in the sizing agent is 52/48 to 80/20.

In the above-described carbon fiber-reinforced resin composition according to the present invention, the aliphatic epoxy compound (A) is a polyether polyepoxy compound having two or more epoxy groups in a molecule and/or a polyol polyepoxy compound having two or more epoxy groups in a molecule.

In the above-described carbon fiber-reinforced resin composition according to the present invention, the aliphatic epoxy compound (A) is a glycidyl ether epoxy compound obtained by causing epichlorohydrin to react with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

In the above-described carbon fiber-reinforced resin composition according to the present invention, the aromatic epoxy compound (B1) is a bisphenol A epoxy compound or a bisphenol F epoxy compound.

In the above-described carbon fiber-reinforced resin composition according to the present invention, in the sizing agent-coated carbon fibers, values (I) and (II) determined by a ratio (a)/(b)
where (a) is the height (cps) of a component having a binding energy (284.6 eV) attributed to CHx, C—C, and C=C, and (b) is the height (cps) of a component having binding energy (286.1 eV) attributed to C—O in a $C_{1s}$ core spectrum of the sizing agent-coated carbon fibers measured by X-ray photoelectron spectroscopy using an X ray of 400 eV at a photoelectron takeoff angle of 55°
satisfy a relation (III):

$$0.50 \leq (I) \leq 0.90 \text{ and } 0.60 < (II)/(I) < 1.0 \quad \text{(III)}$$

where (I) is a value of (a)/(b) of the surface of the sizing agent-coated carbon fibers before ultrasonic treatment, and (II) is a value of (a)/(b) of the surface of the sizing agent-coated carbon fibers after washing to reduce an attached amount of the sizing agent to 0.09% by mass to 0.20% by mass by the ultrasonic treatment of the sizing agent-coated carbon fibers in an acetone solvent.

In the above-described carbon fiber-reinforced resin composition according to the present invention, the surface of the sizing agent-coated carbon fibers after washing to reduce the attached amount of the sizing agent on the surface of the sizing agent-coated carbon fibers to 0.09% by mass to 0.20% by mass by the ultrasonic treatment in a solvent that dissolves the matrix resin constituting the carbon fiber-reinforced resin composition has a ratio of (a)/(b) of 0.30 to 0.70 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent-coated carbon fibers measured by X-ray photoelectron spectroscopy using an X ray of 400 eV at a photoelectron takeoff angle of 55°.

In the above-described carbon fiber-reinforced resin composition according to the present invention, a surface carboxy group concentration (COOH/C) is 0.003 to 0.015 and a surface hydroxy group concentration (COH/C) is 0.001 to 0.050 where the surface carboxy group concentration and the surface hydroxy group concentration are determined by chemical modification X-ray photoelectron spectroscopy of the carbon fibers.

In the above-described carbon fiber-reinforced resin composition according to the present invention, the matrix resin is one or more resins selected from a polyarylene sulfide resin, a polyether ether ketone resin, a polyphenylene ether resin, a polyoxymethylene resin, a polyester resin, a polycarbonate resin, a polystyrene resin, and a polyolefin resin.

In the above-described carbon fiber-reinforced resin composition according to the present invention, the matrix resin is a polyamide.

In the above-described carbon fiber-reinforced resin composition according to the present invention, the sizing agent-coated carbon fibers are formed by attaching the sizing agent in an amount of 0.1 parts by mass to 10.0 parts by mass relative to 100 parts by mass of the carbon fibers, and the carbon fiber-reinforced resin composition comprises the sizing agent-coated carbon fibers in an amount of 1% by mass to 80% by mass and the matrix resin in an amount of 20% by mass to 99% by mass.

A method for manufacturing the carbon fiber-reinforced resin composition according to any one of the above, the method includes: coating carbon fibers with a sizing agent comprising at least the aliphatic epoxy compound (A) in an amount of 35% by mass to 65% by mass and an aromatic compound (B) in an amount of 35% by mass to 60% by mass relative to a total amount of the sizing agent except a solvent to produce sizing agent-coated carbon fibers; and adding the sizing agent-coated carbon fibers to a matrix resin.

In the above-described carbon fiber-reinforced resin composition according to the present invention, the carbon fiber-reinforced resin composition is any one of the following forms of molding materials (H), (J1), (J2), and (K):
the molding material (H): a molding material that has a cylindrical shape and in which the carbon fibers are almost parallelly arranged in an axis center direction and a length of the carbon fibers has substantially the same length as a length of the molding material,
the molding material (J1): a molding material in which the carbon fibers are in a form of single fiber and that is substantially oriented in two dimensions,
the molding material (J2): a molding material in which the carbon fibers are in a bundle-like form and that is substantially oriented in two dimensions, and
the molding material (K): a prepreg.

A molding material that is the above-described the molding material (H), includes: any one of the following structures (L), (M), and (N):
(L): a core-sheath structure formed by covering a circumference of a structure Y with a structure X where the structure Y comprising the carbon fibers as a main component is a core structure and the structure X comprising the matrix resin as a main component is a sheath structure,
(M): a structure having a length of 1 mm to 50 mm, and
(N): a structure having a form of a long fiber pellet.

In the above-described molding material according to the present invention, the molding material (H) comprises an impregnation promoter (D) in an amount of 0.1 parts by mass to 100 parts by mass relative to 100 parts by mass of the carbon fibers.

In the above-described molding material according to the present invention, the molding material (H) is made by impregnating a part of or whole of the impregnation promoter (D) into the carbon fibers.

A method for manufacturing the molding material (H) according to any one of the above, the method at least includes: coating continuous carbon fibers with a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent; obtaining continuous strands by impregnating a melted matrix resin into the continuous sizing agent-coated carbon fibers obtained in said coating; and cooling the strands obtained in said obtaining continuous strands and then cutting the cooled strands to obtain the cylindrical molding material (H).

In the above-described method for manufacturing the molding material according to the present invention, further includes impregnating a melted impregnation promoter (D)

into the continuous sizing agent-coated carbon fibers before said obtaining continuous strands.

A molding material that is the above-described the molding material (J1), includes: the molding material (J1) being in a shape of web-like, nonwoven cloth-like, felt-like, or mat-like.

A method for manufacturing the molding material (J1) according to the above, the method at least includes: processing carbon fibers to a web-like cloth, a nonwoven cloth-like cloth, a felt-like cloth, or a mat-like cloth; applying a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent to the cloth obtained in the processing in an amount of 0.1 parts by mass to 10 parts by mass relative to 100 parts by mass of the cloth obtained in the processing; and applying a matrix resin in an amount of 20% by mass to 99% by mass to 1% by mass to 80% by mass of the cloth to which the sizing agent is applied in the applying to form a composite product.

A molding material that is the above-described the molding material (J2), includes: the molding material (J2) being in a shape of sheet-like.

A method for manufacturing the molding material (J2) according to the above, the method at least includes: coating carbon fibers with a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent in an amount of 0.1 parts by mass to 10 parts by mass relative to 100 parts by mass of the carbon fibers; cutting the sizing agent-coated carbon fibers obtained in said coating in a length of 1 mm to 50 mm; and mixing the sizing agent-coated carbon fibers cut in said cutting in an amount of 1% by mass to 80% by mass and the matrix resin in an amount of 20% by mass to 99% by mass to form a composite product.

A molding material that is the above-described the molding material (K), includes: the molding material (K) being a prepreg having a width of 1 mm to 50 mm.

A method for manufacturing a molding material (K) according to the above, the method includes: firstly coating continuous carbon fibers with a sizing agent containing at least an aliphatic epoxy compound (A) in an amount of 35% by mass to 65% by mass and an aromatic compound (B) in an amount of 35% by mass to 60% by mass relative to the total amount of the sizing agent excluding solvents; and secondaly passing the continuous sizing agent-coated carbon fibers obtained in the first step into a melted thermoplastic resin to further increase the width of the sizing agent-coated carbon fibers to obtain a prepreg having a width of 1 to 50 mm.

A carbon fiber-reinforced resin molded article of the present invention is characterized that the carbon fiber-reinforced resin molded article is formed by molding any one of the above described carbon fiber-reinforced resin composition, the carbon fiber-reinforced resin composition manufactured by any one of the above-described method, the molding material described in any one of the above described aspects, or the molding material manufactured by the above-described method.

Advantageous Effects of Invention

The carbon fiber-reinforced resin composition, the method for manufacturing the carbon fiber-reinforced resin composition, the molding material, and the method for manufacturing the molding material according to the present invention improves the interfacial adhesion between the carbon fibers and the matrix resin and maintains high mechanical properties under humid conditions by coating carbon fibers with the sizing agent containing at least the aliphatic epoxy compound (A) and the aromatic epoxy compound (B1) as the aromatic compound (B) to form the surface, which has the specific chemical composition, of the sizing agent of the sizing agent-coated carbon fibers.

The carbon fiber-reinforced resin molded article of the present invention is lightweight but is excellent in strength and elastic modulus and thus is suitably used in various fields such as aircraft members, spacecraft members, automobile members, ship members, constructional materials, and sporting goods.

DESCRIPTION OF EMBODIMENTS

Figure 1:
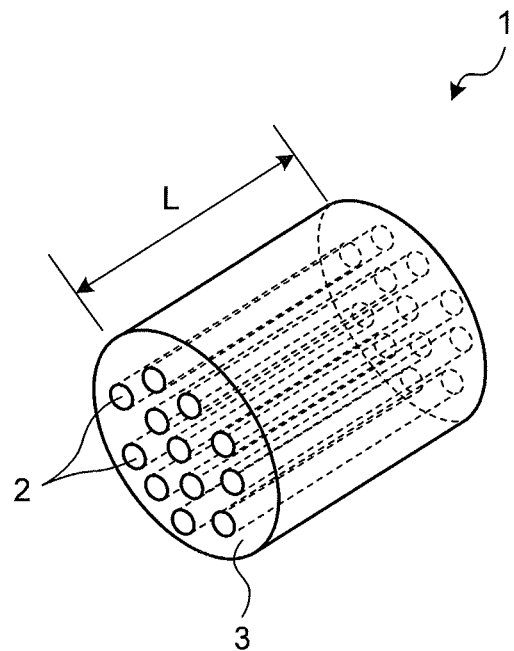
FIG. 1 is a perspective view illustrating one example of the molding material according to a fourth embodiment (Form A) of the present invention.

Hereinafter, embodiments for achieving the carbon fiber-reinforced resin composition, the method for manufacturing the carbon fiber-reinforced resin composition, the molding material, the method for manufacturing the molding material, and the carbon fiber-reinforced resin molded article of the present invention will be described in more detail.

The carbon fiber-reinforced resin composition of the present invention includes a sizing agent-coated carbon fibers in which carbon fibers are coated with a sizing agent, and a matrix resin including a thermoplastic resin or a radical polymerizable resin, in which the sizing agent includes at least an aliphatic epoxy compound (A) and an aromatic epoxy compound (B1) as an aromatic compound (B); and in which the carbon fibers coated with the sizing agent has a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum obtained by measuring the surface of the sizing agent of the sizing agent-coated carbon fibers by X-ray photoelectron spectroscopy using $AlK\alpha_{1,2}$ as an X-ray source at a photoelectron takeoff angle of 15°. Hereinafter, each embodiment will be individually described.

First Embodiment

The first embodiment provides a carbon fiber-reinforced resin composition including sizing agent-coated carbon fibers in which carbon fibers are coated with a sizing agent, and a thermoplastic resin, in which the sizing agent includes at least an aliphatic epoxy compound (A) and an aromatic epoxy compound (B1) as an aromatic compound (B); and in which the carbon fibers coated with the sizing agent has a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum obtained by measuring the surface of the sizing agent-coated carbon fibers by X-ray photoelectron spectroscopy at a photoelectron takeoff angle of 15°.

The inventors of the present invention have found that when a carbon fiber-reinforced resin composition made of carbon fibers having the specific chemical composition at the surface of a sizing agent prepared by using the sizing agent containing at least an aliphatic epoxy compound (A) and an aromatic epoxy compound (B1) as an aromatic compound (B) and a thermoplastic resin is used, a carbon fiber-reinforced thermoplastic resin composition molded article having high interfacial adhesion between the carbon fibers and the thermoplastic resin as the matrix resin, excellent mechanical properties, and reduced deterioration in physical properties under humid conditions even when a resin having a high hygroscopic property is used as the matrix resin is obtained. In other words, in the first embodiment, formation of the surface of the sizing agent having the specific chemical composition prepared by combining specific compounds is important and novel for the sizing technique, even though a known sizing agent can be used as an individual sizing agent itself.

The inventors of the present invention also have found that a carbon fiber-reinforced resin composition having high interfacial adhesion between carbon fibers and a thermoplastic resin and excellent physical properties under humid conditions can be formed by the step of coating the carbon fibers with a sizing agent containing the aliphatic epoxy compound (A) and the aromatic compound (B) in a specific ratio and the step of compounding the carbon fibers coated with the sizing agent and the thermoplastic resin, and have achieved the present invention.

The carbon fibers coated with a sizing agent made of the aliphatic epoxy compound (A) alone as an epoxy compound has strong interaction and excellent adhesion between the carbon fibers and the sizing agent. As a result, it is ascertained that the carbon fiber-reinforced resin composition made by using the sizing agent has excellent physical properties. Although the mechanism is not certain, the mechanism is supposed as follows: the aliphatic epoxy compound (A) has a flexible skeleton and a structure having a high degree of freedom; and thus the aliphatic epoxy compound (A) can form a strong interaction with functional groups such as a carboxy group and a hydroxy group on the surface of the carbon fiber. However, the aliphatic epoxy compound (A) exhibits high adhesion due to the interaction with the surface of the carbon fibers but has strong interaction with water due to its structure. Therefore, it is ascertained that the carbon fibers coated with the sizing agent made of the aliphatic epoxy compound (A) alone has high water content and, particularly when a resin having a high hygroscopic property is used, the reinforced resin composition containing the resin slightly deteriorates physical properties under humid conditions.

A carbon fiber-reinforced resin composition made by using carbon fibers coated with a sizing agent containing the aromatic epoxy compound (B1) alone as an epoxy compound and not containing the aliphatic epoxy compound (A) has such an advantage that a rigid interface layer can be formed. The sizing agent has a high hydrophobic property and thus also has an advantage that the water content of the surface of the carbon fibers can be reduced. However, the aromatic epoxy compound (B1), which is a rigid compound, is ascertained to be slightly inferior in the interaction between the carbon fibers and the sizing agent to the aliphatic epoxy compound (A) and thus the carbon fiber-reinforced resin composition containing the aromatic epoxy compound (B1) is ascertained to be slightly inferior in the mechanical properties to the carbon fiber-reinforced resin composition containing the aliphatic epoxy compound (A).

In the carbon fiber-reinforced resin composition of the first embodiment, when the aliphatic epoxy compound (A) is mixed with the aromatic compound (B), it is important that a phenomenon that the aliphatic epoxy compound (A) having higher polarity tends to exist in a larger amount in the carbon fiber side, and the aromatic compound (B) having lower polarity tends to exist in a larger amount in the outermost layer of the sizing layer opposite to the carbon fibers is observed. As a result of this gradient structure of the sizing layer, the aliphatic epoxy compound (A) existing near the carbon fibers has a strong interaction with the carbon fibers, while the aromatic compound (B) having lower polarity has a strong interaction with the thermoplastic resin. As a result, the interfacial adhesion between the carbon fibers and the thermoplastic resin can be improved and physical properties of the obtained carbon fiber-reinforced resin composition can be improved. The aromatic compound (B) existing in the outer layer in a large amount plays a roll of reducing the water content near the carbon fibers in the resin composition. This reduces the deterioration of physical properties because the water content near the carbon fibers is lowered under humid conditions even when a resin having a hygroscopic property is used. Subsequently, the existing ratio of the aliphatic epoxy compound (A) and the aromatic compound (B) of the surface layer of the sizing agent measured by an X-ray photoelectron spectroscopy is important.

In the carbon fiber-reinforced resin composition of the first embodiment, the sizing agent contains at least the aliphatic epoxy compound (A) and the aromatic compound (B). The aliphatic epoxy compound (A) is preferably contained in an amount of 35% by mass to 65% by mass relative to the total amount of the sizing agent excluding solvents. When the aliphatic epoxy compound (A) is applied in an amount of 35% by mass or more, the interfacial adhesion to the thermoplastic resin is improved and the physical properties of the carbon fiber-reinforced resin composition are improved. When the aliphatic epoxy compound (A) is applied in an amount of 65% by mass or less, other components in addition to the aliphatic epoxy compound (A) can be used in the sizing agent. This is preferable because the interaction between the sizing agent and the thermoplastic resin becomes higher and thus the physical properties become excellent. The amount of the aliphatic epoxy compound (A) is more preferably 38% by mass or more and further preferably 40% by mass or more. In addition, the amount of the aliphatic epoxy compound (A) is more preferably 60% by mass or less and further preferably 55% by mass or less.

The aromatic compound (B) is preferably contained in an amount of 35% by mass to 60% by mass relative to the total amount of the sizing agent excluding solvents. When the aromatic compound (B) is contained in an amount of 35% by mass or more, the aromatic compound (B) in the outer layer of the sizing agent can be maintained at a high composition. This is preferable because the sizing agent has strong interaction with the thermoplastic resin and the water content near the carbon fibers in the carbon fiber-reinforced resin composition can be reduced. The aromatic compound (B) contained in an amount of 60% by mass or less is preferable because the gradient structure in the sizing agent can be exerted and thus the adhesion can be sustained. The amount of the aromatic compound (B) is more preferably 37% by mass or more and further preferably 39% by mass or more. In addition, the amount of the aromatic compound (B) is more preferably 55% by mass or less and further preferably 45% by mass or less.

The aliphatic epoxy compound (A) and the aromatic epoxy compound (B1) as the aromatic compound (B) are contained as epoxy components in the sizing agent in the first embodiment. The mass ratio (A)/(B1) of the aliphatic epoxy compound (A) and the aromatic epoxy compound (B1) is preferably 52/48 to 80/20. When the sizing agent has a ratio (A)/(B1) of 52/48 or more, the ratio of the aliphatic epoxy compound (A) existing at the surface of carbon fibers is increased and thus the interfacial adhesion to the carbon fibers is improved. As a result, the carbon fiber-reinforced resin composition obtains higher composite physical properties such as tensile strength and thus this mass ratio is preferable. The ratio of 80/20 or less is preferable because the existing amount of the aliphatic epoxy compound having high water content at the surface of the carbon fibers in the carbon fiber-reinforced resin composition is decreased and the amount of the aromatic compound that can interact with the thermoplastic resin is increased. The mass ratio (A)/(B1) is more preferably 55/45 or more, further preferably 57/43 or more, and most preferably 60/40 or more. In addition, the mass ratio (A)/(B1) is more preferably 75/35 or less and further preferably 73/37 or less.

In the carbon fiber-reinforced resin composition of the first embodiment, each of the aliphatic epoxy compound (A) and the aromatic epoxy compound (B1) preferably has a surface tension of 35 mJ/m$^2$ to 45 mJ/m$^2$ at 125° C. A combination of the aliphatic epoxy compound (A) and the aromatic epoxy compound (B1) having similar surface tensions provides the two compounds with good miscibility and can reduce the generation of the bleed out of the sizing agent component or the like during the storage of the carbon fibers coated with the sizing agent.

Here, in the carbon fiber-reinforced resin composition of the first embodiment, the surface tension values of the aliphatic epoxy compound (A) and the aromatic epoxy compound (B1) at 125° C. can be determined by the Wilhelmy method using a platinum plate in accordance with the following procedure.

When a platinum plate is in contact with a sizing liquid containing each component alone at a controlled temperature of 125° C., the sizing liquid wets up the platinum plate. At this time, surface tension is generated around the plate and the plate is dragged into the sizing liquid by the surface tension. This force is measured and the surface tension is calculated. For example, a surface tensiometer DY-500 manufactured by Kyowa Interface Science Co., Ltd. is used to determine a static surface tension.

The aliphatic epoxy compound (A) used in the carbon fiber-reinforced resin composition of the first embodiment is an epoxy compound containing no aromatic rings. The aliphatic epoxy compound (A) has a flexible skeleton with a high degree of freedom and thus can have strong interaction with carbon fibers. As a result, the compound can improve the interfacial adhesion to the carbon fibers coated with the sizing agent. Therefore, this structure is preferable.

In the carbon fiber-reinforced resin composition of the first embodiment, the aliphatic epoxy compound (A) has one or more epoxy groups in the molecule. This can form strong binding between the carbon fibers and the epoxy group in the sizing agent. The number of the epoxy groups in the molecule is preferably two or more and more preferably three or more. In the epoxy compound having two or more epoxy groups in the molecule, even when one epoxy group forms a covalent bond with an oxygen-containing functional group on the surface of the carbon fiber, the remaining epoxy groups can form a covalent bond or a hydrogen bond with the aromatic epoxy compound (B1) in the outer layer or a thermoplastic resin. This is preferable because the adhesion can be further improved. The upper limit of the number of epoxy groups is not particularly limiting. Ten epoxy groups in the molecule are sufficient because the interfacial adhesion may be saturated.

In the carbon fiber-reinforced resin composition of the first embodiment, the aliphatic epoxy compound (A) is preferably an epoxy compound having two or more types of functional groups, where the number of the functional groups is three or more. The aliphatic epoxy compound (A) is more preferably an epoxy compound having two or more types of functional groups, where the number of the functional groups is four or more. In addition to the epoxy group, the functional group of the epoxy compound is preferably selected from a hydroxy group, an amido group, an imido group, a urethane group, a urea group, a sulfonyl group, and a sulfo group. In the epoxy compound having three or more epoxy groups or other functional groups in the molecule, even when one epoxy group forms a covalent bond with an oxygen-containing functional group on the surface of a carbon fiber, two or more remaining epoxy groups or other functional groups can form a covalent bond or a hydrogen bond with the aromatic epoxy compound (B1) or the thermoplastic resin. This further improves the adhesion. The upper limit of the number of the functional groups including epoxy groups is not particularly limiting. Ten epoxy groups in the molecule are sufficient from the viewpoint of adhesion.

In the carbon fiber-reinforced resin composition of the first embodiment, the aliphatic epoxy compound (A) preferably has an epoxy equivalent of less than 360 g/eq., more preferably less than 270 g/eq., and further preferably less than 180 g/eq. When the epoxy equivalent is less than 360 g/eq., interaction is formed with the carbon fibers at high density and the interfacial adhesion to the carbon fibers is further improved. The lower limit of the epoxy equivalent is not particularly limiting. An epoxy equivalent of 90 g/eq. or more is sufficient because the interfacial adhesion may be saturated.

In the carbon fiber-reinforced resin composition of the first embodiment, specific examples of the aliphatic epoxy compound (A) include glycidyl ether epoxy compounds derived from polyols, glycidylamine epoxy compounds derived from amines having a plurality of active hydrogens, glycidyl ester epoxy compounds derived from polycarboxylic acids, and epoxy compounds obtained by oxidation of compounds having a plurality of double bonds in the molecule.

Examples of the glycidyl ether epoxy compound include glycidyl ether epoxy compounds obtained by causing polyols to react with epichlorohydrin. Examples of the glycidyl ether epoxy compound include glycidyl ether epoxy compounds obtained by causing a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol to react with epichlorohydrin. Examples of the glycidyl ether epoxy compound also include glycidyl ether epoxy compounds having a dicyclopentadiene skeleton.

Examples of the glycidylamine epoxy compound include 1,3-bis(aminomethyl)cyclohexane.

Examples of the glycidyl ester epoxy compound include glycidyl ester epoxy compounds obtained by causing dimer acids to react with epichlorohydrin.

Examples of the epoxy compound obtained by oxidation of a compound having a plurality of double bonds in the molecule include epoxy compounds having an epoxycyclohexane ring in the molecule. This epoxy compound further includes epoxidized soybean oil.

In addition to these epoxy compounds, examples of the aliphatic epoxy compound (A) used in the first embodiment include epoxy compounds such as triglycidyl isocyanurate.

In the carbon fiber-reinforced resin composition of the first embodiment, the aliphatic epoxy compound (A) preferably has one or more epoxy groups and at least one or more functional groups selected from a hydroxy group, an amido group, an imido group, a urethane group, an urea group, a sulfonyl group, a carboxy group, an ester group, and a sulfo group. Specific examples of the aliphatic epoxy compound include compounds having an epoxy group and a hydroxy group, compounds having an epoxy group and an amido group, compounds having an epoxy group and an imido group, compounds having an epoxy group and a urethane group, compounds having an epoxy group and an urea group, compounds having an epoxy group and a sulfonyl group, and compounds having an epoxy group and a sulfo groups.

Examples of the compound having hydroxy groups in addition to epoxy groups include sorbitol polyglycidyl ethers and glycerol polyglycidyl ethers and specifically include "Denacol (registered trademark)" EX-611, EX-612, EX-614, EX-614B, EX-622, EX-512, EX-521, EX-421, EX-313, EX-314, and EX-321 (manufactured by Nagase ChemteX Corporation).

Examples of the compound having amido groups in addition to epoxy groups include amido-modified epoxy compounds. The amido-modified epoxy can be obtained by causing the carboxy group of an aliphatic dicarboxylic acid amide to react with the epoxy group of an epoxy compound having two or more epoxy groups.

Examples of the compound having a urethane group in addition to an epoxy group include urethane-modified epoxy compounds and specifically include "Adeka Resin (registered trademark)" EPU-78-13S, EPU-6, EPU-11, EPU-15, EPU-16A, EPU-16N, EPU-17T-6, EPU-1348, and EPU-1395 (manufactured by ADEKA Corporation). In addition, the compound can be obtained by causing the terminal hydroxy group of polyethylene oxide monoalkyl ether to react with a polyvalent isocyanate in an amount equivalent to that of the hydroxy group and then causing the isocyanate residue of the obtained reaction product to react with a hydroxy group of a polyvalent epoxy compound. Examples of the polyvalent isocyanate used here include hexamethylene diisocyanate, isophorone diisocyanate, and norbornane diisocyanate.

Examples of the compound having an urea group in addition to an epoxy group include urea-modified epoxy compounds. The urea-modified epoxy compound can be obtained by causing a carboxy group of an aliphatic dicarboxylic acid urea to react with an epoxy group of an epoxy compound having two or more epoxy groups.

Among the aliphatic epoxy compound (A) used in the first embodiment, a glycidyl ether epoxy compound obtained by causing a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, glycerol, diglycerol, polyglycerol, trimethylolpropane, pentaerythritol, sorbitol, and arabitol to react with epichlorohydrin is more preferable from the viewpoint of high adhesion.

Among them, the aliphatic epoxy compound (A) in the carbon fiber-reinforced resin composition of the first embodiment is preferably a polyether polyepoxy compound having two or more epoxy groups in a molecule and/or a polyol polyepoxy compound having two or more epoxy groups in a molecule from the viewpoint of high adhesion.

The aliphatic epoxy compound (A) is more preferably a glycidyl ether epoxy compound obtained by causing a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol to react with epichlorohydrin.

In the carbon fiber-reinforced resin composition of the first embodiment, the aliphatic epoxy compound (A) is more preferably polyglycerol polyglycidyl ether.

In the carbon fiber-reinforced resin composition of the first embodiment, the aromatic compound (B) has one or more aromatic rings in the molecule. The aromatic ring may be an aromatic hydrocarbon ring containing carbons alone or may be a heteroaromatic ring such as furan, thiophene, pyrrole, and imidazole which contains a hetero atom such as nitrogen and oxygen. The aromatic ring may also be polycyclic aromatic rings such as naphthalene and anthracene. In the carbon fiber-reinforced resin molded article made of the carbon fibers coated with the sizing agent and the thermoplastic resin, what is called an interface layer near the carbon fibers is affected by the carbon fibers or the sizing agent and thus may have different characteristics from the thermoplastic resin. When the aromatic compound (B) has one or more aromatic rings, a rigid interface layer is formed to improve the stress transmission capacity between the carbon fibers and the thermoplastic resin and to improve mechanical properties such as tensile strength of the fiber-reinforced composite material. In particular, when a resin containing aromatic rings or hydrocarbon moieties in a large amount and having a high hydrophobic property is used as the thermoplastic resin, the resin has high interaction with the aromatic compound (B) contained in the sizing agent and improves the adhesion, and thus use of this resin is preferable. The epoxy compound having aromatic rings has high heat resistance and thus the loss of the epoxy compound caused by thermal decomposition does not occur even when a thermoplastic resin having a high molding temperature as represented by a polyarylene sulfide resin is used. Therefore, the epoxy compound having aromatic rings can sustain the original reaction with oxygen-containing functional groups on the surface of the carbon fibers and the function of the interaction with the thermoplastic resin. The water content near the carbon fibers can be reduced by increasing the hydrophobic property due to the aromatic rings and thus deterioration of the physical properties of the carbon fiber composite material under humid conditions is reduced even when a thermoplastic resin having a high hygroscopic property is used. Therefore, the use of the epoxy compound having aromatic rings is preferable. The epoxy compound having aromatic rings preferably has two or more aromatic rings because the above-described effect caused by the aromatic rings is enhanced. The upper limit of the number of aromatic rings is not particularly limiting. Ten aromatic rings in the molecule are sufficient because the mechanical properties may be saturated.

In the carbon fiber-reinforced resin composition of the first embodiment, the aromatic compound (B) may have one or more types of functional groups in the molecule. The aromatic compound (B) may be used singly or may be used in combination of a plurality of compounds. At least one of the aromatic compounds (B) is the aromatic epoxy compound (B1) having one or more epoxy groups and one or more aromatic rings in the molecule. The functional group in addition to the epoxy group is preferably selected from a hydroxy group, an amido group, an imido group, a urethane group, a urea group, a sulfonyl group, a carboxy group, an ester group, and a sulfo group, and two or more types of functional groups may be contained in one molecule. Use of the epoxy group or the functional group excluding the epoxy group is preferable because the aromatic epoxy compound can have the interaction with the thermoplastic resin. In addition to the aromatic compound (B) and the aromatic epoxy compound (B1), an aromatic ester compound and an aromatic urethane compound are preferably used because these compounds are stable and improve high-order processability.

In the first embodiment, the aromatic epoxy compound (B1) preferably has two or more epoxy groups and more preferably three or more epoxy groups. Ten or less epoxy groups in the molecule are sufficient for the aromatic epoxy compound (B1).

In the carbon fiber-reinforced resin composition of the first embodiment, the aromatic epoxy compound (B1) is preferably an epoxy compound having two or more types of functional groups, where the number of the functional groups is three or more. The aromatic epoxy compound (B1) is more preferably an epoxy compound having two or more types of functional groups, where the number of the functional groups is four or more. In addition to the epoxy group, the functional group of the epoxy compound is preferably a functional group selected from a hydroxy group, an amido group, an imido group, a urethane group, a urea group, a sulfonyl group, and a sulfo group. In the epoxy compound having three or more epoxy groups or other functional groups in the molecule, even when one epoxy group forms a covalent bond with an oxygen-containing functional group on the surface of a carbon fiber, two or more remaining epoxy groups or other functional groups can form a covalent bond, a hydrogen bond or the like with the thermoplastic resin. This further improves the interfacial adhesion to the thermoplastic resin. The upper limit of the number of the functional groups including the epoxy groups is not particularly limiting. Ten functional groups including an epoxy group in the molecule are sufficient from the viewpoint of saturation of the interfacial adhesion.

In the carbon fiber-reinforced resin composition of the first embodiment, the aromatic epoxy compound (B1) preferably has an epoxy equivalent of less than 360 g/eq., more preferably less than 270 g/eq., and further preferably less than 180 g/eq. When the epoxy equivalent is less than 360 g/eq., covalent bonds are formed with the carbon fibers at high density. This is preferable because the interfacial adhesion to the carbon fiber, the aliphatic epoxy compound (A), or the thermoplastic resin is improved. The lower limit of the epoxy equivalent is not particularly limiting. An epoxy equivalent of 90 g/eq. or more is sufficient from the viewpoint of the saturation of the interfacial adhesion.

In the carbon fiber-reinforced resin composition of the first embodiment, specific examples of the aromatic epoxy compound (B1) include glycidyl ether epoxy compounds derived from polyols, glycidylamine epoxy compounds derived from amines having a plurality of active hydrogens, glycidyl ester epoxy compounds derived from polycarboxylic acids, and epoxy compounds obtained by oxidation of compounds having a plurality of double bonds in the molecule.

Examples of the glycidyl ether epoxy compound include bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane. Examples of the glycidyl ether epoxy compound also include a glycidyl ether epoxy compound having a biphenylaralkyl skeleton.

Examples of the glycidylamine epoxy compound include N,N-diglycidylaniline, N,N-diglycidyl-o-toluidine, m-xylylenediamine, m-phenylenediamine, 4,4'-diaminodiphenylmethane, and 9,9-bis(4-aminophenyl)fluorene.

Examples of the glycidylamine epoxy compound also include an epoxy compound obtained by causing both a hydroxy group and an amino group of aminophenols such as m-aminophenol, p-aminophenol, and 4-amino-3-methylphenol to react with epichlorohydrin.

Examples of the glycidyl ester epoxy compound include glycidyl ester epoxy compounds obtained by causing phthalic acid, terephthalic acid, and hexahydrophthalic acid to react with epichlorohydrin.

In addition to these epoxy compounds, examples of the aromatic epoxy compound (B1) used in the carbon fiber-reinforced resin composition of the first embodiment include epoxy compounds synthesized from the epoxy compound exemplified above as a raw material, such as an epoxy compound synthesized by an oxazolidone ring formation reaction of bisphenol A diglycidyl ether and tolylene diisocyanate.

In the carbon fiber-reinforced resin composition of the first embodiment, in addition to one or more epoxy groups, at least one or more functional groups selected from a hydroxy group, an amido group, an imido group, a urethane group, a urea group, a sulfonyl group, a carboxy group, an ester group, and a sulfo group is preferably used in the aromatic epoxy compound (B1). Examples of the aromatic epoxy compound (B1) include compounds having epoxy groups and hydroxy groups, compounds having epoxy groups and amido groups, compounds having epoxy groups and imido groups, compounds having epoxy groups and urethane groups, compounds having epoxy groups and urea groups, compounds having epoxy groups and sulfonyl groups, and compounds having epoxy groups and sulfo groups.

Examples of the aromatic epoxy compound (B1) having amido groups in addition to epoxy groups includes glycidylbenzamide and amide-modified epoxy compounds. The amide-modified epoxy compound can be obtained by causing a carboxy group of a dicarboxylic amide containing an aromatic ring to react with an epoxy group of an epoxy compound having two or more epoxy groups.

Examples of the aromatic epoxy compound (B1) having imido groups in addition to epoxy groups include glycidylphthalimide. Specific examples of the compound include Denacol (registered trademark) EX-731 (manufactured by Nagase ChemteX Corporation).

The aromatic epoxy compound (B1) having urethane groups in addition to epoxy groups can be prepared by causing the terminal hydroxy group of a polyethylene oxide monoalkyl ether to react with a polyvalent isocyanate having aromatic rings in an amount equivalent to that of the hydroxy group and then causing the isocyanate residue of the obtained reaction product to react with a hydroxy group of a polyvalent epoxy compound. Examples of the polyvalent isocyanate used here include 2,4-tolylene diisocyanate, m-phenylene diisocyanate, p-phenylene diisocyanate, diphenylmethane diisocyanate, triphenylmethane triisocyanate, and biphenyl-2,4,4'-triisocyanate.

Examples of the aromatic epoxy compound (B1) having urea groups in addition to epoxy groups include urea-modified epoxy compounds. The urea-modified epoxy can be obtained by causing a carboxy group of a dicarboxylic acid urea to react with an epoxy group of an aromatic ring-containing epoxy compound having two or more epoxy groups.

Examples of the aromatic epoxy compound (B1) having sulfonyl groups in addition to epoxy groups include bisphenol S epoxy compounds.

Examples of the aromatic epoxy compound (B1) having sulfo groups in addition to epoxy groups include glycidyl p-toluenesulfonate and glycidyl 3-nitrobenzenesulfonate.

In the carbon fiber-reinforced resin composition of the first embodiment, the aromatic epoxy compound (B1) is preferably a phenol novolac epoxy compound, a cresol novolac epoxy compound, tetraglycidyldiaminodiphenylmethane, a bisphenol A epoxy compound, or a bisphenol F epoxy compound. These epoxy compounds have a large number of epoxy groups, a small epoxy equivalent, strong interaction with the carbon fibers, the aliphatic epoxy compound (A), and the thermoplastic resin, improve the interfacial adhesion to improve mechanical properties such as the tensile strength of the fiber-reinforced composite material, and have excellent mechanical properties under humid conditions due to high content of aromatic rings. The use of these epoxy compounds is thus preferable. The aromatic epoxy compound (B1) is more preferably the bisphenol A epoxy compound or the bisphenol F epoxy compound.

The sizing agent used in the carbon fiber-reinforced resin composition of the first embodiment may further include one or more components in addition to the aliphatic epoxy compound (A) and the aromatic epoxy compound (B1) as the aromatic compound (B). An adhesion promoting component is added to improve the adhesion between the carbon fibers and the sizing agent, and a component that imparts bindability or flexibility to the carbon fibers coated with the sizing agent is added to improve handling properties, abrasion resistance, and fuzz resistance and to improve the impregnation property of the thermoplastic resin. Compounds in addition to the compounds (A) and (B1) can be added in order to improve the long term stability of the prepreg of the carbon fiber-reinforced resin composition. Auxiliary components such as a dispersant and a surfactant can be added to the sizing agent in order to stabilize the sizing agent.

In addition to the aliphatic epoxy compound (A) and the aromatic epoxy compound (B1), an ester compound (C) having no epoxy group in the molecule can be contained in the sizing agent used in the first embodiment in an amount of 2% by mass to 35% by mass relative to the total amount of the applied sizing agent. The ester compound (C) is preferably contained in an amount of 15% by mass to 30% by mass. When the ester compound (C) is contained, the bindability and the handling properties can improve and, at the same time, the hydrophobic property near the carbon fibers and the mechanical properties under humid conditions can be improved when an aromatic ester compound (C1) is used as the ester compound (C). Therefore, the addition of the ester compound (C) is preferable. The aromatic ester compound (C1) is included in the ester compound (C) having no epoxy groups in the molecule and, at the same time, is also included in the aromatic compound (B) (in this case, the aromatic compound (B) is not made of the aromatic ester compound (C1) alone, but is constituted by the compounds (B1) and (C1) as described above). The use of the aromatic ester compound (C1) as the ester compound (C) is preferable because the handling properties of the carbon fibers coated with the sizing agent are improved. In addition to the ester group, the aromatic ester compound (C1) can have a functional group excluding the epoxy group. The functional group is preferably a hydroxy group, an amido group, an imido group, a urethane group, a urea group, a sulfonyl group, a carboxy group, and a sulfo group. Specifically, an ester compound that is a condensate of an alkylene oxide adduct of bisphenols and an unsaturated dibasic acid is preferably used as the aromatic ester compound (C1). The unsaturated dibasic acid includes lower alkyl esters of acid anhydrides, and, for example, fumaric acid, maleic acid, citraconic acid, and itaconic acid are preferably used. As the alkylene oxide adduct of bisphenols, an ethylene oxide adduct of bisphenols, a propylene oxide adduct of bisphenols, and a butylene oxide adduct of bisphenols are preferably used. Among the condensates, condensates of fumaric acid or maleic acid with an ethylene oxide adduct or/and a propylene oxide adduct of bisphenol A are preferably used.

The addition method of an alkylene oxide to a bisphenol is not limiting, and a known method can be used. A saturated dibasic acid or a small amount of a monobasic acid can be partially added to the unsaturated dibasic acid, if needed. A common glycol, a common polyether glycol, a small amount of a polyol, and a small amount of a monovalent alcohol can be added to the alkylene oxide adduct of bisphenols unless properties such as adhesion are impaired. A known method can be used as a method for condensing the alkylene oxide adduct of bisphenols with the unsaturated dibasic acid.

In the carbon fiber-reinforced resin composition of the first embodiment, at least one compound selected from tertiary amine compounds and/or tertiary amine salts, quaternary ammonium salts having a cation site, and quaternary phosphonium salts and/or phosphine compounds can be used as an adhesion promoting component in order to improve the adhesion between carbon fibers and the epoxy compounds in the sizing agent and to improve the interfacial adhesion between the carbon fibers and the thermoplastic resin. The compound is preferably contained in an amount of 0.1% by mass to 25% by mass relative to the total amount of the applied sizing agent. The amount is more preferably 2% by mass to 10% by mass.

When the carbon fibers are coated with the sizing agent containing the aliphatic epoxy compound (A) and the aromatic epoxy compound (B1) and further containing at least one compound selected from the tertiary amine compounds and/or the tertiary amine salts, the quaternary ammonium salts having a cation site, and the quaternary phosphonium salts and/or the phosphine compounds and heat treatment under specific conditions is carried out to the coated carbon fiber, the adhesion is further improved and thus this addition of these compounds is preferable. Although the mechanism is not certain, the mechanism is supposed as follows: first, the compound reacts with an oxygen-containing functional group such as a carboxy group and a hydroxy group of the carbon fibers used in the carbon fiber-reinforced resin composition of the first embodiment and abstracts a proton contained in the functional group to form an anion; and then a nucleophilic reaction of the anionic functional group with an epoxy group contained in the aliphatic epoxy compound (A) or the aromatic epoxy compound (B1) component is carried out. This forms a strong binding between the carbon fibers used in the carbon fiber-reinforced resin composition of the first embodiment and the epoxy group in the sizing agent to improve the adhesion.

Specific examples of the compound preferably include N-benzylimidazole, 1,8-diazabicyclo[5,4,0]-7-undecene (DBU) and salts thereof, or 1,5-diazabicyclo[4,3,0]-5-nonene (DBN) and salts thereof. In particular, 1,8-diazabicyclo[5,4,0]-7-undecene (DBU) and salts thereof or 1,5-diazabicyclo[4,3,0]-5-nonene (DBN) and salts thereof are suitable.

Specific examples of the DBU salts include a phenolate of DBU (U-CAT SA1, manufactured by San-Apra Ltd.), an octanoate of DBU (U-CAT SA102, manufactured by San-Apro Ltd.), a p-toluenesulfonate of DBU (U-CAT SA506, manufactured by San-Apro Ltd.), a formate of DBU (U-CAT SA603, manufactured by San-Apro Ltd.), an orthophthalate of DBU (U-CAT SA810), and a phenol novolac resin salt of DBU (U-CAT SA810, SA831, SA841, SA851, and 881, manufactured by San-Apro Ltd.).

In the carbon fiber-reinforced resin composition of the first embodiment, tributylamine, N,N-dimethylbenzylamine, diisopropylethylamine, triisopropylamine, dibutylethanolamine, diethylethanolamine, triisopropanolamine, triethanolamine, and N,N-diisopropylethylamine are preferable and triisopropylamine, dibutylethanolamine, diethylethanolamine, triisopropanolamine, and diisopropylethylamine are particularly preferable.

In addition to the compounds described above, examples of the additive such as a surfactant include nonionic surfactants including polyalkylene oxides such as polyethylene oxide and polypropylene oxide; adducts of higher alcohols, polyols, alkylphenols, styrenated phenols, and the like with polyalkylene oxides such as polyethylene oxide and polypropylene oxide; and block copolymers of ethylene oxide and propylene oxide. A polyester resin, an unsaturated polyester compound, and other additives may be appropriately added unless the effect of the carbon fiber-reinforced resin composition of the first embodiment is impaired.

Subsequently, the carbon fibers used in the carbon fiber-reinforced resin composition of the first embodiment will be described.

In the carbon fiber-reinforced resin composition of the first embodiment, examples of the carbon fibers include polyacrylonitrile (PAN) carbon fibers, rayon carbon fibers, and pitch carbon fibers. Among them, the PAN carbon fibers are preferably used due to excellent balance between strength and elastic modulus.

In the carbon fiber-reinforced resin composition of the first embodiment, carbon fiber bundles obtained from the carbon fibers preferably have a strand strength of 3.5 GPa or more, more preferably 4 GPa or more, and further preferably 5 GPa or more. The obtained carbon fiber bundles preferably have a strand elastic modulus of 220 GPa or more, more preferably 240 GPa or more, and further preferably 280 GPa or more.

In the carbon fiber-reinforced resin composition of the first embodiment, the strand tensile strength and the elastic modulus of the carbon fiber bundles can be determined by the following procedure in accordance with the test method of resin-impregnated strand described in JIS-R-7608 (2004). The resin formulation is "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the hardening conditions are at normal pressure at 130° C. for 30 minutes. Ten strands of the carbon fiber bundles are tested, and average values are determined as the strand tensile strength and the strand elastic modulus.

The carbon fibers used in the first embodiment preferably has a surface roughness (Ra) of 6.0 to 100 nm. The surface roughness (Ra) is more preferably 15 nm to 80 nm and further preferably 30 nm to 60 nm. Carbon fibers having a surface roughness (Ra) of 6.0 nm to 60 nm are preferable because the carbon fibers have surfaces having a highly active edge part and thus the interaction with the epoxy group in the sizing agent is improved and the interfacial adhesion between the carbon fibers and the thermoplastic resin can be improved. The carbon fibers having a surface roughness (Ra) of 6.0 nm to 100 nm are preferable because the carbon fibers have uneven surfaces and thus the interfacial adhesion can be improved due to an anchoring effect of the sizing agent.

The surface roughness (Ra) of the carbon fibers can be determined by using an atomic force microscope (AFM). For example, carbon fibers cut into pieces having a length of several millimeters are prepared; the fiber pieces are fixed onto a substrate (silicon wafer) using a silver paste; and a three-dimensional surface shape image of the central part of each single fiber may be observed with the atomic force microscope (AFM). Examples of the usable atomic force microscope include NanoScope IIIa with Dimension 3000 stage system manufactured by Digital Instruments. The observation can be carried out in the following observation conditions.

Scan mode: Tapping mode
Probe: Silicon cantilever
Scan field: 0.6 μm×0.6 μm
Scan speed: 0.3 Hz
Number of pixels: 512×512
Measurement environment: At room temperature in the atmosphere For each sample, the curve of the fiber cross section is approximated with a three-dimensional curved surface based on the images obtained by the observation of a single area per single fiber. From the obtained whole image, the average roughness (Ra) of the carbon fibers is calculated. It is preferable that the surface roughness (Ra) of five single carbon fibers be determined and the average value be evaluated.

In the carbon fiber-reinforced resin composition of the first embodiment, the carbon fibers preferably have a total fineness of 400 tex to 3,000 tex. The carbon fibers preferably have a filament number of 1,000 to 100,000 and more preferably 3,000 to 50,000.

In the carbon fiber-reinforced resin composition of the first embodiment, the carbon fibers preferably have a single fiber diameter of 4.5 μm to 7.5 μm. When the carbon fibers have a single fiber diameter of 7.5 μm or less, high strength and high elastic modulus are obtained and thus the carbon fibers are preferably used. The single fiber diameter is more preferably 6 μm or less and further preferably 5.5 μm or less. When the carbon fibers have a single fiber diameter of 4.5 μm or more, the carbon fibers do not easily cause single fiber breakage in processes and the productivity is not easily reduced, which are thus preferable.

In the carbon fiber-reinforced resin composition of the first embodiment, the carbon fibers preferably have a surface oxygen concentration (O/C) in a range from 0.05 to 0.50, more preferably in a range from 0.06 to 0.30, and further preferably in a range from 0.07 to 0.25, where the surface oxygen concentration (O/C) is the ratio of the number of oxygen (O) atoms and that of carbon (C) atoms on the surface of the fibers measured by X-ray photoelectron spectroscopy. When the carbon fibers have a surface oxygen concentration (O/C) of 0.05 or more, the oxygen-containing functional groups on the surface of the carbon fibers are secured and thus a strong interfacial adhesion to the thermoplastic resin can be obtained. When the carbon fibers have a surface oxygen concentration (O/C) of 0.50 or less, deterioration in strength of the carbon fibers themselves caused by oxidation can be reduced.

The surface oxygen concentration of carbon fibers is determined by X-ray photoelectron spectroscopy in accordance with the following procedure. First, carbon fibers from which dirt and the like attaching to the surface of carbon fibers are removed with a solvent are cut into pieces having a length of 20 mm and the pieces are spread and arranged on a copper sample holder. Thereafter, the sample is measured by using $AlK\alpha_{1,2}$ as an X-ray source and maintaining the inside of a sample chamber at $1\times10^{-8}$ Torr. The sample is measured at a photoelectron takeoff angle of 90°. As the calibration value for the peak associated with electrification during measurement, the binding energy value of the main peak (peak top) of $C_{1s}$ is set to 284.6 eV. The $C_{1s}$ peak area is determined by drawing a straight base line in a range from 282 eV to 296 eV, and the $O_{1s}$ peak area is determined by drawing a straight base line in a range from 528 eV to 540 eV. The surface oxygen concentration O/C is expressed as an atom number ratio calculated by dividing the ratio of the $O_{1s}$ peak area by a sensitivity correction value specific to the apparatus. When ESCA-1600 manufactured by Ulvac-Phi, Inc. is used as the X-ray photoelectron spectrometer, the sensitivity correction value specific to the apparatus is 2.33.

The carbon fibers used in the first embodiment preferably have a surface carboxy group concentration (COOH/C) in a range from 0.003 to 0.015, where the surface carboxy group concentration (COOH/C) is defined by the ratio of the numbers of atoms of the carboxy group (COOH) and the carbon (C) on the surface of carbon fibers measured by chemical modification X-ray photoelectron spectroscopy. The surface carboxy group concentration (COOH/C) is more preferably in a range from 0.004 to 0.010. The carbon fibers used in the first embodiment preferably have a surface hydroxy group concentration (COH/C) in a range from 0.001 to 0.050, where the surface hydroxy group concentration (COH/C) is defined by the ratio of the numbers of atoms of the hydroxy group (OH) and the carbon (C) on the surface of carbon fibers determined by chemical modification X-ray photoelectron spectroscopy. The surface hydroxy group concentration (COH/C) is more preferably in a range from 0.010 to 0.040.

The surface carboxy group concentration and the hydroxy group concentration of the carbon fibers are determined by X-ray photoelectron spectroscopy in accordance with the following procedure.

The surface hydroxy group concentration (COH/C) is determined by chemical modification X-ray photoelectron spectroscopy in accordance with the following procedure. First, the carbon fiber bundle from which the sizing agent and the like are removed with a solvent is cut into pieces and the pieces are spread and arranged on a platinum sample holder. Then, the pieces are exposed to a dry nitrogen gas containing 0.04 mol/liter of trifluoroacetic anhydride gas at room temperature for 10 minutes for carrying out chemical modification treatment. Thereafter, the modified pieces are mounted on an X-ray photoelectron spectrometer at a photoelectron takeoff angle of 35°. $AlK\alpha_{1,2}$ is used as the X-ray source, and the inside of the sample chamber is maintained at a degree of vacuum of $1\times10^{-8}$ Torr. As the calibration for the peak associated with electrification during measurement, first, the binding energy value of the main peak of $C_{1s}$ is set to 284.6 eV. The $C_{1s}$ peak area [$C_{1s}$] is determined by drawing a straight base line in a range from 282 to 296 eV, and the $F_{1s}$ peak area [$F_{1s}$] is determined by drawing a straight base line in a range from 682 eV to 695 eV. The reaction rate r is determined from $C_{1s}$ peak splitting of polyvinyl alcohol simultaneously carrying out the chemical modification treatment.

The surface hydroxy group concentration (COH/C) is expressed by the value calculated in accordance with the following formula.

$$COH/C=\{[F_{1s}]/(3k[C_{1s}]-2[F_{1s}])r\}\times100(\%)$$

Where k is a sensitivity correction value specific to the apparatus for the $F_{1s}$ peak area relative to the $C_{1s}$ peak area. When model SSX-100-206 manufactured by SSI, USA is used, the sensitivity correction value specific to the apparatus is 3.919.

The surface carboxy group concentration (COOH/C) is determined by chemical modification X-ray photoelectron spectroscopy in accordance with the following procedure. First, the carbon fiber bundle from which the sizing agent and the like are removed with a solvent is cut into pieces and the pieces are spread and arranged on a platinum sample holder. Then, the pieces are exposed to air containing 0.02 mol/liter of trifluoroethanol gas, 0.001 mol/liter of dicyclohexylcarbodiimide gas, and 0.04 mol/liter of pyridine gas at 60° C. for 8 hours for carrying out chemical modification treatment. Thereafter, the modified pieces are mounted on an X-ray photoelectron spectrometer at a photoelectron takeoff angle of 35°. $AlK\alpha_{1,2}$ is used as the X-ray source, and the inside of the sample chamber is maintained at a degree of vacuum of $1\times10^{-8}$ Torr. As the calibration for the peak associated with electrification during measurement, first, the binding energy value of the main peak of $C_{1s}$ is set to 284.6 eV. The $C_{1s}$ peak area [$C_{1s}$] is determined by drawing a straight base line in a range from 282 eV to 296 eV, and the $F_{1s}$ peak area [$F_{1s}$] is determined by drawing a straight base line in a range from 682 eV to 695 eV. The reaction rate r can be determined from $C_{1s}$ peak splitting of polyacrylic acid simultaneously carrying out the chemical modification treatment, and the residual rate m of a dicyclohexylcarbodiimide derivative can be determined from $O_{1s}$ peak splitting.

The surface carboxy group concentration (COOH/C) is expressed by the value calculated in accordance with the following formula.

$$COOH/C=\{[F_{1s}]/(3k[C_{1s}]-(2+13m)[F_{1s}])r\times100(\%)$$

where k is a sensitivity correction value specific to the apparatus for the $F_{1s}$ peak area relative to the $C_{1s}$ peak area. When model SSX-100-206 manufactured by SSI, USA is used, the sensitivity correction value specific to the apparatus is 3.919.

The carbon fibers used for carbon fiber-reinforced resin composition of the first embodiment preferably have a polar component of surface free energy of 8 mJ/m² or more and 50 mJ/m² or less. The carbon fibers having a polar component of surface free energy of 8 mJ/m² or more are preferable because a structure in which a sizing layer is eccentrically located is obtained by approximating the aliphatic epoxy compound (A) to the surface of the carbon fibers and thus the interfacial adhesion is improved. The carbon fibers having a polar component of surface free energy of 50 mJ/m² or less are preferable because impregnation properties with the thermoplastic resin is improved and the applications are expanded when the carbon fiber-reinforced resin composition is used as a composite material.

The polar component of surface free energy of the surface of the carbon fibers is more preferably 15 mJ/m² or more and 45 mJ/m² or less and most preferably 25 mJ/m² or more and 40 mJ/m² or less. The polar component of surface free energy of the carbon fibers is a polar component of surface free energy calculated by using the Owens approximation formula on the basis of each contact angle of the carbon fibers with a corresponding liquid of water, ethylene glycol, and tricresyl phosphate determined by the Wilhelmy method.

The aliphatic epoxy compound (A) used in the carbon fiber-reinforced resin composition of the first embodiment preferably has a polar component of surface free energy of 9 mJ/m² or more and 50 mJ/m² or less.

The polar components of surface free energy of the aliphatic epoxy compound (A) and the aromatic epoxy compound (B1) are determined by immersing carbon fiber bundles in a solution containing the aliphatic epoxy compound (A) or the aromatic epoxy compound (B1) alone and pulling up; drying the carbon fiber bundles at 120° C. to 150° C. for 10 minutes; and calculating each polar component of surface free energy by using the Owens approximation formula on the basis of each contact angle of the carbon fiber bundles with a corresponding liquid of water, ethylene glycol, and tricresyl phosphate determined by the Wilhelmy method as described above.

In the carbon fiber-reinforced resin composition of the first embodiment, the polar component of surface free energy of carbon fibers $E_{CF}$, the polar component of surface free energy of the aliphatic epoxy compound (A) $E_A$, and the polar component of surface free energy of the aromatic epoxy compound (B1) $E_{B1}$ preferably satisfy the relation of $E_{CF} \geq E_A > E_{B1}$.

Subsequently, a method for producing the PAN carbon fibers preferably used for the carbon fiber-reinforced resin composition of the first embodiment will be described.

Usable examples of spinning methods for obtaining precursor fibers of carbon fibers include dry spinning, wet spinning, and dry-wet spinning methods. From the viewpoint of easy preparation of a high-strength carbon fiber, the wet spinning or the dry-wet spinning is preferably used. In particular, the dry-wet spinning is more preferably used because carbon fibers having high strength can be obtained.

In order to further improve the interfacial adhesion between the carbon fibers and the thermoplastic resin, the carbon fibers have a surface roughness (Ra) of 6.0 to 100 nm. In order to obtain the carbon fibers having this surface roughness, the precursor fibers are preferably formed by the wet spinning method.

As a spinning solution, a solution in which a homopolymer or copolymer of polyacrylonitrile is dissolved in a solvent is used. Examples of the usable solvent include an organic solvent such as dimethyl sulfoxide, dimethylformamide, and dimethylacetamide and an aqueous solution of an inorganic compound such as nitric acid, sodium rhodanate, zinc chloride, and sodium thiocyanate. Dimethyl sulfoxide and dimethylacetamide are preferable as the solvent.

The spinning solution is passed through a spinneret for spinning, discharged into a spinning bath or air, and then solidified in the spinning bath. As the spinning bath, an aqueous solution of the same solvent as the solvent used for the spinning solution can be used. The spinning liquid containing the same solvent as the solvent for the spinning solution is preferable, and a dimethyl sulfoxide aqueous solution and a dimethylacetamide aqueous solution are preferable. The fibers solidified in the spinning bath are washed and stretched to form precursor fibers. Flame retardant treatment and carbonization treatment are applied to the obtained precursor fibers and graphite treatment is further applied, if needed, to obtain carbon fibers. As conditions for the carbonization treatment and the graphite treatment, a maximum heat treatment temperature is preferably 1100° C. or more and more preferably 1,400° C. to 3,000° C.

In order to improve the interfacial adhesion to the thermoplastic resin, oxidation treatment is usually applied to the carbon fibers to introduce oxygen-containing functional groups. As the oxidation treatment, gas phase oxidation, liquid phase oxidation, and liquid phase electrolytic oxidation are used. From the viewpoint of high productivity and uniform treatment, the liquid phase electrolytic oxidation is preferably used.

In the carbon fiber-reinforced resin composition of the first embodiment, an acid electrolytic solution and an alkaline electrolytic solution are exemplified as the electrolytic solution used for the liquid phase electrolytic oxidation. From the viewpoint of adhesion, carbon fibers are more preferably treated by applying the liquid phase electrolytic oxidation in an alkaline electrolytic solution and then the carbon fiber are coated with the sizing agent.

Examples of the acid electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among them, sulfuric acid and nitric acid, which exhibit strong acidity, are preferably used.

Specific examples of the alkaline electrolytic solution include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, the aqueous solutions of ammonium carbonate and ammonium hydrogen carbonate or an aqueous solution of tetraalkylammonium hydroxide, which exhibits strong alkalinity, is preferably used.

The concentration of the electrolytic solution used in the carbon fiber-reinforced resin composition of the first embodiment is preferably in a range from 0.01 mol/liter to 5 mol/liter and more preferably in a range from 0.1 mol/liter to 1 mol/liter. When the concentration of the electrolytic solution is 0.01 mol/liter or more, the electrical voltage at the electrolytic treatment can be decreased, which is advantageous in operating cost. When the concentration of the electrolytic solution is 5 mol/liter or less, this concentration is advantageous from the viewpoint of safety.

The temperature of the electrolytic solution of the carbon fiber-reinforced resin composition of the first embodiment is preferably 10° C. or more and less than 100° C. and more preferably 10° C. or more and 40° C. or less. When the temperature of the electrolytic solution is 10° C. or more, the efficiency of electrolytic treatment is improved, which is advantageous in operating cost. When the temperature of the electrolytic solution is less than 100° C., this temperature is advantageous from the viewpoint of safety.

In the carbon fiber-reinforced resin composition in the first embodiment, the quantity of electricity during the liquid phase electrolytic oxidation is preferably optimized depending on the carbonization degree of the carbon fibers, and a larger quantity of electricity is required when the carbon fibers having a high elastic modulus are treated.

In the carbon fiber-reinforced resin composition of the first embodiment, the current density during the liquid phase electrolytic oxidation is preferably in a range from 1.5 A/m$^2$ to 1,000 A/m$^2$ and more preferably from 3 A/m$^2$ to 500 A/m$^2$ relative to 1 m$^2$ of the surface area of the carbon fibers in the electrolytic treatment solution. When the current density is 1.5 A/m$^2$ or more, the efficiency of electrolytic treatment is improved, which is advantageous in operating cost. When the current density is 1,000 A/m$^2$ or less, this current density is advantageous from the viewpoint of safety.

In the carbon fiber-reinforced resin composition of the first embodiment, the carbon fibers are preferably washed with water and dried after electrolytic treatment. Examples of the usable method for washing include a dipping method and a spraying method. Among them, from the viewpoint of easiness of washing, the dipping method is preferably used. The dipping method is preferably carried out while carbon fibers are vibrated by ultrasonic waves. When the drying temperature is excessively high, the functional groups on the outmost surfaces of carbon fibers are easily lost by thermal decomposition. Therefore, the drying is preferably carried out at a temperature as low as possible. Specifically, the drying is preferably carried out at a drying temperature of 250° C. or less and more preferably 210° C. or less.

Next, the carbon fibers prepared by coating the above-described carbon fibers with the sizing agent will be described.

The sizing agent in the carbon fiber-reinforced resin composition of the first embodiment contains at least the aliphatic epoxy compound (A) and the aromatic epoxy compound (B1) as the aromatic compound (B) and may contain additional components.

As a method of coating the carbon fibers with the sizing agent, a method for coating the carbon fibers at one time with a sizing agent-containing liquid in which the aliphatic epoxy compound (A), the aromatic compound (B) at least containing the aromatic epoxy compound (B1), and other components are simultaneously dissolved or dispersed in a solvent and a method for coating the carbon fibers in multiple times with sizing agent-containing liquids in which any of the compounds (A), (B1), and (B) and other components are selected and individually dissolved or dispersed in solvents are preferably used. In the first embodiment, in order to set the components of the surface of the carbon fibers coated with the sizing agent at specific values, one step application, that is, the method for coating the carbon fibers with the sizing agent-containing liquid containing all the components of the sizing agent at one time is preferably used from the viewpoint of the effect and simple treatment.

In the carbon fiber-reinforced resin composition of the first embodiment, the sizing agent can be used as a sizing liquid prepared by diluting the sizing agent with a solvent. Examples of the solvent include water, methanol, ethanol, isopropanol, acetone, methyl ethyl ketone, dimethylformamide, and dimethylacetamide. In particular, an aqueous dispersion emulsified with a surfactant or an aqueous solution is preferably used from the viewpoint of easy handling and safety.

As the order of dissolution, the sizing liquid is preferably prepared by firstly emulsifying components containing at least the aromatic compound (B) with a surfactant to prepare a water emulsion liquid and then mixing a solution at least containing the aliphatic epoxy compound (A). When the aliphatic epoxy compound (A) is soluble in water, a method of dissolving the aliphatic epoxy compound (A) in water to provide an aqueous solution in advance and mixing a water emulsion liquid containing at least the aromatic compound (B) is preferably used from the viewpoint of emulsion stability. Alternatively, a method of using a water dispersant in which the aliphatic epoxy compound (A), the aromatic compound (B), and other components are emulsified with a surfactant is preferably used from the viewpoint of long-term stability of the sizing agent.

The content of the sizing agent in the sizing liquid is required to be appropriately controlled by a method for applying the sizing liquid and adjusting the squeezing amount determined by squeezing an excess sizing liquid after applying the sizing liquid. Usually, the content is preferably in a range from 0.2% by mass to 20% by mass.

Examples of the method of applying the sizing agent to the carbon fibers (coating) include a method of immersing carbon fibers in a sizing liquid using a roller, a method of bringing carbon fibers into contact with a roller onto which the sizing liquid is attached, and a method of spraying a sizing liquid onto carbon fibers. The method of applying the sizing agent may be either a batch method or a continuous method, and the continuous method is preferably used due to good productivity and small fluctuation. During the application, in order to uniformly attach effective components in the sizing agent onto carbon fibers within an appropriate range of an attached amount, the concentration and temperature of the sizing liquid, the thread tension, and other conditions are preferably controlled. During the application of a sizing agent, carbon fibers are preferably vibrated by ultrasonic waves.

In order to reduce concentration change in the sizing agent due to the evaporation of the solvent, the liquid temperature of the sizing liquid is preferably in a range from 10° C. to 50° C. The attached amount of the sizing agent can be controlled and the sizing agent can be uniformly applied into carbon fibers by adjusting the squeezing amount determined by squeezing an excess sizing liquid after applying the sizing liquid.

In the carbon fiber-reinforced resin composition of the first embodiment, after coating the carbon fibers with the sizing agent, the carbon fibers are preferably heated at a temperature in a range from 160° C. to 260° C. for 30 seconds to 600 seconds. The heat treatment conditions are preferably at a temperature in a range from 170° C. to 250° C. for 30 seconds to 500 seconds and more preferably at a temperature in a range from 180° C. to 240° C. for 30 seconds to 300 seconds. The heat treatment conditions of 160° C. or more and/or 30 seconds or more are preferable because the interaction between the epoxy compounds in the sizing agent and oxygen-containing functional groups on the surface of carbon fibers are promoted and thus the interfacial adhesion between the carbon fibers and the thermoplastic resin becomes sufficient. The heat treatment conditions of 260° C. or less and/or 600 seconds or less are preferable because decomposition and volatilization of the sizing agent can be suppressed and the interaction with the carbon fibers is promoted, and thus the interfacial adhesion between the carbon fibers and the thermoplastic resin becomes sufficient.

The heat treatment can be carried out by microwave irradiation and/or infrared irradiation. When the carbon fibers coated with the sizing agent are treated with heat by microwave irradiation and/or infrared irradiation, microwaves penetrate to the carbon fibers and are absorbed by the carbon fibers, and whereby the carbon fibers as a substance to be heated can be heated to a desired temperature in a short period of time. The inside of the carbon fibers can be rapidly heated by the microwave irradiation and/or the infrared irradiation. This can reduce the difference in temperature between the inner side and the outer side of carbon fiber bundles and thus the uneven adhesion of the sizing agent is reduced.

The carbon fiber-reinforced resin composition of the first embodiment has a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum at the surface of the sizing agent measured by X-ray photoelectron spectroscopy using $AlK\alpha_{1,2}$ as an X-ray source at a photoelectron takeoff angle of 15°. The (a)/(b) ratio is preferably 0.55 or more and further preferably 0.57 or more. In addition, the (a)/(b) ratio is preferably 0.80 or less and further preferably 0.74 or less. A larger (a)/(b) ratio means that larger amounts of compounds derived from aromatics and smaller amounts of compounds derived from aliphatics exist near the surface of the sizing agent. Therefore, in the carbon fiber-reinforced resin composition of the first embodiment, when the (a)/(b) ratio is within the specific range, the carbon fiber-reinforced resin composition has excellent adhesion between the carbon fibers and the sizing agent and the interaction between the sizing agent and the thermoplastic resin is improved. As a result, the obtained carbon fiber-reinforced thermoplastic resin composition has the excellent interfacial adhesion between the carbon fibers and the thermoplastic resin and thus has excellent physical properties. The inventors of the present invention have found that, even when a thermoplastic resin having a high hygroscopic property is used, the obtained carbon fiber-reinforced resin composition also has excellent mechanical properties under humid conditions when the carbon fibers are used and has achieved the present invention.

The method of measuring X-ray photoelectron spectroscopy is an analytical method of irradiating carbon fibers as a sample with X rays in an ultrahigh vacuum and analyzing the kinetic energy of photoelectrons emitted from the surface of carbon fibers with what is called an energy analyzer. By analyzing the kinetic energy of the photoelectrons emitted from the surface of the carbon fibers as the sample, a binding energy is uniquely determined from the converted energy value of X rays that are incident on the carbon fibers as the sample and the kinds, concentrations, and chemical states of elements present in the outmost surface (the order of nanometers) of the sample can be analyzed from the binding energy and a photoelectron intensity.

In the carbon fiber-reinforced resin composition of the first embodiment, the peak ratio of (a) and (b) of the surface of the sizing agent of the sizing agent-coated carbon fibers can be determined by the X-ray photoelectron spectroscopy in accordance with the following procedure. The measurement is carried out at a photoelectron takeoff angle of 15°. The carbon fibers coated with the sizing agent are cut into 20 mm pieces and the pieces are spread and arranged on a copper sample holder. The sample is measured by using $AlK\alpha_{1,2}$ as an X-ray source and maintaining the inside of a sample chamber at $1\times10^{-8}$ Torr. As the calibration for the peak associated with electrification during measurement, first, the binding energy value of the main peak of $C_{1s}$ is set to 286.1 eV. At this time, the $C_{1s}$ peak area is determined by drawing a straight base line in a range from 282 eV to 296 eV. The straight base line from 282 eV to 296 eV for calculating area at the $C_{1s}$ peak is defined as the original point (zero point) for the photoelectron intensity. The (a)/(b) ratio is calculated by determining the height (b) (cps: photoelectron intensity per unit time) of the peak at a binding energy of 286.1 eV attributed to a C—O component and the height (a) (cps) of the component at a binding energy of 284.6 eV attributed to CHx, C—C, and C=C.

In the sizing agent-coated carbon fibers according to the carbon fiber-reinforced resin composition of the first embodiment, the values of (I) and (II) preferably satisfy the following relation of (III). The values of (I) and (II) are determined from the (a)/(b) ratio where (a) is the height (cps) of a component at a binding energy (284.6 eV) attributed to CHx, C—C, and C=C and (b) is the height (cps) of a component at a binding energy (286.1 eV) attributed to C—O in a $C_{1s}$ core spectrum of the surface of the sizing agent applied to the carbon fibers analyzed by X-ray photoelectron spectroscopy using an X ray at 400 eV at a photoelectron takeoff angle of 55°.

(I) The value of the (a)/(b) ratio of the surface of the sizing agent-coated carbon fibers before ultrasonic treatment (II) The value of the (a)/(b) ratio at the surface of the sizing agent-coated carbon fibers after washing to reduce an attached amount of the sizing agent to between 0.09% by mass and 0.20% by mass by the ultrasonic treatment of the sizing agent-coated carbon fibers in an acetone solvent $$0.50 \leq (I) \leq 0.90 \text{ and } 0.60 < (II)/(I) < 1.0 \qquad (III)$$

When the value (I) as the value of (a)/(b) of the surface of the sizing agent-coated carbon fibers before the ultrasonic treatment falls within the range, larger amounts of compounds derived from aromatics and smaller amounts of compounds derived from aliphatics exist on the surface of the sizing agent. The value (I) as the value of (a)/(b) before the ultrasonic treatment is preferably 0.55 or more and more preferably 0.57 or more. In addition, the value (I) as the value of (a)/(b) before the ultrasonic treatment is preferably 0.80 or less and more preferably 0.74 or less.

When the ratio (II)/(I) as the ratio of the values of (a)/(b) of the surface of sizing agent-coated carbon fibers before and after the ultrasonic treatment falls within the range, larger amounts of compounds derived from aliphatics exist in the inner layer of the sizing agent than at the surface of the sizing agent. The ratio (II)/(I) is preferably 0.65 or more. In addition, the ratio (II)/(I) is preferably 0.85 or less.

When the values (I) and (II) satisfy the relation of (III), the carbon fiber-reinforced resin composition having excellent adhesion to the matrix resin, high interaction with the thermoplastic resin used for the matrix resin, and excellent physical properties is obtained. Here, the ultrasonic treatment means treatment of immersing 2 g of the sizing agent-coated carbon fibers in 50 ml of acetone to carry out ultrasonic cleaning for 30 minutes three times, subsequently immersing these carbon fibers in 50 ml of methanol to carry out ultrasonic cleaning for 30 minutes once, and drying these carbon fibers.

In the carbon fiber-reinforced resin composition of the first embodiment, the attached amount of the sizing agent is preferably in a range of 0.1 to 10.0 parts by mass and more preferably in a range of 0.2 to 3.0 parts by mass relative to 100 parts by mass of the carbon fibers. When the attached amount of the sizing agent is 0.1% by mass or more, the carbon fibers coated with the sizing agent can withstand friction against metal guides or the like through which the carbon fibers pass when the carbon fibers coated with the sizing agent are added to the thermoplastic resin. This prevents generation of fluffs and thus an obtained carbon fiber sheet has excellent quality such as smoothness. The attached amount of the sizing agent of 10.0 parts by mass or less is preferable because the thermoplastic resin is impregnated into the carbon fibers without blocking by the sizing agent coating around the carbon fibers coated with the sizing agent and generation of voids in the obtained carbon fiber-reinforced resin composition is prevented, and thus the carbon fiber-reinforced resin composition has excellent quality and excellent mechanical characteristics.

The attached amount of the sizing agent is obtained by measuring a mass change, which is determined by weighing about 2±0.5 g of the carbon fibers coated with the sizing agent, applying heat treatment to the carbon fibers at 450° C. for 15 minutes in a nitrogen atmosphere, and measuring the change in mass before and after the heat treatment. The attached amount of the sizing agent (parts by mass) is a mass change amount per 100 parts by mass of the carbon fibers coated with the sizing agent.

In the carbon fiber-reinforced resin composition of the first embodiment, the epoxy equivalent of the sizing agent applied to the carbon fibers is preferably 350 to 550 g/eq. The epoxy equivalent of 550 g/eq. or less is preferable because the interfacial adhesion between the carbon fibers coated with the sizing agent and the thermoplastic resin is improved and thus the physical properties of the carbon fiber-reinforced resin composition are improved. The sufficient epoxy equivalent is 350 g/eq. or more from the viewpoint of the adhesion.

In the first embodiment, the epoxy equivalent of the carbon fibers coated with the sizing agent can be determined by immersing the sizing agent-coated carbon fibers in a solvent represented by N,N-dimethylformamide, carrying out ultrasonic cleaning to elute the sizing agent from the fibers, ring-opening the epoxy groups with hydrochloric acid, and carrying out acid-base titration. The epoxy equivalent is preferably 360 g/eq. or more and more preferably 380 g/eq. or more. In addition, the epoxy equivalent is preferably 530 g/eq. or less and more preferably 500 g/eq. or less. The epoxy equivalent of the sizing agent applied to the carbon fibers can be controlled by, for example, the epoxy equivalent of a sizing agent used for application and heat history during drying or other treatment after the application.

In the carbon fiber-reinforced resin composition of the first embodiment, the attached amount of the aliphatic epoxy compound (A) is preferably 0.05 to 5.0 parts by mass and more preferably 0.2 to 2.0 parts by mass relative to 100 parts by mass of the carbon fibers. The attached amount is further preferably 0.3 to 1.0 parts by mass. When the attached amount of the aliphatic epoxy compound (A) is 0.05% by mass or more, the interfacial adhesion between the carbon fibers in which the surface of the carbon fibers is coated with the aliphatic epoxy compound (A) as the sizing agent and the thermoplastic resin is improved, and thus this amount is preferable.

In the carbon fiber-reinforced resin composition of the first embodiment, the thickness of a sizing agent layer that is applied to the carbon fibers and dried is preferably in a range of 2.0 nm to 20 nm and has a maximum value of the thickness of less than twice a minimum value of the thickness. When the sizing agent layer having such a uniform thickness is employed, a large adhesion improvement effect can be stably obtained and excellent high-order processability can be stably obtained.

In the carbon fiber-reinforced resin composition of the first embodiment, when the carbon fibers coated with the sizing agent is eluted into a mixed solvent of acetonitrile and chloroform, the aliphatic epoxy compound (A) is preferably eluted in a ratio of 2.0 parts by mass or less and more preferably 0.3 parts by mass relative to 100 parts by mass of the carbon fibers coated with the sizing agent. In particular, when the eluted amount of the aliphatic epoxy compound (A) is 0.3 parts by mass or less, the water content on the surface of the carbon fibers is reduced and the interaction with the thermoplastic resin is improved at the time of mixing the carbon fibers coated with the sizing agent of the carbon fiber-reinforced resin composition of the first embodiment with the thermoplastic resin. From this viewpoint, the ratio of the eluted aliphatic epoxy compound (A) is preferably 0.1 parts by mass or less and more preferably 0.05 parts by mass relative to 100 parts by mass of the carbon fibers coated with the sizing agent.

The ratio of the eluted aliphatic epoxy compound (A) can be determined by immersing a test specimen of the carbon fibers coated with the sizing agent into a mixed solution of acetonitrile and chloroform (a volume ratio of 9/1), applying ultrasonic cleaning for 20 minutes, and analyzing the eluate in which the sizing agent is eluted into the mixed solution of acetonitrile and chloroform using liquid chromatography in the following conditions.

Analytical column: Chromolith Performance RP-18e (4.6×100 mm)

Mobile phase: Water/acetonitrile solution is used; from the start of analysis to 7 minutes, the mobile phase is changed from water/acetonitrile=60%/40% to acetonitrile 100%; to 12 minutes, acetonitrile 100% is maintained; then to 12.1 minutes, the mobile phase is changed to water/acetonitrile=60%/40%; and to 17 minutes, water/acetonitrile=60%/40% is maintained.

Flow rate: 2.5 mL/min

Column temperature: 45° C.

Detector: Evaporative light scattering detector (ELSD)

Detector temperature: 60° C.

In the carbon fiber-reinforced resin composition of the first embodiment, the water content of the sizing agent-coated carbon fibers is preferably 0.010% by mass to 0.030% by mass. The water content of the sizing agent-coated carbon fibers of 0.030% by mass or less is preferable because the high mechanical properties of the carbon fiber-reinforced resin molded article can be maintained even under humid conditions and, particularly, when the thermoplastic resin that is easy to be hydrolyzed is used, reduction in molecular weight can be suppressed. The water content of the sizing agent-coated carbon fibers is preferably 0.024% by mass or less and further preferably 0.022% by mass or less. The lower limit of the water content is preferably 0.010% by mass or more because uniform applicability of the sizing agent that is applied to the carbon fibers is improved. The lower limit of the water content is more preferably 0.015% by mass or more. The water amount of the sizing agent-coated carbon fibers can be determined by weighing about 2 g of the sizing agent-coated carbon fibers and measuring a water content with a moisture tester such as KF-100 (volumetric Karl Fischer moisture meter) manufactured by Mitsubishi Chemical Analytech Co., Ltd. The measurement is carried out at a heating temperature of 150° C.

Next, the molding material and the carbon fiber-reinforced resin molded article according to the carbon fiber-reinforced resin composition of the first embodiment will be described.

Preferable examples of the thermoplastic resin used in the carbon fiber-reinforced resin composition of the first embodiment include at least one thermoplastic resin selected from polyester resins such as polyethylene terephthalate (PET), polybutylene terephthalate (PBT), poly trimethylene terephthalate (PTT), polyethylene naphthalate (PEN), and liquid crystal polyester; polyolefin resins such as polyethylene (PE), polypropylene (PP), polybutylene, acid-modified polyethylene (m-PE), acid-modified polypropylene (m-PP), and acid-modified polybutylene; polyarylene sulfide resins such as polyoxymethylene (POM), polyamide (PA), polyarylene sulfide resins such as polyphenylene sulfide (PPS); polyketones (PK), polyether ketone (PEK), polyether ether ketone (PEEK), polyether ketone ketone (PEKK), polyether nitrile (PEN); fluorine resins such as polytetrafluoroethylene; crystalline resins such as a liquid crystal polymer (LCP), polystyrene resins such as polystyrene (PS), acrylonitrile styrene (AS), and acrylonitrile butadiene styrene (ABS), amorphous resins such as polycarbonate (PC), poly (methyl methacrylate) (PMMA), poly vinyl chloride (PVC), unmodified or modified polyphenylene ether (PPE), polyimide (PI), polyamide-imide (PAI), polyetherimide (PEI), polysulfone (PSU), polyether sulfone, and polyarylate (PAR); phenolic resin, phenoxy resin; and various thermoplastic elastomers such as polystyrene elastomer, polyolefin elastomer, polyurethane elastomer, polyester elastomer, polyamide elastomer, polybutadiene elastomer, polyisoprene elastomers, fluorine-containing resin and acrylonitrile elastomer, and copolymers and modified resins thereof.

Among them, at least one thermoplastic resin selected from the group consisting of the polyarylene sulfide resin, the polyether ether ketone resin, the polyphenylene ether resin, the polyoxymethylene resin, the polyester resin, the polycarbonate resin, the polystyrene resins and the polyolefin resins is preferable because these thermoplastic resins have a large interaction effect with the aromatic compound (B) and thus a strong interface can be formed due to the strong interaction effect between the sizing agent and the thermoplastic resin.

The thermoplastic resin used in the carbon fiber-reinforced resin composition of the first embodiment is preferably the polyarylene sulfide resin and the polyether ether ketone resin from the viewpoint of heat resistance. The thermoplastic resin is preferably the polyphenylene ether resin from the viewpoint of dimensional stability. The thermoplastic resin is preferably the polyoxymethylene resin from the viewpoint of friction and abrasion properties. The thermoplastic resin is preferably the polyamide resin from the viewpoint of strength. The thermoplastic resin is preferably amorphous resins such as the polycarbonate resin and the polystyrene resin from the viewpoint of surface appearance. The thermoplastic resin is preferably the polyolefin resins from the viewpoint of lightweight properties.

More preferably the thermoplastic resin is one or more resins selected from the polyarylene sulfide resin, the polycarbonate resin, the polystyrene resins, and the polyolefin resins or the polyamide. From the viewpoint of heat resistance, dimensional stability, and lightweight properties, the polyarylene sulfide, the polystyrene resins such as ABS, and the polyolefin resins are particularly preferable, respectively.

The use of a resin having a high hygroscopic property represented by the polyamide is preferable because physical properties are maintained even at the time of moisture absorption by the effect of reduction in water content due to the aromatic compound (B) on the surface of the carbon fibers. In particular, the polyamide resin has high strength and thus is preferable.

As the thermoplastic resin, the carbon fiber-reinforced resin composition including a plurality of different types of the thermoplastic resins may be used unless the purpose of the carbon fiber-reinforced resin composition of the first embodiment is impaired.

In the carbon fiber-reinforced resin composition of the first embodiment, the interaction with the sizing agent when the preferable thermoplastic resin is used will be described.

In the carbon fiber-reinforced resin composition of the first embodiment, epoxy groups, hydroxy groups, amido groups, imido groups, urethane groups, urea groups, sulfonyl groups or sulfo groups contained in the sizing agent that remains without having interaction to the carbon fibers are considered to form interaction such as covalent bond or hydrogen bonds with functional groups such as ether groups, ester groups, sulfide groups, and amido groups in the main chain of the thermoplastic resin, acid anhydride groups and cyano groups in side chains, and hydroxy groups, carboxy groups, and amino groups at the terminals and thus the interfacial adhesion is improved. In particular, the functional groups of the aromatic compound (B) are considered to form the interaction with the thermoplastic resin to improve the interfacial adhesion.

When the polyarylene sulfide resin is used as a matrix resin, a strong interface is considered to be formed by the interaction such as covalent bonds of the thiol groups or the carboxy groups at the terminals and the epoxy groups in the sizing agent or hydrogen bonds of the sulfide groups in the main chain and epoxy groups, hydroxy groups, amido groups, imido groups, urethane groups, urea groups, sulfonyl groups, or sulfo groups contained in the sizing agent, particularly in the aromatic compound (B). In particular, high adhesion is considered to be obtained by the interaction between the aromatic rings in the thermoplastic resin and the aromatic compound (B) in the sizing agent.

When the polyamide resin is used as the matrix resin, strong interface is considered to be formed by the interaction such as covalent bonds of the carboxy groups or the amino groups at the terminals and the epoxy groups in the sizing agent or the hydrogen bonds of the amido groups in the main chain and epoxy groups, hydroxy groups, amido groups, imido groups, urethane groups, urea groups, sulfonyl groups, or sulfo groups contained in the sizing agent, particularly in the aromatic compound (B).

When the polyester resin and the polycarbonate resin are used as the matrix resins, strong interface is considered to be formed by the interaction such as covalent bonds of the carboxy groups or the hydroxy groups at the terminals and the epoxy groups in the sizing agent or the hydrogen bonds of the ester groups in the main chain and epoxy groups, hydroxy groups, amido groups, imido groups, urethane groups, urea groups, sulfonyl groups, or sulfo groups contained in the sizing agent, particularly in the aromatic compound (B). In particular, high adhesion is considered to be obtained by the interaction between the aromatic rings in the thermoplastic resin and the aromatic compound (B) in the sizing agent.

When the polystyrene resin such as the ABS resin is used as the matrix resin, strong interface is considered to be formed by the hydrogen bonds of the cyano groups in the side chains and epoxy groups, hydroxy groups, amido groups, imido groups, urethane groups, urea groups, sulfonyl groups, or sulfo groups contained in the sizing agent, particularly in the aromatic compound (B). In particular, high adhesion is considered to be obtained by the interaction between the aromatic rings in styrene and the aromatic compound (B) in the sizing agent.

When the polyolefin resin, particularly the acid-modified polyolefin resin is used as the matrix resin, strong interface is considered to be formed by the hydrogen bonds of the acid anhydride groups or the carboxy groups in the side chains and epoxy groups, hydroxy groups, amido groups, imido groups, urethane groups, urea groups, sulfonyl groups, or sulfo groups contained in the sizing agent. In particular, high adhesion is considered to be obtained by the interaction between the non-modified moiety having the high hydrophobic property of the polyolefin and the aromatic compound (B) in the sizing agent.

Next, preferable aspect of manufacturing the carbon fiber-reinforced resin composition according to the first embodiment will be described.

A method for manufacturing the carbon fiber-reinforced resin composition of the first embodiment preferably includes the steps of coating carbon fibers with a sizing agent at least containing an aliphatic epoxy compound (A) in an amount of 35% by mass to 65% by mass and an aromatic compound (B) in an amount of 35% by mass to 60% by mass relative to the total amount of the sizing agent excluding solvents, and adding the carbon fibers coated with the sizing agent to the thermoplastic resin.

The carbon fibers coated with the sizing agent can be obtained by the step of coating the carbon fibers with the sizing agent.

In the method for manufacturing the carbon fiber-reinforced resin composition in the first embodiment, the aliphatic epoxy compound (A) is preferably contained in the sizing agent-containing liquid in an amount of 35% by mass to 65% by mass relative to the total amount of the sizing agent excluding solvents. When the aliphatic epoxy compound (A) is contained in an amount of 35% by mass or more, the interfacial adhesion to the thermoplastic resin is improved and thus the physical properties of the carbon fiber-reinforced resin composition is improved. The aliphatic epoxy compound (A) contained in an amount of 65% by mass or less is preferable because components in addition to the aliphatic epoxy compound (A) can be used as the sizing agent and thus the interaction between the sizing agent and the thermoplastic resin is improved, resulting in favorable physical properties. The amount is more preferably 38% by mass or more and further preferably 40% by mass or more. In addition, the amount is more preferably 60% by mass or less and further preferably 55% by mass or less.

The aromatic compound (B) in the sizing agent solution is preferably contained in an amount of 35% by mass to 60% by mass relative to the total amount of the sizing agent excluding solvents. When the aromatic compound (B) is contained in an amount of 35% by mass or more, the aromatic compound (B) in the outer layer of the sizing agent can be maintained at a high composition. This is preferable because the sizing agent has strong interaction with the thermoplastic resin and the water content near the carbon fibers in the carbon fiber-reinforced resin composition can be reduced. The aromatic compound (B) contained in an amount of 60% by mass or less is preferable because the gradient structure in the sizing agent can be exerted and thus the adhesion can be sustained. The amount of the aromatic compound (B) is more preferably 37% by mass or more and further preferably 39% by mass or more. In addition, the amount of the aromatic compound (B) is more preferably 55% by mass or less and further preferably 45% by mass or less.

In the sizing agent solution, the mass ratio (A)/(B1) of the aliphatic epoxy compound (A) and the aromatic epoxy compound (B1) as the epoxy components is preferably 52/48 to 80/20. When the ratio (A)/(B1) is 52/48 or more, the ratio of the aliphatic epoxy compound (A) existing on the surface of the carbon fibers becomes larger and thus the interfacial adhesion to the carbon fibers is improved. As a result, physical properties of the composite such as tensile strength of the carbon fiber-reinforced resin composition are improved and thus this mass ratio is preferable. The ratio (A)/(B1) of 80/20 or less is preferable because an amount of the aliphatic epoxy compound having high water content existing on the surface of the carbon fibers in the carbon fiber-reinforced resin composition becomes smaller and an amount of the aromatic compound that can interact with the thermoplastic resin is increased. The mass ratio (A)/(B1) is more preferably 55/45 or more, further preferably 57/43 or more, and most preferably 60/40 or more. In addition, the mass ratio (A)/(B1) is more preferably 75/35 or less and further preferably 73/37 or less.

In the carbon fiber-reinforced resin composition of the first embodiment, a method for adding the carbon fibers coated with the sizing agent and the thermoplastic resin is not limiting. Examples of the method include a method for simultaneously melting and kneading the thermoplastic resin and the carbon fibers that are coated with the sizing agent containing at least an aliphatic epoxy compound (A) and an aromatic epoxy compound (B1) as an aromatic compound (B) and that have a ratio (a)/(b) of 0.50 to 0.90 where (a) is the height (cps) of a component having a binding energy (284.6 eV) attributed to CHx, C—C, and C=C and (b) is the height (cps) of a component having a binding energy (286.1 eV) attributed to C—O in a $C_{1s}$ core spectrum at the surface of the sizing agent measured by X-ray photoelectron spectroscopy using $AlK\alpha_{1,2}$ as an X-ray source at a photoelectron takeoff angle of 15° C. The carbon fibers can be uniformly dispersed by melting and kneading the carbon fibers coated with the sizing agent and the thermoplastic resin and thus a molded article having excellent mechanical properties can be obtained. The sizing agent containing at least an aliphatic epoxy compound (A) and an aromatic compound (B) is localized at the surface of the carbon fibers and thus high effects of improving reaction efficiency of the oxygen-containing functional groups at the surface of the carbon fibers and the epoxy groups contained in the aliphatic epoxy compound (A) and improving the interfacial adhesion due to existence of the aromatic compound (B) between the carbon fibers and the thermoplastic resin can be obtained.

The carbon fiber-reinforced resin composition of the first embodiment is preferably a carbon fiber-reinforced resin composition containing the carbon fibers coated with the sizing agent in an amount of 1% by mass to 80% by mass and the thermoplastic resin in an amount of 20% by mass to 99% by mass.

The method of melting and kneading is not particularly limiting and a known heating melting-mixing device can be used. Specifically, a single screw extruder, a twin screw extruder, a twin screw extruder equipped with the combination of these extruders, a kneader-ruder, and the like can be used. Among them, the twin screw extruder is preferably used from the viewpoint of mixing power. More preferably, the twin screw extruder having two or more kneading zones is used.

As a form at the time of feeding the carbon fibers coated with the sizing agent into the heating melting-mixing device, either a long fiber form or a short fiber form prepared by cutting in a specific length can be used. When the carbon fibers having long fiber form is directly fed into the heating melting-mixing device (in the case of direct roving), breakage of the carbon fibers can be suppressed and a fiber length can be secured in a molded article. Therefore, the molded article having excellent mechanical properties can be obtained. In addition, a step of cutting the carbon fibers can be eliminated and thus the productivity is improved.

In the carbon fiber-reinforced resin composition of the first embodiment, other components in addition to the components described above can be contained, depending on applications unless the mechanical properties are impaired. Fillers and additives may also be contained. Examples of the fillers and the additives include inorganic fillers, flame retardants, conductivity imparting agents, crystal nucleating agents, ultraviolet absorbers, antioxidants, damping agents, antimicrobial agents, insect repellents, deodorants, coloring prevention agents, heat stabilizers, mold release agents, antistatic agents, plasticizers, lubricants, colorants, pigments, blowing agents, and coupling agents.

In particular, as the additives, the flame retardant is preferably added for the application that requires flame retardancy and the conductivity imparting agent is preferably added for the application that requires electric conductivity. Examples of the usable flame retardant include halogen compounds, antimony compounds, phosphorus compounds, nitrogen compounds, silicone compounds, fluorine compounds, phenol compounds and metal hydroxides. Among them, the phosphorus compounds such as ammonium polyphosphate, polyphosphazene, phosphates, phosphonates, phosphinates, phosphine oxides and red phosphorus can be preferably used from the viewpoint of reducing an environmental burden.

Examples of the usable conductivity imparting agent include carbon black, amorphous carbon powder, natural graphite powder, artificial graphite powder, expanded graphite powder, pitch microbeads, vapor-grown carbon fibers and carbon nanotubes.

The carbon fiber-reinforced resin composition of the first embodiment can be used in the form of molding materials such as pellets, stampable sheets, and prepregs. The most preferable molding material is the pellets. Generally, the pellets mean a molding material obtained by melting and kneading the thermoplastic resin and the continuous carbon fibers or the discontinuous carbon fibers (chopped carbon fibers) made by cutting carbon fibers in a specific length in an extruder, extruding the mixture, and pelletizing the extrudate.

Examples of the method of molding the molding material include injection molding (injection compression molding, gas-assisted injection molding, and insert molding), blow molding, rotational molding, extrusion molding, press molding, transfer molding, and filament winding molding. Among them, the injection molding is preferably used from the viewpoint of productivity. The carbon fiber-reinforced molded article can be obtained by these molding methods.

Examples of applications of the carbon fiber-reinforced molded article obtained by forming the carbon fiber-reinforced resin composition of the first embodiment include housings, internal parts such as trays and chassis, cases thereof, and mechanical parts of electric and electronic devices such as personal computers, displays, OA devices, cell phones, portable information terminals, facsimiles, compact discs, portable MD, portable radio cassettes, PDA (portable information terminals such as electronic notebooks), video cameras, digital still cameras, optical equipment, audio equipment, air conditioners, lighting equipment, recreational supplies, toy supplies, and other home appliances, construction applications such as panels; parts, members, and outer panels of automobiles and motorbikes such as motor parts, alternator terminals, alternator connectors, IC regulators, potentiometer-bases for light dyers, suspension parts, various valves such as exhaust gas valves, various pipes for fuel systems, exhaust systems, or air intake systems, air intake nozzle snorkels, intake manifolds, various arms, various frames, various hinges, various bearings, fuel pumps, gasoline tanks, CNG tanks, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, thermostat bases for air conditioners, warm air flow control valves for heating, brush holders for radiator motor, water pump impellers, turbine panes, wiper motor-related parts, distributors, starter switches, starter relays, wire harnesses for transmissions, window washer nozzles, air conditioning panel switch boards, fuel system related electromagnetic valve coils, connectors for fuses, battery trays, AT brackets, head lamp supports, pedal housings, steering wheels, door beams, protectors, chassis, frames, armrests, horn terminals, step motor rotors, lamp sockets, lamp reflectors, lamp housings, brake pistons, noise shields, radiator supports, spare tire covers, seat shells, solenoid bobbins, engine oil filters, ignition device cases, under covers, scuff plates, pillar trims, propeller shafts, wheels, fenders, fascia, bumpers, bumper beams, hoods, aero parts, platforms, cowl louvers, roofs, instrument panels, spoilers, and various modules; aircraft-related parts, members, and outer panels such as landing gear pods, winglets, spoilers, edges, ladders, elevators, fairings, and ribs; and windmill blades. In particular, the carbon fiber-reinforced molded article is preferably used for the aircraft members, the windmill blades, the automobile outer panels, and the housings, the trays, and the chassis of the electronic devices.

Second Embodiment

The second embodiment provides a prepreg (K) made by containing at least a sizing agent-coated carbon fibers coated with the sizing agent and the thermoplastic resin, in which the sizing agent includes at least an aliphatic epoxy compound (A) and an aromatic epoxy compound (B1) as an aromatic compound (B), and in which the sizing agent-coated carbon fibers have a ratio (a)/(b) of 0.50 to 0.90 where (a) is the height (cps) of a component having a binding energy (284.6 eV) attributed to CHx, C—C, and C═C and (b) is the height (cps) of a component having binding energy (286.1 eV) attributed to C—O in a $C_{1s}$ core spectrum at the surface of the sizing agent applied to the carbon fibers measured by X-ray photoelectron spectroscopy using $AlK\alpha_{1,2}$ as an X-ray source at a photoelectron takeoff angle of 15°.

In the prepreg (K) according to the second embodiment, the sizing agent used contains at least the aliphatic epoxy compound (A) and the aromatic epoxy compound (B1) as the aromatic compound (B). In the second embodiment, the aliphatic epoxy compound (A), the aromatic epoxy compound (B1) as the aromatic compound (B), the surface form of the sizing agent, and the ratios are similar to those of the first embodiment and thus the description thereof is omitted. Also for the carbon fibers used, the method for manufacturing, and the sizing agent-coated carbon fibers in which the carbon fibers are coated with the sizing agent, it is possible to refer to the description of the first embodiment.

In the prepreg (K) according to the second embodiment, for the method for coating the carbon fibers with the sizing agent, the attached amount of the sizing agent to the carbon fibers, the epoxy equivalent of the carbon fibers coated with the sizing agent, the thickness of the sizing agent layer applied to the carbon fibers and dried, the ratio of the eluted aliphatic epoxy compound (A) when the sizing agent-coated carbon fibers are eluted with a mixed solvent of acetonitrile and chloroform, and the water content of the sizing agent-coated carbon fibers, it is possible to refer to the description of the first embodiment. The predetermined ratios of the peaks of the surface of the sizing agent-coated carbon fibers and the surface of the sizing agent-coated carbon fibers after ultrasonic treatment in an acetone solvent measured by X-ray photoelectron spectroscopy are also similar to those of the first embodiment and thus the description is omitted.

Next, the prepreg (K) according to the second embodiment and the carbon fiber-reinforced resin molded article will be described. The prepreg (K) according to the second embodiment includes the sizing agent-coated carbon fibers and a thermoplastic resin as a matrix resin.

In the second embodiment, the prepreg containing the sizing agent-coated carbon fibers and the thermoplastic resin means a unidirectional prepreg in which carbon fiber bundles are unidirectionally oriented. The form of the thermoplastic resin constituting the prepreg together with the unidirectionally oriented carbon fiber bundles may be any forms such as a film-like shape, a particle-like shape, and a fiber-like shape.

The carbon fiber bundles are preferably constituted by at least a large number of continuous filaments that are unidirectionally oriented and have a length of 10 mm or more.

The prepreg (K) of the second embodiment preferably has a width of the prepreg of 1 to 50 mm.

As the thermoplastic resin used in the second embodiment, the thermoplastic resin similar to the thermoplastic resin used in the first embodiment can be used.

Among them, at least one thermoplastic resin selected from the group consisting of the polyarylene sulfide resin, the polyether ether ketone resin, the polyphenylene ether resin, the polyoxymethylene resin, the polyester resin, the polycarbonate resin, the polystyrene resins and the polyolefin resins is preferable because these thermoplastic resins have a large interaction effect with the aromatic compound (B) and thus a strong interface can be formed due to the strong interaction effect between the sizing agent and the thermoplastic resin.

The thermoplastic resin used in the second embodiment is preferably the polyarylene sulfide resin and the polyether ether ketone resin from the viewpoint of heat resistance. The thermoplastic resin is preferably the polyphenylene ether resin from the viewpoint of dimensional stability. The thermoplastic resin is preferably the polyoxymethylene resin from the viewpoint of friction and abrasion properties. The thermoplastic resin is preferably the polyamide resin from the viewpoint of strength. The thermoplastic resin is preferably amorphous resins such as the polycarbonate resin and the polystyrene resin from the viewpoint of surface appearance. The thermoplastic resin is preferably the polyolefin resins from the viewpoint of lightweight properties.

The thermoplastic resin is more preferably one or more resins selected from the polyarylene sulfide resin, the polycarbonate resin, and the polyolefin resins or the polyamide. From the viewpoint of heat resistance, the polyarylene sulfide is particularly preferable, and from the viewpoint of lightweight properties, the polyolefin resins are particularly preferable.

The use of a resin having a high hygroscopic property represented by the polyamide is preferable because physical properties are maintained even at the time of moisture absorption by the effect of reduction in water content due to the aromatic compound (B) on the surface of the carbon fibers. In particular, the polyamide resin has high strength and thus is preferable.

A thermoplastic resin composition containing a plurality of different types of the thermoplastic resins may be used as the thermoplastic resin unless the purpose of the present invention is impaired.

In the second embodiment, also for the interaction with the sizing agent when the preferable thermoplastic resin is used, it is possible to refer to the description of the interaction with the sizing agent when the thermoplastic resin is used in the first embodiment.

In the prepreg (K) of the second embodiment, the surface of the sizing agent-coated carbon fibers after washing to reduce the attached amount of the sizing agent to between 0.09% by mass and 0.20% by mass by carrying out ultrasonic treatment in a solvent that dissolves the thermoplastic resin constituting the prepreg (K) preferably has a ratio (a)/(b) of 0.30 to 0.70 where (a) is the height (cps) of a component having a binding energy (284.6 eV) attributed to CHx, C—C, and C═C and (b) is the height (cps) of a component having binding energy (286.1 eV) attributed to C—O in a $C_{1s}$ core spectrum at the surface of the sizing agent-coated carbon fibers measured by X-ray photoelectron spectroscopy using an X ray of 400 eV at a photoelectron takeoff angle of 55°. The ratio (a)/(b) is preferably 0.30 or more because the interaction between the thermoplastic resin and the sizing agent is improved. The ratio (a)/(b) is more preferably 0.35 or more. The ratio (a)/(b) of 0.70 or less is preferable because the adhesion between the carbon fibers and the sizing agent is improved and thus physical properties of a carbon fiber composite material is excellent. The ratio (a)/(b) is more preferably 0.6 or less. The solvent that elutes the thermoplastic resin and the sizing agent in the prepreg is not limiting. Any solvents can be used as long as the solvents can dissolve the thermoplastic resin and the attached amount of the sizing agent after washing is within the above range. For example, when the polyamide resin is used as the thermoplastic resin, formic acid is preferably used. When the polycarbonate resin is used, dichloromethane is preferably used.

Next, preferable aspects of manufacturing the prepreg (K) according to the second embodiment and the carbon fiber-reinforced resin molded article will be described.

A preferable method for manufacturing the prepreg (K) according to the second embodiment includes the first step of coating the carbon fibers with the sizing agent that contains at least the aliphatic epoxy compound (A) in an amount of 35% by mass to 65% by mass and the aromatic compound (B) in an amount of 35% by mass to 60% by mass relative to the total amount of the sizing agent excluding solvents, and the second step of impregnating the thermoplastic resin into the carbon fibers coated with the sizing agent.

In the method for manufacturing the prepreg (K) in the second embodiment, the aliphatic epoxy compound (A) is preferably contained in the sizing agent-containing liquid in an amount of 35% by mass to 65% by mass relative to the total amount of the sizing agent excluding solvents. When the aliphatic epoxy compound (A) is contained in an amount of 35% by mass or more, the interfacial adhesion to the matrix resin is improved and thus the physical properties of the carbon fiber-reinforced resin composition is improved. The aliphatic epoxy compound (A) contained in an amount of 65% by mass or less is preferable because components in addition to the aliphatic epoxy compound (A) can be used as a sizing agent and the interaction between the sizing agent and the matrix resin is improved to give excellent physical properties. The amount is more preferably 38% by mass or more and further preferably 40% by mass or more. In addition, the amount is more preferably 60% by mass or less and further preferably 55% by mass or less.

The aromatic compound (B) in the sizing agent solution is preferably contained in an amount of 35% by mass to 60% by mass relative to the total amount of the sizing agent excluding solvents. The aromatic compound (B) contained in an amount of 35% by mass or more is preferable because a high composition of the aromatic compound (B) in the outer layer of the sizing agent can be maintained and thus the interaction with the matrix resin can be strong and subsequently the water content near the carbon fibers of the carbon fiber-reinforced resin composition can be lowered. The aromatic compound (B) contained in an amount of 60% by mass or less is preferable because the gradient structure in the sizing agent described above can be exerted thus the adhesion can be sustained. The amount is more preferably 37% by mass or more and further preferably 39% by mass or more. In addition, the amount is more preferably 55% by mass or less and further preferably 45% by mass or less.

In the sizing agent solution, the mass ratio (A)/(B1) of the aliphatic epoxy compound (A) and the aromatic epoxy compound (B1) contained as the epoxy components is preferably 52/48 to 80/20. When the ratio (A)/(B1) is 52/48 or more, the ratio of the aliphatic epoxy compound (A) existing on the surface of the carbon fibers becomes larger and thus the interfacial adhesion to the carbon fibers is improved. As a result, physical properties of the composite such as tensile strength of the carbon fiber-reinforced resin composition are improved and thus this mass ratio is preferable. The ratio (A)/(B1) of 80/20 or less is preferable because an amount of the aliphatic epoxy compound having high water content existing on the surface of the carbon fibers in the carbon fiber-reinforced resin composition becomes smaller and an amount of the aromatic compound that can interact with the matrix resin is increased. The mass ratio (A)/(B1) is more preferably 55/45 or more, further preferably 57/43 or more, and most preferably 60/40 or more. In addition, the mass ratio (A)/(B1) is more preferably 75/35 or less and further preferably 73/37 or less.

The carbon fibers coated with the sizing agent can be obtained by the first step of coating the carbon fibers with the sizing agent. The sizing agent-coated carbon fibers obtained in the first step of the present invention has a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum at the surface of the sizing agent measured by X-ray photoelectron spectroscopy at a photoelectron takeoff angle of 15°.

For the first step of coating the carbon fibers with the sizing agent and the sizing agent-coated carbon fibers obtained in the first step, it is possible to refer to those of the first embodiment.

In the second embodiment, the method for impregnating the thermoplastic resin into the carbon fibers coated with the sizing agent is not limiting. A pultrusion method of melting the thermoplastic resin, passing at least continuous carbon fibers coated with the sizing agent obtained in the first step through the melted thermoplastic resin, and increasing the width of a prepreg to form the prepreg having a width of 1 to 50 mm is preferable. A molded article containing uniformly arranged carbon fibers and having excellent mechanical properties can be obtained by continuously passing the carbon fibers coated with the sizing agent through the melted thermoplastic resin and further increasing the width. The sizing agent containing at least the aliphatic epoxy compound (A) and the aromatic compound (B) is localized on the surface of the carbon fibers and thus reaction efficiency between the oxygen-containing functional groups on the surface of the carbon fibers and the epoxy groups contained in the aliphatic epoxy compound (A) is improved and the interfacial adhesion is improved due to existence of the aromatic compound (B) between the carbon fibers and the thermoplastic resin. Therefore, the high effect can be obtained.

In the pultrusion method, for example, additives for resins are added to the thermoplastic resin, if needed, and the thermoplastic resin is supplied in a melting state from an extruder to an impregnating die. The thermoplastic resin supplied to the impregnating die is added to carbon fiber bundles by pulling the carbon fiber bundles through the impregnating die and is heated to be impregnated. The carbon fiber bundles into which the melted resin is impregnated are cooled while drawing and the width of the impregnated carbon fiber bundles is increased to be able to form a tape-like prepreg.

The prepreg (K) according to the second embodiment may be a prepreg formed with unidirectionally oriented carbon fiber bundles and the thermoplastic resin. Any form of the thermoplastic resin such as film-like, particle-like, and fiber-like thermoplastic resin can be used.

As a film-like thermoplastic resin, in addition to a coating film prepared by applying a melting resin onto release paper, a film-like thermoplastic resin prepared by spinning a thermoplastic resin to form fibers, cutting the fibers to form short fibers, dispersing the short fibers into a liquid, and forming a short fiber web in which the fibers are randomly oriented from the dispersion can be used.

The prepreg (K) of the second embodiment can be manufactured by sandwiching the unidirectionally oriented carbon fiber bundles between the coating films of the thermoplastic resin or the short fiber webs and heating the sandwiched carbon fiber bundles.

A prepreg containing the particle-like thermoplastic resin can be prepared by passing the unidirectionally oriented carbon fiber bundles in resin slurry in which the powder of the thermoplastic resin is dispersed in water to attach the resin slurry to the carbon fiber bundles, evaporating the water attached to the carbon fiber bundles, and thereafter heating the particle-like thermoplastic resin to more than the melting temperature of the thermoplastic resin to impregnate the resin into the carbon fiber bundles.

In the resin slurry bath, for example, the amount of the particle-like resin is in a range from 4% by mass to 30% by mass in an aqueous solution. The resin slurry bath may also contain a surfactant that promotes mixing of the particle-like resin and water in an amount of 0.05% by mass to 0.25% by mass.

As a prepreg containing the fiber-like thermoplastic resin, a prepreg prepared by mixed weaving the carbon fiber bundles and the fibers of the thermoplastic resin may be exemplified. The mixed weaving can be carried out as follows: polymer fibers of the thermoplastic resin wound in a bobbin rack or the like is sent to a godet roll; after the polymer fibers are left from the godet roll, each fiber is passed through a fiber comb via a fiber guide; the carbon fiber bundle is sent to the godet roll via the fiber guide and the like and thereafter the width of carbon fiber tows are equalized with a fiber bundle opening device after passing through further fiber guides; and the carbon fibers after passing through the fiber comb is mixed with the polymer fibers with a fixed rod for mixing and the mixed fibers are sent to a twist guide via the comb and drawn in order to maintain dimension stability and a mixed state of the mixed woven prepreg. In order to secure the complete mixed woven state of the prepreg, the mixed weaving is preferably carried out by uniformly spreading the polymer fibers and the carbon fibers across the whole width and substantially maintaining the spread width of the polymer fibers and the carbon fibers in the same width.

Thus manufactured prepreg (K) according to the second embodiment preferably contains the sizing agent-coated carbon fibers to which the sizing agent is attached in an amount of 0.1 to 10.0 parts by mass relative to the 100 parts by mass of the carbon fibers in an amount of 1% by mass to 80% by mass and the thermoplastic resin in an amount of 20% by mass to 99% by mass.

Other components may be contained in addition to the components described above in the prepreg (K) of the second embodiment unless the mechanical properties are impaired. Fillers and additives may also be contained. Examples of the fillers and additives include inorganic fillers, flame retardants, conductivity imparting agents, crystal nucleating agents, ultraviolet absorbers, antioxidants, damping agents, antimicrobial agents, insect repellents, deodorants, coloring prevention agents, heat stabilizers, mold release agents, antistatic agents, plasticizers, lubricants, colorants, pigments, blowing agent, and a coupling agent.

In particular, as additives, the flame retardant is preferably added for the application that requires flame retardancy and the conductivity imparting agent is preferably added for the application that requires electric conductivity. As the flame retardants and the conductivity imparting agents, similar flame retardants and conductivity imparting agents used in the carbon fiber-reinforced resin composition of the first embodiment can be used.

The carbon fiber-reinforced resin molded article can be formed from thus prepared prepreg (K) according to the second embodiment by unidirectionally orienting the prepreg (K) in a desired mold and thereafter press-forming the prepreg (K) with a heating press machine or the like while heating the prepreg (K). The carbon fiber-reinforced resin molded article can also be formed by unidirectionally orienting the prepreg (K) in a desired mold, stacking a plurality of prepregs with staggering angles of the prepregs in a fiber axis direction, and thereafter press-forming the stacked prepregs with a heating press machine or the like while heating the stacked prepregs.

The carbon fiber bundles are not necessarily continuous across the whole length of the stacked product in a length direction or across the whole width of the stacked product in a width direction and may be divided in the middle of the carbon fiber bundles. Examples of forms of the carbon fiber bundles include carbon fiber bundles containing a large number of filaments, cloths made of these carbon fiber bundles, filament bundles (unidirectional fiber bundles) containing a large number of unidirectionally oriented filaments, and unidirectional cloths made of these unidirectional fiber bundles. From the viewpoint of the productivity of the prepreg and the stacked product, the cloths and the unidirectional fiber bundles are preferable. The carbon fiber bundles of the stacked product may be made of a plurality of fiber bundles having the same form or may be made of a plurality of fiber bundles having different forms. A sandwich form made by staking other substrate between the stacks of stacked carbon fiber groups is used, if needed.

The carbon fiber-reinforced resin molded article prepared by forming the prepreg (K) of the second embodiment is preferably used for, for example, in addition to electronic devices such as personal computers and aircraft members, the applications similar to the applications of the first embodiment.

Third Embodiment

The third embodiment is a molding material (J) containing at least sizing agent-coated carbon fibers in which the carbon fibers are coated with the sizing agent and a matrix resin including the thermoplastic resin or a thermosetting resin, in which the sizing agent contains at least an aliphatic epoxy compound (A) and an aromatic epoxy compound (B1) as an aromatic compound (B), in which the sizing agent-coated carbon fibers have a ratio (a)/(b) of 0.50 to 0.90 where (a) is the height (cps) of a component having a binding energy (284.6 eV) attributed to CHx, C—C, and C═C and (b) is the height (cps) of a component having binding energy (286.1 eV) attributed to C—O in a $C_{1s}$ core spectrum of the surface of the sizing agent measured by X-ray photoelectron spectroscopy using $AlK\alpha_{1,2}$ as an X ray source at a photoelectron takeoff angle of 15°, and in which the carbon fibers in the molding material is a bundle-like or a single fiber-like carbon fibers and are substantially oriented in two dimensions.

In the molding material according to the third embodiment, the sizing agent used contains at least the aliphatic epoxy compound (A) and the aromatic epoxy compound (B1) as the aromatic compound (B). In the third embodiment, the aliphatic epoxy compound (A), the aromatic epoxy compound (B1) as the aromatic compound (B), and ratios of each component are similar to those of the first embodiment and thus the description is omitted. For the carbon fibers used and the method for manufacturing the same, it is possible to refer to those of the first embodiment.

In the molding material (J) according to the third embodiment, the sizing agent-coated carbon fibers mean sizing agent-coated carbon fibers made by coating continuous carbon fibers with the sizing agent and made by applying the sizing agent to carbon fibers processed to a web-like cloth, a nonwoven cloth-like cloth, a felt-like cloth, or a mat-like cloth.

In the molding material (J) according to the third embodiment, for the method for coating the carbon fibers with the sizing agent, the attached amount of the sizing agent to the carbon fibers, the epoxy equivalent of the carbon fibers coated with the sizing agent, the thickness of the sizing agent layer applied to the carbon fibers and dried, the ratio of the eluted aliphatic epoxy compound (A) when the sizing agent-coated carbon fibers are eluted with a mixed solvent of acetonitrile and chloroform, and the water content of the sizing agent-coated carbon fibers, it is possible to refer to those of the first embodiment. The ratios of the specific peaks of the surface of the sizing agent-coated carbon fibers and the surface of the sizing agent-coated carbon fibers after ultrasonic treatment in an acetone solvent measured by X-ray photoelectron spectroscopy are also similar to those of the first embodiment and thus the description is omitted. Similar to the continuous carbon fibers, coating of the sizing agent can be carried out in the state of the cloth made by processing carbon fibers.

Subsequently, the molding material (J) according to the third embodiment and a method for manufacturing a carbon fiber-reinforced resin molded article will be described. The molding material (J) according to the third embodiment is preferably manufactured by the following two methods.

A first method is a method including at least: a fabrication process for fabricating carbon fibers to a web-like cloth, a nonwoven cloth-like cloth, a felt-like cloth, or a mat-like cloth; an application process for applying a sizing agent containing at least the aliphatic epoxy compound (A) in an amount of 35% by mass to 65% by mass and an aromatic compound (B) in an amount of 35% by mass to 60% by mass relative to the total amount of the sizing agent except solvents to the cloth obtained in the fabrication process in an amount of 0.1 parts by mass to 10 parts by mass relative to 100 parts by mass of the cloth obtained in the fabrication process and a composite formation process for applying the matrix resin in an amount of 20% by mass to 99% by mass to 1% by mass to 80% by mass of the cloth to which the sizing agent is applied in the application process to form a composite product.

A second method is a method comprising at least: a coating process for coating carbon fibers with a sizing agent containing at least the aliphatic epoxy compound (A) in an amount of 35% by mass to 65% by mass and an aromatic compound (B) in an amount of 35% by mass to 60% by mass relative to the total amount of the sizing agent except solvents in an amount of 0.1 parts by mass to 10 parts by mass relative to 100 parts by mass of carbon fibers; a cutting process for cutting the sizing agent-coated carbon fibers obtained in the coating process in a length of 1 mm to 50 mm; and a composite formation process for mixing the sizing agent-coated carbon fibers cut in the cutting process in an amount of 1% by mass to 80% by mass and the matrix resin in an amount of 20% by mass to 99% by mass to form a composite product.

In the first method and the second method, the aliphatic epoxy compound (A) in the sizing agent-containing liquid is preferably contained in an amount of 35% by mass to 65% by mass relative to the total amount of the sizing agent except solvents. When the aliphatic epoxy compound (A) is contained in an amount of 35% by mass or more, the interfacial adhesion to the matrix resin is improved and thus the physical properties of the carbon fiber-reinforced resin composition is improved. The aliphatic epoxy compound (A) contained in an amount of 65% by mass or less is preferable because components in addition to the aliphatic epoxy compound (A) can be used as a sizing agent and the interaction between the sizing agent and the matrix resin is improved to give excellent physical properties. The amount is more preferably 38% by mass or more and further preferably 40% by mass or more. In addition, the amount is more preferably 60% by mass or less and further preferably 55% by mass or less.

The aromatic compound (B) in the sizing agent solution is preferably contained in an amount of 35% by mass to 60% by mass relative to the total amount of the sizing agent excluding solvents. The aromatic compound (B) contained in an amount of 35% by mass or more is preferable because a high composition of the aromatic compound (B) in the outer layer of the sizing agent can be maintained and thus the interaction with the matrix resin can be strong and subsequently the water content near the carbon fibers of the carbon fiber-reinforced resin composition can be lowered. The aromatic compound (B) is preferably contained in an amount of 60% by mass or less because the gradient structure in the sizing agent described above can be exerted and thus the adhesion can be sustained. The amount is more preferably 37% by mass or more and further preferably 39% by mass or more. In addition, the amount is more preferably 55% by mass or less and further preferably 45% by mass or less.

In the sizing agent solution, the mass ratio (A)/(B1) of the aliphatic epoxy compound (A) and the aromatic epoxy compound (B1) contained as the epoxy components is preferably 52/48 to 80/20. When the ratio (A)/(B1) is 52/48 or more, the ratio of the aliphatic epoxy compound (A) existing on the surface of the carbon fibers becomes larger and thus the interfacial adhesion to the carbon fibers is improved. As a result, physical properties of the composite such as tensile strength of the carbon fiber-reinforced resin composition are improved and thus this mass ratio is preferable. The ratio (A)/(B1) of 80/20 or less is preferable because an amount of the aliphatic epoxy compound having high water content existing on the surface of the carbon fibers in the carbon fiber-reinforced resin composition becomes smaller and an amount of the aromatic compound that can interact with the matrix resin is increased. The mass ratio (A)/(B1) is more preferably 55/45 or more, further preferably 57/43 or more, and most preferably 60/40 or more. In addition, the mass ratio (A)/(B1) is more preferably 75/35 or less and further preferably 73/37 or less.

First, the first method for manufacturing the molding material (J1) in which carbon fibers are single fiber form and substantially oriented in two dimensions will be described.

In the first method, the carbon fibers are processed to a web-like cloth, a nonwoven cloth-like cloth, a felt-like cloth, or a mat-like cloth (the fabrication process). The cloth of the carbon fibers such as the web-like cloth can be manufactured by processing to disperse carbon fiber bundles. When the carbon fiber bundles are made of the above-described carbon fibers, either the carbon fiber bundles made of continuous carbon fibers or carbon fiber bundles made of discontinuous carbon fibers may be used. However, the discontinuous carbon fibers are preferable and chopped carbon fibers are more preferable in order to achieve a more excellent dispersion state.

The dispersion of the carbon fibers may be achieved by either a wet method or a dry method. The wet method is a method for dispersing the carbon fiber bundles in water and forming a cloth and the dry method is a method for dispersing the carbon fiber bundles in air.

When the wet method is used, the carbon fiber bundles are dispersed in water to obtain slurry and a sheet-like carbon fiber cloth can be formed from the obtained slurry.

As water (dispersion liquid) dispersing the carbon fiber bundles, in addition to common tap water, water such as distilled water and purified water can be used. A surfactant can be mixed with water, if needed. The surfactant is classified into a cationic surfactant, an anionic surfactant, a nonionic surfactant, and an amphoteric surfactant. Among them, the nonionic surfactant is preferably used and among the nonionic surfactant, polyoxyethylene lauryl ether is more preferably used. When the surfactant is mixed with water, the concentration of the surfactant is usually 0.0001% by mass or more and 0.1% by mass or less and preferably 0.0005% by mass or more and 0.05% by mass or less.

The added amount of the carbon fiber bundles relative to 1 L of water (dispersion liquid) can be adjusted usually in a range of 0.1 g or more and 10 g or less and preferably in a range of 0.3 g or more and 5 g or less. When water (dispersion liquid) is added within the range described above, the carbon fiber bundles are effectively dispersed into the water (the dispersion liquid) and slurry in which the carbon fiber bundles are uniformly dispersed can be obtained in a short period of time. When the carbon fiber bundles are dispersed in water (dispersion liquid), the mixture is stirred, if needed.

Slurry means a suspension liquid that disperses solid particles, and the slurry is preferably water slurry in the third embodiment. The solid content in the slurry (the mass content of the carbon fiber in the slurry) is 0.01% by mass or more and 1% by mass or less and more preferably 0.03% by mass or more and 0.5% by mass or less. When the solid content is within the above-described range, the carbon fiber sheet can be effectively formed.

The carbon fiber sheet forming from the slurry can be carried out by sucking water from the slurry. The carbon fiber sheet forming from the slurry can be carried by following what is called a papermaking method. To describe with one example, the carbon fiber sheet forming from the slurry can be carried out by pouring the slurry into a vessel that has a papermaking surface at the bottom part and can suck water from the bottom part and sucking water. As the vessel, a vessel having a papermaking surface having a width of 200 mm at the bottom part and providing a mesh conveyer, No. 2553-I (trade name), manufactured by KUMAGAI RIKI KOGYO Co., Ltd. can be exemplified. In such a manner, the carbon fiber sheet can be obtained.

In the case of the dry method, the carbon fiber sheet can be obtained by dispersing carbon fiber bundles in a gas phase. In other words, the carbon fiber sheet can be obtained by dispersing carbon fiber bundles in a gas phase and depositing the carbon fiber bundles after dispersion.

The dispersion of carbon fiber bundles in a gas phase includes three methods: a method for opening carbon fiber bundles in a noncontact manner and depositing the opened carbon fiber bundles (a noncontact method), a method for opening carbon fiber bundles by applying air flow and depositing the opened carbon fiber bundles (a method of using air flow), and a method for opening carbon fiber bundles in a contact manner for dispersing the carbon fiber bundles in a gas phase and depositing the opened carbon fiber bundles (a contact method).

The noncontact method is a method for opening carbon fiber bundles without bringing the carbon fiber bundles into contact with a solid or a fiber opening device. Examples of the noncontact method include a method for blowing gas such as air or inert gas to carbon fiber bundles. In particular, a method for pressurizing and blowing air, which is advantageous in terms of cost, is preferably exemplified.

In the method for using air flow, conditions for applying air flow to carbon fiber bundles are not particularly limiting. As one example, pressurized air (air flow applying a pressure of usually 0.1 MPa or more and 10 MPa or less and preferably 0.5 MPa or more and 5 MPa or less) is applied until carbon fiber bundles are opened. In the method for applying air flow, usable devices are not particularly limiting. In the method for using air flow, a container that is equipped with an air pipe from which air can be sucked, and that can contain carbon fiber bundles can be exemplified. By using such a container, carbon fiber bundles can be opened and deposited in one container.

The contact method is a method for opening carbon fiber bundles by physically bringing the carbon fiber bundles into contact with a solid or a fiber opening device. Examples of the contact method include carding, needle punch, and roller opening. Among them, carding and needle punch are preferable and carding is more preferable. Conditions of carrying out the contact method are not particularly limiting. Conditions with which carbon fiber bundles can be opened can be appropriately determined.

An areal weight of the sheet-like carbon fiber cloth manufactured as described above is preferably 10 $g/m^2$ to 500 $g/m^2$ and more preferably 50 $g/m^2$ to 300 $g/m^2$. When the areal weight is less than 10 $g/m^2$, trouble in handling properties such as a break of a substrate may occur. When the areal weight is more than 500 $g/m^2$, long time is needed for drying the substrate in the wet method. The thickness of the sheet may excessively increase in the dry method, which may cause difficulty in handling properties in subsequent processes.

After the fabrication process, a sizing agent containing at least the aliphatic epoxy compound (A) in an amount of 35% by mass to 65% by mass and an aromatic compound (B) in an amount of 35% by mass to 60% by mass relative to the total amount of the sizing agent except solvents is applied to the carbon fiber sheet as the obtained cloth in an amount of 0.1 parts by mass to 10 parts by mass relative to 100 parts by mass of the carbon fiber sheet (an application process). The sizing agent containing aliphatic epoxy compound (A) and an aromatic compound (B) is also called a "binder" in the first method of the present invention and is important from the viewpoint of improving handling properties of carbon fibers in processes and the interfacial adhesion between the carbon fibers and the matrix resin. When the sizing agent is applied in an amount of 0.1 parts by mass or more, the handling properties of the carbon fiber sheet becomes easy and production efficiency of the molding material is improved. When the sizing agent is applied in an amount of 10 parts by mass or less, the interfacial adhesion between the carbon fibers and the matrix resins is improved.

The sizing agent is preferably applied to the carbon fiber sheet using an aqueous solution, an emulsion, or a suspension containing the sizing agent. The aqueous solution means a solution in which the aliphatic epoxy compound (A) and the aromatic compound (B) are almost completely dissolved in water. The emulsion means a state that fine particles of the liquid containing aliphatic epoxy compound (A) and the aromatic compound (B) are formed and dispersed in a liquid as a dispersion medium. The suspension means a state that the solid aliphatic epoxy compound (A) and aromatic compound (B) are suspended in water. As sizes of component particles in the liquid, the component particles of the aqueous solution are the smallest, those of the emulsion are medium, and those of the suspension are the largest. Methods for applying the sizing agent to the carbon fiber sheet are not particularly limiting. Example of the methods include a method for immersing the carbon fiber sheet into the aqueous solution, the emulsion, or the suspension of the sizing agent and a method for showering the aqueous solution, the emulsion, or the suspension of the sizing agent to the carbon fiber sheet. After the application, it is preferable that excessive amount of the aqueous solution, the emulsion, or the suspension be removed by a method for removing the excess by suction or a method for absorbing the excess to an absorber such as absorbent paper.

In the application process, the carbon fiber sheet is preferably heated after the application of the sizing agent. By the heating, water contained in the carbon fiber sheet after the application of the sizing agent can be removed; required time for the next process can be shortened; and the molding material can be obtained in a short period of time. The heating temperature can be appropriately set and is preferably 100° C. or more and 300° C. or less and more preferably 120° C. or more and 250° C. or less.

In order to manufacture in a short period of time a large amount of the carbon fiber sheet to which the sizing agent is applied, drawing of the carbon fiber sheet is preferably carried out. At this time, the carbon fiber sheet is preferably drawn in a state of a tensile strength of 1 N/cm or more so that wrinkles or sags of the carbon fiber sheet are not generated. The tensile strength is more preferably 3 N/cm or more and further preferably 5 N/cm or more. The tensile strength applicable to the carbon fiber sheet can be controlled by adjusting the types and the applied amount of the sizing agent. When the applied amount is increased, the tensile strength can be improved. When an applicable tensile strength is less than 1 N/cm, the carbon fiber sheet may be easily broken. In addition, from the viewpoint of the handling properties of the carbon fiber sheet, the tensile strength is preferably 1 N/cm or more. The upper limit of the tensile strength is not particularly limiting. When the tensile strength is about 100 N/cm, the handling properties of the carbon fiber sheet is sufficiently satisfied.

In the composite formation process, a matrix resin is impregnated into the carbon fiber sheet to which the sizing agent is applied obtained in the application process to form a composite of the carbon fiber sheet and the thermoplastic resin and thus the molding material is obtained.

In the first method, contents of the carbon fibers, the sizing agent, and the matrix resin relative to the molding material are 1% by mass to 70% by mass, 0.1% by mass to 10% by mass, and 20% by mass to 98.9% by mass, respectively. By having the contents within these ranges, the molding material that effectively exerts reinforcement of the carbon fibers tends to be obtained. More preferably, the contents of the carbon fiber, the sizing agent, and the matrix resin are 10% by mass to 60% by mass, 0.5% by mass to 10% by mass, and 30% by mass to 89.5% by mass, respectively. Further preferably, the contents of the carbon fibers, the sizing agent, and the matrix resin are 20% by mass to 60% by mass, 1% by mass to 8% by mass, and 32% by mass to 79% by mass, respectively.

In the first method, when the thermoplastic resin is used as the matrix resin, formation of the composite of the thermoplastic resin and the carbon fiber sheet to which the sizing agent is applied is carried out by bringing the thermoplastic resin into contact with the carbon fiber sheet. In this case, the form of the thermoplastic resin is not particularly limiting. For example, the form of the thermoplastic resin is preferably at least one form selected from a fabric, a nonwoven cloth, and a film. Methods for bringing into contact are not particularly limiting. A method for providing two fabrics, nonwoven cloths, or films and disposing each fabric, nonwoven cloth, or film of the thermoplastic resin onto the upper and lower surfaces of the carbon fiber sheet to which the sizing agent is applied is exemplified.

In the first method, the formation of the composite of the thermoplastic resin and the carbon fiber sheet to which the sizing agent is applied is preferably carried out under pressurizing and/or heating and more preferably carried out under both pressurizing and heating at the same time. The pressurizing condition is preferably 0.01 MPa or more and 10 MPa or less and more preferably 0.05 MPa or more and 5 MPa or less. The heating condition is preferably a temperature at which the thermoplastic resin used can be melted or flowed and the temperature range is preferably 50° C. or more and 400° C. or less and more preferably 80° C. or more and 350° C. or less. The pressurizing and/or heating can be carried out in a state that the thermoplastic resin is in contact with the carbon fiber sheet to which the sizing agent is applied. Examples of the method for pressurizing and/or heating include a method for providing two fabrics, nonwoven cloths, or films of the thermoplastic resin, disposing each of the fabric, nonwoven cloth, or film onto the upper and lower surfaces of the carbon fiber sheet to which the sizing agent is applied, and pressurizing and/or heating from both sides (a method for sandwiching the disposed carbon fiber sheet with a double belt press device or the like).

In the molding material (J1) of the third embodiment manufactured by the first method, the carbon fibers are single fiber form and substantially oriented in two dimensions. The phrase "oriented in two dimensions" means that an average value of a two-dimensional orientation angle formed between a carbon fiber single fiber constituting the molding material and another carbon fiber single fiber that is the closest fiber to the single fiber constituting the molding material is 10 to 80°. The two-dimensional orientation angle can be measured by observing the molding material with an optical microscope or an electron microscope. In a molding material, the two-dimensional orientation angles formed by 400 carbon fibers are measured and the average value is calculated. The phrase "the carbon fibers are "substantially" oriented in two dimensions" means that, among the 400 carbon fibers, usually 70% or more, preferably 95% or more, and more preferably all of the carbon fibers in the number of the carbon fibers are oriented in two dimensions.

Subsequently, the second method as a method for manufacturing the molding material (J2) in which the carbon fibers are in the bundle-like form and that is substantially oriented in two dimensions will be described. The second method includes at least the coating process, the cutting process, and the composite formation process.

In the coating step, the sizing agent-coated carbon fibers are obtained by coating carbon fibers with a sizing agent containing at least the aliphatic epoxy compound (A) in an amount of 35% by mass to 65% by mass and an aromatic compound (B) in an amount of 35% by mass to 60% by mass relative to the total amount of the sizing agent except solvents in an amount of 0.1 parts by mass to 10 parts by mass relative to 100 parts by mass of carbon fibers. As described in the first embodiment, examples of the method of coating the carbon fibers with the sizing agent include the method of immersing carbon fibers in a sizing liquid through a roller, the method of bringing carbon fibers into contact with a roller onto which the sizing liquid is attached, and the method of spraying a sizing liquid onto carbon fibers.

In the cutting process, the sizing agent-coated carbon fibers obtained in the coating process is cut in a length of 1 to 50 mm. The length of the carbon fibers is preferably set to 1 to 50 mm. When the length is less than 1 mm, effective reinforcement and hardening with the carbon fibers may be difficult to be exerted, while when the length is more than 50 mm, good dispersion may be difficult to be sustained. The cut can be carried out by known methods such as a guillotine cutter and rotary cutters such as a roving cutter.

In the composite formation process, the sizing agent-coated carbon fibers cut in the cutting process and the matrix resin are mixed so that the sizing agent-coated carbon fibers are in an amount of 1% by mass to 80% by mass and the matrix resin is in an amount of 20% by mass to 99% by mass to form a composite product. The contained ratio of the sizing agent-coated carbon fibers and the matrix resin is preferably the sizing agent-coated carbon fibers of 1% by mass to 80% by mass and the matrix resin of 20% by mass to 99% by mass, more preferably the sizing agent-coated carbon fibers of 10% by mass to 70% by mass and the matrix resin of 30% by mass to 90% by mass, and further preferably the sizing agent-coated carbon fibers of 20% by mass to 60% by mass and the matrix resin of 40% by mass to 80% by mass.

In the molding material (J2) of the third embodiment manufactured in the second method, the carbon fibers are bundle-like form and substantially oriented in two dimensions. The phrase "oriented in two dimensions" has the same meaning as the meaning in the first method.

In the first method and the second method, the thermoplastic resin or a thermosetting resin such as a radical polymerizable resin is used as the matrix resin used in the composite formation process. Particularly in the first method, the thermoplastic resin is preferably used from the viewpoint of moldability.

Examples of the radical polymerizable resin include an unsaturated polyester resin, a vinyl ester resin, a cyanate ester resin, and a bismaleimide resin. Among them, the unsaturated polyester resin and the vinyl ester resin are suitably used.

The unsaturated polyester resin can be obtained from an unsaturated polybasic acid or optionally an unsaturated polybasic acid containing a saturated polybasic acid and a polyol. Examples of the unsaturated polybasic acid include maleic acid, maleic anhydride, fumaric acid, itaconic acid, itaconic anhydride, mesaconic acid, citraconic acid, citraconic anhydride, chloro maleic acid, and pyromellitic acid or a (di)alkyl ester thereof. These unsaturated polybasic acids can be used singly or in combination of two or more of them. Examples of the saturated polybasic acid replacing a part of the unsaturated polybasic acid include phthalic acid, phthalic anhydride, isophthalic acid, terephthalic acid, hexahydrophthalic anhydride, azelaic acid, adipic acid, sebacic acid, and HET acid. These saturated polybasic acids can be used singly or in combination of two or more of them.

Examples of the polyol include ethylene glycol, diethylene glycol, propylene glycol, dipropylene glycol, trimethylene glycol, 1,2-butanediol, 1,3-butanediol, 1,4-butanediol, 1,2-pentanediol, 1,6-hexanediol, cyclohexane diol, neopentyl glycol, 2,2,4-trimethyl-1,3-pentanediol, glycerin monoallylol, bisphenol A, hydrogenated bisphenol A, a propylene oxide adduct of bisphenol A, an ethylene oxide adduct of bisphenol A, glycidylated bisphenol A, glycidylated bisphenol F, glycerin, trimethylolpropane, pentaerythritol, ethylene oxide, propylene oxide, and epichlorohydrin. These polyols can be used singly or in combination of two or more of them.

In order to reduce the weight of the molding material, a thermoplastic resin can be contained in the radical polymerizable resin. A solid thermoplastic resin composition at room temperature is preferable for reducing the weight. In particular, compositions made of one of a saturated polyester, a polyvinyl compound, polyacetate, and poly(meth)acrylate or a combination thereof is preferably used. Among them, poly(meth)acrylate is easy to handle and inexpensive and thus can be most preferably used.

The added amount of the thermoplastic resin to the radical polymerizable resin is preferably 10% by mass or more and particularly preferably 20% by mass or more, and preferably 60% by mass or less and particularly preferably 40% by mass or less. When the amount of the thermoplastic resin is more than 60% by mass, the strength of the molded carbon fiber-reinforced resin molded article is deteriorated.

In addition to the above-described thermoplastic resin, additives such as a hardening agent (a polymerization initiator), a hardening catalyst, a mold release agent, a thickening agent, a colorant, and other fillers may be added to the radical polymerizable resin that can be used in the third embodiment. For example, an azo compound, a peroxide, or the like as the hardening agent, a chain transfer agent as represented by mercaptans or the like as the hardening catalyst, a higher fatty acid such as stearic acid or a metal salt thereof or the like as the mold release agent, an oxide of an alkaline earth metal or the like as the thickening agent, an inorganic pigment, tonner, or the like as the colorant can be used in an appropriate amount.

When the thermoplastic resin is used, the same thermoplastic resin as used in the first embodiment can be used. As the thermoplastic resin, plurality types of the thermoplastic resins can be used unless the purpose of the present invention is impaired.

Among these thermoplastic resins, when the thermoplastic resin is at least one thermoplastic resin selected from the group consisting of the polyarylene sulfide resin, the polyether ether ketone resin, the polyphenylene ether resin, the polyoxymethylene resin, the polyester resin, the polycarbonate resin, the polystyrene resins and the polyolefin resins, the thermoplastic resin has a large interaction effect with the aromatic compound (B) and thus a strong interface can be formed due to the strong interaction effect between the sizing agent and the thermoplastic resin.

The thermoplastic resin used in the third embodiment is preferably the polyarylene sulfide resin and the polyether ether ketone resin from the viewpoint of heat resistance. The thermoplastic resin is preferably the polyphenylene ether resin from the viewpoint of dimensional stability. The thermoplastic resin is preferably the polyoxymethylene resin from the viewpoint of friction and abrasion properties. The thermoplastic resin is preferably the polyamide resin from the viewpoint of strength. The thermoplastic resin is preferably amorphous resins such as the polycarbonate resin and the polystyrene resins from the viewpoint of surface appearance. The thermoplastic resin is preferably the polyolefin resins from the viewpoint of lightweight properties.

The thermoplastic resin is more preferably one or more resins selected from the polyarylene sulfide resin, the polycarbonate resin, and the polyolefin resins or the polyamide. From the viewpoint of heat resistance, the polyarylene sulfide is particularly preferable, and from the viewpoint of lightweight properties, the polyolefin resins are particularly preferable.

The use of a resin having a high hygroscopic property represented by the polyamide is preferable because physical properties are maintained even at the time of moisture absorption by the effect of reduction in water content due to the aromatic compound (B) on the surface of the carbon fibers. In particular, the polyamide resin has high strength and thus is preferable.

In the third embodiment, also for the interaction with the sizing agent when the preferable thermoplastic resin is used, it is possible to refer to the description of the interaction with the sizing agent when the thermoplastic resin is used in the first embodiment.

Preferable examples of the thermoplastic resin in the second method for manufacturing the molding material of the third embodiment include (meth)acrylic resins such as poly(methyl methacrylate), polystyrene resins such as polystyrene, a vinyl acetate resin, a vinyl chloride resin, a polyester resin, polypropylene, polyethylene, and polycarbonate. Among them, the (meth)acrylic resin, which has excellent weatherability, is particularly preferable.

In the second method, when the thermoplastic resin is used as the matrix resin, a polymerizable monomer can be added in order to secure flowability at the time of molding. The polymerizable monomer of the thermoplastic resin acts as improving moldability at the time of molding the carbon fiber-reinforced resin molded article. The polymerizable monomer also improves wettability to the carbon fibers and thus a larger amount of the carbon fibers can be contained in the molding material. The polymerizable monomer is a monomer that can form a thermoplastic polymer at the time of polymerization. Such a polymerizable monomer is, for example, a molecule having one radical polymerizable carbon-carbon double bond in the molecule and having a molecular weight of 1,000 or less.

By using the polymerizable monomer having one radical polymerizable carbon-carbon double bond, the carbon fiber-reinforced resin molded article formed by polymerizing and hardening the molding material containing the polymerizable monomer is made of a non-crosslinked polymer and thus exerts thermoplasticity. Consequently, in the third embodiment, the molding material using the thermoplastic resin as the matrix resin is recyclable.

Specific examples of the usable polymerizable monomer of the thermoplastic resin include aromatic vinyl such as styrene, vinyl acetate, vinyl chloride, maleic anhydride, maleic acid, fumaric acid, fumaric acid esters, and (meth) acrylic monomers such as methyl methacrylate and methacrylic acid. These monomers may be used singly or in combination of two or more of the monomers, if needed. The polymerizable monomer of the thermoplastic resin may be in the form of oligomer of the polymerizable monomer and the like as long as the oligomer can impart appropriate flowability to the molding material. Among them, the (meth) acrylic monomer, which has excellent weatherability after hardening, is particularly preferable.

In the second method, when a radical polymerizable resin is used as the matrix resin, the radical polymerizable resin is used as a sheet such as a film-like form made by uniformly applying a melted resin on a release film. After the bundle-like sizing agent-coated carbon fibers cut in the cutting process are uniformly dropped or spread on the sheet, a sheet coated with the melted resin in a similar manner is laminated to sandwich the carbon fibers to form a composite product. By heating the obtained sheet for predetermined time (for example, for 24 hours at 40° C.), the viscosity of the matrix resin is increased, and thus a sheet as the molding material of the present invention can be obtained.

In the second method, when the thermoplastic resin is used as the matrix resin, the thermoplastic resin is used as a sheet such as a film-like form made by uniformly applying a melted resin on a release film similar to the radical polymerizable resin. When the thermoplastic resin containing the polymerizable monomer is used, the thermoplastic resin preferably has a viscosity that does not cause drip of the thermoplastic resin from the sides of the release film. After the bundle-like sizing agent-coated carbon fibers cut in the cutting process are uniformly dropped or spread on the sheet to which the thermoplastic resin is applied, a sheet coated with a melted resin in a similar manner is laminated to sandwich the carbon fibers to form a composite product.

The surface of the sizing agent-coated carbon fibers after washing the molding material (J) of the third embodiment to reduce an attached amount of the sizing agent to 0.09% by mass to 0.20% by mass by carrying out ultrasonic treatment in a solvent that dissolves the matrix resin constituting the molding material preferably has a ratio (a)/(b) of 0.3 to 0.7 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent-coated carbon fibers measured by X-ray photoelectron spectroscopy using an X ray of 400 eV at a photoelectron takeoff angle of 55°. The ratio (a)/(b) is preferably 0.3 or more because the interaction between the matrix resin and the sizing agent is improved. The ratio (a)/(b) is more preferably 0.35 or more. The ratio (a)/(b) is preferably 0.7 or less because the adhesion between the carbon fibers and the sizing agent is improved and thus physical properties of a carbon fiber composite material is excellent. The ratio (a)/(b) is more preferably 0.6 or less. The solvent that elutes the matrix resin and the sizing agent of the molding material is not limiting. Any solvents can be used as long as the solvents can dissolve the matrix resin and the attached amount of the sizing agent after washing is within the above range. For example, when the polyamide is used as the matrix resin, formic acid is preferably used and when the polycarbonate resin is used, dichloromethane is preferably used.

Other components may be contained in addition to the components described above in the molding material (J) of the third embodiment unless the mechanical properties are impaired. Fillers, additives, or the like may also be contained. Examples of the fillers and the additives include inorganic fillers, flame retardants, conductivity imparting agents, crystal nucleating agents, ultraviolet absorbers, antioxidants, damping agents, antimicrobial agents, insect repellents, deodorants, coloring prevention agents, heat stabilizers, mold release agents, antistatic agents, plasticizers, lubricants, colorants, pigments, blowing agents, and coupling agents.

In particular, as additives, the flame retardant is preferably added for the application that requires flame retardancy and the conductivity imparting agent is preferably added for the application that requires electric conductivity. As the flame retardants and the conductivity imparting agents, similar flame retardants and conductivity imparting agents of the first embodiment can be used.

The carbon fiber-reinforced resin molded article prepared by forming the molding material (J) of the third embodiment is preferably used for, for example, electronic devices such as personal computers and aircraft members and, in addition, the applications similar to the applications of the first embodiment.

Fourth Embodiment

The fourth embodiment is a molding material (H) that has a cylindrical shape and is constituted with a sizing agent-coated carbon fibers in which a sizing agent is applied to carbon fibers and a thermoplastic resin, in which the sizing agent contains at least an aliphatic epoxy compound (A) and an aromatic epoxy compound (B1) as an aromatic compound (B), in which the sizing agent-coated carbon fibers have a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent measured by X-ray photoelectron spectroscopy at a photoelectron takeoff angle of 15°, and in which the carbon fibers in the molding material are almost parallelly arranged in an axis center direction and the length of the carbon fibers in the molding material is substantially the same length as the length of the molding material.

In the molding material (H) according to the fourth embodiment, the sizing agent used contains at least an aliphatic epoxy compound (A) and an aromatic epoxy compound (B1) as an aromatic compound (B). In the fourth embodiment, the aliphatic epoxy compound (A), the aromatic epoxy compound (B1) as the aromatic compound (B), and ratios of each component are similar to those of the first embodiment and thus the description is omitted. Also for the description of the carbon fibers used, the method for manufacturing the same, and the sizing agent-coated carbon fibers made by coating the carbon fibers with the sizing agent, it is possible to refer to the description of the first embodiment.

Subsequently, the molding material (H) and a carbon fiber-reinforced resin molded article according to the fourth embodiment will be described. The molding material (H) according to the fourth embodiment is constituted by the sizing agent-coated carbon fibers and the thermoplastic resin. As shown in FIG. 1, a molding material 1 of the fourth embodiment has a cylindrical shape. A plurality of carbon fibers 2 are almost parallelly arranged in an axis center direction and circumference of the carbon fibers 2 are covered with a thermoplastic resin 3. In other words, the carbon fibers 2 mainly constitute the core structure of the cylinder and the thermoplastic resin 3 is a main component of the sheath structure covering the core structure made of the carbon fibers 2. The shape of the molding material 1 of the fourth embodiment may be any shapes such as a prismatic shape and an elliptic cylindrical shape in addition to the cylindrical shape as long as the carbon fiber 2 and the thermoplastic resin 3 constitute the core-sheath structure. In this specification, the phrase "almost parallelly arranged" means a state in which the axis line of the long axis of the carbon fibers 2 and the axis line of the long axis of the molding material 1 are oriented in the same direction. Declination of the angles between the axes is preferably 20° or less, more preferably 10° or less, and further preferably 5° or less.

The molding material 1 of the fourth embodiment is preferably long fiber pellets in which the length of the carbon fibers 2 and the length L of the molding material 1 are substantially the same. In this specification, the phrase "lengths are substantially the same" means that, in the pellet-like molding material 1, the carbon fibers 2 are not cut in the middle of the inside of the pellet or carbon fibers 2 significantly shorter than the whole length of the molding material 1 are not substantially included. An amount of the carbon fibers 2 shorter than the length L of the molding material 1 is not particularly required to be limiting. When the content of the carbon fibers having a length shorter than 50% or less of the length L of the molding material 1 is 30% by mass or less, it is evaluated that the carbon fiber bundles having a length shorter than the whole length of the molding material 1 is not substantially included. The content of the carbon fibers having a length shorter than 50% or less of the whole length of the molding material 1 is preferably 20% by mass or less. Here, the whole length of the molding material 1 means the length L in the carbon fiber orientation direction in the molding material 1. When the carbon fibers have an equal length to the molding material 1, the length of the carbon fibers in the molded article can be long and thus excellent mechanical properties can be obtained.

The molding material (H) of the fourth embodiment is preferably used by cutting in a length in a range from 1 mm to 50 mm. By adjusting the above-described length, flowability and handling properties at the time of molding can be sufficiently improved. The continuous or long molding material (H) of the fourth embodiment may be used depending on molding methods. For example, a roll-like molded article may be obtained by winding the molding material as a thermoplastic yarn prepreg to a mandrel with heating.

As the thermoplastic resin used for the molding material (H) of the fourth embodiment, the thermoplastic resin similar to the thermoplastic resin used in the first embodiment can be used. A thermoplastic resin composition containing a plurality of different types of the thermoplastic resins may be used as the thermoplastic resin unless the purpose of the present invention is impaired.

Figure 2:
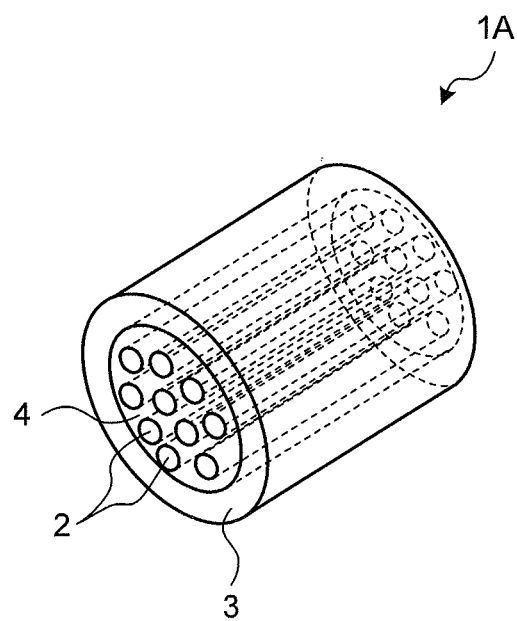
FIG. 2 is a perspective view illustrating one example of the molding material according to the fourth embodiment (Form B) of the present invention.

As the molding material (H) of the fourth embodiment, the molding material in which an impregnation promoter (D) is provided between the carbon fibers 2 and the thermoplastic resin 3 is suitably used. FIG. 2 is a perspective view illustrating a molding material 1A according to the fourth embodiment. The molding material 1A has a constitution in which a plurality of carbon fibers 2 are almost parallelly arranged in an axis center direction, circumference of the carbon fibers 2 are covered with an impregnation promoter 4 and circumference of the impregnation promoter 4 is covered with a thermoplastic resin 3. In order to improve the mechanical properties of the molded article obtained by molding the molding material, generally a thermoplastic resin having high molecular weight is preferably used. However, the thermoplastic resin having high molecular weight has high melt viscosity and is difficult to be impregnated into the carbon fiber bundles. On the other hand, in order to improve the impregnation properties of the thermoplastic resin into the carbon fiber bundles, a thermoplastic resin having low molecular weight is preferably used. However, the molded article molded by using the thermoplastic resin having low molecular weight significantly deteriorates mechanical properties.

After a resin having relatively low molecular weight (a prepolymer) is impregnated as an impregnation promoter 4 into the bundles of the carbon fibers 2, the thermoplastic resin 3 having relatively high molecular weight as the matrix resin is used, and whereby the molding material having excellent mechanical properties can be manufactured in excellent productivity.

Hereinafter, a preferable aspect for the molding material (H) using the impregnation promoter (D) will be described.

The impregnation promoter (D) is preferably contained in an amount of 0.1 parts by mass to 100 parts by mass relative to 100 parts by weight of the carbon fibers. The impregnation promoter (D) is more preferably contained in an amount of 10 parts by mass to 70 parts by mass and further preferably in an amount of 15 parts by mass to 30 parts by mass. When the impregnation promoter (D) is preferably contained in an amount of 0.1 parts by mass to 100 parts by mass relative to 100 parts by mass of the carbon fibers, the molding material having high mechanical properties can be manufactured in excellent productivity.

When the polyarylene sulfide resin is used as the thermoplastic resin, polyarylene sulfide [d] (hereinafter abbreviated as PAS) having a mass average molecular weight of 10,000 or more and a degree of dispersion represented by mass average molecular weight/number average molecular weight of 2.5 or less is preferably used as the impregnation promoter (D).

The molecular weight of PAS as the impregnation promoter is 10,000 or more, preferably 15,000 or more, and more preferably 18,000 or more in mass average molecular weight. When the mass average molecular weight is less than 10,000, low molecular weight components may suffer thermal decomposition reaction at the time of molding at higher temperature (for example, 360° C.) and this may cause environmental pollution around molding facilities by the gas generated by the decomposition. The upper limit of the mass average molecular weight is not particularly limiting. As a preferable range, a mass average molecular weight of 1,000,000 or less can be exemplified. The range is more preferably 500,000 or less and further preferably 200,000 or less. When the mass average molecular weight is within this range, high impregnation properties and excellent moldability and processability can be obtained.

When the polyamide resin is used as the thermoplastic resin, a phenolic polymer [e] is preferably used as the impregnation promoter (D).

Examples of the phenolic polymer [e] used as the impregnation promoter (D) include phenolic polymers obtained by a condensation reaction of phenol or a substituent derivative of phenol (precursor a) and a hydrocarbon (precursor b) having two double bonds.

As the precursor a, phenols having 1 to 3 substituents selected from an alkyl group, a halogen atom, and a hydroxy group on the benzene ring of phenol as well as phenol, are preferably used. Specific examples of the substituted phenol include cresol, xylenol, ethylphenol, butylphenol, t-butylphenol, nonylphenol, 3,4,5-trimethylphenol, chlorophenol, bromophenol, chlorocresol, hydroquinone, resorcinol, and orcinol. These substituted phenols can be used singly or in combination of two or more thereof. In particular, phenol and cresol are preferably used.

As the precursor b, aliphatic hydrocarbons such as butadiene, isoprene, pentadiene, and hexadiene and alicyclic hydrocarbons such as cyclohexadiene, vinylcyclohexene, cycloheptadiene, cyclooctadiene, 2,5-norbornadiene, tetrahydroindene, dicyclopentadiene, monocyclic monoterpenes (dipentene, limonene, terpinolene, terpinene, and phellandrene), and bicyclic sesquiterpenes (cadinene, selinene, and caryophyllene). These compounds can be used singly or in combination of two or more thereof. In particular, the monocyclic monoterpenes and dicyclopentadiene are preferably used.

When the polyolefin resin is used as the thermoplastic resin, a terpene resin [f] is preferably used as the impregnation promoter (D).

Examples of the terpene resin [f] used as the impregnation promoter (D) include resins made of polymers obtained by homopolymerizing a terpene monomer or copolymerizing a terpene monomer and an aromatic monomer or the like in the presence of a Friedel-Crafts catalyst in an organic solvent.

The terpene resin [f] is a thermoplastic polymer having a viscosity lower than the viscosity of the polyolefin resin. When the terpene resin is used, the viscosity of the resin composition can be lowered and moldability can be improved in a molding process for molding a final shape such as injection molding and press molding. In this case, the terpene resin [f] has good compatibility with the polyolefin resin and thus the moldability can be effectively improved.

Examples of the terpene monomer include monocyclic monoterpenes such as α-pinene, β-pinene, dipentene, d-limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, paramenthadienes, and carenes. Examples of the aromatic monomer include styrene and α-methylstyrene.

Among them, α-pinene, β-pinene, dipentene, and d-limonene are preferable because these terpene monomers have good compatibility with the polyolefin resin. Homopolymers of these compounds are more preferable. A hydrogenated terpene resin obtained by hydrogenation treatment of the terpene resin is preferable because the hydrogenated terpene resin has better compatibility with the polyolefin resin.

Furthermore, when the polyolefin resin is used as the thermoplastic resin, a mixture of a first propylene resin [g] and a second propylene resin [h] having acyl groups in side chains can be preferably used as the impregnation promoter (D) component.

Examples of the first propylene resin [g] used as the impregnation promoter (D) include a homopolymer of propylene or a copolymer of propylene and at least one monomer such as an α-olefin, a conjugated diene, and a nonconjugated diene.

Examples of monomer repeating units constituting the α-olefin include α-olefins having a carbon number of 2 to 12 such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, and 1-dodecene except propylene. Examples of the monomer repeating units constituting the conjugated diene and the nonconjugated diene include butadiene, ethylidenenorbornene, dicyclopentadiene, and 1,5-hexadiene. One or two or more of these other monomer repeating units can be selected.

Examples of the skeleton structure of the first propylene resin [g] include a propylene homopolymer, a random or a block copolymer made of propylene and one or two or more of the other monomers, and a copolymer made of propylene and other thermoplastic monomer. Preferable examples include polypropylene, ethylene-propylene copolymer, propylene-1-butene copolymer, and ethylene-propylene-1-butene copolymer.

Raw materials of the second propylene resin [h] can be obtained by graft-polymerizing a monomer having acyl groups that is neutralized or not neutralized and/or a monomer having a carboxylic acid ester that is saponified or not saponified to a homopolymer or a copolymer made of propylene and one or two or more of α-olefins represented by polypropylene, ethylene-propylene copolymer, propylene-1-butene copolymer, and ethylene-propylene-1-butene copolymer. The monomer repeating unit and the skeleton structure of the homopolymer or the copolymer made of propylene and one or two or more of the α-olefins can be selected by a similar idea in the selection of the first propylene resin [g].

Examples of the monomer having acyl groups that are neutralized or not neutralized and a monomer having a carboxylic acid esters that are saponified or not saponified include an ethylenically unsaturated carboxylic acid and an acid anhydride thereof, and also include an ester thereof and a compound having an unsaturated vinyl group except olefins.

Examples of the ethylenically unsaturated carboxylic acid include (meth)acrylic acid, maleic acid, fumaric acid, tetrahydrophthalic acid, itaconic acid, citraconic acid, crotonic acid, and isocrotonic acid. Examples of the acid anhydride of the ethylenically unsaturated carboxylic acid include nadic acid (registered trademark) (Endocis-bicyclo[2.2.1] hept-5-ene-2,3-dicarboxylic acid), maleic anhydride, and citraconic anhydride.

In the molding materials 1 and 1A according to the fourth embodiment illustrated in FIG. 1 and FIG. 2, at least one thermoplastic resin selected from the group consisting of the polyarylene sulfide resin, the polyether ether ketone resin, the polyphenylene ether resin, the polyoxymethylene resin, the polyester resin, the polycarbonate resin, the polystyrene resins and the polyolefin resin are preferably used because the these resins have large interaction with the aromatic compound (B) and strong interface can be formed due to strong interaction between the sizing agent and the thermoplastic resin.

The thermoplastic resin used in the fourth embodiment is preferably the polyarylene sulfide resin and the polyether ether ketone resin from the viewpoint of heat resistance. The thermoplastic resin is preferably the polyphenylene ether resin from the viewpoint of dimensional stability. The thermoplastic resin is preferably the polyoxymethylene resin from the viewpoint of friction and abrasion properties. The thermoplastic resin is preferably the polyamide resin from the viewpoint of strength. The thermoplastic resin is preferably amorphous resins such as the polycarbonate resin and the polystyrene resin from the viewpoint of surface appearance. The thermoplastic resin is preferably the polyolefin resins from the viewpoint of lightweight properties.

The thermoplastic resin is more preferably one or more resins selected from the polyarylene sulfide resin, the polycarbonate resin, and the polyolefin resins or the polyamide. From the viewpoint of heat resistance, the polyarylene sulfide is particularly preferable, and from the viewpoint of lightweight properties, the polyolefin resins are particularly preferable.

The use of a resin having a high hygroscopic property represented by the polyamide is preferable because physical properties are maintained even at the time of moisture absorption by the effect of reduction in water content due to the aromatic compound (B) on the surface of the carbon fibers. In particular, the polyamide resin has high strength and thus is preferable.

A thermoplastic resin composition containing a plurality of different types of the thermoplastic resins may be used as the thermoplastic resin unless the purpose of the present invention is impaired.

In the fourth embodiment, for the interaction with the sizing agent when the preferable thermoplastic resin is used, it is possible to refer to the description of the interaction with the sizing agent when the thermoplastic resin is used in the first embodiment.

The surface of the sizing agent-coated carbon fibers after washing the molding material (H) of the fourth embodiment to reduce the attached amount of the sizing agent to 0.09% by mass to 0.20% by mass by carrying out ultrasonic treatment in a solvent that dissolves the thermoplastic resin constituting the molding material (H) preferably has a ratio (a)/(b) of 0.30 to 0.70 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent-coated carbon fibers measured by X-ray photoelectron spectroscopy using an X ray of 400 eV at a photoelectron takeoff angle of 55°. The ratio (a)/(b) is preferably 0.30 or more because the interaction between the thermoplastic resin and the sizing agent is improved. The ratio (a)/(b) is more preferably 0.35 or more. The ratio (a)/(b) is preferably 0.70 or less because the adhesion between the carbon fibers and the sizing agent is improved and thus physical properties of a composite is excellent. The ratio (a)/(b) is more preferably 0.60 or less.

The solvent that elutes the thermoplastic resin and the sizing agent in the molding material (H) is not limiting as long as the solvents can dissolve the thermoplastic resin and the attached amount of the sizing agent after washing is within the above range. For example, when the polyamide is used as the thermoplastic resin, formic acid is preferably used and when the polycarbonate resin is used, dichloromethane is preferably used.

Subsequently, preferable aspects of a method for manufacturing the molding material (H) and a carbon fiber-reinforced resin molded article of the fourth embodiment will be described.

In the method for manufacturing the molding material (H) of the fourth embodiment, the method preferably including the processes of: a coating process for coating continuous carbon fibers with a sizing agent containing at least a aliphatic epoxy compound (A) in an amount of 35% by mass to 65% by mass and an aromatic compound (B) in an amount of 35% by mass to 60% by mass relative to the total amount of the sizing agent except solvents; a strand formation process for impregnating a melted thermoplastic resin into the continuous sizing agent-coated carbon fibers to obtain a continuous strands; and a cutting process for cooling the strand and thereafter the cooled strands are cut to obtain the columnar molding material.

In the method for manufacturing the molding material (H) in the fourth embodiment, the aliphatic epoxy compound (A) is preferably contained in an amount of 35% by mass to 65% by mass relative to the total amount of the sizing agent except solvents. When the aliphatic epoxy compound (A) is contained in an amount of 35% by mass or more, the interfacial adhesion with the matrix resin is improved and thus the physical properties of the carbon fiber-reinforced resin composition is improved. The aliphatic epoxy compound (A) is preferably contained in an amount of 65% by mass or less because components in addition to the aliphatic epoxy compound (A) can be used as a sizing agent and the interaction between the sizing agent and the matrix resin is improved to provide excellent physical properties. The amount is more preferably 38% by mass or more and further preferably 40% by mass or more. In addition, the amount is more preferably 60% by mass or less and further preferably 55% by mass or less.

The aromatic compound (B) in the sizing agent solution is preferably contained in an amount of 35% by mass to 60% by mass relative to the total amount of the sizing agent except solvents. The aromatic compound (B) is preferably contained in an amount of 35% by mass or more because a larger amount composition of the aromatic compound (B) in the outer layer of the sizing agent can be maintained and thus the interaction with the matrix resin can be strong and the water content near the carbon fibers of the carbon fiber-reinforced resin composition can be lowered. The aromatic compound (B) is preferably contained in an amount of 60% by mass or less because the gradient structure in the sizing agent described above can be exerted and thus the adhesion can be sustained. The amount is more preferably 37% by mass or more and further preferably 39% by mass or more.

In addition, the amount is more preferably 55% by mass or less and further preferably 45% by mass or less.

In the sizing agent solution, the mass ratio (A)/(B1) of the aliphatic epoxy compound (A) and the aromatic epoxy compound (B1) contained as the epoxy components is preferably 52/48 to 80/20. When the ratio (A)/(B1) is 52/48 or more, the ratio of the aliphatic epoxy compound (A) existing on the surface of the carbon fibers becomes larger and thus the interfacial adhesion to the carbon fibers is improved. As a result, physical properties of the composite such as tensile strength of the carbon fiber-reinforced resin composition are improved and thus this mass ratio is preferable. The ratio (A)/(B1) of 80/20 or less is preferable because an amount of the aliphatic epoxy compound having high water content existing on the surface of the carbon fibers in the carbon fiber-reinforced resin composition becomes smaller and an amount of the aromatic compound that can interact with the matrix resin is increased. The mass ratio (A)/(B1) is more preferably 55/45 or more, further preferably 57/43 or more, and most preferably 60/40 or more. In addition, the mass ratio (A)/(B1) is more preferably 75/35 or less and further preferably 73/37 or less.

The carbon fibers coated with the sizing agent can be obtained by the coating process of coating the carbon fibers with the sizing agent. The sizing agent-coated carbon fibers obtained in the first process of the present invention have a ratio (a)/(b) of 0.50 to 0.90 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent measured by X-ray photoelectron spectroscopy using at a photoelectron takeoff angle of 15°.

In the molding material (H) according to the fourth embodiment, for the method for coating the carbon fibers with the sizing agent, the attached amount of the sizing agent to the carbon fibers, the epoxy equivalent of the carbon fibers coated with the sizing agent, the thickness of the sizing agent layer applied to the carbon fibers and dried, the ratio of the eluted aliphatic epoxy compound (A) when the sizing agent-coated carbon fibers are eluted with a mixed solvent of acetonitrile and chloroform, and the water content of the sizing agent-coated carbon fibers, it is possible to refer to those of the first embodiment. The ratios of the specific peaks of the surface of the sizing agent-coated carbon fibers and the surface of the sizing agent-coated carbon fibers after ultrasonic treatment in an acetone solvent measured by X-ray photoelectron spectroscopy are also similar to those of the first embodiment and thus the description is omitted.

In the fourth embodiment, a method for impregnating the thermoplastic resin to the carbon fibers coated with the sizing agent is not limiting. Examples of the method include a pultrusion molding method (a pultrusion method) for impregnating the thermoplastic resin to the carbon fibers while the carbon fibers coated with the sizing agent are pultruded. The pultrusion method is a method of optionally adding an additive for resins to the thermoplastic resin, feeding the thermoplastic resin from an extruder to a crosshead die in a melting state to impregnate the thermoplastic resin into the continuous carbon fibers with pulling continuous carbon fibers through the crosshead die, heating the melted resin impregnated continuous carbon fibers, and cooling the continuous carbon fibers. The cooled strand is cut in a direction perpendicular to the pulling direction to obtain the molding material 1. In the molding material 1, the carbon fibers are parallelly arranged in the length direction in the same length. The pultrusion method is basically a method for impregnating the thermoplastic resin with pulling continuous carbon fibers. In addition to the method for feeding the thermoplastic resin from an extruder to a crosshead die with passing the continuous carbon fiber bundles through the crosshead die to impregnate the thermoplastic resin, usable methods include a method for passing carbon fiber bundles through an impregnation bath that contains an emulsion, a suspension, or a solution of the thermoplastic resin for the impregnation and a method for spraying thermoplastic resin powder to carbon fiber bundles or passing the carbon fiber bundles through a bath that contains the powder to attach the thermoplastic resin powder to the carbon fibers, and thereafter melting the attached thermoplastic resin for the impregnation. The crosshead method is particularly preferable. Generally, the impregnation operation of the resin in the pultrusion method is carried out in one process. However, the impregnation operation can be divided into two or more processes and further a different impregnation method may be carried out.

The pultrusion method is preferable because the carbon fibers can be uniformly arranged and a carbon fiber-reinforced resin molded article having excellent mechanical properties can be obtained.

The molding material containing the impregnation promoter (D) is preferably prepared by impregnating the impregnation promoter (D) into the sizing agent-coated carbon fibers, and thereafter impregnating the sizing agent-coated carbon fibers into which the impregnation promoter (D) is impregnated into the thermoplastic resin. For example, the molding material containing the impregnation promoter (D) is manufactured by covering with the thermoplastic resin by the pultrusion molding method (the pultrusion method).

Other components may be contained in the molding material (H) of the fourth embodiment in addition to the components described above unless the mechanical properties are impaired. Fillers and additives may also be contained. Examples of the fillers and the additives include inorganic fillers, flame retardants, conductivity imparting agents, crystal nucleating agents, ultraviolet absorbers, antioxidants, damping agents, antimicrobial agents, insect repellents, deodorants, coloring prevention agents, heat stabilizers, mold release agents, antistatic agents, plasticizers, lubricants, colorants, pigments, blowing agents, and coupling agents.

In particular, as additives, the flame retardant is preferably added for the application that requires flame retardancy and the conductivity imparting agent is preferably added for the application that requires electric conductivity. As the flame retardants and the conductivity imparting agents, those similar to the first embodiment can be used.

The molding material (H) of the fourth embodiment is preferably used in the form of long fiber pellets. Examples of the method for molding the molding material (H) according to the fourth embodiment include injection molding (injection compression molding, gas-assisted injection molding, and insert molding), extrusion molding, and press molding. Among them, the injection molding is preferably used from the viewpoint of productivity. The carbon fiber-reinforced resin molded article can be obtained by these methods.

The carbon fiber-reinforced resin molded article prepared by forming the molding material of the present invention is preferably used for, for example, electronic devices such as personal computers and aircraft members and, in addition, the applications similar to the applications of the first embodiment.

EXAMPLES

Subsequently, the present invention is specifically described with reference to Examples. However, the present invention is not limiting to these Examples. Preparation environment and evaluation of molding material in Examples shown below are carried out in an atmosphere of a temperature of 25° C.±2° C. and a relative humidity of 50% RH unless otherwise noted.

(1) X-Ray Photoelectron Spectroscopy of Surface of Sizing Agent of Sizing Agent-Coated Carbon Fibers (X-Ray Source: AlKα$_{1,2}$)

In the present invention, the peak ratio of (a) and (b) of the surface of the sizing agent on sizing agent-coated carbon fibers was determined by the X-ray photoelectron spectroscopy in accordance with the following procedure. The sizing agent-coated carbon fibers are cut into 20 mm pieces and the pieces were spread and arranged on a copper sample holder. The sample was measured by using AlKα$_{1,2}$ as an X-ray source and maintaining the inside of a sample chamber at $1 \times 10^{-8}$ Torr. As the correction for the peak associated with electrification during the measurement, first, the binding energy value of the main peak of $C_{1s}$ was set to 286.1 eV. At this time, the $C_{1s}$ peak area was determined by drawing a straight base line in a range from 282 eV to 296 eV. The straight base line from 282 to 296 eV for calculating area at the $C_{1s}$ peak was defined as the original point (zero point) for the photoelectron intensity. The ratio (a)/(b) was calculated by determining (b) the height (cps) of the peak at a binding energy of 286.1 eV attributed to a C—O component and (a) the height (cps) of the component at a binding energy of 284.6 eV attributed to CHx, C—C, and C=C.

When (a) was larger than (b), the peak of $C_{1s}$ was not in a range from 282 to 296 eV when the binding energy value of the main peak of $C_{1s}$ was adjusted to 286.1. In this case, the binding energy value of the main peak of $C_{1s}$ was adjusted to 284.6 and then the ratio (a)/(b) was calculated by the above-described procedure.

(2) Washing of Sizing Agent of Sizing Agent-Coated Carbon Fibers

Into 50 mL of acetone, 2 g of the sizing agent-coated carbon fibers were immersed and ultrasonic cleaning was applied for 30 minutes three times. Subsequently, the carbon fibers were immersed in 50 mL of methanol, and ultrasonic cleaning was applied for 30 minutes once, followed by drying the carbon fibers.

(3) X-Ray Photoelectron Spectroscopy of Sizing Agent-Coated Carbon Fibers at 400 eV In the present invention, the peak ratio of (a) and (b) of the surface of the sizing agent of sizing agent-coated carbon fibers was determined by the X-ray photoelectron spectroscopy in accordance with the following procedure. The sizing agent-coated carbon fibers and the sizing agent-coated carbon fibers from which the sizing agent was washed were cut into 20 mm pieces and the pieces are spread and arranged on a copper sample holder. Saga synchrotron radiation was used as an X-ray source and the measurement was carried out at an excitation energy of 400 eV. The inside of a sample chamber was maintained at $1 \times 10^{-8}$ Torr. The measurement was carried out at a photoelectron takeoff angle of 55°. As the correction for the peak associated with electrification during the measurement, first, the binding energy value of the main peak of $C_{1s}$ was set to 286.1 eV. At this time, the $C_{1s}$ peak area was determined by drawing a straight base line in a range from 282 eV to 296 eV. The straight base line from 282 eV to 296 eV for calculating area at the $C_{1s}$ peak was defined as the original point (zero point) for photoelectron intensity. The (a)/(b) ratio was calculated by determining the height (cps) of the peak (b) (cps: photoelectron intensity per unit time) at a binding energy of 286.1 eV attributed to a C—O component and the height (cps) of the component (a) at a binding energy of 284.6 eV attributed to CHx, C—C, and C=C.

If (a) was larger than (b), the peak of $C_{1s}$ was not in a range from 282 eV to 296 eV when the binding energy value of the main peak of $C_{1s}$ was adjusted to 286.1 eV. In this case, the binding energy value of the main peak of $C_{1s}$ was adjusted to 284.6 and then the ratio (a)/(b) was calculated by the above-described procedure.

(4) Strand Tensile Strength and Strand Elastic Modulus of Carbon Fiber Bundles

The strand tensile strength and the strand elastic modulus of carbon fiber bundles were determined by the test method of resin-impregnated strand described in JIS-R-7608 (2004) in accordance with the following procedure. The resin formulation was "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the hardening conditions were at normal pressure at a temperature of 125° C. for 30 minutes. Ten strands of the carbon fiber bundles were tested, and average values were determined as the strand tensile strength and the strand elastic modulus.

(5) Surface Oxygen Concentration (O/C) of Carbon Fibers

The surface oxygen concentration (O/C) of the carbon fibers was determined by X-ray photoelectron spectroscopy in accordance with the following procedure. First, carbon fibers from which dirt and the like attaching to the surface of the carbon fibers are removed with a solvent were cut into pieces having a length of about 20-mm pieces and the pieces were spread on a copper sample holder. Subsequently, the sample holder was set in a sample chamber, and the inside of the sample chamber was maintained at $1 \times 10^{-8}$ Torr. Subsequently, AlKα$_{1,2}$ was used as the X-ray source and the measurement was carried out at a photoelectron takeoff angle of 90°. As the correction value for the peak associated with electrification during the measurement, the binding energy value of the main peak (peak top) of $C_{1s}$ was set to 284.6 eV. The $C_{1s}$ peak area was determined by drawing a straight base line in a range from 282 eV to 296 eV. The $O_{1s}$ peak area was determined by drawing a straight base line in a range from 528 eV to 540 eV. Here, the surface oxygen concentration is calculated as an atomic content ratio using a sensitivity correction value specific to the apparatus from the ratio of the $O_{1s}$ peak area and the $C_{1s}$ peak area. When ESCA-1600 manufactured by Ulvac-Phi, Inc. was used as the X-ray photoelectron spectrometer, the sensitivity correction value specific to the apparatus was 2.33.

(6) Surface Carboxy Group Concentration (COOH/C) and Surface Hydroxy Group Concentration (COH/C) of Carbon Fibers The surface hydroxy group concentration (COH/C) was determined by chemical modification X-ray photoelectron spectroscopy in accordance with the following procedure.

The carbon fiber bundles from which the sizing agent and the like were removed with a solvent were cut into pieces and the pieces were spread and arranged on a platinum sample holder. Thereafter, the pieces were exposed to a dry nitrogen gas containing 0.04 mol/L of trifluoroacetic anhydride gas at room temperature for 10 minutes for carrying out chemical modification treatment. Thereafter, the modified pieces were mounted on an X-ray photoelectron spectrometer at a photoelectron takeoff angle of 35°. $AlK\alpha_{1,2}$ was used as the X-ray source, and the inside of the sample chamber was maintained at a degree of vacuum of $1\times10^{-8}$ Torr. As the correction for the peak associated with electrification during the measurement, first, the binding energy value of the main peak of $C_{1s}$ was adjusted to 284.6 eV. The $C_{1s}$ peak area $[C_{1s}]$ was determined by drawing a straight base line in a range from 282 eV to 296 eV, and the $F_{1s}$ peak area $[F_{1s}]$ was determined by drawing a straight base line in a range from 682 eV to 695 eV. The reaction rate r was determined from $C_{1s}$ peak splitting of polyvinyl alcohol to which the chemical modification treatment was simultaneously carried out.

The surface hydroxy group concentration (COH/C) was expressed by the value calculated in accordance with the following formula.

$$COH/C=\{[F_{1s}]/(3k[C_{1s}]-2[F_{1s}])r\}\times100(\%)$$

where k is a sensitivity correction value specific to the apparatus for the $F_{1s}$ peak area relative to the $C_{1s}$ peak area. When model SSX-100-206 manufactured by SSI, USA was used, the sensitivity correction value specific to the apparatus was 3.919.

The surface carboxy group concentration (COOH/C) was determined by chemical modification X-ray photoelectron spectroscopy in accordance with the following procedure. First, the carbon fiber bundles from which the sizing agent and the like were removed with a solvent were cut into pieces and the pieces were spread and arranged on a platinum sample holder. Thereafter, the pieces were exposed to air containing 0.02 mol/L of trifluoroethanol gas, 0.001 mol/L of dicyclohexylcarbodiimide gas, and 0.04 mol/L of pyridine gas at 60° C. for 8 hours for carrying out chemical modification treatment. Thereafter, the modified pieces were mounted on an X-ray photoelectron spectrometer at a photoelectron takeoff angle of 35°. $AlK\alpha_{1,2}$ was used as the X-ray source, and the inside of the sample chamber was maintained at a degree of vacuum of $1\times10^{-8}$ Torr. As the correction for the peak associated with electrification during the measurement, first, the binding energy value of the main peak of $C_{1s}$ was set to 284.6 eV. The $C_{1s}$ peak area $[C_{1s}]$ was determined by drawing a straight base line in a range from 282 eV to 296 eV, and the $F_{1s}$ peak area $[F_{1s}]$ was determined by drawing a straight base line in a range from 682 eV to 695 eV. The reaction rate r was determined from $C_{1s}$ peak splitting of polyacrylic acid to which the chemical modification treatment was simultaneously carried out, and the residual rate m of a dicyclohexylcarbodiimide derivative was determined from $O_{1s}$ peak splitting.

The surface carboxy group concentration COOH/C was expressed by the value calculated in accordance with the following formula.

$$COOH/C=\{[F_{1s}]/(3k[C_{1s}]-(2+13m)[F_{1s}])r\}\times100(\%)$$

where k is a sensitivity correction value specific to the apparatus for the $F_{1s}$ peak area relative to the $C_{1s}$ peak area. When model SSX-100-206 manufactured by SSI, USA was used, the sensitivity correction value specific to the apparatus was 3.919.

(7) Epoxy Equivalent of Sizing Agent and Epoxy Equivalent of Sizing Agent Applied onto Carbon Fibers The epoxy equivalent of the sizing agent was determined by dissolving the sizing agent from which the solvents are removed into N,N-dimethylformamide, ring-opening the epoxy groups with hydrochloric acid, and carrying out acid-base titration. The epoxy equivalent of a sizing agent applied to carbon fibers was determined by immersing sizing agent-coated carbon fibers in N,N-dimethylformamide, carrying out ultrasonic cleaning to elute the sizing agent from the fibers, then ring-opening the epoxy groups with hydrochloric acid, and carrying out acid-base titration.

(8) Measurement Method of Attached Amount of Sizing Agent

About 2 g of carbon fibers coated with the sizing agent were weighed (W1) (to the fourth decimal place) and thereafter placed in an electric furnace (a volume of 120 cm3) set at a temperature of 450° C. for 15 minutes in a nitrogen gas stream of 50 mL/min, and the sizing agent was completely thermally decomposed. The carbon fiber bundles were transferred into a container in a dry nitrogen stream of 20 L/min, cooled for 15 minutes, and weighed (W2) (to the fourth decimal place). The attached amount of the sizing agent was determined by the formula, W1-W2. The attached amount of the sizing agent was converted into a value (round off the number to the third decimal place) relative to 100 parts by mass of the carbon fiber bundles and the value was determined as parts by mass of the attached sizing agent. The measurement was carried out two times, and the average value was determined as the parts by mass of the sizing agent.

(9) Water Content Measurement of Sizing Agent-Coated Carbon Fibers

The water content was determined by weighing about 2 g of the sizing agent-coated carbon fibers and measuring the water content with KF-100 (volumetric Karl Fischer moisture meter) manufactured by Mitsubishi Chemical Analytech Co., Ltd. The measurement was carried out at a heating temperature of 150° C.

(10) Ratio of Eluted Aliphatic Epoxy Compound (A)

From sizing agent-coated carbon fibers, 0.1 g of a test specimen was weighed, and the test specimen was cut into a length of several centimeters. The cut test specimen was immersed in 10 mL of a mixed solution of acetonitrile and chloroform (a volume ratio of 9/1) and ultrasonic cleaning was carried out for 20 minutes to elute the sizing agent in the mixed solution of acetonitrile and chloroform. 5 mL of the eluate was collected and nitrogen purge was carried out to remove the solvent by distillation. To the residue after removing the solvent by the distillation, 0.2 mL of a mixed solution of acetonitrile and chloroform (a volume ratio of 9/1) was added and a sample for analysis was prepared. The aliphatic epoxy compound (A) was analyzed by liquid chromatography in the following conditions:

Analytical column: Chromolith Performance RP-18e (4.6×100 mm)

Mobile phase: Water/acetonitrile system was used; from the start of analysis to 7 minutes, the mobile phases were changed from water/acetonitrile=60%/40% to acetonitrile 100%; to 12 minutes, acetonitrile 100% was maintained; then to 12.1 minutes, the mobile phase was changed to water/acetonitrile=60%/40%; and to 17 minutes, water/acetonitrile=60%/40% was maintained.

Flow rate: 2.5 mL/min

Column temperature: 45° C.

Detector: Evaporative light scattering detector (ELSD)

Detector temperature: 60° C.

(11) Evaluation Method of Bending Properties of Molded Article

Specimens of a bending strength test having a length of 130±1 mm and a width of 25±0.2 mm were cut from injection molded articles of a carbon fiber-reinforced resin composition, molded articles obtained by press molding a prepreg containing sizing agent-coated carbon fibers and a thermoplastic resin, or carbon fiber-reinforced resin molded articles obtained by molding a molding material. In the case of the prepreg, test specimens were cut from a molded article obtained by press molding the prepreg in a direction perpendicular to the direction of the carbon fibers. According to the test method prescribed in ASTM D-790 (2004), the bending strength was measured by using a 3-point bending test jig (having an indenter of 10 mm and a fulcrum of 10 mm), setting a support span of 100 mm, and setting a crosshead speed of 5.3 mm/min. In Examples, "Instron (registered trademark)" Universal Tester Type 4201 (manufactured by Instron Inc.) was used as a test machine. The measurement number was determined as n=5 and the average value was determined as the bending strength.

(12) Reduction Rate in Bending Strength of Molded Article in Case of Water Absorption Test specimens were prepared from molded articles obtained by using polyamide as a thermoplastic resin by immersing the molded articles into water to absorb 2.5% of water and the bending properties of the test specimens were evaluated. As a result, when a reduction rate in the bending strength was 60% or less relative to the bending strength obtained in (11), "OK" was marked as the preferable range, while when the reduction rate was more than 60%, "NG" was marked because the reduction rate is high.

(13) Surface Roughness (Ra) of Carbon Fibers

The surface roughness (Ra) of the carbon fibers was measured by an atomic force microscope (AFM). Carbon fibers cut into pieces having a length of several millimeters were prepared and the fiber pieces were fixed onto a substrate (silicon wafer) using a silver paste. A three-dimensional surface shape image of the central part of each single fiber was observed with the atomic force microscope (AFM). As the atomic force microscope, NanoScope IIIa with Dimension 3000 Stage System manufactured by Digital Instruments was used. The observation was carried out in the following observation conditions.

Scan mode: Tapping mode
Probe: Silicon cantilever
Scan field: 0.6 μm×0.6 μm
Scan speed: 0.3 Hz
Number of pixels: 512×512
Measurement environment: At room temperature in the atmosphere The component (A) and the component (B1) of the sizing agent used in each Example and each Comparative Example are as follows:

Component (A): A-1 and A-2
A-1: "Denacol (registered trademark)" EX-611 (manufactured by Nagase ChemteX Corporation)
Sorbitol polyglycidyl ether
Epoxy equivalent: 167 g/eq.,
A-2: "Denacol (registered trademark)" EX-521 (manufactured by Nagase ChemteX Corporation)
Polyglycerol polyglycidyl ether
Epoxy equivalent: 183 g/eq., surface tension at 125° C. 37 mJ/m$^2$ Component (B1): B-1 to B-4
B-1: "jER (registered trademark)" 152 (manufactured by Mitsubishi Chemical Corporation)
Glycidyl ether of phenol novolac
Epoxy equivalent: 175 g/eq., surface tension at 125° C. 40 mJ/m$^2$
B-2: "jER (registered trademark)" 828 (manufactured by Mitsubishi Chemical Corporation)
Diglycidyl ether of bisphenol A
Epoxy equivalent: 189 g/eq., surface tension at 125° C. 38 mJ/m$^2$
B-3: "jER (registered trademark)" 1001 (manufactured by Mitsubishi Chemical Corporation)
Diglycidyl ether of bisphenol A
Epoxy equivalent: 475 g/eq., surface tension at 125° C. 38 mJ/m$^2$
B-4: "jER (registered trademark)" 807 (manufactured by Mitsubishi Chemical Corporation)
Diglycidyl ether of bisphenol F
Epoxy equivalent: 167 g/eq., surface tension at 125° C. 40 mJ/m$^2$ The following thermoplastic resins were used for each Example and Comparative Example of the first embodiment.
Polyarylene sulfide resin:
Polyphenylene sulfide (PPS) resin pellets—"Torelina(registered trademark)" M2888 (manufactured by Toray Industries Inc.)
Polyamide resin:
Polyamide 66 (PA) resin pellets—"Amilan (registered trademark)" CM3001 (manufactured by Toray Industries Inc.)
Polycarbonate resin:
Polycarbonate (PC) resin pellets—"Lexan (registered trademark)" 141R (manufactured by Saudi Basic Industries Corporation (SABIC))
Polyolefin resin:
Polypropylene (PP) resin pellets—Mixture of unmodified PP resin pellets and acid-modified PP resin pellets (unmodified PP resin pellets: "Prime Polypro (registered trademark)" J830HV (manufactured by Prime Polymer Co., Ltd.) 50 parts by mass, acid-modified PP resin pellets: "ADMER (registered trademark)" QE800 (manufactured by Mitsui Chemicals, Inc.) 50 parts by mass)
Polystyrene resin:
Acrylonitrile butadiene styrene (ABS) resin pellets—"Toyolac (registered trademark)" type 700, segment number 314 (manufactured by Toray Industries Inc.)

Example 1

This Example includes the following first to fifth processes.

First Process: Process for Manufacturing Carbon Fibers to be Raw Material

A copolymer made from 99 mol % of acrylonitrile and 1 mol % of itaconic acid was dry-wet spun and baked to obtain carbon fibers having a total filament number of 24,000, a total fineness of 1,000 tex, a specific gravity of 1.8, a strand tensile strength of 5.9 GPa, and a strand tensile modulus of 295 GPa. Subsequently, electrolytic surface treatment was applied to the carbon fibers using an aqueous ammonium hydrogen carbonate solution having a concentration of 0.1 mol/L as an electrolytic solution at a quantity of electricity of 50 coulombs per gram of carbon fibers. The electrolytically surface-treated carbon fibers were subsequently washed with water and dried in hot air at a temperature of 150° C. to obtain carbon fibers to be a raw material. At this time, the surface oxygen concentration O/C was 0.14, the surface carboxy group concentration COOH/C was 0.004, and the surface hydroxy group concentration COH/C was 0.018. At this time, the carbon fibers had a surface roughness (Ra) of 2.9 nm. The carbon fibers are named Carbon fibers A.

Second Process: Process for Attaching Sizing Agent to Carbon Fibers

After an aqueous dispersion emulsion containing 20 parts by mass of (B-2) as a component (B1), 20 parts by mass of a component (C), and 10 parts by mass of an emulsifier was prepared, 50 parts by mass of (A-1) was mixed as a component (A) to prepare a sizing liquid. As the component (C), a condensate (C-1) of 2 mol of an adduct of bisphenol A with 2 mol of EO, 1.5 mol of maleic acid, and 0.5 mol of sebacic acid was used. As the emulsifier, polyoxyethylene (70 mol) styrenated (5 mol) cumylphenol was used. Both of the component (C) and the emulsifier are aromatic compounds and also correspond to the component (B). The epoxy equivalent of the sizing agent except solvents in the sizing liquid is shown in Table 1-1. The surface-treated carbon fibers are coated with the sizing agent by the immersion method. Thereafter, heat treatment at a temperature of 210° C. for 75 seconds was applied to the carbon fibers to obtain the carbon fibers coated with the sizing agent. The attached amount of the sizing agent was adjusted so as to be 0.6% by mass relative to the carbon fibers coated with the sizing agent. Subsequently, the epoxy equivalent of the sizing agent applied to the carbon fibers, the water content of the carbon fibers, the X-ray photoelectron spectrum of the sizing agent surface were measured, and the eluted aliphatic epoxy compound were measured. The results are summarized in Table 1-1. From the results of Table 1-1, it was ascertained that both of the epoxy equivalent of the sizing agent and the chemical composition of the surface of the sizing agent were as expected.

Third Process: Process for Cutting Carbon Fibers Coated with Sizing Agent

The carbon fibers coated with the sizing agent obtained in the second process was cut into pieces having a length of ¼ inch with a cartridge cutter.

Fourth Process: Extrusion Process

The TEX-30α twin screw extruder (screw diameter 30 mm and L/D=32) manufactured by Japan Steel Works, LTD. was used. PPS resin pellets were fed from a main hopper and subsequently the carbon fibers coated with the sizing agent cut in the previous process were fed from a side hopper located downstream. These materials were sufficiently kneaded at a barrel temperature of 320° C. and a rotational speed of 150 rpm. Then, degassing was carried out from a vacuum vent located further downstream. The fed amount of the carbon fibers coated with the sizing agent was adjusted to 10 parts by mass relative to 90 parts by mass of the PPS resin pellets with the weight feeders. The melted resin was extruded from the die mouth (diameter 5 mm) and the obtained strands were cooled and then cut with a cutter to form a pellet-like molding material.

Fifth Process: Injection Molding Process

Test specimens for property evaluation were molded from the pellet-like molding material obtained in the extrusion process using J350EIII injection molding machine manufactured by Japan Steel Works, LTD. at a cylinder temperature of 330° C. and a mold temperature of 80° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 1-1. The results showed that the bending strength was 228 MPa and thus the mechanical properties were sufficiently high.

Examples 2 to 11

First Process: Process for Manufacturing Carbon Fibers to be Raw Material

This process was carried out in a similar manner to Example 1.

Second Process: Process for Attaching Sizing Agent to Carbon Fibers

Carbon fibers coated with the sizing agent were obtained in a similar manner to Example 1 except that types and amounts of the component (A) and the component (B1) and amounts of the component (C-1) and other components were used as shown in Table 1-1. Subsequently, the epoxy equivalent of the sizing agent and the X-ray photoelectron spectrum of the surface of the sizing agent were measured. It was found that both of the epoxy equivalent of the sizing agent and the chemical composition of the surface of the sizing agent were as expected. The results are shown in Table 1-1.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The results are summarized in Table 1-1. The results showed that the bending strengths were 222 MPa to 230 MPa and thus the mechanical properties were sufficiently high.

Example 12

First Process: Process for Manufacturing Carbon Fibers to be Raw Material

The process was carried out in a similar manner to Example 1 except that an aqueous sulfuric acid solution having a concentration of 0.05 mol/L was used as the electrolytic solution and the electrolytic surface treatment was carried out at a quantity of electricity of 8 coulombs per gram of carbon fibers. At this time, the carbon fibers had a surface oxygen concentration O/C of 0.08, a surface carboxy group concentration COOH/C of 0.003, and a surface hydroxy group concentration COH/C of 0.003. At this time, the carbon fibers had a surface roughness (Ra) of 2.9 nm. The carbon fibers were named Carbon fibers B.

Second Process: Process for Attaching Sizing Agent to Carbon Fibers

The carbon fibers coated with the sizing agent was obtained in a similar manner to Example 1 except that types and amounts of the component (A) and the component (B1) and amounts of the component (C-1) and other components were used as shown in Table 1-1. Subsequently, the epoxy equivalent of the sizing agent and the X-ray photoelectron spectrum of the surface of the sizing agent were measured. Both of the epoxy equivalent of the sizing agent and the chemical composition of the surface of the sizing agent were as expected. The results are shown in Table 1-1.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The results are summarized in Table 1-1. The result showed that the bending strength was in an acceptable level.

Example 13

First Process: Process for Manufacturing Carbon Fibers to be Raw Material

A copolymer made from 99 mol % by mole of acrylonitrile and 1 mol % of itaconic acid was wet spun and baked to obtain carbon fibers having a total filament number of 12,000, a total fineness of 447 tex, a specific gravity of 1.8, a strand tensile strength of 5.6 GPa, and a strand tensile modulus of 300 GPa. Subsequently, electrolytic surface treatment was applied to the carbon fibers using an aqueous ammonium hydrogen carbonate solution having a concentration of 0.1 mol/L as an electrolytic solution at a quantity of electricity of 40 coulombs per gram of carbon fibers. The electrolytic surface-treated carbon fibers were subsequently washed with water and dried in hot air at a temperature of 150° C. to obtain carbon fibers to be a raw material. The carbon fibers had a surface oxygen concentration O/C of 0.13, a surface carboxy group concentration COOH/C of 0.005, and a surface hydroxy group concentration COH/C of 0.018. At this time, the carbon fibers had a surface roughness (Ra) of 23 nm. The carbon fibers were named Carbon fibers C.

Second Process: Process for Attaching Sizing Agent to Carbon Fibers

Carbon fibers coated with the sizing agent were obtained in a similar manner to Example 1 except that types and amounts of the component (A) and the component (B1) and amounts of the component (C-1) and other components were used as shown in Table 1-1. Subsequently, the epoxy equivalent of the sizing agent and the X-ray photoelectron spectrum of the surface of the sizing agent were measured. Both of the epoxy equivalent of the sizing agent and the chemical composition of the surface of the sizing agent were as expected. The results are shown in Table 1-1.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The results are summarized in Table 1-1. The result showed that the bending strength was in an acceptable level.

Example 14

First Process: Process for Manufacturing Carbon Fibers to be Raw Material

This process was carried out in a similar manner to Example 1.

Second Process: Process for Attaching Sizing Agent to Carbon Fibers

The carbon fibers coated with the sizing agent were obtained in a similar manner to Example 1 except that the component (A) and the component (B1) were used as shown in Table 1-1 and were applied as a dimethylformamide solution. Subsequently, the epoxy equivalent of the sizing agent and the X-ray photoelectron spectrum of the surface of the sizing agent were measured. Both of the epoxy equivalent of the sizing agent and the chemical composition of the surface of the sizing agent were as expected. The results are shown in Table 1-1.

Third to Fifth Processes:
Test specimens for property evaluation were molded in a similar manner to the method of Example 1.
Subsequently, the obtained test specimens for property evaluation were evaluated in accordance with the above-described evaluation method of the injection molded article. The results are summarized in Table 1-1.
The results showed that the bending strength was high.

Comparative Example 1

First Process: Process for Manufacturing Carbon Fibers to be Raw Material

This process was carried out in a similar manner to Example 1.

Second Process: Process for Attaching Sizing Agent to Carbon Fibers

The carbon fibers coated with the sizing agent were obtained in a similar manner to Example 1 except that the component (A) was not used and types and amounts of the component (B1) and amounts of other components as shown in Table 1-1 were used. Subsequently, the X-ray photoelectron spectrum of the surface of the sizing agent was measured. As shown in Table 1-2, the ratio was out of the range of the present invention.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The result showed that the bending strength was as shown in Table 1-2 and that the mechanical properties were insufficient.

Comparative Example 2

First Process: Process for Manufacturing Carbon Fibers to be Raw Material

This process was carried out in a similar manner to Example 1.

Second Process: Process for Attaching Sizing Agent to Carbon Fibers

Carbon fibers coated with the sizing agent were obtained in a similar manner to Example 1 except that the component (B1) was not used and types and amounts of the component (A) were used as shown in Table 1-2. Subsequently, the X-ray photoelectron spectrum of the surface of the sizing agent was measured. As shown in Table 1-2, the ratio was out of the range of the present invention.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The result showed that the bending strength was as shown in Table 1-2 and that the mechanical properties were slightly low.

Comparative Example 3

First Process: Process for Manufacturing Carbon Fibers to be Raw Material

This process was carried out in a similar manner to Example 1.

Second Process: Process for Attaching Sizing Agent to Carbon Fibers

The carbon fibers coated with the sizing agent was obtained in a similar manner to Example 1 except that types and amounts of the component (A) and the component (B1) and amounts of the component (C-1) and other components were used as shown in Table 1-2. Subsequently, the X-ray photoelectron spectrum of the surface of the sizing agent was measured. As shown in Table 1-2, the ratio was out of the range of the present invention.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The result showed that the bending strength was as shown in Table 1-2 and that the mechanical properties were insufficient.

Comparative Example 4

First Process: Process for Manufacturing Carbon Fibers to be Raw Material

This process was carried out in a similar manner to Example 1.

Second Process: Process for Attaching Sizing Agent to Carbon Fibers

The carbon fibers coated with the sizing agent was obtained in a similar manner to Example 1 except that types and amounts of the component (A) and the component (B1) and amounts of the component (C-1) and other components were used as shown in Table 1-2. Subsequently, the X-ray photoelectron spectrum of the surface of the sizing agent was measured. As shown in Table 1-2, the ratio was out of the range of the present invention.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The result showed that the bending strength was as shown in Table 1-2 and that the mechanical properties were slightly low.

Comparative Example 5

First Process: Manufacturing Process for Carbon Fibers to be Raw Material

This process was carried out in a similar manner to Example 1.

Second Process: Process for Attaching Sizing Agent to Carbon Fibers

An aqueous solution of (A-2) was prepared as the component (A) and was applied to surface treated carbon fibers by the immersion method. Thereafter, the coated carbon fibers were treated with heat at a temperature of 210° C. for 75 seconds to obtain the carbon fibers coated with the sizing agent. The attached amount of the sizing agent was adjusted so as to be 0.30 parts by mass relative to 100 parts by mass of the surface treated carbon fibers. Subsequently, an aqueous dispersion emulsion containing 20 parts by mass of (B-2) as a component (B1), 20 parts by mass of a component (C), and 10 parts by mass of an emulsifier was prepared. As the component (C), a condensate (C-1) of 2 mol of an adduct of bisphenol A with 2 mol of EO, 1.5 mol of maleic acid, and 0.5 mol of sebacic acid was used. As the emulsifier, polyoxyethylene (70 mol) styrenated (5 mol) cumylphenol was used. Both of the component (C) and the emulsifier are aromatic compounds and also correspond to the component (B). The carbon fibers coated with the component (A) was coated with the sizing agent by the immersion method. Thereafter, the coated carbon fibers were treated with heat at a temperature of 210° C. for 75 seconds to obtain the carbon fibers coated with the sizing agent. The attached amount of the sizing agent was adjusted so as to be 0.30 parts by mass relative to 100 parts by mass of the surface treated carbon fibers. The X-ray photoelectron spectrum of the surface of the sizing agent was measured. The ratio (a)/(b) where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent measured by X-ray photoelectron spectroscopy using at a photoelectron takeoff angle of 15° is larger than 0.90 and the ratio was out of the range of the present invention.

Third to Fifth Processes:

Test specimens for property evaluation were molded in a similar manner to the method of Example 1. Subsequently, the obtained test specimens for property evaluation were evaluated in accordance with the above-described evaluation method of the injection molded article. The result showed that the bending strength was as shown in Table 1-2 and the mechanical properties were low.

TABLE 1-1

| | | | | Example 1 | Example 2 | Example 3 | Example 4 | Example 5 | Example 6 | Example 7 |
|---|---|---|---|---|---|---|---|---|---|---|
| Carbon fibers | | Carbon fibers | | A | A | A | A | A | A | A |
| Sizing agent | (A) | A-1 | EX-611 | 50 | | | 25 | | | |
| | | A-2 | EX-521 | | 50 | 50 | 25 | 50 | 50 | 50 |
| | | | Total | 50 | 50 | 50 | 50 | 50 | 50 | 50 |
| | (B1) | B-1 | jER152 | | | | | 20 | | |
| | | B-2 | jER828 | 20 | 40 | 20 | 20 | | | |
| | | B-3 | jER1001 | | | | | | 20 | |
| | | B-4 | jER807 | | | | | | | 20 |
| | | | Total | 20 | 40 | 20 | 20 | 20 | 20 | 20 |
| | (C) | C-1 | Aromatic polyester | 20 | | 20 | 20 | 20 | 20 | 20 |
| | Other | — | Emulsifier (nonionic surfactant) | 10 | 10 | 10 | 10 | 10 | 10 | 10 |
| | Ratio | A/B1 | (A) (% by mass) | 71 | 56 | 71 | 71 | 71 | 71 | 71 |
| | | | (B1) (% by mass) | 29 | 44 | 29 | 29 | 29 | 29 | 29 |
| | | | (A) (% by mass) | 50 | 50 | 50 | 50 | 50 | 50 | 50 |
| | | | (B) (% by mass) | 50 | 50 | 50 | 50 | 50 | 50 | 50 |
| | | Epoxy equivalent (g/eq.) | | 245 | 210 | 265 | 255 | 260 | 320 | 250 |
| | | Sizing agent attached amount (% by mass) | | 0.6 | 0.6 | 0.6 | 0.6 | 0.6 | 0.6 | 0.6 |

TABLE 1-1-continued

| Evaluation item | Sizing agent-coated fibers | | | | | | | | |
|---|---|---|---|---|---|---|---|---|---|
| | Thermoplastic resin | | PPS | PPS | PPS | PPS | PPS | PPS | PPS |
| | Epoxy equivalent of sizing agent (g/eq.) | | 475 | 350 | 430 | 450 | 420 | 530 | 400 |
| | Water content (% by mass) | | 0.019 | 0.021 | 0.021 | 0.020 | 0.019 | 0.018 | 0.019 |
| | X-ray photo-electron spectrum of sizing agent surface (a)/(b) | | 0.6 | 0.65 | 0.64 | 0.62 | 0.65 | 0.71 | 0.63 |
| | Eluted aliphatic epoxy compound (A) (part by mass) | | 0.13 | 0.13 | 0.13 | 0.13 | 0.13 | 0.13 | 0.13 |
| Carbon fiber-reinforced composite material | Bending strength (MPa) | | 228 | 230 | 229 | 227 | 228 | 222 | 229 |

| | | | Example 8 | Example 9 | Example 10 | Example 11 | Example 12 | Example 13 | Example 14 |
|---|---|---|---|---|---|---|---|---|---|
| Carbon fibers | Carbon fibers | | A | A | A | A | B | C | A |
| Sizing agent | (A) | A-1 EX-611 | | | | | | | |
| | | A-2 EX-521 | 50 | 40 | 65 | 50 | 50 | 50 | 55 |
| | | Total | 50 | 40 | 65 | 50 | 50 | 50 | 55 |
| | (B1) | B-1 jER152 | | | | | | | |
| | | B-2 jER828 | 10 | 25 | 17 | 20 | 20 | 20 | 45 |
| | | B-3 jER1001 | 10 | | | | | | |
| | | B-4 jER807 | | | | | | | |
| | | Total | 20 | 25 | 17 | 20 | 20 | 20 | 45 |
| | (C) | C-1 Aromatic polyester | 20 | 25 | 8 | 20 | 20 | 20 | |
| | Other | — Emulsifier (nonionic surfactant) | 10 | 10 | 10 | 10 | 10 | 10 | |
| | Ratio A/B1 | (A) (% by mass) | 71 | 62 | 79 | 71 | 71 | 71 | 55 |
| | | (B1) (% by mass) | 29 | 38 | 21 | 29 | 29 | 29 | 45 |
| | | (A) (% by mass) | 50 | 40 | 65 | 50 | 50 | 50 | 55 |
| | | (B) (% by mass) | 50 | 60 | 35 | 50 | 50 | 50 | 45 |
| | | Epoxy equivalent (g/eq.) | 290 | 285 | 225 | 265 | 265 | 265 | 185 |
| | | Sizing agent attached amount (% by mass) | 0.6 | 0.6 | 0.6 | 1 | 0.6 | 0.6 | 0.6 |
| Evaluation item | Sizing agent-coated fibers | Thermoplastic resin | PPS | PPS | PPS | PPS | PPS | PPS | PPS |
| | | Epoxy equivalent of sizing agent (g/eq.) | 470 | 505 | 350 | 430 | 430 | 430 | 275 |
| | | Water content (% by mass) | 0.019 | 0.018 | 0.022 | 0.022 | 0.020 | 0.021 | 0.021 |
| | | X-ray photo-electron spectrum of sizing agent surface (a)/(b) | 0.67 | 0.77 | 0.52 | 0.64 | 0.63 | 0.63 | 0.63 |
| | | Eluted aliphatic epoxy compound (A) (part by mass) | 0.13 | 0.08 | 0.16 | 0.25 | 0.12 | 0.13 | 0.14 |

TABLE 1-1-continued

| | | | | | | | | |
|---|---|---|---|---|---|---|---|---|
| Carbon fiber-reinforced composite material | Bending strength (MPa) | 228 | 227 | 227 | 228 | 220 | 220 | 228 |

TABLE 1-2

| | | | | Comparative Example 1 | Comparative Example 2 | Comparative Example 3 | Comparative Example 4 | Comparative Example 5 |
|---|---|---|---|---|---|---|---|---|
| Carbon fibers | Carbon fibers | | | A | A | A | A | A |
| Sizing agent | (A) | A-1 | EX-611 | | 100 | 30 | 75 | |
| | | A-2 | EX-521 | | | | | 50 |
| | | Total | | | 100 | 30 | 75 | 50 |
| | (B1) | B-1 | jER152 | | | | | |
| | | B-2 | jER828 | 20 | | 30 | 10 | 20 |
| | | B-3 | jER1001 | 70 | | | | |
| | | B-4 | jER807 | | | | | |
| | | Total | | 90 | | 30 | 10 | 20 |
| | (C) | C-1 | Aromatic polyester | | | 30 | 10 | 20 |
| | Other | — | Emulsifier (nonionic surfactant) | 10 | | 10 | 5 | 10 |
| | Ratio A/B1 | | (A) (% by mass) | 0 | 100 | 50 | 88 | 71 |
| | | | (B1) (% by mass) | 100 | 0 | 50 | 12 | 29 |
| | | | (A) (% by mass) | 0 | 100 | 30 | 75 | 50 |
| | | | (B) (% by mass) | 100 | 0 | 70 | 25 | 50 |
| | Epoxy equivalent (g/eq.) | | | 400 | 165 | 300 | 200 | 185/420 |
| | Sizing agent attached amount (% by mass) | | | 0.6 | 0.6 | 0.6 | 0.6 | 0.3/0.3 |
| Thermoplastic resin | | | | PPS | PPS | PPS | PPS | PPS |
| Evaluation item | Sizing agent-coated fibers | Epoxy equivalent of sizing agent (g/eq.) | | 710 | 240 | 505 | 330 | 550 |
| | | Water content (% by mass) | | 0.015 | 0.032 | 0.019 | 0.025 | 0.021 |
| | | X-ray photoelectron spectrum of sizing agent surface (a)/(b) | | 1.01 | 0.29 | 0.92 | 0.49 | 0.98 |
| | | Eluted aliphatic epoxy compound (A) (part by mass) | | — | 0.33 | 0.04 | 0.22 | 0.12 |
| | Carbon fiber-reinforced composite material | Bending strength (MPa) | | 215 | 218 | 216 | 217 | 217 |

Examples 15 to 20

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Examples 1, 2, 3, 5, 6, and 7.

Third Process: Process for Cutting Carbon Fibers Coated with Sizing Agent

The carbon fibers coated with the sizing agent obtained in the second process was cut into pieces having a length of ¼ inch with a cartridge cutter.

Fourth Process: Extrusion Process

The TEX-30α twin screw extruder (screw diameter 30 mm and L/D=32) manufactured by Japan Steel Works, LTD. was used. PC resin pellets were fed from a main hopper and subsequently the carbon fibers coated with the sizing agent cut in the previous process were fed from a side hopper located downstream. These materials were sufficiently kneaded at a barrel temperature of 300° C. and a rotational speed of 150 rpm. Then, degassing was carried out from a vacuum vent located further downstream. The fed amount of the carbon fibers coated with the sizing agent was adjusted to 8 parts by mass relative to 92 parts by mass of the PC resin pellets with the weight feeders. The melted resin was extruded from the die mouth (diameter 5 mm) and the obtained strands were cooled and then cut with a cutter to form a pellet-like molding material.

Fifth Process: Injection Molding Process

Test specimens for property evaluation were molded from the pellet-like molding material obtained in the extrusion process using J350EIII injection molding machine manufactured by Japan Steel Works, LTD. at a cylinder temperature of 320° C. and a mold temperature of 70° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 2. The results showed that the bending strength was high and the mechanical properties were sufficiently high.

Comparative Example 6

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 1.

Third to Fifth Processes:

Test specimens for property evaluation were molded in a similar manner to the method of Example 15. Subsequently, the obtained test specimens for property evaluation were evaluated in accordance with the above-described evaluation method of the injection molded article. The result showed that the bending strength was as shown in Table 2 and that the mechanical properties were insufficient.

Comparative Example 7

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 2.

Third to Fifth Processes:

Test specimens for property evaluation were molded in a similar manner to the method of Example 15. Subsequently, the obtained test specimens for property evaluation were evaluated in accordance with the above-described evaluation method of the injection molded article. The result showed that the bending strength was as shown in Table 2 and that the mechanical properties were slightly low.

TABLE 2

| | | | | Example 15 | Example 16 | Example 17 | Example 18 | Example 19 | Example 20 | Comparative Example 6 | Comparative Example 7 |
|---|---|---|---|---|---|---|---|---|---|---|---|
| Carbon fibers | Carbon fibers | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio | A/B1 | (A) (% by mass) | 71 | 56 | 71 | 71 | 71 | 71 | 0 | 100 |

TABLE 2-continued

|  |  |  | Example 15 | Example 16 | Example 17 | Example 18 | Example 19 | Example 20 | Comparative Example 6 | Comparative Example 7 |
|---|---|---|---|---|---|---|---|---|---|---|
|  |  | (B1) (% by mass) | 29 | 44 | 29 | 29 | 29 | 29 | 100 | 0 |
|  |  | (A) (% by mass) | 50 | 50 | 50 | 50 | 50 | 50 | 0 | 100 |
|  |  | (B) (% by mass) | 50 | 50 | 50 | 50 | 50 | 50 | 100 | 0 |
|  |  | Epoxy equivalent (g/eq.) | 245 | 210 | 265 | 260 | 320 | 250 | 400 | 165 |
|  |  | Sizing agent attached amount (% by mass) | 0.6 | 0.6 | 0.6 | 0.6 | 0.6 | 0.6 | 0.6 | 0.6 |
| Thermoplastic resin |  |  | PC | PC | PC | PC | PC | PC | PC | PC |
| Evaluation item | Sizing agent-coated fibers | Epoxy equivalent of sizing agent (g/eq.) | 475 | 350 | 430 | 420 | 530 | 400 | 710 | 240 |
|  |  | Water content (% by mass) | 0.019 | 0.021 | 0.021 | 0.019 | 0.018 | 0.019 | 0.015 | 0.032 |
|  |  | X-ray photoelectron spectrum of sizing agent surface (a)/(b) | 0.6 | 0.65 | 0.64 | 0.65 | 0.71 | 0.63 | 1.01 | 0.29 |
|  |  | Eluted aliphatic epoxy compound (A) (part by mass) | 0.13 | 0.13 | 0.13 | 0.13 | 0.13 | 0.13 | — | 0.33 |
|  | Carbon fiber-reinforced composite material | Bending strength (MPa) | 158 | 161 | 160 | 158 | 152 | 158 | 145 | 149 |

Examples 21 to 26

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Examples 1, 2, 3, 6, 5, and 7.

Third Process: Process for Cutting Carbon Fibers Coated with Sizing Agent

The carbon fibers coated with the sizing agent obtained in the second process was cut into pieces having a length of ¼ inch with a cartridge cutter.

Fourth Process: Extrusion Process

The TEX-30α twin screw extruder (screw diameter 30 mm and L/D=32) manufactured by Japan Steel Works, LTD. was used. PP resin pellets were fed from a main hopper and subsequently the carbon fibers coated with the sizing agent cut in the previous process were fed from a side hopper located downstream. These materials were sufficiently kneaded at a barrel temperature of 230° C. and a rotational speed of 150 rpm. Then, degassing was carried out from a vacuum vent located further downstream. The fed amount of the carbon fibers coated with the sizing agent was adjusted to 20 parts by mass relative to 80 parts by mass of the PP resin pellets with the weight feeders. The melted resin was extruded from the die mouth (diameter 5 mm) and the obtained strands were cooled and then cut with a cutter to form a pellet-like molding material.

Fifth Process: Injection Molding Process

Test specimens for property evaluation were molded from the pellet-like molding material obtained in the extrusion process using J350EIII injection molding machine manufactured by Japan Steel Works, LTD. at a cylinder temperature of 240° C. and a mold temperature of 60° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 3. The results showed that the bending strength was high and the mechanical properties were sufficiently high.

Comparative Example 8

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 1.

Third to Fifth Processes:

Test specimens for property evaluation were molded in a similar manner to the method of Example 21. Subsequently, the obtained test specimens for property evaluation were evaluated in accordance with the above-described evaluation method of the injection molded article. The result showed that the bending strength was as shown in Table 3 and that the mechanical properties were insufficient.

Comparative Example 9

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 2.

Third to Fifth Processes:

Test specimens for property evaluation were molded in a similar manner to the method of Example 21. Subsequently, the obtained test specimens for property evaluation were evaluated in accordance with the above-described evaluation method of the injection molded article. The result showed that the bending strength was as shown in Table 3 and that the mechanical properties were slightly low.

TABLE 3

| | | | | Example 21 | Example 22 | Example 23 | Example 24 | Example 25 | Example 26 | Comparative Example 8 | Comparative Example 9 |
|---|---|---|---|---|---|---|---|---|---|---|---|
| Carbon fibers | Carbon fibers | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | | 20 | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio A/B1 | (A) (% by mass) | | 71 | 56 | 71 | 71 | 71 | 71 | 0 | 100 |
| | | (B1) (% by mass) | | 29 | 44 | 29 | 29 | 29 | 29 | 100 | 0 |
| | | (A) (% by mass) | | 50 | 50 | 50 | 50 | 50 | 50 | 0 | 100 |
| | | (B) (% by mass) | | 50 | 50 | 50 | 50 | 50 | 50 | 100 | 0 |
| | Epoxy equivalent (g/eq.) | | | 245 | 210 | 265 | 260 | 320 | 250 | 400 | 165 |
| | Sizing agent attached amount (% by mass) | | | 0.6 | 0.6 | 0.6 | 0.6 | 0.6 | 0.6 | 0.6 | 0.6 |
| Thermoplastic resin | | | | PP | PP | PP | PP | PP | PP | PP | PP |
| Evaluation item | Sizing agent-coated fibers | Epoxy equivalent of sizing agent (g/eq.) | | 475 | 350 | 430 | 420 | 530 | 400 | 710 | 240 |
| | | Water content (% by mass) | | 0.019 | 0.021 | 0.021 | 0.019 | 0.018 | 0.019 | 0.015 | 0.032 |
| | | X-ray photoelectron spectrum of sizing agent surface (a)/(b) | | 0.6 | 0.65 | 0.64 | 0.65 | 0.71 | 0.63 | 1.01 | 0.29 |
| | | Eluted aliphatic epoxy compound (A) (part by mass) | | 0.13 | 0.13 | 0.13 | 0.13 | 0.13 | 0.13 | — | 0.33 |
| | Carbon fiber-reinforced composite material | Bending strength (MPa) | | 110 | 113 | 112 | 110 | 102 | 110 | 95 | 97 |

Examples 27 to 32

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Examples 1, 2, 3, 5, 6, and 7.

Third Process: Process for Cutting Carbon Fibers Coated with Sizing Agent

The carbon fibers coated with the sizing agent obtained in the second process was cut into pieces having a length of ¼ inch with a cartridge cutter.

Fourth Process: Extrusion Process

The TEX-30α twin screw extruder (screw diameter 30 mm and L/D=32) manufactured by Japan Steel Works, LTD. was used. PA66 resin (PA) pellets were fed from a main hopper and subsequently the carbon fibers coated with the sizing agent cut in the previous process were fed from a side hopper located downstream. These materials were sufficiently kneaded at a barrel temperature of 280° C. and a rotational speed of 150 rpm. Then, degassing was carried out from a vacuum vent located further downstream. The fed amount of the carbon fibers coated with the sizing agent was adjusted to 30 parts by mass relative to 70 parts by mass of the PA66 resin pellets with the weight feeders. The melt resin was extruded from the die mouth (diameter 5 mm) and the obtained strands were cooled and then cut with a cutter to form a pellet-like molding material.

Fifth Process: Injection Molding Process

Test specimens for property evaluation were molded from the pellet-like molding material obtained in the extrusion process using J350EIII injection molding machine manufactured by Japan Steel Works, LTD. at a cylinder temperature of 300° C. and a mold temperature of 70° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results as summarized in Table 4 showed that bending strength was high and thus the mechanical properties were sufficiently high. Bending strength was also measured in water because PA has a high hygroscopic property. The result showed that each reduction in strength was small.

Comparative Example 10

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 1.

Third to Fifth Processes:

Test specimens for property evaluation were molded in a similar manner to the method of Example 27. Subsequently, the obtained test specimens for property evaluation were evaluated in accordance with the above-described evaluation method of the injection molded article. The result showed that the bending strength was as shown in Table 4 and that the mechanical properties were insufficient. The reduction in the bending strength in water was small.

Comparative Example 11

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 2.

Third to Fifth Processes:

Test specimens for property evaluation were molded in a similar manner to the method of Example 27. Subsequently, the obtained test specimens for property evaluation were evaluated in accordance with the above-described evaluation method of the injection molded article. The result showed that the bending strength was as shown in Table 4, that the mechanical properties were sufficient, and that the reduction in the bending strength in water was large.

TABLE 4

| | | | | Example 27 | Example 28 | Example 29 | Example 30 | Example 31 | Example 32 | Comparative Example 10 | Comparative Example 11 |
|---|---|---|---|---|---|---|---|---|---|---|---|
| Carbon fibers | Carbon fibers | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio | A/B1 | (A) (% by mass) | 71 | 56 | 71 | 71 | 71 | 71 | 0 | 100 |

TABLE 4-continued

|  |  |  | Example 27 | Example 28 | Example 29 | Example 30 | Example 31 | Example 32 | Comparative Example 10 | Comparative Example 11 |
|---|---|---|---|---|---|---|---|---|---|---|
|  |  | (B1) (% by mass) | 29 | 44 | 29 | 29 | 29 | 29 | 100 | 0 |
|  |  | (A) (% by mass) | 50 | 50 | 50 | 50 | 50 | 50 | 0 | 100 |
|  |  | (B) (% by mass) | 50 | 50 | 50 | 50 | 50 | 50 | 100 | 0 |
|  |  | Epoxy equivalent (g/eq.) | 245 | 210 | 265 | 260 | 320 | 250 | 400 | 165 |
|  |  | Sizing agent attached amount (% by mass) | 0.6 | 0.6 | 0.6 | 0.6 | 0.6 | 0.6 | 0.6 | 0.6 |
| Thermoplastic resin |  |  | PA | PA | PA | PA | PA | PA | PA | PA |
| Evaluation item | Sizing agent-coated fibers | Epoxy equivalent of sizing agent (g/eq.) | 475 | 350 | 430 | 420 | 530 | 400 | 710 | 240 |
|  |  | Water content (% by mass) | 0.019 | 0.021 | 0.021 | 0.019 | 0.018 | 0.019 | 0.015 | 0.032 |
|  |  | X-ray photoelectron spectrum of sizing agent surface (a)/(b) | 0.6 | 0.65 | 0.64 | 0.65 | 0.71 | 0.63 | 1.01 | 0.29 |
|  |  | Eluted aliphatic epoxy compound (A) (part by mass) | 0.13 | 0.13 | 0.13 | 0.13 | 0.13 | 0.13 | — | 0.33 |
|  | Carbon fiber-reinforced composite material | Bending strength (MPa) | 339 | 340 | 339 | 338 | 335 | 339 | 320 | 340 |
|  |  | Reduction in bending strength in water | OK | OK | OK | OK | OK | OK | OK | NG |

Examples 33 to 38

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Examples 1, 2, 3, 5, 6, and 7.

Third Process: Extrusion Process

The TEX-30α twin screw extruder (screw diameter 30 mm and L/D=32) manufactured by Japan Steel Works, LTD. was used. ABS resin pellets were fed from a main hopper at 8 kg/hour and subsequently the carbon fibers coated with the sizing agent were fed from a side hopper located downstream. These materials were sufficiently kneaded at a barrel temperature of 230° C. and a rotational speed of 150 rpm. Then, degassing was carried out from a vacuum vent located further downstream. The fed amount of the carbon fibers coated with the sizing agent was adjusted to 20 parts by mass relative to 80 parts by mass of the ABS resin pellets with the weight feeders. The melted resin was extruded from the die mouth (diameter 5 mm) and the obtained strands were cooled and then cut with a cutter to form a pellet-like molding material.

Fourth Process: Injection Molding Process

Test specimens for property evaluation were molded from the pellet-like molding material obtained in the extrusion process using J350EIII injection molding machine manufactured by Japan Steel Works, LTD. at a cylinder temperature of 230° C. and a mold temperature of 60° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. As shown in Table 5, it was revealed that the bending strength was high and the mechanical properties were sufficiently high.

Comparative Example 12

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 1.

Third and Fourth Processes:

Test specimens for property evaluation were molded in a similar manner to the method of Example 33. Subsequently, the obtained test specimens for property evaluation were evaluated in accordance with the above-described evaluation method of the injection molded article. The result showed that the bending strength was as shown in Table 5 and that the mechanical properties were slightly low.

Comparative Example 13

First Process: Process for Manufacturing Carbon Fibers to be Raw Material

This process was carried out in a similar manner to Example 1.

Second Process: Process for Attaching Sizing Agent to Carbon Fibers

This process was carried out in a similar manner to Comparative Example 2.

Third and Fourth Processes:

Test specimens for property evaluation were molded in a similar manner to the method of Example 33. Subsequently, the obtained test specimens for property evaluation were evaluated in accordance with the above-described evaluation method of the injection molded article. The result showed that the bending strength was as shown in Table 5 and that the mechanical properties were slightly low.

TABLE 5

| | | | | Example 33 | Example 34 | Example 35 | Example 36 | Example 37 | Example 38 | Comparative Example 12 | Comparative Example 13 |
|---|---|---|---|---|---|---|---|---|---|---|---|
| Carbon fibers | Carbon fibers | | | A | A | A | A | A | A | A | A |
| | | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio A/B1 | | (A) (% by mass) | 71 | 56 | 71 | 71 | 71 | 71 | 0 | 100 |
| | | | (B1) (% by mass) | 29 | 44 | 29 | 29 | 29 | 29 | 100 | 0 |
| | | | (A) (% by mass) | 50 | 50 | 50 | 50 | 50 | 50 | 0 | 100 |
| | | | (B) (% by mass) | 50 | 50 | 50 | 50 | 50 | 50 | 100 | 0 |
| | | | Epoxy equivalent (g/eq.) | 245 | 210 | 265 | 260 | 320 | 250 | 400 | 165 |
| | | | Sizing agent attached amount (% by mass) | 0.6 | 0.6 | 0.6 | 0.6 | 0.6 | 0.6 | 0.6 | 0.6 |
| Thermoplastic resin | | | | ABS | ABS | ABS | ABS | ABS | ABS | ABS | ABS |
| Evaluation item | Sizing agent-coated fibers | | Epoxy equivalent of sizing agent (g/eq.) | 475 | 350 | 430 | 420 | 530 | 400 | 710 | 240 |
| | | | Water content (% by mass) | 0.019 | 0.021 | 0.021 | 0.019 | 0.018 | 0.019 | 0.015 | 0.032 |
| | | | X-ray photoelectron spectrum of sizing agent surface (a)/(b) | 0.6 | 0.65 | 0.64 | 0.65 | 0.71 | 0.63 | 1.01 | 0.29 |
| | | | Eluted aliphatic epoxy compound (A) (part by mass) | 0.13 | 0.13 | 0.13 | 0.13 | 0.13 | 0.13 | — | 0.33 |
| | Carbon fiber-reinforced composite material | | Bending strength (MPa) | 146 | 150 | 149 | 147 | 146 | 148 | 141 | 130 |

Examples 39

In 50 mL of acetone, 2 g of the sizing agent-coated carbon fibers obtained in Example 1 were immersed and ultrasonic cleaning was applied to the sizing agent-coated carbon fibers for 30 minutes three times. Subsequently, the carbon fibers were immersed in 50 mL of methanol, and ultrasonic cleaning was applied for 30 minutes once, followed by drying carbon fibers. The attached amount of the sizing agent remaining after the cleaning was measured. The result was as shown in Table 6.

Subsequently, the surface of the sizing agent of the sizing agent-coated carbon fibers before cleaning and the surface of the sizing agent of the sizing agent-coated carbon fibers obtained after the cleaning were analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C═C were measured. The ratio (I) of (a)/(b) of the surface of the sizing agent of the sizing agent-coated carbon fibers before cleaning and the ratio (II) of (a)/(b) of the surface of the sizing agent of the sizing agent-coated carbon fibers after cleaning were calculated. (I) and (II)/(I) are as shown in Table 6.

Examples 40 and 41

In a similar manner to Example 39, the sizing agent-coated carbon fibers obtained in Example 2 and Example 3 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the $C_{1s}$ core spectrum. The results are shown in Table 6.

Comparative Example 14

In a similar manner to Example 39, the sizing agent-coated carbon fibers obtained in Comparative Example 1 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the $C_{1s}$ core spectrum. The results are shown in Table 6. The result showed that (II)/(I) is large and thus the sizing agent had no gradient structure.

Comparative Example 15

In a similar manner to Example 39, the sizing agent-coated carbon fibers obtained in Comparative Example 2 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the C1s core spectrum. The results are shown in Table 6. The result showed that (II)/(I) is large and thus the sizing agent had no gradient structure.

Comparative Example 16

In a similar manner to Example 39, the sizing agent-coated carbon fibers obtained in Comparative Example 5 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the C1s core spectrum. The results are shown in Table 6. The result showed that (II)/(I) is small.

TABLE 6

|  |  | Example 39 | Example 40 | Example 41 | Comparative Example 14 | Comparative Example 15 | Comparative Example 16 |
|---|---|---|---|---|---|---|---|
| Sizing agent-coated carbon fibers | | Example 1 | Example 2 | Example 3 | Comparative Example 1 | Comparative Example 2 | Comparative Example 5 |
| | Sizing agent attached amount after washing sizing agent | 0.18 | 0.18 | 0.18 | 0.12 | 0.18 | 0.18 |
| XPS (400 eV) | (I) | 0.62 | 0.67 | 0.66 | 1.01 | 0.29 | 0.98 |
| | (II)/(I) | 0.8 | 0.71 | 0.72 | 1 | 1 | 0.3 |

In Example and Comparative Examples according to the second embodiment, the component (A) and the component (B1) of the sizing agent similar to those of the first embodiment were used and thermoplastic resins described below were used as the thermoplastic resin.

Thermoplastic resins
Polyarylene sulfide resin:
 Polyphenylene sulfide (PPS) resin pellets—"Torelina(registered trademark)" M2888 (manufactured by Toray Industries Inc.)
Polyamide resin:
 Polyamide 66 (PA) resin pellets—"Amilan (registered trademark)" CM3001 (manufactured by Toray Industries Inc.)
Polycarbonate resin:
 Polycarbonate (PC) resin pellets—"Lexan (registered trademark)" 141R (manufactured by Saudi Basic Industries Corporation (SABIC))
Polyolefin resin:
 Polypropylene (PP) resin pellets—Mixture of unmodified PP resin pellets and acid-modified PP resin pellets (unmodified PP resin pellets: "Prime Polypro (registered trademark)" J830HV (manufactured by Prime Polymer Co., Ltd.) 50 parts by mass, acid-modified PP resin pellets: "ADMER (registered trademark)" QE800 (manufactured by Mitsui Chemicals, Inc.) 50 parts by mass)

Example 42

This Example includes the following first to fourth processes.

First Process: Process for Manufacturing Carbon Fibers to be Raw Material

Carbon fibers A were obtained in a similar manner to Example 1 of the first embodiment.

Second Process: Process for Attaching Sizing Agent to Carbon Fibers

After an aqueous dispersion emulsion containing 20 parts by mass of (B-2) as a component (B1), 20 parts by mass of a component (C), and 10 parts by mass of an emulsifier was prepared, 50 parts by mass of (A-1) was mixed as a component (A) to prepare a sizing liquid. As the component (C), a condensate (C-1) of 2 mol of an adduct of bisphenol A with 2 mol of EO, 1.5 mol of maleic acid, and 0.5 mol of sebacic acid was used. As the emulsifier, polyoxyethylene (70 mol) styrenated (5 mol) cumylphenol was used. Both of the component (C) and the emulsifier are aromatic compounds and also correspond to the component (B). The epoxy equivalent of the sizing agent except the solvents in the sizing liquid is as shown in Table 7-1. The surface-treated carbon fibers were coated with the sizing agent by an immersion method. Thereafter, heat treatment at a temperature of 210° C. for 75 seconds was applied to the carbon fibers to obtain the carbon fibers coated with the sizing agent. The attached amount of the sizing agent was adjusted so as to be 0.6% by mass relative to the carbon fibers coated with the sizing agent. Subsequently, the epoxy equivalent of the sizing agent applied to the carbon fibers, the water content of the sizing agent-coated carbon fibers, the X-ray photoelectron spectrum of the sizing agent surface, and the eluted aliphatic epoxy compound were measured. The results are summarized in Table 7-1. From the results of Table 7-1, it was ascertained that both of the epoxy equivalent of the sizing agent and the chemical composition of the surface of the sizing agent were as expected.

Third Process: Process for Manufacturing Tape-Like Prepreg

The tip part of a single screw extruder was equipped with a crosshead die that is processed as a wave-like form through which continuous sizing agent-coated carbon fibers were able to pass. Subsequently, the PPS resin pellets were fed from the extruder to the crosshead die in a melted state and impregnated into the continuous sizing agent-coated carbon fibers while the continuous sizing agent-coated carbon fibers were pulled through the crosshead die at a speed of 5 m/min. After the impregnated sizing agent-coated carbon fibers were cooled, a tape like prepreg was manufactured by winding. Here, the extruder was operated under conditions of a barrel temperature of 320° C. and a rotational speed of 150 rpm and the PPS resin pellets were sufficiently kneaded. Then, degassing was carried out from a vacuum vent located downstream. The PPS resin pellets were adjusted to feed in an amount of 34 parts by mass relative to 66 parts by mass of the sizing agent-coated carbon fibers.

Fourth Process: Process for Stacking and Press Molding Prepregs

The tape-like prepreg obtained in the previous process were unidirectionally oriented in a mold having a size of 30 cm×30 cm and press-molded with a heating press molding machine under conditions of 330° C. for 10 minutes to obtain a planar molded article having a size of 30 cm×30 cm×3 mm. Subsequently, the obtained test specimens for property evaluation were evaluated in accordance with the above-described evaluation method of the molded article. The results are summarized in Table 7-1. The results showed that the bending strength was 76 MPa and thus the mechanical properties were sufficiently high.

Examples 43 to 51

First Process: Process for Manufacturing Carbon Fibers to be Raw Material

This process was carried out in a similar manner to Examples 1 and 42.

Second Process: Process for Attaching Sizing Agent to Carbon Fibers

The carbon fibers coated with the sizing agent was obtained in a similar manner to Example 42 except that types and amounts of the component (A) and the component (B1) and amounts of the component (C-1) and other components were used as shown in Table 7-1. Subsequently, the epoxy equivalent of the sizing agent, the water content of the sizing agent-coated carbon fibers, and the X-ray photoelectron spectrum of the surface of the sizing agent were measured. It was found that both of the epoxy equivalent of the sizing agent and the chemical composition of the surface of the sizing agent were as expected. The results are shown in Table 7-1.

Third and Fourth Processes:

Test specimens for property evaluation were molded in a similar manner to the method of Example 42. Subsequently, the obtained test specimens for property evaluation were evaluated in accordance with the above-described evaluation method of the molded article. The results are summarized in Table 7-1. The results showed that the bending strengths were 73 MPa to 79 MPa and thus the mechanical properties were sufficiently high.

Example 52

First Process: Process for Manufacturing Carbon Fibers to be Raw Material

This process was carried out in a similar manner to Examples 1 and 42.

Second Process: Process for Attaching Sizing Agent to Carbon Fibers

The carbon fibers coated with the sizing agent was obtained in a similar manner to Example 42 except that types and amounts of the component (A) and the component (B1) and amounts of the component (C-1) and other components were used as shown in Table 7-1.

The attached amount of the sizing agent was 1.0 part by mass to 100 parts by mass of the surface treated carbon fibers.

Third and Fourth Processes:

Test specimens for property evaluation were molded in a similar manner to the method of Example 42. Subsequently, the obtained test specimens for property evaluation were evaluated in accordance with the above-described evaluation method of the molded article.

The results are summarized in Table 7-1.

The results showed that the bending strength was 76 MPa and thus the mechanical properties were sufficiently high.

Example 53

First Process: Process for Manufacturing Carbon Fibers to be Raw Material

Carbon fibers B were obtained in a similar manner to the method of Example 12 in the first embodiment.

Second Process: Process for Attaching Sizing Agent to Carbon Fibers

The carbon fibers coated with the sizing agent was obtained in a similar manner to Example 42 except that types and amounts of the component (A) and the component (B1) and amounts of the component (C-1) and other components were used as shown in Table 7-1. Subsequently, the epoxy equivalent of the sizing agent, the water content of the sizing agent-coated carbon fibers, and the X-ray photoelectron spectrum of the surface of the sizing agent were measured. Both of the epoxy equivalent of the sizing agent and the chemical composition of the surface of the sizing agent were as expected. The results are shown in Table 7-1.

Third and Fourth Processes:

Test specimens for property evaluation were molded in a similar manner to the method of Example 42. Subsequently, the obtained test specimens for property evaluation were evaluated in accordance with the above-described evaluation method of the molded article.

The results are summarized in Table 7-1.

The result showed that the bending strength was in an acceptable level.

Example 54

First Process: Process for Manufacturing Carbon Fibers to be Raw Material

Carbon fibers B were obtained in a similar manner to the method of Example 13 in the first embodiment.

Second Process: Process for Attaching Sizing Agent to Carbon Fibers

The carbon fibers coated with the sizing agent was obtained in a similar manner to Example 42 except that types and amounts of the component (A) and the component (B1) and amounts of the component (C-1) and other components were used as shown in Table 7-1. Subsequently, the epoxy equivalent of the sizing agent, the water content of the sizing agent-coated carbon fibers, and the X-ray photoelectron spectrum of the surface of the sizing agent were measured. Both of the epoxy equivalent of the sizing agent and the chemical composition of the surface of the sizing agent were as expected. The results are shown in Table 7-1.

Third and Fourth Processes:

Test specimens for property evaluation were molded in a similar manner to the method of Example 42. Subsequently, the obtained test specimens for property evaluation were evaluated in accordance with the above-described evaluation method of the molded article. The results are summarized in Table 7-1. The result showed that the bending strength was in an acceptable level.

Example 55

First Process: Process for Manufacturing Carbon Fibers to be Raw Material

This process was carried out in a similar manner to Example 42.

Second Process: Process for Attaching Sizing Agent to Carbon Fibers

The carbon fibers coated with the sizing agent were obtained in a similar manner to Example 1 except that the component (A) and the component (B1) were used as shown in Table 7-1 and were applied as a dimethylformamide solution. Subsequently, the epoxy equivalent of the sizing agent, the water amount of the sizing agent-coated carbon fibers, and the X-ray photoelectron spectrum of the surface of the sizing agent were measured. Both of the epoxy equivalent of the sizing agent and the chemical composition of the surface of the sizing agent were as expected. The results are shown in Table 7-1.

Third and Fourth Processes:

Test specimens for property evaluation were molded in a similar manner to the method of Example 42. Subsequently, the obtained test specimens for property evaluation were evaluated in accordance with the above-described evaluation method of the molded article. The results are summarized in Table 7-1. The results showed that the bending strength was high.

Comparative Example 17

First Process: Process for Manufacturing Carbon Fibers to be Raw Material

This process was carried out in a similar manner to Examples 1 and 42.

Second Process: Process for Attaching Sizing Agent to Carbon Fibers

The carbon fibers coated with the sizing agent were obtained in a similar manner to Example 42 except that the component (A) was not used and types and amounts of the component (B1) and amounts of other components as shown in Table 7-2 were used. Subsequently, the X-ray photoelectron spectrum of the surface of the sizing agent was measured. As shown in Table 7-2, the ratio was out of the range of the present invention.

Third and Fourth Processes:

Test specimens for property evaluation were molded in a similar manner to the method of Example 42. Subsequently, the obtained test specimens for property evaluation were evaluated in accordance with the above-described evaluation method of the molded article. The result showed that the bending strength was as shown in Table 7-2 and that the mechanical properties were insufficient.

Comparative Example 18

First Process: Process for Manufacturing Carbon Fibers to be Raw Material

This process was carried out in a similar manner to Examples 1 and 42.

Second Process: Process for Attaching Sizing Agent to Carbon Fibers

Carbon fibers coated with the sizing agent were obtained in a similar manner to Example 42 except that the component (B1) was not used and types and amounts of the component (A) were used as shown in Table 7-2. Subsequently, the X-ray photoelectron spectrum of the surface of the sizing agent was measured. As shown in Table 7-2, the ratio was out of the range of the present invention.

Third and Fourth Processes:

Test specimens for property evaluation were molded in a similar manner to the method of Example 42. Subsequently, the obtained test specimens for property evaluation were evaluated in accordance with the above-described evaluation method of the molded article. The result showed that the bending strength was as shown in Table 7-2 and that the mechanical properties were slightly low.

Comparative Example 19

First Process: Process for Manufacturing Carbon Fibers to be Raw Material

This process was carried out in a similar manner to Examples 1 and 42.

Second Process: Process for Attaching Sizing Agent to Carbon Fibers

The carbon fibers coated with the sizing agent was obtained in a similar manner to Example 42 except that types and amounts of the component (A) and the component (B1) and amounts of the component (C-1) and other components were used as shown in Table 7-2. Subsequently, the X-ray photoelectron spectrum of the surface of the sizing agent was measured. As shown in Table 7-2, the ratio was out of the range of the present invention.

Third and Fourth Processes:

Test specimens for property evaluation were molded in a similar manner to the method of Example 42. Subsequently, the obtained test specimens for property evaluation were evaluated in accordance with the above-described evaluation method of the molded article. The result showed that the bending strength was as shown in Table 7-2 and that the mechanical properties were insufficient.

Comparative Example 20

First Process: Process for Manufacturing Carbon Fibers to be Raw Material

This process was carried out in a similar manner to Examples 1 and 42.

Second Process: Process for Attaching Sizing Agent to Carbon Fibers

The carbon fibers coated with the sizing agent was obtained in a similar manner to Example 42 except that types and amounts of the component (A) and the component (B1) and amounts of the component (C-1) and other components were used as shown in Table 7-2. Subsequently, the X-ray photoelectron spectrum of the surface of the sizing agent was measured. As shown in Table 7-2, the ratio was out of the range of the present invention.

Third and Fourth Processes:

Test specimens for property evaluation were molded in a similar manner to the method of Example 42. Subsequently, the obtained test specimens for property evaluation were evaluated in accordance with the above-described evaluation method of the molded article. The result showed that the bending strength was as shown in Table 7-2 and that the mechanical properties were slightly low.

Comparative Example 21

First Process: Process for Manufacturing Carbon Fibers to be Raw Material

This process was carried out in a similar manner to Examples 1 and 42.

Second Process: Process for Attaching Sizing Agent to Carbon Fibers

An aqueous solution of (A-2) was prepared as the component (A) and was applied to surface treated carbon fibers by the immersion method. Thereafter, the coated carbon fibers were treated with heat at a temperature of 210° C. for 75 seconds to obtain the carbon fibers coated with the sizing agent. The attached amount of the sizing agent was adjusted so as to be 0.30% by mass relative to the finally obtained sizing agent-coated carbon fibers. Subsequently, an aqueous dispersion emulsion containing 20 parts by mass of (B-2) as a component (B1), 20 parts by mass of a component (C), and 10 parts by mass of an emulsifier was prepared. As the component (C), a condensate (C-1) of 2 mol of an adduct of bisphenol A with 2 mol of EO, 1.5 mol of maleic acid, and 0.5 mol of sebacic acid were used. As the emulsifier, polyoxyethylene (70 mol) styrenated (5 mol) cumylphenol was used. Both of the component (C) and the emulsifier are aromatic compounds and also correspond to the component (B). The carbon fibers coated with the component (A) was coated with the sizing agent by the immersion method. Thereafter, the coated carbon fibers were treated with heat at a temperature of 210° C. for 75 seconds to obtain the carbon fibers coated with the sizing agent. The attached amount of the sizing agent was adjusted so as to be 0.30 parts by mass relative to the finally obtained sizing agent-coated carbon fibers. The X-ray photoelectron spectrum of the surface of the sizing agent was measured. The ratio (a)/(b) where (a) is the height (cps) of a component having a binding energy (284.6 eV) attributed to CHx, C—C, and C=C and (b) is the height (cps) of a component having binding energy (286.1 eV) attributed to C—O in a C1s core spectrum of the surface of the sizing agent measured by X-ray photoelectron spectroscopy at a photoelectron takeoff angle of 15° is larger than 0.90 and the ratio was out of the range of the present invention.

Third and Fourth Processes:

Test specimens for property evaluation were molded in a similar manner to the method of Example 42. Subsequently, the obtained test specimens for property evaluation were evaluated in accordance with the above-described evaluation method of the molded article. The result showed that the bending strength was as shown in Table 7-2 and the mechanical properties were low.

TABLE 7-1

| | | | | Example 42 | Example 43 | Example 44 | Example 45 | Example 46 | Example 47 | Example 48 | Example 49 |
|---|---|---|---|---|---|---|---|---|---|---|---|
| Carbon fibers | | | | A | A | A | A | A | A | A | A |
| Sizing agent | (A) | A-1 | EX-611 | 50 | | | | 25 | | | |
| | | A-2 | EX-521 | | 50 | 50 | 25 | 25 | 50 | 50 | 50 |
| | | Total | | 50 | 50 | 50 | 50 | 50 | 50 | 50 | 50 |
| | (B1) | B-1 | jER152 | | | | | | 20 | | |
| | | B-2 | jER828 | 20 | 40 | 20 | 20 | | | | 10 |
| | | B-3 | jER1001 | | | | | | | 20 | 10 |
| | | B-4 | jER807 | | | | | | | 20 | |
| | | Total | | 20 | 40 | 20 | 20 | 20 | 20 | 20 | 20 |
| | (C) | C-1 | Aromatic polyester | 20 | | 20 | 20 | 20 | 20 | 20 | 20 |
| | Other | — | Emulsifier | 10 | 10 | 10 | 10 | 10 | 10 | 10 | 10 |

TABLE 7-1-continued

| | | | | | | | | | | | | |
|---|---|---|---|---|---|---|---|---|---|---|---|---|
| | | | (nonionic surfactant) | | | | | | | | | |
| | Ratio | A/B1 | (A) (% by mass) | 71 | 56 | 71 | 71 | 71 | 71 | 71 | 71 |
| | | | (B1) (% by mass) | 29 | 44 | 29 | 29 | 29 | 29 | 29 | 29 |
| | | | (A) (% by mass) | 50 | 50 | 50 | 50 | 50 | 50 | 50 | 50 |
| | | | (B) (% by mass) | 50 | 50 | 50 | 50 | 50 | 50 | 50 | 50 |
| | | | Epoxy equivalent (g/eq.) | 245 | 210 | 265 | 255 | 260 | 320 | 250 | 290 |
| | | | Sizing agent attached amount (% by mass) | 0.6 | 0.6 | 0.6 | 0.6 | 0.6 | 0.6 | 0.6 | 0.6 |
| Thermoplastic resin | | | | PPS | PPS | PPS | PPS | PPS | PPS | PPS | PPS |
| Evaluation item | Sizing agent-coated fibers | | Epoxy equivalent of sizing agent (g/eq.) | 475 | 350 | 430 | 450 | 420 | 530 | 400 | 470 |
| | | | Water content (% by mass) | 0.019 | 0.021 | 0.021 | 0.020 | 0.019 | 0.018 | 0.019 | 0.019 |
| | | | X-ray photoelectron spectrum of sizing agent surface (a)/(b) | 0.6 | 0.65 | 0.64 | 0.62 | 0.65 | 0.71 | 0.63 | 0.67 |
| | | | Eluted aliphatic epoxy compound (A) (part by mass) | 0.13 | 0.13 | 0.13 | 0.13 | 0.13 | 0.13 | 0.13 | 0.13 |
| | Carbon fiber-reinforced composite material | | 90° bending strength (MPa) | 76 | 79 | 78 | 75 | 76 | 73 | 78 | 78 |

| | | | | Example 50 | Example 51 | Example 52 | Example 53 | Example 54 | Example 55 |
|---|---|---|---|---|---|---|---|---|---|
| Carbon fibers | | | | A | A | A | B | C | A |
| Sizing agent | (A) | A-1 | EX-611 | | | | | | |
| | | A-2 | EX-521 | 40 | 65 | 50 | 50 | 50 | 55 |
| | | Total | | 40 | 65 | 50 | 50 | 50 | 55 |
| | (B1) | B-1 | jER152 | | | | | | |
| | | B-2 | jER828 | 25 | 17 | 20 | 20 | 20 | 45 |
| | | B-3 | jER1001 | | | | | | |
| | | B-4 | jER807 | | | | | | |
| | | Total | | 25 | 17 | 20 | 20 | 20 | 45 |
| | (C) | C-1 | Aromatic polyester | 25 | 8 | 20 | 20 | 20 | |
| | Other | — | Emulsifier (nonionic surfactant) | 10 | 10 | 10 | 10 | 10 | |
| | Ratio | A/B1 | (A) (% by mass) | 62 | 79 | 71 | 71 | 71 | 55 |
| | | | (B1) (% by mass) | 38 | 21 | 29 | 29 | 29 | 45 |
| | | | (A) (% by mass) | 40 | 65 | 50 | 50 | 50 | 55 |
| | | | (B) (% by mass) | 60 | 35 | 50 | 50 | 50 | 45 |
| | | | Epoxy equivalent (g/eq.) | 285 | 225 | 265 | 265 | 265 | 185 |
| | | | Sizing agent attached amount (% by mass) | 0.6 | 0.6 | 1 | 0.6 | 0.6 | 0.6 |
| Thermoplastic resin | | | | PPS | PPS | PPS | PPS | PPS | PPS |
| Evaluation item | Sizing agent-coated fibers | | Epoxy equivalent of sizing agent (g/eq.) | 505 | 350 | 430 | 430 | 430 | 275 |
| | | | Water content (% by mass) | 0.018 | 0.022 | 0.022 | 0.020 | 0.021 | 0.021 |
| | | | X-ray photoelectron spectrum of sizing agent surface | 0.77 | 0.52 | 0.64 | 0.63 | 0.63 | 0.63 |

TABLE 7-1-continued

|  |  |  |  |  |  |  |
|---|---|---|---|---|---|---|
| (a)/(b) Eluted aliphatic epoxy compound (A) (part by mass) | 0.08 | 0.16 | 0.25 | 0.12 | 0.13 | 0.14 |
| Carbon fiber-reinforced composite material 90° bending strength (MPa) | 75 | 75 | 76 | 72 | 71 | 76 |

TABLE 7-2

| | | | | Comparative Example 17 | Comparative Example 18 | Comparative Example 19 | Comparative Example 20 | Comparative Example 21 |
|---|---|---|---|---|---|---|---|---|
| Carbon fibers | | | | A | A | A | A | A |
| Sizing agent | (A) | A-1 | EX-611 | | 100 | 30 | 75 | |
| | | A-2 | EX-521 | | | | | 50 |
| | | Total | | | 100 | 30 | 75 | 50 |
| | (B1) | B-1 | jER152 | | | | | |
| | | B-2 | jER828 | 20 | | 30 | 10 | 20 |
| | | B-3 | jER1001 | 70 | | | | |
| | | B-4 | jER807 | | | | | |
| | | Total | | 90 | | 30 | 10 | 20 |
| | (C) | C-1 | Aromatic polyester | | | 30 | 10 | 20 |
| | Other | — | Emulsifier (nonionic surfactant) | 10 | | 10 | 5 | 10 |
| | Ratio A/B1 | | (A) (% by mass) | 0 | 100 | 50 | 88 | 71 |
| | | | (B1) (% by mass) | 100 | 0 | 50 | 12 | 29 |
| | | | (A) (% by mass) | 0 | 100 | 30 | 75 | 50 |
| | | | (B) (% by mass) | 100 | 0 | 70 | 25 | 50 |
| | Epoxy equivalent (g/eq.) | | | 400 | 165 | 300 | 200 | 185/420 |
| | Sizing agent attached amount (% by mass) | | | 0.6 | 0.6 | 0.6 | 0.6 | 0.3/0.3 |
| Thermoplastic resin | | | | PPS | PPS | PPS | PPS | PPS |
| Evaluation item | Sizing agent-coated fibers | | Epoxy equivalent of sizing agent (g/eq.) | 710 | 240 | 505 | 330 | 550 |
| | | | Water content (% by mass) | 0.015 | 0.032 | 0.019 | 0.025 | 0.021 |
| | | | X-ray photoelectron spectrum of sizing agent surface (a)/(b) | 1.01 | 0.29 | 0.92 | 0.49 | 0.98 |
| | | | Eluted aliphatic epoxy compound (A) (part by mass) | — | 0.33 | 0.04 | 0.22 | 0.12 |
| | Carbon fiber-reinforced composite material | | 90° bending strength (MPa) | 56 | 61 | 57 | 59 | 59 |

Examples 56 to 61

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Examples 42, 43, 44, 46, 47, and 48.

Third Process: Process for Manufacturing Tape-Like Prepreg

The tip part of a single screw extruder was equipped with a crosshead die that is processed as a wave-like form through which continuous sizing agent-coated carbon fibers were able to pass. Subsequently, the PC resin pellets were fed from the extruder to the crosshead die in a melted state and impregnated into the continuous sizing agent-coated carbon fibers while the continuous sizing agent-coated carbon fibers were pulled through the crosshead die at a speed of 5 m/min. After the melted-resin-impregnated sizing agent-coated carbon fibers were heated and cooled, a tape like prepreg was manufactured by winding. Here, the extruder was operated under conditions of a barrel temperature of 300° C. and a rotational speed of 150 rpm and the PPS resin pellets were sufficiently kneaded. Then, degassing was carried out from a vacuum vent located downstream. The PC resin pellets were adjusted to feed in an amount of 31 parts by mass relative to 69 parts by mass of the sizing agent-coated carbon fibers.

Fourth Process: Process for Stacking and Press Molding Prepregs

The tape-like prepregs obtained in the previous process were unidirectionally oriented in a mold having a size of 30 cm×30 cm and press-molded with a heating press molding machine under conditions of 320° C. for 10 minutes to obtain a planar molded article having a size of 30 cm×30 cm×3 mm. Subsequently, the obtained test specimens for property evaluation were evaluated in accordance with the above-described evaluation method of the molded article. The results are summarized in Table 8. The results showed that the bending strengths were 51 MPa to 58 MPa and thus the mechanical properties were sufficiently high.

Comparative Example 22

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Comparative Example 17.

Third and Fourth Processes:

Test specimens for property evaluation were molded in a similar manner to the method of Example 56. Subsequently, the obtained test specimens for property evaluation were evaluated in accordance with the above-described evaluation method of the molded article. The result showed that the bending strength was as shown in Table 8 and that the mechanical properties were insufficient.

Comparative Example 23

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Comparative Example 18.

Third and Fourth Processes:

Test specimens for property evaluation were molded in a similar manner to the method of Example 56. Subsequently, the obtained test specimens for property evaluation were evaluated in accordance with the above-described evaluation method of the molded article. The result showed that the bending strength was as shown in Table 8 and that the mechanical properties were slightly low.

TABLE 8

| | | | | Example 56 | Example 57 | Example 58 | Example 59 | Example 60 | Example 61 | Comparative Example 22 | Comparative Example 23 |
|---|---|---|---|---|---|---|---|---|---|---|---|
| Carbon fibers | | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio | A/B1 | (A) (% by mass) | 71 | 56 | 71 | 71 | 71 | 71 | 0 | 100 |
| | | | (B1) (% by mass) | 29 | 44 | 29 | 29 | 29 | 29 | 100 | 0 |
| | | | (A) (% by mass) | 50 | 50 | 50 | 50 | 50 | 50 | 0 | 100 |
| | | | (B) (% by mass) | 50 | 50 | 50 | 50 | 50 | 50 | 100 | 0 |
| | Epoxy equivalent (g/eq.) | | | 245 | 210 | 265 | 260 | 320 | 250 | 400 | 165 |
| | Sizing agent attached amount (% by mass) | | | 0.6 | 0.6 | 0.6 | 0.6 | 0.6 | 0.6 | 0.6 | 0.6 |

TABLE 8-continued

|  |  |  | Example 56 | Example 57 | Example 58 | Example 59 | Example 60 | Example 61 | Comparative Example 22 | Comparative Example 23 |
|---|---|---|---|---|---|---|---|---|---|---|
| Thermoplastic resin |  |  | PC | PC | PC | PC | PC | PC | PC | PC |
| Evaluation item | Sizing agent-coated fibers | Epoxy equivalent of sizing agent (g/eq.) | 475 | 350 | 430 | 420 | 530 | 400 | 710 | 240 |
|  |  | Water content (% by mass) | 0.019 | 0.021 | 0.021 | 0.019 | 0.018 | 0.019 | 0.015 | 0.032 |
|  |  | X-ray photoelectron spectrum of sizing agent surface (a)/(b) | 0.6 | 0.65 | 0.64 | 0.65 | 0.71 | 0.63 | 1.01 | 0.29 |
|  |  | Eluted aliphatic epoxy compound (A) (part by mass) | 0.13 | 0.13 | 0.13 | 0.13 | 0.13 | 0.13 | — | 0.33 |
|  | Carbon fiber-reinforced composite material | 90° bending strength (MPa) | 53 | 58 | 56 | 54 | 51 | 53 | 42 | 46 |

Examples 62 to 67

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Examples 42, 43, 44, 46, 47, and 48.

Third Process: Process for Manufacturing Tape-Like Prepreg

The tip part of a single screw extruder was equipped with a crosshead die that is processed as a wave-like form through which continuous sizing agent-coated carbon fibers were able to pass. Subsequently, the PP resin pellets were fed from the extruder to the crosshead die in a melted state and impregnated into the continuous sizing agent-coated carbon fibers while the continuous sizing agent-coated carbon fibers were pulled through the crosshead die at a speed of 5 m/min. After the melted-resin-impregnated sizing agent-coated carbon fibers were heated and cooled, a tape like prepreg was manufactured by winding. Here, the extruder was operated under conditions of a barrel temperature of 240° C. and a rotational speed of 150 rpm and the PPS resin pellets were sufficiently kneaded. Then, degassing was carried out from a vacuum vent located downstream. The PP resin pellets were adjusted to feed in an amount of 25 parts by mass relative to 75 parts by mass of the sizing agent-coated carbon fibers.

Fourth Process: Process for Stacking and Press Molding Prepregs

The tape-like prepregs obtained in the previous process were unidirectionally oriented in a mold having a size of 30 cm×30 cm and press-molded with a heating press molding machine under conditions of 240° C. for 10 minutes to obtain a planar molded article having a size of 30 cm×30 cm×3 mm. Subsequently, the obtained test specimens for property evaluation were evaluated in accordance with the above-described evaluation method of the molded article.

The results are summarized in Table 9. The results showed that the bending strengths were 30 MPa to 34 MPa and thus the mechanical properties were sufficiently high.

Comparative Example 24

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Comparative Example 17.

Third and Fourth Processes:

Test specimens for property evaluation were molded in a similar manner to the method of Example 62. Subsequently, the obtained test specimens for property evaluation were evaluated in accordance with the above-described evaluation method of the molded article. The result showed that the bending strength was as shown in Table 9 and that the mechanical properties were insufficient.

Comparative Example 25

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Comparative Example 18.

Third and Fourth Processes:

Test specimens for property evaluation were molded in a similar manner to the method of Example 62. Subsequently, the obtained test specimens for property evaluation were evaluated in accordance with the above-described evaluation method of the molded article. The result showed that the bending strength was as shown in Table 9 and that the mechanical properties were slightly low.

TABLE 9

|  |  |  |  | Example 62 | Example 63 | Example 64 | Example 65 | Example 66 | Example 67 | Comparative Example 24 | Comparative Example 25 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  |  |  |  |  | 100 |
|  |  | A-2 | EX-521 |  | 50 | 50 | 50 | 50 | 50 |  |  |
|  |  | Total |  | 50 | 50 | 50 | 50 | 50 | 50 |  | 100 |
|  | (B1) | B-1 | jER152 |  |  |  | 20 |  |  |  |  |
|  |  | B-2 | jER828 | 20 | 40 | 20 |  |  |  | 20 |  |
|  |  | B-3 | jER1001 |  |  |  |  | 20 |  | 70 |  |
|  |  | B-4 | jER807 |  |  |  |  |  | 20 |  |  |
|  |  | Total |  | 20 | 40 | 20 | 20 | 20 | 20 | 90 |  |
|  | (C) | C-1 | Aromatic polyester | 20 |  | 20 | 20 | 20 | 20 |  |  |
|  | Other | — | Emulsifier (nonionic surfactant) | 10 | 10 | 10 | 10 | 10 | 10 | 10 |  |
|  | Ratio A/B1 | (A) (% by mass) |  | 71 | 56 | 71 | 71 | 71 | 71 | 0 | 100 |
|  |  | (B1) (% by mass) |  | 29 | 44 | 29 | 29 | 29 | 29 | 100 | 0 |
|  |  | (A) (% by mass) |  | 50 | 50 | 50 | 50 | 50 | 50 | 0 | 100 |
|  |  | (B) (% by mass) |  | 50 | 50 | 50 | 50 | 50 | 50 | 100 | 0 |
|  | Epoxy equivalent (g/eq.) |  |  | 245 | 210 | 265 | 260 | 320 | 250 | 400 | 165 |
|  | Sizing agent attached amount (% by mass) |  |  | 0.6 | 0.6 | 0.6 | 0.6 | 0.6 | 0.6 | 0.6 | 0.6 |
| Thermoplastic resin |  |  |  | PP | PP | PP | PP | PP | PP | PP | PP |
| Evaluation item | Sizing agent-coated fibers | Epoxy equivalent of sizing agent (g/eq.) |  | 475 | 350 | 430 | 420 | 530 | 400 | 710 | 240 |
|  |  | Water content (% by mass) |  | 0.019 | 0.021 | 0.021 | 0.019 | 0.018 | 0.019 | 0.015 | 0.032 |
|  |  | X-ray photoelectron spectrum of sizing agent surface (a)/(b) |  | 0.6 | 0.65 | 0.64 | 0.65 | 0.71 | 0.63 | 1.01 | 0.29 |
|  |  | Eluted aliphatic epoxy compound (A) (part by mass) |  | 0.13 | 0.13 | 0.13 | 0.13 | 0.13 | 0.13 | — | 0.33 |
|  | Carbon fiber-reinforced composite material | 90° bending strength (MPa) |  | 32 | 34 | 33 | 32 | 30 | 32 | 26 | 20 |

Examples 68 to 73

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Examples 42, 43, 44, 46, 47, and 48.

Third Process: Process for Manufacturing Tape-Like Prepreg

The tip part of a single screw extruder was equipped with a crosshead die that is processed as a wave-like form through which continuous sizing agent-coated carbon fibers were able to pass. Subsequently, the PA6 resin pellets were fed from the extruder to the crosshead die in a melted state and impregnated into the continuous sizing agent-coated carbon fibers while the continuous sizing agent-coated carbon fibers were pulled through the crosshead die at a speed of 5 m/min. After the melted-resin-impregnated sizing agent-coated carbon fibers were heated and cooled, a tape like prepreg was manufactured by winding. Here, the extruder was operated under conditions of a barrel temperature of 300° C. and a rotational speed of 150 rpm and the PPS resin pellets were sufficiently kneaded. Then, degassing was carried out from a vacuum vent located downstream. The PA6 resin pellets were adjusted to feed in an amount of 30 parts by mass relative to 70 parts by mass of the sizing agent-coated carbon fibers.

Fourth Process: Process for Stacking and Press Molding Prepregs

The tape-like prepregs obtained in the previous process were unidirectionally oriented in a mold having a size of 30 cm×30 cm and press-molded with a heating press molding machine under conditions of 300° C. for 10 minutes to obtain a planar molded article having a size of 30 cm×30 cm×3 mm. Subsequently, the obtained test specimens for property evaluation were evaluated in accordance with the above-described evaluation method of the molded article. The results are summarized in Table 10. The results showed that the bending strengths were 50 MPa to 54 MPa and thus the mechanical properties were sufficiently high. It is showed that the reduction rate in the bending strength in case of water absorption was also small.

Comparative Example 26

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Comparative Example 17.

Third to Fifth Processes:

Test specimens for property evaluation were molded in a similar manner to the method of Example 68. Subsequently, the obtained test specimens for property evaluation were evaluated in accordance with the above-described evaluation method of the molded article. The result showed that the bending strength was as shown in Table 10 and that the mechanical properties were insufficient. It is also showed that the reduction rate in the bending strength in case of water absorption was small.

Comparative Example 27

First Process: Process for Manufacturing Carbon Fibers to be Raw Material

This process was carried out in a similar manner to Examples 1 and 42.

Second Process: Process for Attaching Sizing Agent to Carbon Fibers

This process was carried out in a similar manner to Comparative Example 18.

Third to Fifth Processes:

Test specimens for property evaluation were molded in a similar manner to the method of Example 68. Subsequently, the obtained test specimens for property evaluation were evaluated in accordance with the above-described evaluation method of the molded article. The result showed that the bending strength was as shown in Table 10, that the mechanical properties were sufficient, and that the reduction rate in the bending strength in case of water absorption was large.

TABLE 10

| | | | | Example 68 | Example 69 | Example 70 | Example 71 | Example 72 | Example 73 | Comparative Example 26 | Comparative Example 27 |
|---|---|---|---|---|---|---|---|---|---|---|---|
| Carbon fibers | | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio A/B1 | | (A) (% by mass) | 71 | 56 | 71 | 71 | 71 | 71 | 0 | 100 |
| | | | (B1) (% by mass) | 29 | 44 | 29 | 29 | 29 | 29 | 100 | 0 |
| | | | (A) (% by mass) | 50 | 50 | 50 | 50 | 50 | 50 | 0 | 100 |
| | | | (B) (% by mass) | 50 | 50 | 50 | 50 | 50 | 50 | 100 | 0 |
| | Epoxy equivalent (g/eq.) | | | 245 | 210 | 265 | 260 | 320 | 250 | 400 | 165 |
| | Sizing agent attached amount (% by mass) | | | 0.6 | 0.6 | 0.6 | 0.6 | 0.6 | 0.6 | 0.6 | 0.6 |
| Thermoplastic resin | | | | PA | PA | PA | PA | PA | PA | PA | PA |
| Evaluation item | Sizing agent-coated fibers | | Epoxy equivalent of sizing agent (g/eq.) | 475 | 350 | 430 | 420 | 530 | 400 | 710 | 240 |
| | | | Water content (% by mass) | 0.019 | 0.021 | 0.021 | 0.019 | 0.018 | 0.019 | 0.015 | 0.032 |
| | | | X-ray photoelectron spectrum of sizing agent surface (a)/(b) | 0.6 | 0.65 | 0.64 | 0.65 | 0.71 | 0.63 | 1.01 | 0.29 |
| | | | Eluted aliphatic epoxy | 0.13 | 0.13 | 0.13 | 0.13 | 0.13 | 0.13 | — | 0.33 |

TABLE 10-continued

|  |  | Example 68 | Example 69 | Example 70 | Example 71 | Example 72 | Example 73 | Comparative Example 26 | Comparative Example 27 |
|---|---|---|---|---|---|---|---|---|---|
| Carbon fiber-reinforced composite material | compound (A) (part by mass) |  |  |  |  |  |  |  |  |
|  | 90° bending strength (MPa) | 50 | 51 | 51 | 52 | 54 | 53 | 42 | 50 |
|  | Reduction in bending strength in water | OK | OK | OK | OK | OK | OK | OK | NG |

Example 74

In 50 mL of acetone, 2 g of the sizing agent-coated carbon fibers obtained in Example 42 were immersed and ultrasonic cleaning was applied to the sizing agent-coated carbon fibers for 30 minutes three times. Subsequently, the carbon fibers were immersed in 50 mL of methanol, and ultrasonic cleaning was applied for 30 minutes once, followed by drying carbon fibers. The attached amount of the sizing agent remaining after the cleaning was measured. The result was as shown in Table 11.

Subsequently, the surface of the sizing agent of the sizing agent-coated carbon fibers before cleaning and the surface of the sizing agent of the sizing agent-coated carbon fibers obtained after the cleaning were analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured. The ratio (I) of (a)/(b) of the surface of the sizing agent of the sizing agent-coated carbon fibers before cleaning and the ratio (II) of (a)/(b) of the surface of the sizing agent of the sizing agent-coated carbon fibers after cleaning were calculated. (I) and (II)/(I) are as shown in Table 11.

Examples 75 and 76

In a similar manner to Example 74, the sizing agent-coated carbon fibers obtained in Example 43 and Example 44 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 11.

Comparative Example 28

In a similar manner to Example 74, the sizing agent-coated carbon fibers obtained in Comparative Example 17 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 11. The result showed that (II)/(I) is large and thus the sizing agent had no gradient structure.

Comparative Example 29

In a similar manner to Example 74, the sizing agent-coated carbon fibers obtained in Comparative Example 18 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 11. The result showed that (II)/(I) is large and thus the sizing agent had no gradient structure.

Comparative Example 30

In a similar manner to Example 74, the sizing agent-coated carbon fibers obtained in Comparative Example 21 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 11. The result showed that (II)/(I) is small.

TABLE 11

|  |  | Example 74 | Example 75 | Example 76 | Comparative Example 28 | Comparative Example 29 | Comparative Example 30 |
|---|---|---|---|---|---|---|---|
| Sizing agent-coated carbon fibers |  | Example 42 | Example 43 | Example 44 | Comparative Example 17 | Comparative Example 18 | Comparative Example 21 |
|  | Sizing agent attached amount after washing sizing agent | 0.18 | 0.18 | 0.18 | 0.12 | 0.18 | 0.18 |
| XPS (400 eV) | (I) | 0.62 | 0.67 | 0.66 | 1.01 | 0.29 | 0.98 |
|  | (II)/(I) | 0.8 | 0.71 | 0.72 | 1 | 1 | 0.3 |

Example 77

Into a cylindrical filter paper, 10 g of the prepreg obtained in Example 56 was placed, and Soxhlet extraction was carried out using 300 mL of dichloromethane to elute the thermoplastic resin and the sizing agent. Thereafter, the solvent was dried by drying the eluted prepreg at 80° C. for 30 minutes. The remaining attached amount of the sizing agent to the carbon fibers was measured. The attached amount is as shown in Table 12.

The surface of the sizing agent of the sizing agent-coated carbon fibers obtained by washing was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The ratio (a)/(b) is as shown in Table 12.

Examples 78

The surface of the sizing agent of the sizing agent-coated carbon fibers obtained by using the prepreg obtained in Example 58 and washing in a similar manner to Example 77 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 12.

Example 79

Into a beaker, 10 g of the prepreg obtained in Example 68 was placed and ultrasonic cleaning was applied to the prepreg for 30 minutes three times with 250 mL of formic acid and final ultrasonic cleaning was applied to the prepreg for 30 minutes one time with 250 mL of methanol. Thereafter, the solvent was dried by drying the washed molding material at 80° C. for 30 minutes. The surface of the sizing agent of the sizing agent-coated carbon fibers obtained by washing was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 12.

Example 80

The surface of the sizing agent of the sizing agent-coated carbon fibers obtained by using the prepreg obtained in Example 70 and washing in a similar manner to Example 79 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 12.

Comparative Example 31

The surface of the sizing agent of the sizing agent-coated carbon fibers obtained by using the prepreg obtained in Comparative Example 22 and washing in a similar manner to Example 77 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are large values as shown in Table 12.

Comparative Example 32

The surface of the sizing agent of the sizing agent-coated carbon fibers obtained by using the prepreg obtained in Comparative Example 23 and washing in a similar manner to Example 77 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are small values as shown in Table 12.

Comparative Example 33

The surface of the sizing agent of the sizing agent-coated carbon fibers obtained by using the prepreg obtained in Comparative Example 26 and washing in a similar manner to Example 79 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are large values as shown in Table 12.

Comparative Example 34

The surface of the sizing agent of the sizing agent-coated carbon fibers obtained by using the prepreg obtained in Comparative Example 27 and washing in a similar manner to Example 79 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are small values as shown in Table 12.

TABLE 12

|  |  | Example 77 | Example 78 | Example 79 | Example 80 | Comparative Example 31 | Comparative Example 32 | Comparative Example 33 | Comparative Example 34 |
|---|---|---|---|---|---|---|---|---|---|
| Prepreg |  | Example 56 | Example 58 | Example 68 | Example 70 | Comparative Example 22 | Comparative Example 23 | Comparative Example 26 | Comparative Example 27 |
|  | Sizing agent attached amount | 0.18 | 0.18 | 0.18 | 0.18 | 0.12 | 0.18 | 0.12 | 0.18 |
| XPS (400 eV) | (a)/(b) | 0.50 | 0.48 | 0.50 | 0.48 | 1.01 | 0.29 | 1.01 | 0.29 |

In Example and Comparative Examples according to the third embodiment, the component (A) and the component (B1) of the sizing agent similar to those of the first embodiment were used and the matrix resins described below were used.

Matrix resin
Polyarylene sulfide (PPS) resin film: "Torelina (registered trademark)" M2888 (manufactured by Toray Industries Inc.) was modified to a film-like shape (an areal weight of 100 g/m$^2$)
Polyamide 6 (PA6) resin film: "Amilan (registered trademark)" CM1001 (manufactured by Toray Industries Inc.) was modified to a film-like shape (an areal weight of 100 g/m$^2$)
Vinyl ester (VE) resin film: A resin paste prepared by mixing 100 parts by mass of a vinyl ester rein (manufactured by Dow Chemical Co., Derakan 790), 1 part by mass of tert-butyl peroxybenzoate (manufactured by NOF Corporation, Perbutyl Z), 2 parts by mass of zinc stearate (manufactured by Sakai Chemical Industry Co., SZ-2000), and 4 parts by mass of magnesium oxide (manufactured by Kyowa Chemical Industry Co., MgO #40) was applied onto a release film made of polypropylene (an areal weight of 400 g/m$^2$). Polypropylene (PP) resin film (polyolefin resin): Unmodified PP resin pellets and acid-modified PP resin pellets were mixed and modified to a film-like shape (an areal weight of 100 g/m$^2$, unmodified PP resin pellets: "Prime Polypro (registered trademark)" J830HV (manufactured by Prime Polymer Co., Ltd.) 50 parts by mass, acid-modified PP resin pellets: "ADMER (registered trademark)" QE800 (manufactured by Mitsui Chemicals, Inc.) 50 parts by mass).

Example 81

The Example includes the following first to fourth processes.
First Process: Process for Manufacturing Carbon Fibers to be Raw Material
Carbon fibers A were obtained in a similar manner to Example 1 of the first embodiment. Thereafter, Carbon fibers A were cut into pieces having a length of 6 mm with a cartridge cutter.
Second Process: Process for Manufacturing Papermaking Web
Into a cylindrical container having a diameter of 500 mm, a dispersion liquid having a concentration of 0.1% by mass and made of water and a surfactant (manufactured by NACALAI TESQUE, INC., Polyoxyethylene lauryl ether (trade name)) was placed and Carbon fibers A cut in the previous process was charged so that the mass content of the fibers is 0.02%. After the mixture was stirred for 5 minutes, dewatering treatment was carried out to obtain a papermaking web (Form A). At this time, the areal weight was 67 g/m$^2$.
Third Process: Process for Applying Sizing Agent to Papermaking Web
After an aqueous dispersion emulsion containing 20 parts by mass of (B-2) as a component (B1), 20 parts by mass of a component (C), and 10 parts by mass of an emulsifier was prepared, 50 parts by mass of (A-1) was mixed as a component (A) to prepare a sizing liquid. As the component (C), a condensate (C-1) of 2 mol of an adduct of bisphenol A with 2 mol of EO, 1.5 mol of maleic acid, and 0.5 mol of sebacic acid was used. As the emulsifier, polyoxyethylene (70 mol) styrenated (5 mol) cumylphenol was used. Both of the component (C) and the emulsifier are aromatic compounds and also correspond to the component (B). The epoxy equivalent of the sizing agent except the solutions solvents in the sizing liquid is as shown in Table 13-1. Subsequently, the sizing liquid was sprayed over the papermaking web obtained in the previous process. Thereafter, excessive sizing liquid was sucked and then heat treatment was carried out at 210° C. for 180 seconds. The attached amount of the sizing agent was 0.6 parts by mass relative to 100 parts by mass of the carbon fibers. Subsequently, the epoxy equivalent of the sizing agent-coated carbon fibers, the water content of the sizing agent-coated carbon fibers, and the X-ray photoelectron spectrum of the surface of the sizing agent were measured. It was found that both of the epoxy equivalent of the sizing agent and the chemical composition of the surface of the sizing agent were as expected. The results are shown in Table 13-1.

Fourth Process: Process for Forming Composite of Papermaking Web and Thermoplastic Resin The papermaking web obtained in the previous process was sandwiched with the PPS resin films (a resin areal weight of 100 g/m$^2$) from upper and lower directions and the sandwiched papermaking web was heated and pressurized at 330° C. and 3.5 MPa. Thereafter, the sandwiched papermaking web was cooled to 60° C. and pressurized at 3.5 MPa to obtain a molding material of composite product of the papermaking web and the PPS resin. Further stacking, heating and pressurizing, and cooling and pressurizing were carried out so that the thickness of the molded article became 3 mm. The carbon fiber content of the obtained molded article was 25% by mass. The molded article was left in a constant temperature and humidity chamber adjusted at a temperature of 23° C. and 50% RH for 24 hours, and thereafter the molded article was used for property evaluation test. Subsequently, the obtained test specimens for property evaluation were evaluated in accordance with the above-described evaluation method of the molded article. The results are summarized in Table 13-1. The results showed that the bending strength was 446 MPa and thus the mechanical properties were sufficiently high.

Examples 82 to 90

First and Second Processes:

These processes were carried out in a similar manner to Example 81.

Third Process: Process for Applying Sizing Agent to Papermaking Web

The papermaking web to which the sizing agent is applied was obtained in a similar manner to Example 81 except that types and amounts of the component (A) and the component (B1) and amounts of the component (C-1) and other components were used as shown in Table 13-1. Each of the attached amounts of the sizing agent was 0.6 parts by mass to 100 parts by mass of the surface treated carbon fibers.

Fourth Process: Process for Forming Composite of Papermaking Web and Thermoplastic Resin Test specimens for property evaluation were molded in a similar manner to the method of Example 81. Subsequently, the obtained test specimens for property evaluation were evaluated in accordance with the above-described evaluation method of the molded article. The results are summarized in Table 13-1. The results showed that the bending strengths were 437 MPa to 448 MPa and thus the mechanical properties were sufficiently high.

Example 91

First and Second Processes:

These processes were carried out in a similar manner to Examples 81.

Third Process: Process for Applying Sizing Agent to Papermaking Web

The papermaking web to which the sizing agent is applied was obtained in a similar manner to Example 81 except that types and amounts of the component (A) and the component (B1) and amounts of the component (C-1) and other components were used as shown in Table 13-1 at the third process in Example 81. The attached amount of the sizing agent was 1.0 part by mass to 100 parts by mass of the surface treated carbon fibers.

Fourth Process: Process for Forming Composite of Papermaking Web and Thermoplastic Resin Test specimens for property evaluation were molded in a similar manner to the method of Example 81. Subsequently, the obtained test specimens for property evaluation were evaluated in accordance with the above-described evaluation method of the molded article. The results are summarized in Table 13-1. The results showed that the bending strength was 446 MPa and thus the mechanical properties were sufficiently high.

Example 92

First Process: Process for Manufacturing Carbon Fibers to be Raw Material

Carbon fibers B were obtained in a similar manner to the method of Example 12 in the first embodiment. The carbon fibers B obtained were cut into pieces having a length of 6 mm with a cartridge cutter.

Second Process: Process for Manufacturing Papermaking Web

This process was carried out in a similar manner to Example 81.

Third and Fourth Processes:

Test specimens for property evaluation were molded in a similar manner to the method of Example 81. Subsequently, the obtained test specimens for property evaluation were evaluated in accordance with the above-described evaluation method of the injection molded article. The results are summarized in Table 13-1. The result showed that the bending strength was in an acceptable level.

Example 93

First Process: Process for Manufacturing Carbon Fibers to be Raw Material

Carbon fibers C were obtained in a similar manner to the method of Example 13 in the first embodiment. Thereafter, Carbon fibers C were cut into pieces having a length of 6 mm with a cartridge cutter.

Second Process: Process for Manufacturing Papermaking Web

This process was carried out in a similar manner to Example 81.

Third and Fourth Processes:

Test specimens for property evaluation were molded in a similar manner to the method of Example 81. Subsequently, the obtained test specimens for property evaluation were evaluated in accordance with the above-described evaluation method of the injection molded article. The results are summarized in Table 13-1. The result showed that the bending strength was in an acceptable level.

Example 94

First Process: Process for Manufacturing Carbon Fibers to be Raw Material

This process was carried out in a similar manner to Example 81.

Second Process: Process for Attaching Sizing Agent to Carbon Fibers

The carbon fibers coated with the sizing agent were obtained in a similar manner to Example 1 except that the component (A) and the component (B1) were used as shown in Table 13-1 and were used as a dimethylformamide solution. Subsequently, the epoxy equivalent of the sizing agent, the water content of the sizing agent-coated carbon fibers, and the X-ray photoelectron spectrum of the surface of the sizing agent were measured. It was found that both of the epoxy equivalent of the sizing agent and the chemical composite of the surface of the sizing agent were as expected. The results are shown in Table 13-1.

Third and Fourth Processes:

Test specimens for property evaluation were molded in a similar manner to the method of Example 81. Subsequently, the obtained test specimens for property evaluation were evaluated in accordance with the above-described evaluation method of the injection molded article. The results are summarized in Table 13-1. The results showed that the bending strength was high.

Comparative Example 35

First and Second Processes:

These processes were carried out in a similar manner to Examples 81.

Third Process: Process for Applying Sizing Agent to Papermaking Web

The papermaking web to which the sizing agent was applied was obtained in a similar manner to Example 81 except that the component (A) was not used and types and amounts of the component (B1) and amounts of other components as shown in Table 13-2 were used. Each of the attached amounts of the sizing agent was 0.6 parts by mass to 100 parts by mass of the surface treated carbon fibers. Subsequently, the X-ray photoelectron spectrum of the surface of the sizing agent was measured. As shown in Table 13-2, the ratio was out of the range of the present invention.

Fourth Process: Process for Forming Composite of Papermaking Web and Thermoplastic Resin Test specimens for property evaluation were molded in a similar manner to the method of Example 81. Subsequently, the obtained test specimens for property evaluation were evaluated in accordance with the above-described evaluation method of the molded article. The results are summarized in Table 13-2. The results showed that the bending strength was 415 MPa and thus the mechanical properties were insufficient.

Comparative Example 36

First and Second Processes:

These processes were carried out in a similar manner to Example 81.

Third Process: Process for Applying Sizing Agent to Papermaking Web

The papermaking web to which the sizing agent was applied was obtained in a similar manner to Example 81 except that the component (B1) was not used and types and amounts of the component (A) as shown in Table 13-2 were used. Each of the attached amounts of the sizing agent was 0.6 parts by mass to 100 parts by mass of the surface treated carbon fibers. Subsequently, the X-ray photoelectron spectrum of the surface of the sizing agent was measured. As shown in Table 13-2, the ratio was out of the range of the present invention.

Fourth Process: Process for Forming Composite of Papermaking Web and Thermoplastic Resin Test specimens for property evaluation were molded in a similar manner to the method of Example 81. Subsequently, the obtained test specimens for property evaluation were evaluated in accordance with the above-described evaluation method of the molded article. The result showed that the bending strength was as shown in Table 13-2 and that the mechanical properties were slightly low.

Comparative Examples 37 and 38

First and Second Processes:

These processes were carried out in a similar manner to Example 81.

Third Process: Process for Applying Sizing Agent to Papermaking Web

The papermaking web to which the sizing agent was applied was obtained in a similar manner to Example 81 except that types and amounts of the component (A) and the component (B1) and amounts of the component (C-1) and other components as shown in Table 13-2 were used. Subsequently, the X-ray photoelectron spectrum of the surface of the sizing agent was measured. As shown in Table 13-2, the ratio was out of the range of the present invention.

Third and Fourth Processes:

Test specimens for property evaluation were molded in a similar manner to the method of Example 81. Subsequently, the obtained test specimens for property evaluation were evaluated in accordance with the above-described evaluation method of the molded article. The result showed that the bending strength was as shown in Table 13-2 and that the mechanical properties were insufficient.

Comparative Example 39

First and Second Processes:

These processes were carried out in a similar manner to Examples 81.

Third Process: Process for Applying Sizing Agent to Papermaking Web

An aqueous solution of (A-2) was prepared as the component (A) and spread to the papermaking web by the immersion method. Excessive aqueous solution was sucked and then heat treatment was carried out at 210° C. for 75 seconds to obtain the papermaking web to which the sizing agent was applied. The attached amount of the sizing agent was adjusted so as to be 0.30% by mass relative to the finally obtained sizing agent-coated carbon fibers (the sizing agent-coated papermaking web). Subsequently, an aqueous dispersion emulsion containing 20 parts by mass of (B-2) as a component (B1), 20 parts by mass of a component (C), and 10 parts by mass of an emulsifier was prepared. As the component (C), a condensate (C-1) of 2 mol of an adduct of bisphenol A with 2 mol of EO, 1.5 mol of maleic acid, and 0.5 mol of sebacic acid were used. As the emulsifier, polyoxyethylene (70 mol) styrenated (5 mol) cumylphenol was used. Both of the component (C) and the emulsifier are aromatic compounds and also correspond to the component (B). This sizing agent was applied to the papermaking web to which the component (A) was applied by the immersion method. Excessive aqueous solution was sucked and then heat treatment was carried out at 210° C. for 75 seconds to obtain the papermaking web to which the sizing agent was applied. The attached amount of the sizing agent was adjusted so as to be 0.30% by mass relative to the finally obtained sizing agent-coated carbon fibers (the sizing agent-coated papermaking web). The X-ray photoelectron spectrum of the surface of the sizing agent was measured. The ratio (a)/(b) where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent measured by X-ray photoelectron spectroscopy at a photoelectron takeoff angle of 15° is larger than 0.90 and the ratio was out of the range of the present invention.

Third and Fourth Processes:

Test specimens for property evaluation were molded in a similar manner to the method of Example 81. Subsequently, the obtained test specimens for property evaluation were evaluated in accordance with the above-described evaluation method of the molded article. The result showed that the bending strength was as shown in Table 13-2 and the mechanical properties were low.

TABLE 13-1

|  |  |  |  | Example 81 | Example 82 | Example 83 | Example 84 | Example 85 | Example 86 | Example 87 | Example 88 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  | 25 |  |  |  |  |
|  |  | A-2 | EX-521 |  | 50 | 50 | 25 | 50 | 50 | 50 | 50 |
|  |  | Total |  | 50 | 50 | 50 | 50 | 50 | 50 | 50 | 50 |
|  | (B1) | B-1 | jER152 |  |  |  |  | 20 |  |  |  |
|  |  | B-2 | jER828 | 20 | 40 | 20 | 20 |  |  |  | 10 |
|  |  | B-3 | jER1001 |  |  |  |  |  | 20 |  | 10 |
|  |  | B-4 | jER807 |  |  |  |  |  |  | 20 |  |
|  |  | Total |  | 20 | 40 | 20 | 20 | 20 | 20 | 20 | 20 |
|  | (C) | C-1 | Aromatic polyester | 20 |  | 20 | 20 | 20 | 20 | 20 | 20 |
|  | Other | — | Emulsifier (nonionic surfactant) | 10 | 10 | 10 | 10 | 10 | 10 | 10 | 10 |
|  | Ratio | A/B1 | (A) (% by mass) | 71 | 56 | 71 | 71 | 71 | 71 | 71 | 71 |
|  |  |  | (B1) (% by mass) | 29 | 44 | 29 | 29 | 29 | 29 | 29 | 29 |
|  |  |  | (A) (% by mass) | 50 | 50 | 50 | 50 | 50 | 50 | 50 | 50 |
|  |  |  | (B) (% by mass) | 50 | 50 | 50 | 50 | 50 | 50 | 50 | 50 |
|  |  | Epoxy equivalent (g/eq.) |  | 245 | 210 | 265 | 255 | 260 | 320 | 250 | 290 |
|  |  | Sizing agent attached amount (% by mass) |  | 0.6 | 0.6 | 0.6 | 0.6 | 0.6 | 0.6 | 0.6 | 0.6 |
| Matrix resin |  |  |  | PPS Form A | PPS Form A | PPS Form A | PPS Form A | PPS Form A | PPS Form A | PPS Form A | PPS Form A |
| Evaluation item | Sizing agent-coated fibers | Epoxy equivalent of sizing agent (g/eq.) |  | 480 | 355 | 435 | 455 | 425 | 530 | 405 | 475 |
|  |  | Water content (% by mass) |  | 0.019 | 0.021 | 0.021 | 0.020 | 0.019 | 0.018 | 0.019 | 0.019 |
|  |  | X-ray photoelectron spectrum of sizing agent surface (a)/(b) |  | 0.59 | 0.64 | 0.63 | 0.61 | 0.64 | 0.7 | 0.62 | 0.66 |
|  |  | Eluted aliphatic epoxy compound (A) (part by mass) |  | 0.13 | 0.13 | 0.13 | 0.13 | 0.13 | 0.13 | 0.13 | 0.13 |
|  | Carbon fiber-reinforced composite material | Bending strength (MPa) |  | 446 | 448 | 447 | 445 | 446 | 437 | 447 | 446 |

|  |  |  |  | Example 89 | Example 90 | Example 91 | Example 92 | Example 93 | Example 94 |
|---|---|---|---|---|---|---|---|---|---|
| Carbon fibers |  |  |  | A | A | A | B | C | A |
| Sizing agent | (A) | A-1 | EX-611 |  |  |  |  |  |  |
|  |  | A-2 | EX-521 | 40 | 65 | 50 | 50 | 50 | 55 |
|  |  | Total |  | 40 | 65 | 50 | 50 | 50 | 55 |
|  | (B1) | B-1 | jER152 |  |  |  |  |  |  |
|  |  | B-2 | jER828 | 25 | 17 | 20 | 20 | 20 | 45 |
|  |  | B-3 | jER1001 |  |  |  |  |  |  |
|  |  | B-4 | jER807 |  |  |  |  |  |  |
|  |  | Total |  | 25 | 17 | 20 | 20 | 20 | 45 |
|  | (C) | C-1 | Aromatic polyester | 25 | 8 | 20 | 20 | 20 |  |

TABLE 13-1-continued

|  |  |  |  |  |  |  |  |  |
|---|---|---|---|---|---|---|---|---|
|  | Other | — | Emulsifier (nonionic surfactant) | 10 | 10 | 10 | 10 | 10 |  |
|  | Ratio A/B1 |  | (A) (% by mass) | 62 | 79 | 71 | 71 | 71 | 55 |
|  |  |  | (B1) (% by mass) | 38 | 21 | 29 | 29 | 29 | 45 |
|  |  |  | (A) (% by mass) | 40 | 65 | 50 | 50 | 50 | 55 |
|  |  |  | (B) (% by mass) | 60 | 35 | 50 | 50 | 50 | 45 |
|  | Epoxy equivalent (g/eq.) |  |  | 285 | 225 | 265 | 265 | 265 | 185 |
|  | Sizing agent attached amount (% by mass) |  |  | 0.6 | 0.6 | 1 | 0.6 | 0.6 | 0.6 |
| Matrix resin |  |  |  | PPS | PPS | PPS | PPS | PPS | PPS |
| Form |  |  |  | Form A | Form A | Form A | Form A | Form A | Form A |
| Evaluation item | Sizing agent-coated fibers | Epoxy equivalent of sizing agent (g/eq.) |  | 510 | 355 | 435 | 435 | 435 | 280 |
|  |  | Water content (% by mass) |  | 0.018 | 0.022 | 0.022 | 0.020 | 0.021 | 0.021 |
|  |  | X-ray photoelectron spectrum of sizing agent surface (a)/(b) |  | 0.76 | 0.51 | 0.62 | 0.62 | 0.62 | 0.62 |
|  |  | Eluted aliphatic epoxy compound (A) (part by mass) |  | 0.08 | 0.16 | 0.26 | 0.12 | 0.13 | 0.14 |
|  | Carbon fiber-reinforced composite material | Bending strength (MPa) |  | 445 | 445 | 446 | 434 | 434 | 446 |

TABLE 13-2

|  |  |  |  | Comparative Example 35 | Comparative Example 36 | Comparative Example 37 | Comparative Example 38 | Comparative Example 39 |
|---|---|---|---|---|---|---|---|---|
| Carbon fibers |  |  |  | A | A | A | A | A |
| Sizing agent | (A) | A-1 | EX-611 |  | 100 | 30 | 75 |  |
|  |  | A-2 | EX-521 |  |  |  |  | 50 |
|  |  | Total |  |  | 100 | 30 | 75 | 50 |
|  | (B1) | B-1 | jER152 |  |  |  |  |  |
|  |  | B-2 | jER828 | 20 |  | 30 | 10 | 20 |
|  |  | B-3 | jER1001 | 70 |  |  |  |  |
|  |  | B-4 | jER807 |  |  |  |  |  |
|  |  | Total |  | 90 |  | 30 | 10 | 20 |
|  | (C) | C-1 | Aromatic polyester |  |  | 30 | 10 | 20 |
|  | Other | — | Emulsifier (nonionic surfactant) | 10 |  | 10 | 5 | 10 |
|  | Ratio A/B1 |  | (A) (% by mass) | 0 | 100 | 50 | 88 | 71 |
|  |  |  | (B1) (% by mass) | 100 | 0 | 50 | 12 | 29 |
|  |  |  | (A) (% by mass) | 0 | 100 | 30 | 75 | 50 |
|  |  |  | (B) (% by mass) | 100 | 0 | 70 | 25 | 50 |
|  | Epoxy equivalent (g/eq.) |  |  | 400 | 165 | 300 | 200 | 185/420 |
|  | Sizing agent attached amount (% by mass) |  |  | 0.6 | 0.6 | 0.6 | 0.6 | 0.3/0.3 |
| Matrix resin |  |  |  | PPS | PPS | PPS | PPS | PPS |
| Form |  |  |  | Form A | Form A | Form A | Form A | Form A |
| Evaluation item | Sizing agent-coated | Epoxy equivalent of sizing |  | 710 | 245 | 510 | 335 | 550 |

TABLE 13-2-continued

|  |  | Comparative Example 35 | Comparative Example 36 | Comparative Example 37 | Comparative Example 38 | Comparative Example 39 |
|---|---|---|---|---|---|---|
| fibers | agent (g/eq.) |  |  |  |  |  |
|  | Water content (% by mass) | 0.015 | 0.032 | 0.019 | 0.025 | 0.021 |
|  | X-ray photoelectron spectrum of sizing agent surface (a)/(b) | 1.01 | 0.29 | 0.91 | 0.48 | 0.98 |
|  | Eluted aliphatic epoxy compound (A) (part by mass) | — | 0.33 | 0.04 | 0.22 | 0.12 |
| Carbon fiber-reinforced composite material | Bending strength (MPa) | 415 | 424 | 420 | 422 | 423 |

Example 95

First Process: Process for Manufacturing Carbon Fibers to be Raw Material

This process was carried out in a similar manner to Example 81.

Second Process: Process for Manufacturing Papermaking Web

Into a cylindrical container having a diameter of 500 mm, a dispersion liquid having a concentration of 0.1% by mass and made of water and a surfactant (manufactured by NACALAI TESQUE, INC., Polyoxyethylene lauryl ether (trade name)) was placed and Carbon fibers A cut in the previous process was charged so that the mass content of the fibers is 0.02%. After the mixture was stirred for 5 minutes, dewatering treatment was carried out to obtain a papermaking web. At this time, the areal weight was 103 g/m².

Third Process: Process for Applying Sizing Agent to Papermaking Web

This process was carried out in a similar manner to Example 81.

Fourth Process: Process for Forming Composite of Papermaking Web and Thermoplastic Resin The papermaking web obtained in the previous process was sandwiched with the PP resin films (a resin areal weight of 100 g/m²) from upper and lower directions and the sandwiched papermaking web was heated and pressurized at 240° C. and 3.5 MPa. Thereafter, the sandwiched papermaking web was cooled to 60° C. and pressurized at 3.5 MPa to obtain a molding material of composite product of the papermaking web and the PP resin. Further stacking, heating and pressurizing, and cooling and pressurizing were carried out so that the thickness of the molded article became 3 mm. The carbon fiber content of the obtained molded article was 34% by mass. The molded article was left in a constant temperature and humidity chamber adjusted at a temperature of 23° C. and 50% RH for 24 hours, and thereafter the molded article was used for property evaluation test. Subsequently, the obtained test specimens for property evaluation were evaluated in accordance with the above-described evaluation method of the molded article.

The results are summarized in Table 14. The results showed that the bending strength was 314 MPa and thus the mechanical properties were sufficiently high.

Examples 96 to 100

First and Second Processes:

These processes were carried out in a similar manner to Example 81.

Third Process: Process for Applying Sizing Agent to Papermaking Web

The papermaking web to which the sizing agent was applied was obtained in a similar manner to Example 95 except that types of the component (A) and the component (B1) as shown in Table 14 were used. Each of the attached amounts of the sizing agent was 0.6 parts by mass to 100 parts by mass of the surface treated carbon fibers.

Fourth Process: Process for Forming Composite of Papermaking Web and Thermoplastic Resin Test specimens for property evaluation were molded in a similar manner to the method of Example 95. Subsequently, the obtained test specimens for property evaluation were evaluated in accordance with the above-described evaluation method of the molded article. The results are summarized in Table 14. The results showed that the bending strengths were 306 MPa to 318 MPa and thus the mechanical properties were sufficiently high.

Comparative Example 40

First and Second Processes:

These processes were carried out in a similar manner to Example 81.

Third Process: Process for Applying Sizing Agent to Papermaking Web

This process was carried out in a similar manner to Comparative Example 35.

Fourth Process: Process for Forming Composite of Papermaking Web and Thermoplastic Resin Test specimens for property evaluation were molded in a similar manner to the method of Example 95. Subsequently, the obtained test specimens for property evaluation were evaluated in accordance with the above-described evaluation method of the molded article. The result showed that the bending strength was as shown in Table 14 and that the mechanical properties were insufficient.

Comparative Example 41

First and Second Processes:
These processes were carried out in a similar manner to Example 81.
Third Process: Process for Applying Sizing Agent to Papermaking Web This process was carried out in a similar manner to Comparative Example 36.

Fourth Process: Process for Forming Composite of Papermaking Web and Thermoplastic Resin Test specimens for property evaluation were molded in a similar manner to the method of Example 95. Subsequently, the obtained test specimens for property evaluation were evaluated in accordance with the above-described evaluation method of the molded article. The result showed that the bending strength was as shown in Table 14 and that the mechanical properties were slightly low.

TABLE 14

|  |  |  |  | Example 95 | Example 96 | Example 97 | Example 98 | Example 99 | Example 100 | Comparative Example 40 | Comparative Example 41 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  |  |  |  |  | 100 |
|  |  | A-2 | EX-521 |  | 50 | 50 | 50 | 50 | 50 |  |  |
|  |  | Total |  | 50 | 50 | 50 | 50 | 50 | 50 |  | 100 |
|  | (B1) | B-1 | jER152 |  |  |  |  | 20 |  |  |  |
|  |  | B-2 | jER828 | 20 | 40 | 20 |  |  |  | 20 |  |
|  |  | B-3 | jER1001 |  |  |  | 20 |  |  | 70 |  |
|  |  | B-4 | jER807 |  |  |  |  |  | 20 |  |  |
|  |  | Total |  | 20 | 40 | 20 | 20 | 20 | 20 | 90 |  |
|  | (C) | C-1 | Aromatic polyester | 20 |  | 20 | 20 | 20 | 20 |  |  |
|  | Other | — | Emulsifier (nonionic surfactant) | 10 | 10 | 10 | 10 | 10 | 10 | 10 |  |
|  | Ratio A/B1 |  | (A) (% by mass) | 71 | 56 | 71 | 71 | 71 | 71 | 0 | 100 |
|  |  |  | (B1) (% by mass) | 29 | 44 | 29 | 29 | 29 | 29 | 100 | 0 |
|  |  |  | (A) (% by mass) | 50 | 50 | 50 | 50 | 50 | 50 | 0 | 100 |
|  |  |  | (B) (% by mass) | 50 | 50 | 50 | 50 | 50 | 50 | 100 | 0 |
|  |  |  | Epoxy equivalent (g/eq.) | 245 | 210 | 265 | 260 | 320 | 250 | 400 | 165 |
|  |  |  | Sizing agent attached amount (% by mass) | 0.6 | 0.6 | 0.6 | 0.6 | 0.6 | 0.6 | 0.6 | 0.6 |
| Matrix resin |  |  |  | PP | PP | PP | PP | PP | PP | PP | PP |
| Form |  |  |  | Form A | Form A | Form A | Form A | Form A | Form A | Form A | Form A |
| Evaluation item | Sizing agent-coated fibers | Epoxy equivalent of sizing agent (g/eq.) |  | 480 | 355 | 435 | 425 | 530 | 405 | 710 | 245 |
|  |  | Water content (% by mass) |  | 0.019 | 0.021 | 0.021 | 0.019 | 0.018 | 0.019 | 0.015 | 0.032 |
|  |  | X-ray photoelectron spectrum of sizing agent surface (a)/(b) |  | 0.59 | 0.64 | 0.63 | 0.64 | 0.7 | 0.62 | 1.01 | 0.29 |
|  |  | Eluted aliphatic epoxy compound (A) (part by mass) |  | 0.13 | 0.13 | 0.13 | 0.13 | 0.13 | 0.13 | — | 0.33 |
|  | Carbon fiber-reinforced composite material | Bending strength (MPa) |  | 314 | 318 | 317 | 314 | 306 | 313 | 292 | 295 |

Example 101

First Process: Process for Manufacturing Carbon Fibers to be Raw Material

This process was carried out in a similar manner to Example 81.

Second Process: Process for Manufacturing Papermaking Web

Into a cylindrical container having a diameter of 500 mm, a dispersion liquid having a concentration of 0.1% by mass and made of water and a surfactant (manufactured by NACALAI TESQUE, INC., Polyoxyethylene lauryl ether (trade name)) was placed and Carbon fibers A cut in the previous process was charged so that the mass content of the fibers is 0.02% by mass. After the mixture was stirred for 5 minutes, dewatering treatment was carried out to obtain a papermaking web (Form A). At this time, the areal weight was 82 g/m².

Third Process: Process for Applying Sizing Agent to Papermaking Web

This process was carried out in a similar manner to Example 81.

Fourth Process: Process for Forming Composite of Papermaking Web and Thermoplastic Resin The papermaking web obtained in the previous process was sandwiched with the PA6 resin films (a resin areal weight of 100 g/m²) from upper and lower directions and the sandwiched papermaking web was heated and pressurized at 300° C. and 3.5 MPa. Thereafter, the sandwiched papermaking web was cooled to 60° C. and pressurized at 3.5 MPa to obtain a molding material of composite product of the papermaking web and the PA6 resin. Further stacking, heating and pressurizing, and cooling and pressurizing were carried out so that the thickness of the molded article became 3 mm. The carbon fiber content of the obtained molded article was 29% by mass. The molded article was left in a constant temperature and humidity chamber adjusted at a temperature of 23° C. and 50% RH for 24 hours, and thereafter the molded article was used for property evaluation test. Subsequently, the obtained test specimens for property evaluation were evaluated in accordance with the above-described evaluation method of the molded article. The results are summarized in Table 15. The results showed that the bending strength was 440 MPa and thus the mechanical properties were sufficiently high.

It is also showed that the reduction rate in the bending strength in case of water absorption was small.

Examples 102 to 106

First and Second Processes:

These processes were carried out in a similar manner to Example 81.

Third Process: Process for Applying Sizing Agent to Papermaking Web

The papermaking web to which the sizing agent was applied was obtained in a similar manner to Example 101 except that types of the component (A) and the component (B1) as shown in Table 15 were used. Each of the attached amounts of the sizing agent was 0.6 parts by mass to 100 parts by mass of the surface treated carbon fibers.

Fourth Process: Process for Forming Composite of Papermaking Web and Thermoplastic Resin Test specimens for property evaluation were molded in a similar manner to the method of Example 101. Subsequently, the obtained test specimens for property evaluation were evaluated in accordance with the above-described evaluation method of the molded article. The results are summarized in Table 15. The results showed that the bending strengths were 443 MPa to 446 MPa and thus the mechanical properties were sufficiently high. It is also showed that the reduction rate in the bending strength in case of water absorption was small.

Comparative Example 42

First and Second Processes:

These processes were carried out in a similar manner to Example 81.

Third Process: Process for Applying Sizing Agent to Papermaking Web

This process was carried out in a similar manner to Comparative Example 35.

Fourth Process: Process for Forming Composite of Papermaking Web and Thermoplastic Resin Test specimens for property evaluation were molded in a similar manner to the method of Example 101. Subsequently, the obtained test specimens for property evaluation were evaluated in accordance with the above-described evaluation method of the molded article. The results showed that the reduction rate in the bending strength in case of water absorption was small but the bending strength was insufficient.

Comparative Example 43

First and Second Processes:

These processes were carried out in a similar manner to Example 81.

Third Process: Process for Applying Sizing Agent to Papermaking Web

This process was carried out in a similar manner to Comparative Example 36.

Fourth Process: Process for Forming Composite of Papermaking Web and Thermoplastic Resin Test specimens for property evaluation were molded in a similar manner to the method of Example 101. Subsequently, the obtained test specimens for property evaluation were evaluated in accordance with the above-described evaluation method of the molded article. The result showed that the bending strength was high but the reduction rate in the bending strength in case of water absorption was large.

TABLE 15

|  |  |  |  | Example 101 | Example 102 | Example 103 | Example 104 | Example 105 | Example 106 | Comparative Example 42 | Comparative Example 43 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  |  |  |  |  | 100 |
|  |  | A-2 | EX-521 |  | 50 | 50 | 50 | 50 | 50 |  |  |
|  | Total |  |  | 50 | 50 | 50 | 50 | 50 | 50 |  | 100 |

TABLE 15-continued

| | | | | Example 101 | Example 102 | Example 103 | Example 104 | Example 105 | Example 106 | Comparative Example 42 | Comparative Example 43 |
|---|---|---|---|---|---|---|---|---|---|---|---|
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio | A/B1 | (A) (% by mass) | 71 | 56 | 71 | 71 | 71 | 71 | 0 | 100 |
| | | | (B1) (% by mass) | 29 | 44 | 29 | 29 | 29 | 29 | 100 | 0 |
| | | | (A) (% by mass) | 50 | 50 | 50 | 50 | 50 | 50 | 0 | 100 |
| | | | (B) (% by mass) | 50 | 50 | 50 | 50 | 50 | 50 | 100 | 0 |
| | Epoxy equivalent (g/eq.) | | | 245 | 210 | 265 | 260 | 320 | 250 | 400 | 165 |
| | Sizing agent attached amount (% by mass) | | | 0.6 | 0.6 | 0.6 | 0.6 | 0.6 | 0.6 | 0.6 | 0.6 |
| Matrix resin | | | | PA | PA | PA | PA | PA | PA | PA | PA |
| Form | | | | Form A | Form A | Form A | Form A | Form A | Form A | Form A | Form A |
| Evaluation item | Sizing agent-coated fibers | | Epoxy equivalent of sizing agent (g/eq.) | 480 | 355 | 435 | 425 | 530 | 405 | 710 | 245 |
| | | | Water content (% by mass) | 0.019 | 0.021 | 0.021 | 0.019 | 0.018 | 0.019 | 0.015 | 0.032 |
| | | | X-ray photoelectron spectrum of sizing agent surface (a)/(b) | 0.59 | 0.64 | 0.63 | 0.64 | 0.7 | 0.62 | 1.01 | 0.29 |
| | | | Eluted aliphatic epoxy compound (A) (part by mass) | 0.13 | 0.13 | 0.13 | 0.13 | 0.13 | 0.13 | — | 0.33 |
| | Carbon fiber-reinforced composite material | | Bending strength (MPa) | 440 | 444 | 443 | 446 | 444 | 443 | 429 | 440 |
| | | | Reduction in bending strength in water | OK | OK | OK | OK | OK | OK | OK | NG |

Example 107

First Process: Process for Manufacturing Carbon Fibers to be Raw Material

Carbon fibers A were obtained in a similar manner to Example 1 of the first embodiment.

Second Process: Process for Attaching Sizing Agent to Carbon Fibers

After an aqueous dispersion emulsion containing 20 parts by mass of (B-2) as a component (B1), 20 parts by mass of a component (C), and 10 parts by mass of polyoxyethylene (70 mol) styrenated (5 mol) cumylphenol was prepared, 50 parts by mass of (A-1) was mixed as a component (A) to prepare a sizing liquid. The epoxy equivalent of the sizing agent except the solvents in the sizing liquid is as shown in Table 16. The sizing agent was applied onto the surface-treated carbon fibers by the immersion method. Thereafter, heat treatment at a temperature of 210° C. for 75 seconds was applied to the carbon fibers to obtain the carbon fibers coated with the sizing agent. The attached amount of the sizing agent was adjusted so as to be 0.6% by mass relative to the carbon fibers coated with the sizing agent. Subsequently, the epoxy equivalent of the sizing agent applied to the carbon fibers, the water content of the sizing agent-coated carbon fibers, the X-ray photoelectron spectrum of the sizing agent surface, and the eluted aliphatic epoxy compound were measured. The results are summarized in Table 16. From the results of Table 16, it was ascertained that both of the epoxy equivalent of the sizing agent and the chemical composition of the surface of the sizing agent were as expected.

Third Process: Process for Cutting Sizing Agent-Coated Carbon Fibers

The sizing agent-coated carbon fibers obtained in the second process were cut into pieces having a length of 6 mm with a cartridge cutter.

Fourth Process: Process for Forming Composite with Thermoplastic Resin

The sizing agent-coated carbon fibers (an areal weight of 86 g/m²) cut in the previous process were randomly placed on the PPS resin film and the sizing agent-coated carbon fibers were sandwiched with another PPS resin film from the upper direction and the sandwiched sizing agent-coated carbon fibers were heated and pressurized at 330° C. and 5.0 MPa. Thereafter, the sizing agent-coated carbon fibers were cooled to 60° C. and pressurized at 5.0 MPa to obtain a sheet-like molding material (Form B) of a composite product of the cut sizing agent-coated carbon fibers and the PPS resin. Further stacking, heating and pressurizing, and cooling and pressurizing were carried out so that the thickness of the molded article became 3 mm. The carbon fiber content of the obtained molded article was 30% by mass. The molded article was left in a constant temperature and humidity chamber adjusted at a temperature of 23° C. and 50% RH for 24 hours, and thereafter the molded article was used for property evaluation test. Subsequently, the obtained test specimens for property evaluation were evaluated in accordance with the above-described evaluation method of the molded article. The results are summarized in Table 16. The results showed that the bending strength was 276 MPa and thus the mechanical properties were sufficiently high.

Examples 108 to 112

First Process: Process for Manufacturing Carbon Fibers to be Raw Material

This process was carried out in a similar manner to Example 107.

Second Process: Process for Attaching Sizing Agent to Carbon Fibers

In the second process of Example 107, the sizing agent-coated carbon fibers in which the carbon fibers are coated with the sizing agent were obtained in a similar manner to Example 107 except that types of the component (A) and the component (B1) were used as shown in Table 16. Each of the attached amounts of the sizing agent was 0.6 parts by mass to 100 parts by mass of the carbon fibers.

Third Process: Process for Cutting Sizing Agent-Coated Carbon Fibers

This process was carried out in a similar manner to Example 107.

Fourth Process: Process for Forming Composite with Thermoplastic Resin

Test specimens for property evaluation were molded in a similar manner to the method of Example 107. Subsequently, the obtained test specimens for property evaluation were evaluated in accordance with the above-described evaluation method of the molded article. The results are summarized in Table 16. The results showed that the bending strengths were 269 MPa to 283 MPa and thus the mechanical properties were sufficiently high.

Comparative Example 44

First Process: Process for Manufacturing Carbon Fibers to be Raw Material

Carbon fibers A were obtained in a similar manner to Example 11 of the first embodiment.

Second Process: Process for Attaching Sizing Agent to Carbon Fibers

The sizing agent-coated carbon fibers were obtained in a similar manner to Example 107 except that the component (A) was not used and types and amounts of the component (B1) and amounts of other components as shown in Table 16 were used. Each of the attached amounts of the sizing agent was 0.6 parts by mass to 100 parts by mass of the surface treated carbon fibers. Subsequently, the X-ray photoelectron spectrum of the surface of the sizing agent was measured. As shown in Table 16, the ratio was out of the range of the present invention.

Third and Fourth Processes:

Test specimens for property evaluation were molded in a similar manner to the method of Example 107. Subsequently, the obtained test specimens for property evaluation were evaluated in accordance with the above-described evaluation method of the injection molded article. The result showed that the bending strength was as shown in Table 16 and that the mechanical properties were insufficient.

Comparative Example 45

First Process: Process for Manufacturing Carbon Fibers to be Raw Material

This process was carried out in a similar manner to Example 107.

Second Process: Process for Attaching Sizing Agent to Carbon Fibers

The sizing agent-coated carbon fibers were obtained in a similar manner to Example 107 except that the component (B1) was not used and types and amounts of the component (A) were used as shown in Table 16. Each of the attached amounts of the sizing agent was 0.6 parts by mass to 100 parts by mass of the surface treated carbon fibers. Subsequently, the X-ray photoelectron spectrum of the surface of the sizing agent was measured. As shown in Table 16, the ratio was out of the range of the present invention.

Third and Fourth Processes:

Test specimens for property evaluation were molded in a similar manner to the method of Example 107. Subsequently, the obtained test specimens for property evaluation were evaluated in accordance with the above-described evaluation method of the molded article. The result showed that the bending strength was as shown in Table 16 and that the mechanical properties were slightly low.

TABLE 16

| | | | | Example 107 | Example 108 | Example 109 | Example 110 | Example 111 | Example 112 | Comparative Example 44 | Comparative Example 45 |
|---|---|---|---|---|---|---|---|---|---|---|---|
| Carbon fibers | | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |

TABLE 16-continued

|  |  |  |  | Example 107 | Example 108 | Example 109 | Example 110 | Example 111 | Example 112 | Comparative Example 44 | Comparative Example 45 |
|---|---|---|---|---|---|---|---|---|---|---|---|
|  |  | B-3 | jER1001 |  |  |  |  | 20 |  | 70 |  |
|  |  | B-4 | jER807 |  |  |  |  |  | 20 |  |  |
|  |  | Total |  | 20 | 40 | 20 | 20 | 20 | 20 | 90 |  |
|  | (C) | C-1 | Aromatic polyester | 20 |  | 20 | 20 | 20 | 20 |  |  |
|  | Other | — | Emulsifier (nonionic surfactant) | 10 | 10 | 10 | 10 | 10 | 10 | 10 |  |
|  | Ratio | A/B1 | (A) (% by mass) | 71 | 56 | 71 | 71 | 71 | 71 | 0 | 100 |
|  |  |  | (B1) (% by mass) | 29 | 44 | 29 | 29 | 29 | 29 | 100 | 0 |
|  |  | (A) (% by mass) |  | 50 | 50 | 50 | 50 | 50 | 50 | 0 | 100 |
|  |  | (B) (% by mass) |  | 50 | 50 | 50 | 50 | 50 | 50 | 100 | 0 |
|  | Epoxy equivalent (g/eq.) |  |  | 245 | 210 | 265 | 260 | 320 | 250 | 400 | 165 |
|  | Sizing agent attached amount (% by mass) |  |  | 0.6 | 0.6 | 0.6 | 0.6 | 0.6 | 0.6 | 0.6 | 0.6 |
| Matrix resin |  |  |  | PPS | PPS | PPS | PPS | PPS | PPS | PPS | PPS |
| Form |  |  |  | Form B | Form B | Form B | Form B | Form B | Form B | Form B | Form B |
| Evaluation item | Sizing agent-coated fibers | Epoxy equivalent of sizing agent (g/eq.) |  | 475 | 350 | 430 | 420 | 530 | 400 | 710 | 240 |
|  |  | Water content (% by mass) |  | 0.019 | 0.021 | 0.021 | 0.019 | 0.018 | 0.019 | 0.015 | 0.032 |
|  |  | X-ray photoelectron spectrum of sizing agent surface (a)/(b) |  | 0.6 | 0.65 | 0.64 | 0.65 | 0.71 | 0.63 | 1.01 | 0.29 |
|  |  | Eluted aliphatic epoxy compound (A) (part by mass) |  | 0.13 | 0.13 | 0.13 | 0.13 | 0.13 | 0.13 | — | 0.33 |
|  | Carbon fiber-reinforced composite material | Bending strength (MPa) |  | 276 | 283 | 282 | 276 | 269 | 280 | 250 | 258 |

Example 113

First Process: Process for Manufacturing Carbon Fibers to be Raw Material

This process was carried out in a similar manner to Example 107.

Second Process: Process for Attaching Sizing Agent to Carbon Fibers

This process was carried out in a similar manner to Example 107.

Third Process: Process for Cutting Sizing Agent-Coated Carbon Fibers

The sizing agent-coated carbon fibers obtained in the second process were cut into pieces having a length of 6 mm with a cartridge cutter.

Fourth Process: Process for Forming Composite with Thermoplastic Resin

A resin paste was prepared by using 100 parts by mass of a vinyl ester resin (VE, manufactured by Dow Chemical Co., Derakan 790) as a matrix resin, 1 part by mass of tert-butyl peroxybenzoate (manufactured by NOF Corporation, Perbutyl Z) as a hardening agent, 2 parts by mass of zinc stearate (manufactured by Sakai Chemical Industry Co., SZ-2000) as an internal mold release agent, and 4 parts by mass of magnesium oxide (manufactured by Kyowa Chemical Industry Co., MgO #40) as a thickener and by sufficiently mixing and stirring them. The resin paste was applied to a release film made of polypropylene using a doctor blade so that a weight per unit area is 400 g/m². From the upper direction, the bundle-like sizing agent-coated carbon fibers cut in the previous process were dropped and spread uniformly. This polypropylene film and another polypropylene film coated with the resin paste having a weight per unit area of 400 g/m² were overlapped so that the resin pastes on the films were placed inside. The content of the carbon fibers relative to a SMC sheet was set to 50% by mass. By leaving the obtained sheet at 40° C. for 24 hours, the viscosity of the resin paste was sufficiently increased to obtain a sheet-like molding material (Form B).

The sheet-like molding material obtained in the previous process was charged in a mold so that a charge ratio (the ratio of area of the sheet-like molding material to a mold area when the mold is seen from above) is 50% and was hardened under pressure at 588.4 kPa and under conditions of 150° C. for 5 minutes using a heating press molding machine to obtain a planar molded article having a size of 30 cm×30 cm×3 mm. Subsequently, the obtained test specimens for property evaluation were evaluated in accordance with the above-described evaluation method of the molded article. The carbon fiber content of the obtained molded article was 50% by mass. The molded article was left in a constant temperature and humidity chamber adjusted at a temperature of 23° C. and 50% RH for 24 hours, and thereafter the molded article was used for property evaluation test. Subsequently, the obtained test specimens for property evaluation were evaluated in accordance with the above-described evaluation method of the molded article. The results are summarized in Table 17. The results showed that the bending strength was 480 MPa and thus the mechanical properties were sufficiently high.

Examples 114 to 118

First Process: Process for Manufacturing Carbon Fibers to be Raw Material

This process was carried out in a similar manner to Example 107.

Second Process: Process for Attaching Sizing Agent to Carbon Fibers

In the second process of Example 113, the sizing agent-coated carbon fibers were obtained in a similar manner to Example 113 except that the component (A) and the component (B) were changed as shown in Table 17. Each of the attached amounts of the sizing agent was 0.6 parts by mass to 100 parts by mass of the surface treated carbon fibers.

Third and Fourth Processes:

Test specimens for property evaluation were molded in a similar manner to the method of Example 113. Subsequently, the obtained test specimens for property evaluation were evaluated in accordance with the above-described evaluation method of the molded article. The results are summarized in Table 17. The results showed that the bending strengths were 473 MPa to 482 MPa and thus the mechanical properties were sufficiently high.

Comparative Example 46

First Process: Process for Manufacturing Carbon Fibers to be Raw Material

This process was carried out in a similar manner to Example 107.

Second Process: Process for Attaching Sizing Agent to Carbon Fibers

This process was carried out in a similar manner to Comparative Example 44.

Third and Fourth Processes:

Test specimens for property evaluation were molded in a similar manner to the method of Example 113. Subsequently, the obtained test specimens for property evaluation were evaluated in accordance with the above-described evaluation method of the injection molded article. The result showed that the bending strength was as shown in Table 17 and that the mechanical properties were insufficient.

Comparative Example 47

First Process: Process for Manufacturing Carbon Fibers to be Raw Material

This process was carried out in a similar manner to Example 107.

Second Process: Process for Attaching Sizing Agent to Carbon Fibers

This process was carried out in a similar manner to Comparative Example 45.

Third and Fourth Processes:

Test specimens for property evaluation were molded in a similar manner to the method of Example 113. Subsequently, the obtained test specimens for property evaluation were evaluated in accordance with the above-described evaluation method of the injection molded article. The result showed that the bending strength was as shown in Table 17 and that the mechanical properties were slightly low.

TABLE 17

|  |  |  |  | Example 113 | Example 114 | Example 115 | Example 116 | Example 117 | Example 118 | Comparative Example 46 | Comparative Example 47 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  |  |  |  |  | 100 |
|  |  | A-2 | EX-521 |  | 50 | 50 | 50 | 50 | 50 |  |  |
|  |  | Total |  | 50 | 50 | 50 | 50 | 50 | 50 |  | 100 |
|  | (B1) | B-1 | jER152 |  |  |  | 20 |  |  |  |  |
|  |  | B-2 | jER828 | 20 | 40 | 20 |  |  |  | 20 |  |
|  |  | B-3 | jER1001 |  |  |  |  | 20 |  | 70 |  |
|  |  | B-4 | jER807 |  |  |  |  |  | 20 |  |  |
|  |  | Total |  | 20 | 40 | 20 | 20 | 20 | 20 | 90 |  |
|  | (C) | C-1 | Aromatic polyester | 20 |  | 20 | 20 | 20 | 20 |  |  |
|  | Other | — | Emulsifier (nonionic surfactant) | 10 | 10 | 10 | 10 | 10 | 10 | 10 |  |
|  | Ratio | A/B1 | (A) (% by mass) | 71 | 56 | 71 | 71 | 71 | 71 | 0 | 100 |
|  |  |  | (B1) (% by mass) | 29 | 44 | 29 | 29 | 29 | 29 | 100 | 0 |
|  |  |  | (A) (% by mass) | 50 | 50 | 50 | 50 | 50 | 50 | 0 | 100 |
|  |  |  | (B) (% by mass) | 50 | 50 | 50 | 50 | 50 | 50 | 100 | 0 |
|  |  | Epoxy equivalent (g/eq.) |  | 245 | 210 | 265 | 260 | 320 | 250 | 400 | 165 |
|  |  | Sizing agent attached amount (% by mass) |  | 0.6 | 0.6 | 0.6 | 0.6 | 0.6 | 0.6 | 0.6 | 0.6 |

TABLE 17-continued

| | | | Example 113 | Example 114 | Example 115 | Example 116 | Example 117 | Example 118 | Comparative Example 46 | Comparative Example 47 |
|---|---|---|---|---|---|---|---|---|---|---|
| Matrix resin | | | VE | VE | VE | VE | VE | VE | VE | VE |
| Form | | | Form B | Form B | Form B | Form B | Form B | Form B | Form B | Form B |
| Evaluation item | Sizing agent-coated fibers | Epoxy equivalent of sizing agent (g/eq.) | 475 | 350 | 430 | 420 | 530 | 400 | 710 | 240 |
| | | Water content (% by mass) | 0.019 | 0.021 | 0.021 | 0.019 | 0.018 | 0.019 | 0.015 | 0.032 |
| | | X-ray photoelectron spectrum of sizing agent surface (a)/(b) | 0.6 | 0.65 | 0.64 | 0.65 | 0.71 | 0.63 | 1.01 | 0.29 |
| | | Eluted aliphatic epoxy compound (A) (part by mass) | 0.13 | 0.13 | 0.13 | 0.13 | 0.13 | 0.13 | — | 0.33 |
| | Carbon fiber-reinforced composite material | Bending strength (MPa) | 480 | 482 | 481 | 480 | 473 | 478 | 440 | 453 |

Example 119

Into 50 mL of acetone, 2 g of the sizing agent-coated carbon fibers (the papermaking web coated with the sizing agent) obtained in Example 81 were immersed and ultrasonic cleaning was applied for 30 minutes three times. Subsequently, the carbon fibers were immersed in 50 mL of methanol, and ultrasonic cleaning was applied for 30 minutes once, followed by drying the carbon fibers. The attached amount of the sizing agent remaining after the cleaning was measured. The results are as shown in Table 18-1.

Subsequently, the surface of the sizing agent of the sizing agent-coated carbon fibers before cleaning and the surface of the sizing agent of the sizing agent-coated carbon fibers obtained after the cleaning were analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C═C were measured. The ratio (I) of (a)/(b) of the surface of the sizing agent of the sizing agent-coated carbon fibers before cleaning and the ratio (II) of (a)/(b) of the surface of the sizing agent of the sizing agent-coated carbon fibers after cleaning were calculated. (I) and (II)/(I) are as shown in Table 18-1.

Examples 120 and 121

In a similar manner to Example 119, the sizing agent-coated carbon fibers obtained in Example 82 and Example 83 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the C1s core spectrum. The results are shown in Table 18-1.

Comparative Example 48

In a similar manner to Example 119, the sizing agent-coated carbon fibers obtained in Comparative Example 35 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the C1s core spectrum. The results are shown in Table 18-1. The result showed that (II)/(I) is large and thus the sizing agent had no gradient structure.

Comparative Example 49

In a similar manner to Example 119, the sizing agent-coated carbon fibers obtained in Comparative Example 36 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the Cis core spectrum. The results are shown in Table 18-1. The result showed that (II)/(I) is large and thus the sizing agent had no gradient structure.

Comparative Example 50

In a similar manner to Example 119, the sizing agent-coated carbon fibers obtained in Comparative Example 39 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C═C and (b) is the height (cps) of a component at a binding energy (286.1 eV) attributed to C—O in the C1s core spectrum. The results are shown in Table 18-1. The result showed that (II)/(I) is small.

TABLE 18-1

|  |  | Example 119 | Example 120 | Example 121 | Comparative Example 48 | Comparative Example 49 | Comparative Example 50 |
|---|---|---|---|---|---|---|---|
| Sizing agent-coated carbon fibers |  | Example 81 | Example 82 | Example 83 | Comparative Example 35 | Comparative Example 36 | Comparative Example 39 |
|  | Sizing agent attached amount after washing sizing agent | 0.18 | 0.18 | 0.18 | 0.12 | 0.18 | 0.18 |
| XPS (400 eV) | (I) | 0.61 | 0.66 | 0.65 | 1.01 | 0.29 | 0.98 |
|  | (II)/(I) | 0.81 | 0.72 | 0.73 | 1 | 1 | 0.3 |

Example 122

In 50 mL of acetone, 2 g of the sizing agent-coated carbon fibers obtained in Example 107 were immersed and ultrasonic cleaning was applied to the sizing agent-coated carbon fibers for 30 minutes three times. Subsequently, the carbon fibers were immersed in 50 mL of methanol, and ultrasonic cleaning was applied for 30 minutes once, followed by drying carbon fibers. The attached amount of the sizing agent remaining after the cleaning was measured. The result was as shown in Table 18-2. Subsequently, the surface of the sizing agent of the sizing agent-coated carbon fibers before cleaning and the surface of the sizing agent of the sizing agent-coated carbon fibers obtained after the cleaning were analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured. The ratio (I) of (a)/(b) of the surface of the sizing agent of the sizing agent-coated carbon fibers before cleaning and the ratio (II) of (a)/(b) of the surface of the sizing agent of the sizing agent-coated carbon fibers after cleaning were calculated. (I) and (II)/(I) are as shown in Table 18-2.

Examples 123 and 124

In a similar manner to Example 122, the sizing agent-coated carbon fibers obtained in Example 108 and Example 109 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 18-2.

Comparative Example 51

In a similar manner to Example 122, the sizing agent-coated carbon fibers obtained in Comparative Example 44 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 18-2. The result showed that (II)/(I) is large and thus the sizing agent had no gradient structure.

Comparative Example 52

In a similar manner to Example 122, the sizing agent-coated carbon fibers obtained in Comparative Example 45 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 18-2. The result showed that (II)/(I) is large and thus the sizing agent had no gradient structure.

TABLE 18-2

|  |  | Example 122 | Example 123 | Example 124 | Comparative Example 51 | Comparative Example 52 |
|---|---|---|---|---|---|---|
| Sizing agent-coated carbon fibers |  | Example 107 | Example 108 | Example 109 | Comparative Example 44 | Comparative Example 45 |
|  | Sizing agent attached amount after washing sizing agent | 0.18 | 0.18 | 0.18 | 0.12 | 0.18 |
| XPS (400 eV) | (I) | 0.62 | 0.67 | 0.66 | 1.01 | 0.29 |
|  | (II)/(I) | 0.8 | 0.71 | 0.72 | 1 | 1 |

Example 125

Into a beaker, 10 g of the molding material obtained in Example 101 was placed and ultrasonic cleaning was applied to the molding material for 30 minutes three times with 250 mL of formic acid and final ultrasonic cleaning was applied to the molding material for 30 minutes one time with 250 mL of methanol. Thereafter, the solvent was dried by drying the washed molding material at 80° C. for 30 minutes. The surface of the sizing agent of the sizing agent-coated carbon fibers obtained by washing was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 19.

Example 126

The surface of the sizing agent of the sizing agent-coated carbon fibers obtained by using the molding material in Example 103 and by washing in a similar manner to Example 125 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 19.

Comparative Example 53

The surface of the sizing agent of the sizing agent-coated carbon fibers obtained by using the molding material obtained in Comparative Example 42 and washing in a similar manner to Example 125 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=O were measured and the ratio (a)/(b) was calculated. The remaining attached amount of the sizing agent and the ratio (a)/(b) after washing are large values as shown in Table 19.

Comparative Example 54

The surface of the sizing agent of the sizing agent-coated carbon fibers obtained by using the molding material obtained in Comparative Example 43 and washing in a similar manner to Example 125 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are small values as shown in Table 19.

TABLE 19

|  | Example 125 | Example 126 | Comparative Example 53 | Comparative Example 54 |
|---|---|---|---|---|
| Molding material | Example 101 | Example 103 | Comparative Example 42 | Comparative Example 43 |
| Sizing agent attached amount | 0.18 | 0.18 | 0.12 | 0.18 |
| XPS (400 eV) (a)/(b) | 0.49 | 0.47 | 1.01 | 0.29 |

In Example and Comparative Examples according to the fourth embodiment, the component (A) and the component (B1) of the sizing agent similar to those of the first embodiment were used and thermoplastic resins and impregnation promoters (D) described below were used.

Thermoplastic resin
Polyarylene sulfide (PPS) resin pellets: "Torelina(registered trademark)" A900 (manufactured by Toray Industries Inc.)
Polyamide 6 (PA6) resin pellets: "Amilan (registered trademark)" CM1001 (manufactured by Toray Industries Inc.)
Polypropylene (PP) resin pellets (polyolefin resin): Mixture of unmodified PP resin pellets and acid-modified PP resin pellets, unmodified PP resin pellets: "Prime Polypro (registered trademark)" J830HV (manufactured by Prime Polymer Co., Ltd.) 50 parts by mass, acid-modified PP resin pellets: "ADMER (registered trademark)" QE800 (manufactured by Mitsui Chemicals, Inc.) 50 parts by mass Polycarbonate (PC) resin pellets: "Lexan (registered trademark)" 141R (manufactured by Saudi Basic Industries Corporation (SABIC))

Impregnation promoters (D): D-1 to D-4
D-1: Polyphenylene sulfide prepolymer prepared in Reference Example 1 described below
D-2: Terpene resin (resin made of polymer using α-pinene and β-pinene as main components, manufactured by Yasuhara Chemical Co., Ltd., YS Resin PX1250 resin)
D-3: Mixture of the polypropylene resin prepared in Reference Example 2 described below
D-4: Terpene phenol polymer (adduct of monocyclic monoterpene phenol and phenol, manufactured by Yasuhara Chemical Co., Ltd. YP902)

Reference Example 1

Preparation of Polyphenylene Sulfide Prepolymer: D-1

Into a 1,000 L autoclave equipped with a stirrer, 118 kg (1,000 mol) of 47.5% aqueous sodium hydrosulfide solution, 42.3 kg (1,014 mol) of 96% sodium hydroxide, 163 kg (1,646 mol) of N-methyl-2-pyrrolidone (hereinafter may be abbreviated as NMP), 24.6 kg (300 mol) of sodium acetate, and 150 kg of ion-exchanged water were charged. The mixture was slowly heated to 240° C. over 3 hours with introducing nitrogen at normal pressure. After 211 kg of water and 4 kg of NMP were removed by distillation through a rectification column, the reaction container was cooled to 160° C. During the liquid removal operation, 0.02 mol of hydrogen sulfide per mole of the charged sulfur components was dispersed to the outside of the system.

Subsequently, 147 kg (1,004 mol) of p-dichlorobenzene and 129 kg (1,300 mol) of NMP were added and the reaction container was sealed with nitrogen gas. The temperature of the reaction mixture was raised to 270° C. at a rate of 0.6° C./min with stirring at 240 rpm and maintained at this temperature for 140 minutes. The reaction mixture was cooled to 250° C. at a rate of 1.3° C./min while 18 kg (1,000 mol) of water was injected over 15 minutes by applying pressure. Thereafter, the mixture was cooled to 220° C. at a rate of 0.4° C./min and then quickly cooled to near room temperature to obtain slurry (E). The slurry (E) was diluted with 376 kg of NMP to obtain slurry (F). 14.3 kg of the slurry (F) heated to 80° C. was filtered with a sieve (80 mesh, aperture 0.175 mm) to obtain 10 kg of a crude PPS resin and slurry (G). The slurry (G) was charged into a rotary evaporator and the inside of the rotary evaporator was replaced with nitrogen. Thereafter, the slurry (G) was treated under reduced pressure from 100° C. to 160° C. for 1.5 hours and then treated at 160° C. for 1 hour using a vacuum dryer. The amount of NMP in the obtained solidified product was 3% by mass.

After 12 kg of ion-exchanged water (1.2 times relative to the slurry (G)) was added to the solidified product, and slurry was prepared again with stirring at 70° C. for 30 minutes. This slurry was suction-filtered with a glass filter having an aperture of 10 μm to 16 To the obtained white cake, 12 kg of ion-exchanged water was added and slurry was prepared again with stirring at 70° C. for 30 minutes. Suction filtering was carried out in a similar manner and thereafter the solidified product was vacuum-dried at 70° C. for 5 hours to obtain 100 g of polyphenylene sulfide oligomer. The above-described operations were repeated until the predetermined amount of polyphenylene sulfide prepolymer was obtained.

4 g of the obtained polyphenylene sulfide prepolymer was separately collected and extracted using a Soxhlet extractor with 120 g of chloroform for 3 hours. To the solid obtained by removing chloroform by distillation from the obtained extracted liquid, 20 g of chloroform was added again and the solid was dissolved at room temperature to obtain a slurry-like mixed liquid. The slurry-like mixed liquid was slowly added dropwise to 250 g of methanol with stirring. The precipitate was suction-filtered with a glass filter having an aperture of 10 μm to 16 μm. The obtained white cake was vacuum dried at 70° C. for 3 hours to obtain a white powder.

The mass average molecular weight of the white powder was 900. From the absorption spectrum in infrared spectroscopic analysis of the white powder, the white powder was determined as polyphenylene sulfide (PAS). Thermal properties of the white powder were analyzed with a differential scanning calorimeter (temperature rising rate 40° C./min). As a result, a broad endotherm was observed in about 200° C. to 260° C. and a peak temperature was 215° C.

From mass spectrum analysis of components prepared by separating components with high-performance liquid chromatography and molecular weight information by MALDI-TOF-MS, the white powder was a mixture made of cyclic polyphenylene sulfide having a number of the repeating unit of 4 to 11 and straight chain polyphenylene sulfide having a number of the repeating unit of 2 to 11. The mass ratio of the cyclic polyphenylene sulfide and the straight chain polyphenylene sulfide was 9:1.

Reference Example 2

Preparation of Mixture PP of Propylene Resin: D-3

As a first propylene resin (g), 91 parts by mass of propylene-butene-ethylene copolymer (g-1) (constitutional unit derived from propylene (hereinafter may be described as "C3")=66 mol %, Mw=90,000), and as a raw material of a second propylene resin (h), 9 parts by mass of maleic anhydride-modified propylene-ethylene copolymer (C3=98 mol %, Mw=25,000, acid content=0.81 millimole equivalent), and as a surfactant, 3 parts by mass of potassium oleate were mixed. This mixture was fed through a hopper of a twin screw extruder (manufactured by Ikegai Steel Co., Ltd., PCM-30, l/d=40) at a rate of 3,000 g/hour and 20% aqueous potassium hydroxide solution was continuously fed through a feed opening provided at a vent part of the extruder at a ratio of 90 g/hour. The extrusion was continuously carried out at a heating temperature of 210° C. The extruded resin mixture was cooled to 110° C. with a static mixer equipped with a jacket located at an extruder outlet and further charged into warm water of 80° C. to obtain an emulsion. The solid content of the obtained emulsion was 45%.

The maleic anhydride-modified propylene-ethylene copolymer (C3=98 mol %, Mw=25,000, acid content=0.81 millimole equivalent) was obtained by mixing 96 parts by mass of the propylene-ethylene copolymer, 4 parts by mass of maleic anhydride, and 0.4 parts by mass of PERHEXA 25B (manufactured by NOF CORPORATION) and modifying the mixture at a heating temperature of 160° C. for 2 hours.

Example 127

This Example includes the following first to fourth processes.

First Process: Manufacturing Process for Carbon Fibers to be Raw Material

Carbon fibers A were obtained in a similar manner to Example 1 of the first embodiment.

Second Process: Process for Attaching Sizing Agent to Carbon Fibers

After an aqueous dispersion emulsion containing 20 parts by mass of (B-2) as a component (B1), 20 parts by mass of a component (C), and 10 parts by mass of an emulsifier was prepared, 50 parts by mass of (A-1) was mixed as a component (A) to prepare a sizing liquid. As the component (C), a condensate (C-1) of 2 mol of an adduct of bisphenol A with 2 mol of EO, 1.5 mol of maleic acid, and 0.5 mol of sebacic acid was used. As the emulsifier, polyoxyethylene (70 mol) styrenated (5 mol) cumylphenol was used. Both of the component (C) and the emulsifier are aromatic compounds and also correspond to the component (B). The epoxy equivalent of the sizing agent except the solvents in the sizing liquid is as shown in Table 20-1. The sizing agent was applied onto the surface-treated carbon fibers by an immersion method. Thereafter, heat treatment at a temperature of 210° C. for 75 seconds was applied to the carbon fibers to obtain the carbon fibers coated with the sizing agent. The attached amount of the sizing agent was adjusted so as to be 0.6% by mass relative to the carbon fibers coated with the sizing agent. Subsequently, the epoxy equivalent of the sizing agent applied to the carbon fibers, the water content of the sizing agent-coated carbon fibers, the X-ray photoelectron spectrum of the surface of the sizing agent, and the ratio of the eluted aliphatic epoxy compound were measured. The results are summarized in Table 20-1. From the results of Table 20-1, it was ascertained that both of the epoxy equivalent of the sizing agent and the chemical composition of the surface of the sizing agent were as expected.

Third Process: Process for Manufacturing Long Fiber Pellets

The tip part of a single screw extruder was equipped with a crosshead die that is processed as a wave-like form through which continuous sizing agent-coated carbon fibers were able to pass. Subsequently, the PPS resin pellets were fed from the extruder to the crosshead die in a melted state and impregnated into the continuous sizing agent-coated carbon fibers while the continuous sizing agent-coated carbon fibers were pulled through the crosshead die at a speed of 5 m/min. After the impregnated sizing agent-coated carbon fibers were cooled, the impregnated sizing agent-coated carbon fibers were cut into 7 mm length in a perpendicular direction to pulling direction to obtain long fiber pellets (Form A) in which carbon fibers were almost parallelly arranged in an axis center direction and the length of the carbon fibers was substantially the same length as the length of the molding material. Here, the extruder was operated under conditions of a barrel temperature of 320° C. and a rotational speed of 150 rpm and the PPS resin pellets were sufficiently kneaded. Then, degassing was carried out from a vacuum vent located downstream. The PPS resin pellets were adjusted to feed in an amount of 80 parts by mass relative to 20 parts by mass of the sizing agent-coated carbon fibers.

Fourth Process: Injection Molding Process

Test specimens for property evaluation were molded from the long fiber pellets obtained in the previous process using J350EIII injection molding machine manufactured by Japan Steel Works, LTD. at a cylinder temperature of 330° C. and a mold temperature of 100° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 20-1. The results showed that the bending strength was 284 MPa and thus the mechanical properties were sufficiently high.

Examples 128 to 136

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent was obtained in a similar manner to Example 127 except that types and amounts of the component (A) and the component (B1) and amounts of the component (C) and other components were used as shown in Table 20-1. Subsequently, the epoxy equivalent of the sizing agent, the water content of the sizing agent-coated carbon fibers, and the X-ray photoelectron spectrum of the surface of the sizing agent were measured. It was found that both of the epoxy equivalent of the sizing agent and the chemical composition of the surface of the sizing agent were as expected. The results are shown in Table 20-1.

Third and Fourth Processes:

Test specimens for property evaluation were molded in a similar manner to the method of Example 127. Subsequently, the obtained test specimens for property evaluation were evaluated in accordance with the above-described evaluation method of the molded article. The results are summarized in Table 20-1. The results showed that the bending strengths were 274 MPa to 291 MPa and thus the mechanical properties were sufficiently high.

Example 137

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent was obtained in a similar manner to Example 127 except that types and amounts of the component (A) and the component (B1) and amounts of the component (C) and other components were used as shown in Table 20-1. The attached amounts of the sizing agent was 1.0 part by mass to 100 parts by mass of the surface treated carbon fibers.

Third and Fourth Processes:

Test specimens for property evaluation were molded in a similar manner to the method of Example 127. Subsequently, the obtained test specimens for property evaluation were evaluated in accordance with the above-described evaluation method of the molded article.

The results are summarized in Table 20-1.

The results showed that the bending strength was 283 MPa and thus the mechanical properties were sufficiently high.

Example 138

First Process: Process for Manufacturing Carbon Fibers to be Raw Material

Carbon fibers B were obtained in a similar manner to the method of Example 12 in the first embodiment.

Second Process: Process for Attaching Sizing Agent to Carbon Fibers

The carbon fibers coated with the sizing agent was obtained in a similar manner to Example 127 except that types and amounts of the component (A) and the component. (B1) and amounts of the component (C) and other components were used as shown in Table 20-1. Subsequently, the epoxy equivalent of the sizing agent, the water content of the sizing agent-coated carbon fibers, and the X-ray photoelectron spectrum of the surface of the sizing agent were measured. Both of the epoxy equivalent of the sizing agent and the chemical composition of the surface of the sizing agent were as expected. The results are shown in Table 20-1.

Third and Fourth Processes:

Test specimens for property evaluation were molded in a similar manner to the method of Example 127. Subsequently, the obtained test specimens for property evaluation were evaluated in accordance with the above-described evaluation method of the molded article. The results are summarized in Table 20-1. The result showed that the bending strength was in an acceptable level.

Example 139

First Process: Process for Manufacturing Carbon Fibers to be Raw Material

Carbon fibers B were obtained in a similar manner to the method of Example 13 in the first embodiment.

Second Process: Process for Attaching Sizing Agent to Carbon Fibers

The carbon fibers coated with the sizing agent was obtained in a similar manner to Example 127 except that types and amounts of the component (A) and the component (B1) and amounts of the component (C) and other components were used as shown in Table 20-1. Subsequently, the epoxy equivalent of the sizing agent, the water content of the sizing agent-coated carbon fibers, and the X-ray photoelectron spectrum of the surface of the sizing agent were measured. Both of the epoxy equivalent of the sizing agent and the chemical composition of the surface of the sizing agent were as expected. The results are shown in Table 20-1.

Third and Fourth Processes:

Test specimens for property evaluation were molded in a similar manner to the method of Example 127. Subsequently, the obtained test specimens for property evaluation were evaluated in accordance with the above-described evaluation method of the molded article. The results are summarized in Table 20-1. The result showed that the bending strength was in an acceptable level.

Example 140

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 127 except that the component (A) and the component (B1) were used as shown in Table 20-1 and were applied as a dimethylformamide solution. Subsequently, the epoxy equivalent of the sizing agent, the water content of the sizing agent-coated carbon fibers, and the X-ray photoelectron spectrum of the surface of the sizing agent were measured. Both of the epoxy equivalent of the sizing agent and the chemical composition of the surface of the sizing agent were as expected. The results are shown in Table 20-1.

Third and Fourth Processes:

Test specimens for property evaluation were molded in a similar manner to the method of Example 127. Subsequently, the obtained test specimens for property evaluation were evaluated in accordance with the above-described evaluation method of the molded article. The results are summarized in Table 20-1. The results showed that the bending strength was high.

Comparative Example 55

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 127 except that the component (A) was not used and types and amounts of the component (B1) and amounts of the component (C) as shown in Table 20-2 were used. Subsequently, the X-ray photoelectron spectrum of the surface of the sizing agent was measured. As shown in Table 20-2, the ratio was out of the range of the present invention.

Third and Fourth Processes:

Test specimens for property evaluation were molded in a similar manner to the method of Example 127. Subsequently, the obtained test specimens for property evaluation were evaluated in accordance with the above-described evaluation method of the molded article. The result showed that the bending strength was as shown in Table 20-2 and that the mechanical properties were insufficient.

Comparative Example 56

First Process: Process for Manufacturing Carbon Fibers to be Raw Material

This process was carried out in a similar manner to Example 127.

Second Process: Process for Attaching Sizing Agent to Carbon Fibers

Carbon fibers coated with the sizing agent were obtained in a similar manner to Example 127 except that the component (B1) was not used and types and amounts of the component (A) were used as shown in Table 20-2. Subsequently, the X-ray photoelectron spectrum of the surface of the sizing agent was measured. As shown in Table 20-2, the ratio was out of the range of the present invention.

Third and Fourth Processes:

Test specimens for property evaluation were molded in a similar manner to the method of Example 127. Subsequently, the obtained test specimens for property evaluation were evaluated in accordance with the above-described evaluation method of the injection molded article. The result showed that the bending strength was as shown in Table 20-2 and that the mechanical properties were slightly low.

Comparative Example 57

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent was obtained in a similar manner to Example 127 except that types and amounts of the component (A) and the component (B1) and amounts of the component (C) and other components were used as shown in Table 20-2. Subsequently, the X-ray photoelectron spectrum of the surface of the sizing agent was measured. As shown in Table 20-2, the ratio was out of the range of the present invention.

Third and Fourth Processes:

Test specimens for property evaluation were molded in a similar manner to the method of Example 127. Subsequently, the obtained test specimens for property evaluation were evaluated in accordance with the above-described evaluation method of the injection molded article. The result showed that the bending strength was as shown in Table 20-2 and that the mechanical properties were insufficient.

Comparative Example 58

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent was obtained in a similar manner to Example 127 except that types and amounts of the component (A) and the component (B1) and amounts of the component (C) and other components were used as shown in Table 20-2. Subsequently, the X-ray photoelectron spectrum of the surface of the sizing agent was measured. As shown in Table 20-2, the ratio was out of the range of the present invention.

Third and Fourth Processes:

Test specimens for property evaluation were molded in a similar manner to the method of Example 127. Subsequently, the obtained test specimens for property evaluation were evaluated in accordance with the above-described evaluation method of the molded article. The result showed that the bending strength was as shown in Table 20-2 and that the mechanical properties were slightly low.

Comparative Example 59

First Process: Process for Manufacturing Carbon Fibers to be Raw Material

This process was carried out in a similar manner to Example 127.

Second Process: Process for Attaching Sizing Agent to Carbon Fibers

An aqueous solution of (A-2) was prepared as the component (A) and was applied to surface treated carbon fibers by the immersion method. Thereafter, the coated carbon fibers were treated with heat at a temperature of 210° C. for 75 seconds to obtain the carbon fibers coated with the sizing agent. The attached amount of the sizing agent was adjusted so as to be 0.30% by mass relative to the finally obtained sizing agent-coated carbon fibers. Subsequently, an aqueous dispersion emulsion containing 20 parts by mass of (B-2) as a component (B1), 20 parts by mass of a component (C), and 10 parts by mass of an emulsifier was prepared. As the component (C), a condensate (C-1) of 2 mol of an adduct of bisphenol A with 2 mol of EO, 1.5 mol of maleic acid, and 0.5 mol of sebacic acid were used. As the emulsifier, polyoxyethylene (70 mol) styrenated (5 mol) cumylphenol was used. Both of the component (C) and the emulsifier are aromatic compounds and also correspond to the component (B). The carbon fibers coated with the component (A) was coated with the sizing agent by the immersion method. Thereafter, the coated carbon fibers were treated with heat at a temperature of 210° C. for 75 seconds to obtain the carbon fibers coated with the sizing agent. The attached amount of the sizing agent was adjusted so as to be 0.30 parts by mass relative to the finally obtained sizing agent-coated carbon fibers. The X-ray photoelectron spectrum of the surface of the sizing agent was measured. The ratio (a)/(b) where (a) is the height (cps) of a component having a binding energy (284.6 eV) attributed to CHx, C—C, and C=C and (b) is the height (cps) of a component having binding energy (286.1 eV) attributed to C—O in a C1s core spectrum of the surface of the sizing agent measured by X-ray photoelectron spectroscopy at a photoelectron takeoff angle of 15° is larger than 0.90 and the ratio was out of the range of the present invention.

Third and Fourth Processes:

Test specimens for property evaluation were molded in a similar manner to the method of Example 127. Subsequently, the obtained test specimens for property evaluation were evaluated in accordance with the above-described evaluation method of the molded article. The result showed that the bending strength was as shown in Table 20-2 and the mechanical properties were low.

TABLE 20-1

| | | | | Example 127 | Example 128 | Example 129 | Example 130 | Example 131 | Example 132 | Example 133 | Example 134 |
|---|---|---|---|---|---|---|---|---|---|---|---|
| Carbon fibers | | | | A | A | A | A | A | A | A | A |
| Sizing agent | (A) | A-1 | EX-611 | 50 | | | 25 | | | | |
| | | A-2 | EX-521 | | 50 | 50 | 25 | 50 | 50 | 50 | 50 |
| | | Total | | 50 | 50 | 50 | 50 | 50 | 50 | 50 | 50 |
| | (B1) | B-1 | jER152 | | | | | 20 | | | |
| | | B-2 | jER828 | 20 | 40 | 20 | 20 | | | | 10 |
| | | B-3 | jER1001 | | | | | | 20 | | 10 |
| | | B-4 | jER807 | | | | | | | 20 | |
| | | Total | | 20 | 40 | 20 | 20 | 20 | 20 | 20 | 20 |
| | (C) | C-1 | Aromatic polyester | 20 | | 20 | 20 | 20 | 20 | 20 | 20 |
| | Other | — | Emulsifier (nonionic surfactant) | 10 | 10 | 10 | 10 | 10 | 10 | 10 | 10 |
| | Ratio A/B1 | (A) (% by mass) | | 71 | 56 | 71 | 71 | 71 | 71 | 71 | 71 |
| | | (B1) (% by mass) | | 29 | 44 | 29 | 29 | 29 | 29 | 29 | 29 |
| | | (A) (% by mass) | | 50 | 50 | 50 | 50 | 50 | 50 | 50 | 50 |
| | | (B) (% by mass) | | 50 | 50 | 50 | 50 | 50 | 50 | 50 | 50 |
| | Epoxy equivalent (g/eq.) | | | 245 | 210 | 265 | 255 | 260 | 320 | 250 | 290 |
| | Sizing agent attached amount (% by mass) | | | 0.6 | 0.6 | 0.6 | 0.6 | 0.6 | 0.6 | 0.6 | 0.6 |
| Thermoplastic resin | | | | PPS | PPS | PPS | PPS | PPS | PPS | PPS | PPS |
| Sizing agent-coated carbon fiber content (% by mass) | | | | 20 | 20 | 20 | 20 | 20 | 20 | 20 | 20 |
| Form of long fiber pellets | | | | Form A | Form A | Form A | Form A | Form A | Form A | Form A | Form A |
| Evaluation item | Sizing agent-coated fibers | Epoxy equivalent of sizing agent (g/eq.) | | 475 | 350 | 430 | 450 | 420 | 530 | 400 | 470 |
| | | Water content (% by mass) | | 0.019 | 0.021 | 0.021 | 0.020 | 0.019 | 0.018 | 0.019 | 0.019 |
| | | X-ray photoelectron spectrum of sizing agent | | 0.6 | 0.65 | 0.64 | 0.62 | 0.65 | 0.71 | 0.63 | 0.67 |

TABLE 20-1-continued

| | | | | | | | | | |
|---|---|---|---|---|---|---|---|---|---|
| | surface (a)/(b) | | | | | | | | |
| | Eluted aliphatic epoxy compound (A) (part by mass) | 0.13 | 0.13 | 0.13 | 0.13 | 0.13 | 0.13 | 0.13 | 0.13 |
| Carbon fiber-reinforced composite material | Bending strength (MPa) | 284 | 291 | 290 | 282 | 283 | 274 | 288 | 286 |

| | | | | Example 135 | Example 136 | Example 137 | Example 138 | Example 139 | Example 140 |
|---|---|---|---|---|---|---|---|---|---|
| Carbon fibers | | | | A | A | A | B | C | A |
| Sizing agent | (A) | A-1 | EX-611 | | | | | | |
| | | A-2 | EX-521 | 40 | 65 | 50 | 50 | 50 | 55 |
| | | Total | | 40 | 65 | 50 | 50 | 50 | 55 |
| | (B1) | B-1 | jER152 | | | | | | |
| | | B-2 | jER828 | 25 | 17 | 20 | 20 | 20 | 45 |
| | | B-3 | jER1001 | | | | | | |
| | | B-4 | jER807 | | | | | | |
| | | Total | | 25 | 17 | 20 | 20 | 20 | 45 |
| | (C) | C-1 | Aromatic polyester | 25 | 8 | 20 | 20 | 20 | |
| | Other | — | Emulsifier (nonionic surfactant) | 10 | 10 | 10 | 10 | 10 | |
| | Ratio A/B1 | (A) (% by mass) | | 62 | 79 | 71 | 71 | 71 | 55 |
| | | (B1) (% by mass) | | 38 | 21 | 29 | 29 | 29 | 45 |
| | | (A) (% by mass) | | 40 | 65 | 50 | 50 | 50 | 55 |
| | | (B) (% by mass) | | 60 | 35 | 50 | 50 | 50 | 45 |
| | Epoxy equivalent (g/eq.) | | | 285 | 225 | 265 | 265 | 265 | 185 |
| | Sizing agent attached amount (% by mass) | | | 0.6 | 0.6 | 1 | 0.6 | 0.6 | 0.6 |
| Thermoplastic resin | | | | PPS | PPS | PPS | PPS | PPS | PPS |
| Sizing agent-coated carbon fiber content (% by mass) | | | | 20 | 20 | 20 | 20 | 20 | 20 |
| Form of long fiber pellets | | | | Form A | Form A | Form A | Form A | Form A | Form A |
| Evaluation item | Sizing agent-coated fibers | Epoxy equivalent of sizing agent (g/eq.) | | 505 | 350 | 430 | 430 | 430 | 275 |
| | | Water content (% by mass) | | 0.018 | 0.022 | 0.022 | 0.020 | 0.021 | 0.021 |
| | | X-ray photoelectron spectrum of sizing agent surface (a)/(b) | | 0.77 | 0.52 | 0.64 | 0.63 | 0.63 | 0.63 |
| | | Eluted aliphatic epoxy compound (A) (part by mass) | | 0.08 | 0.16 | 0.25 | 0.12 | 0.13 | 0.14 |
| | Carbon fiber-reinforced composite material | Bending strength (MPa) | | 284 | 280 | 283 | 271 | 271 | 283 |

TABLE 20-2

| | | | | Comparative Example 55 | Comparative Example 56 | Comparative Example 57 | Comparative Example 58 | Comparative Example 59 |
|---|---|---|---|---|---|---|---|---|
| Carbon fibers | Carbon fibers | | | A | A | A | A | A |
| Sizing agent | (A) | A-1 | EX-611 | | 100 | 30 | 75 | |
| | | A-2 | EX-521 | | | | | 50 |
| | | Total | | | 100 | 30 | 75 | 50 |
| | (B1) | B-1 | jER152 | | | | | |
| | | B-2 | jER828 | 45 | | 30 | 10 | 20 |
| | | B-3 | jER1001 | | | | | |
| | | B-4 | jER807 | | | | | |
| | | Total | | 45 | | 30 | 10 | 20 |
| | (C) | C-1 | Aromatic polyester | 45 | | 30 | 10 | 20 |
| | Other | — | Emulsifier (nonionic surfactant) | 10 | | 10 | 5 | 10 |
| | Ratio | A/B1 | (A) (% by mass) | 0 | 100 | 50 | 88 | 71 |
| | | | (B1) (% by mass) | 100 | 0 | 50 | 12 | 29 |
| | | | (A) (% by mass) | 0 | 100 | 30 | 75 | 50 |
| | | | (B) (% by mass) | 100 | 0 | 70 | 25 | 50 |
| | Epoxy equivalent (g/eq.) | | | 420 | 165 | 300 | 200 | 185/420 |
| | Sizing agent attached amount (% by mass) | | | 0.6 | 0.6 | 0.6 | 0.6 | 0.3/0.3 |
| Thermoplastic resin | | | | PPS | PPS | PPS | PPS | PPS |
| Sizing agent-coated carbon fiber content (% by mass) | | | | 20 | 20 | 20 | 20 | 20 |
| Form of long fiber pellets | | | | Form A | Form A | Form A | Form A | Form A |
| Evaluation item | Sizing agent-coated fibers | Epoxy equivalent of sizing agent (g/eq.) | | 710 | 240 | 505 | 330 | 550 |
| | | Water content (% by mass) | | 0.015 | 0.032 | 0.019 | 0.025 | 0.021 |
| | | X-ray photoelectron spectrum of sizing agent surface (a)/(b) | | 1.01 | 0.29 | 0.92 | 0.49 | 0.98 |
| | | Eluted aliphatic epoxy compound (A) (part by mass) | | — | 0.33 | 0.04 | 0.22 | 0.12 |
| | Carbon fiber-reinforced composite material | Bending strength (MPa) | | 256 | 265 | 259 | 262 | 262 |

Example 141

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Example 127.

Third Process: Process for Manufacturing Long Fiber Pellets

The impregnation promoter (D-1) prepared in Reference Example 1 was melted in a melting bath of 240° C. and fed to a kiss coater by a gear pump. The impregnation promoter (D-1) was applied onto a roll heated to 230° C. from the kiss coater to form a coating film. The sizing agent-coated carbon fibers were passed through the roll while the sizing agent-coated carbon fibers were brought into contact with the roll to attach a constant amount of the impregnation promoter (D-1) per unit length of the sizing agent-coated carbon fibers.

The sizing agent-coated carbon fibers to which the impregnation promoter (D-1) was attached were fed into a furnace heated at 350° C. and were passed between 10 rolls (diameter 50 mm) that were freely rotated using bearings and alternately located at upper and lower positions on a straight line and were passed through 10 roll bars (diameter 200 mm) located in a zigzag manner in the furnace to sufficiently impregnate the impregnation promoter (D-1) to the sizing agent-coated carbon fibers and whereby PAS was converted into highly polymerized product at the same time. Subsequently, after air was blown to the carbon fiber strands pulled out from the furnace to cool, the carbon fiber strands were wounded by a drum winder. Ten strands having a length of 10 mm were cut from the wound carbon fiber strands. In order to separate polyarylene sulfide and the carbon fibers, the cut strand was extracted by refluxing with 1-chloronaphthalene at 210° C. for 6 hours using a Soxhlet extractor. The extracted polyarylene sulfide was used for measuring molecular weights. The obtained PPS had a mass average molecular weight (Mw) of 26,800, a number average molecular weight (Mn) of 14,100, and a degree of dispersion (Mw/Mn) of 1.90. Subsequently, the mass reduction rate ΔWr of the extracted polyarylene sulfide was measured. The mass reduction rate ΔWr was 0.09%. The attached amount of the impregnation promoter (D-1) was 20 parts by mass relative to 100 parts by mass of the carbon fibers.

Subsequently, the PPS resin was melted with a single screw extruder at 360° C. and extruded into a crosshead die attached to the tip part of the extruder. At the same time, the sizing agent-coated carbon fibers into which the impregnation promoter (D-1) was impregnated were continuously fed into the crosshead die (rate: 30 m/min) and whereby the sizing agent-coated carbon fibers into which the impregnation promoter (D-1) was impregnated were covered with the melted PPS resin. Subsequently, after cooling, the covered sizing agent-coated carbon fibers were cut into 7 mm length in a perpendicular direction to pulling direction to obtain core-sheath structure long fiber pellets (Form B) in which carbon fibers were almost parallelly arranged in an axis center direction and the length of the carbon fibers was substantially the same length as the length of the molding material. The PPS resin pellets were adjusted to feed so that the sizing agent-coated carbon fibers became 20% by mass relative to the total amount.

Fourth Process: Injection Molding Process

Test specimens for property evaluation were molded from the long fiber pellets obtained in the previous process using J350EIII injection molding machine manufactured by Japan Steel Works, LTD. at a cylinder temperature of 330° C. and a mold temperature of 100° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 21. The results showed that the bending strength was 282 MPa and thus the mechanical properties were sufficiently high.

Examples 142 to 146

First Process: Process for Manufacturing Carbon Fibers to be Raw Material

This process was carried out in a similar manner to Example 127.

Second Process: Process for Attaching Sizing Agent to Carbon Fibers

In the second process of Example 141, the sizing agent-coated carbon fibers were obtained in a similar manner to Example 141 except that the component (A) and the component (B1) were changed as shown in Table 21. Each of the attached amounts of the sizing agent was 0.6 part by mass to 100 parts by mass of the surface treated carbon fibers.

Third and Fourth Processes:

Test specimens for property evaluation were molded in a similar manner to the method of Example 141. Subsequently, the obtained test specimens for property evaluation were evaluated in accordance with the above-described evaluation method of the molded article. The results are summarized in Table 21. The results showed that the bending strengths were 275 MPa to 289 MPa and thus the mechanical properties were sufficiently high.

Comparative Example 60

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 141 except that the component (A) was not used and types and amounts of the component (B1) and amounts of other components as shown in Table 21 were used.

Third and Fourth Processes:

Test specimens for property evaluation were molded in a similar manner to the method of Example 141. Subsequently, the obtained test specimens for property evaluation were evaluated in accordance with the above-described evaluation method of the molded article. The result showed that the bending strength was as shown in Table 21 and that the mechanical properties were insufficient.

Comparative Example 61

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Comparative Example 56.

Third and Fourth Processes:

Test specimens for property evaluation were molded in a similar manner to the method of Example 141. Subsequently, the obtained test specimens for property evaluation were evaluated in accordance with the above-described evaluation method of the molded article. The result showed that the bending strength was as shown in Table 21 and that the mechanical properties were slightly low.

TABLE 21

|  |  |  |  | Example 141 | Example 142 | Example 143 | Example 144 | Example 145 | Example 146 | Comparative Example 60 | Comparative Example 61 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  |  |  |  |  | 100 |
|  |  | A-2 | EX-521 |  | 50 | 50 | 50 | 50 | 50 |  |  |
|  |  | Total |  | 50 | 50 | 50 | 50 | 50 | 50 |  | 100 |
|  | (B1) | B-1 | jER152 |  |  |  | 20 |  |  |  |  |
|  |  | B-2 | jER828 | 20 | 40 | 20 |  |  |  | 20 |  |
|  |  | B-3 | jER1001 |  |  |  |  | 20 |  | 70 |  |
|  |  | B-4 | jER807 |  |  |  |  |  | 20 |  |  |
|  |  | Total |  | 20 | 40 | 20 | 20 | 20 | 20 | 90 |  |
|  | (C) | C-1 | Aromatic polyester | 20 |  | 20 | 20 | 20 | 20 |  |  |
|  | Other | — | Emulsifier (nonionic surfactant) | 10 | 10 | 10 | 10 | 10 | 10 | 10 |  |
|  | Ratio A/B1 |  | (A) (% by mass) | 71 | 56 | 71 | 71 | 71 | 71 | 0 | 100 |
|  |  |  | (B1) (% by mass) | 29 | 44 | 29 | 29 | 29 | 29 | 100 | 0 |
|  |  |  | (A) (% by mass) | 50 | 50 | 50 | 50 | 50 | 50 | 0 | 100 |
|  |  |  | (B) (% by mass) | 50 | 50 | 50 | 50 | 50 | 50 | 100 | 0 |
|  |  |  | Epoxy equivalent (g/eq.) | 245 | 210 | 265 | 260 | 320 | 250 | 400 | 165 |
|  |  |  | Sizing agent attached amount (% by mass) | 0.6 | 0.6 | 0.6 | 0.6 | 0.6 | 0.6 | 0.6 | 0.6 |
| Component (D) Thermoplastic resin |  |  |  | D-1 PPS | D-1 PPS | D-1 PPS | D-1 PPS | D-1 PPS | D-1 PPS | D-1 PPS | D-1 PPS |
| Sizing agent-coated carbon fiber content (% by mass) |  |  |  | 20 | 20 | 20 | 20 | 20 | 20 | 20 | 20 |
| Form of long fiber pellets |  |  |  | Form B | Form B | Form B | Form B | Form B | Form B | Form B | Form B |
| Evaluation item | Sizing agent-coated fibers | Epoxy equivalent of sizing agent (g/eq.) |  | 475 | 350 | 430 | 420 | 530 | 400 | 710 | 240 |
|  |  | Water content (% by mass) |  | 0.019 | 0.021 | 0.021 | 0.019 | 0.018 | 0.019 | 0.015 | 0.032 |
|  |  | X-ray photoelectron spectrum of sizing agent surface (a)/(b) |  | 0.6 | 0.65 | 0.64 | 0.65 | 0.71 | 0.63 | 1.01 | 0.29 |
|  |  | Eluted aliphatic epoxy compound (A) (part by mass) |  | 0.13 | 0.13 | 0.13 | 0.13 | 0.13 | 0.13 | — | 0.33 |
|  | Carbon fiber-reinforced composite material | Bending strength (MPa) |  | 282 | 289 | 289 | 282 | 275 | 286 | 254 | 264 |

Example 147

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Example 127.

Third Process: Process for Manufacturing Long Fiber Pellets

The tip part of a single screw extruder was equipped with a crosshead die that is processed as a wave-like form through which continuous sizing agent-coated carbon fibers were able to pass. Subsequently, the PC resin pellets were fed from the extruder to the crosshead die in a melted state and impregnated into the continuous sizing agent-coated carbon fibers while the continuous sizing agent-coated carbon fibers were pulled through the crosshead die at a speed of 5 m/min. After the impregnated sizing agent-coated carbon fibers were heated and then cooled, the sizing agent-coated carbon fibers were cut into 7 mm length in a perpendicular direction to pulling direction to obtain long fiber pellets (Form A) in which carbon fibers were almost parallelly arranged in an axis center direction and the length of the carbon fibers was substantially the same length as the length of the molding material. Here, the extruder was operated under conditions of a barrel temperature of 300° C. and a rotational speed of 150 rpm and the PC resin pellets were sufficiently kneaded.

Then, degassing was carried out from a vacuum vent located downstream. The PC resin pellets were adjusted to feed in an amount of 80 parts by mass relative to 20 parts by mass of the sizing agent-coated carbon fibers.

Fourth Process: Injection Molding Process

Test specimens for property evaluation were molded from the long fiber pellets obtained in the previous process using J350EIII injection molding machine manufactured by Japan Steel Works, LTD. at a cylinder temperature of 320° C. and a mold temperature of 70° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 22. The results showed that the bending strength was 206 MPa and thus the mechanical properties were sufficiently high.

Examples 148 to 152

First Process: Process for Manufacturing Carbon Fibers to be Raw Material

This process was carried out in a similar manner to Example 127.

Second Process: Process for Attaching Sizing Agent to Carbon Fibers

In the second process of Example 147, the sizing agent-coated carbon fibers were obtained in a similar manner to Example 147 except that the component (A) and the component (B1) were changed as shown in Table 22. Each of the attached amounts of the sizing agent was 0.6 parts by mass to 100 parts by mass of the surface treated carbon fibers.

Third and Fourth Processes:

Test specimens for property evaluation were molded in a similar manner to the method of Example 147. Subsequently, the obtained test specimens for property evaluation were evaluated in accordance with the above-described evaluation method of the molded article. The results are summarized in Table 22. The results showed that the bending strengths were 200 MPa to 208 MPa and thus the mechanical properties were sufficiently high.

Comparative Example 62

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 147 except that the component (A) was not used and types and amounts of the component (B1) and amounts of other components as shown in Table 22 were used.

Third and Fourth Processes:

Test specimens for property evaluation were molded in a similar manner to the method of Example 147. Subsequently, the obtained test specimens for property evaluation were evaluated in accordance with the above-described evaluation method of the molded article. The result showed that the bending strength was as shown in Table 22 and that the mechanical properties were insufficient.

Comparative Example 63

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Comparative Example 56.

Third and Fourth Processes:

Test specimens for property evaluation were molded in a similar manner to the method of Example 147. Subsequently, the obtained test specimens for property evaluation were evaluated in accordance with the above-described evaluation method of the molded article. The result showed that the bending strength was as shown in Table 22 and that the mechanical properties were slightly low.

TABLE 22

|  |  |  |  | Example 147 | Example 148 | Example 149 | Example 150 | Example 151 | Example 152 | Comparative Example 62 | Comparative Example 63 |
|---|---|---|---|---|---|---|---|---|---|---|---|
| Carbon fibers |  |  |  | A | A | A | A | A | A | A | A |
| Sizing agent | (A) | A-1 | EX-611 | 50 |  |  |  |  |  |  | 100 |
|  |  | A-2 | EX-521 |  | 50 | 50 | 50 | 50 | 50 |  |  |
|  |  | Total |  | 50 | 50 | 50 | 50 | 50 | 50 |  | 100 |
|  | (B1) | B-1 | jER152 |  |  |  | 20 |  |  |  |  |
|  |  | B-2 | jER828 | 20 | 40 | 20 |  |  |  | 20 |  |
|  |  | B-3 | jER1001 |  |  |  |  | 20 |  | 70 |  |
|  |  | B-4 | jER807 |  |  |  |  |  | 20 |  |  |
|  |  | Total |  | 20 | 40 | 20 | 20 | 20 | 20 | 90 |  |
|  | (C) | C-1 | Aromatic polyester | 20 |  | 20 | 20 | 20 | 20 |  |  |
|  | Other | — | Emulsifier (nonionic surfactant) | 10 | 10 | 10 | 10 | 10 | 10 | 10 |  |
|  | Ratio A/B1 | (A) (% by mass) |  | 71 | 56 | 71 | 71 | 71 | 71 | 0 | 100 |
|  |  | (B1) (% by mass) |  | 29 | 44 | 29 | 29 | 29 | 29 | 100 | 0 |
|  |  | (A) (% by mass) |  | 50 | 50 | 50 | 50 | 50 | 50 | 0 | 100 |
|  |  | (B) (% by mass) |  | 50 | 50 | 50 | 50 | 50 | 50 | 100 | 0 |

TABLE 22-continued

|  |  |  | Example 147 | Example 148 | Example 149 | Example 150 | Example 151 | Example 152 | Comparative Example 62 | Comparative Example 63 |
|---|---|---|---|---|---|---|---|---|---|---|
|  |  | Epoxy equivalent (g/eq.) | 245 | 210 | 265 | 260 | 320 | 250 | 400 | 165 |
|  |  | Sizing agent attached amount (% by mass) | 0.6 | 0.6 | 0.6 | 0.6 | 0.6 | 0.6 | 0.6 | 0.6 |
| Thermoplastic resin |  |  | PC | PC | PC | PC | PC | PC | PC | PC |
| Sizing agent-coated carbon fiber content (% by mass) |  |  | 20 | 20 | 20 | 20 | 20 | 20 | 20 | 20 |
| Form of long fiber pellets |  |  | Form A | Form A | Form A | Form A | Form A | Form A | Form A | Form A |
| Evaluation item | Sizing agent-coated fibers | Epoxy equivalent of sizing agent (g/eq.) | 475 | 350 | 430 | 420 | 530 | 400 | 710 | 240 |
|  |  | Water content (% by mass) | 0.019 | 0.021 | 0.021 | 0.019 | 0.018 | 0.019 | 0.015 | 0.032 |
|  |  | X-ray photoelectron spectrum of sizing agent surface (a)/(b) | 0.6 | 0.65 | 0.64 | 0.65 | 0.71 | 0.63 | 1.01 | 0.29 |
|  |  | Eluted aliphatic epoxy compound (A) (part by mass) | 0.13 | 0.13 | 0.13 | 0.13 | 0.13 | 0.13 | — | 0.33 |
|  | Carbon fiber-reinforced composite material | Bending strength (MPa) | 206 | 209 | 208 | 206 | 200 | 205 | 189 | 192 |

Example 153

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Example 127.

Third Process: Process for Manufacturing Long Fiber Pellets

The impregnation promoter (D-2) was melted in a melting bath of 190° C. and fed to a kiss coater by a gear pump. The impregnation promoter (D-2) was applied onto a roll heated to 180° C. from the kiss coater to form a coating film. The sizing agent-coated carbon fibers were passed through the roll while sizing agent-coated carbon fibers were brought into contact with the roll to attach a constant amount of the impregnation promoter (D-2) per unit length of the sizing agent-coated carbon fibers. The sizing agent-coated carbon fibers to which the impregnation promoter (D-2) was attached were fed into a furnace heated at 180° C. and were passed between 10 rolls (diameter 50 mm) that were freely rotated using bearings and alternately located at upper and lower positions on a straight line and were passed through 10 roll bars (diameter 200 mm) located in a zigzag manner in the furnace to sufficiently impregnate the impregnation promoter (D-2) to the sizing agent-coated carbon fibers. The attached amount of the impregnation promoter (D-2) was 20 parts by mass relative to 100 parts by mass of the carbon fibers.

Subsequently, the PP resin was melted with a single screw extruder at 240° C. and extruded into a crosshead die attached to the tip of the extruder. At the same time, the sizing agent-coated carbon fibers into which the impregnation promoter (D-2) was impregnated were also continuously fed into the crosshead die (rate: 30 m/min) and whereby the sizing agent-coated carbon fibers into which the impregnation promoter (D-2) was impregnated were covered with the melted PP resin. Subsequently, after cooling, the covered sizing agent-coated carbon fibers were cut into 7 mm length in a perpendicular direction to pulling direction to obtain core-sheath structure long fiber pellets (Form B) in which carbon fibers were almost parallelly arranged in an axis center direction and the length of the carbon fibers was substantially the same length as the length of the molding material. The PP resin pellets were adjusted to feed so that the sizing agent-coated carbon fibers became 20% by mass relative to the total amount.

Fourth Process: Injection Molding Process

Test specimens for property evaluation were molded from the long fiber pellets obtained in the previous process using J350EIII injection molding machine manufactured by Japan Steel Works, LTD. at a cylinder temperature of 240° C. and a mold temperature of 60° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 23. The results showed that the bending strength was 152 MPa and thus the mechanical properties were sufficiently high.

Examples 154 to 158

First Process: Process for Manufacturing Carbon Fibers to be Raw Material

This process was carried out in a similar manner to Example 127.

Second Process: Process for Attaching Sizing Agent to Carbon Fibers

In the second process of Example 153, the sizing agent-coated carbon fibers were obtained in a similar manner to Example 153 except that the component (A) and the component (B1) were changed as shown in Table 23. Each of the attached amounts of the sizing agent was 0.6 parts by mass to 100 parts by mass of the surface treated carbon fibers.

Third and Fourth Processes:

Test specimens for property evaluation were molded in a similar manner to the method of Example 153. Subsequently, the obtained test specimens for property evaluation were evaluated in accordance with the above-described evaluation method of the molded article. The results are summarized in Table 23. The results showed that the bending strengths were 145 MPa to 157 MPa and thus the mechanical properties were sufficiently high.

Comparative Example 64

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 153 except that the component (A) was not used and types and amounts of the component (B1) and amounts of other components as shown in Table 23 were used.

Third and Fourth Processes:

Test specimens for property evaluation were molded in a similar manner to the method of Example 153. Subsequently, the obtained test specimens for property evaluation were evaluated in accordance with the above-described evaluation method of the molded article. The result showed that the bending strength was as shown in Table 23 and that the mechanical properties were insufficient.

Comparative Example 65

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Comparative Example 56.

Third and Fourth Processes:

Test specimens for property evaluation were molded in a similar manner to the method of Example 153. Subsequently, the obtained test specimens for property evaluation were evaluated in accordance with the above-described evaluation method of the molded article. The result showed that the bending strength was as shown in Table 23 and that the mechanical properties were slightly low.

TABLE 23

| | | | | Example 153 | Example 154 | Example 155 | Example 156 | Example 157 | Example 158 | Comparative Example 64 | Comparative Example 65 |
|---|---|---|---|---|---|---|---|---|---|---|---|
| Carbon fibers | | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio A/B1 | | (A) (% by mass) | 71 | 56 | 71 | 71 | 71 | 71 | 0 | 100 |
| | | | (B1) (% by mass) | 29 | 44 | 29 | 29 | 29 | 29 | 100 | 0 |
| | | | (A) (% by mass) | 50 | 50 | 50 | 50 | 50 | 50 | 0 | 100 |
| | | | (B) (% by mass) | 50 | 50 | 50 | 50 | 50 | 50 | 100 | 0 |
| | | | Epoxy equivalent (g/eq.) | 245 | 210 | 265 | 260 | 320 | 250 | 400 | 165 |
| | | | Sizing agent attached amount (% by mass) | 0.6 | 0.6 | 0.6 | 0.6 | 0.6 | 0.6 | 0.6 | 0.6 |
| Component (D) | | | | D-2 | D-2 | D-2 | D-2 | D-2 | D-2 | D-2 | D-2 |
| Thermoplastic resin | | | | PP | PP | PP | PP | PP | PP | PP | PP |
| Sizing agent-coated carbon fiber content (% by mass) | | | | 20 | 20 | 20 | 20 | 20 | 20 | 20 | 20 |
| Form of long fiber pellets | | | | Form B | Form B | Form B | Form B | Form B | Form B | Form B | Form B |
| Evaluation item | Sizing agent- | | Epoxy equivalent | 475 | 350 | 430 | 420 | 530 | 400 | 710 | 240 |

TABLE 23-continued

|  |  | Example 153 | Example 154 | Example 155 | Example 156 | Example 157 | Example 158 | Comparative Example 64 | Comparative Example 65 |
|---|---|---|---|---|---|---|---|---|---|
| coated fibers | of sizing agent (g/eq.) |  |  |  |  |  |  |  |  |
|  | Water content (% by mass) | 0.019 | 0.021 | 0.021 | 0.019 | 0.018 | 0.019 | 0.015 | 0.032 |
|  | X-ray photoelectron spectrum of sizing agent surface (a)/(b) | 0.6 | 0.65 | 0.64 | 0.65 | 0.71 | 0.63 | 1.01 | 0.29 |
|  | Eluted aliphatic epoxy compound (A) (part by mass) | 0.13 | 0.13 | 0.13 | 0.13 | 0.13 | 0.13 | — | 0.33 |
| Carbon fiber-reinforced composite material | Bending strength (MPa) | 152 | 157 | 156 | 152 | 145 | 151 | 134 | 136 |

Example 159

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Example 127.

Third Process: Process for Manufacturing Long Fiber Pellets

The solid content of the impregnation promoter (D-3) emulsion was adjusted to 27% by mass. The impregnation promoter (D-3) was attached to the sizing agent-coated carbon fibers by a roller impregnation method and thereafter water was removed by drying at 210° C. for 2 minutes to obtain a composite of the sizing agent-coated carbon fibers with the first and the second propylene resins. The attached amount of the impregnation promoter (D-3) was 20 parts by mass relative to 100 parts by mass of the carbon fibers.

Subsequently, the PP resin was melted with a single screw extruder at 300° C. and extruded into a crosshead die attached to the tip part of the extruder. At the same time, the sizing agent-coated carbon fibers into which the impregnation promoter (D-3) was attached were also continuously fed into the crosshead die (rate: 30 m/min) and whereby the sizing agent-coated carbon fibers into which the impregnation promoter (D-3) was attached were covered with the melted PP resin. Subsequently, after cooling, the covered sizing agent-coated carbon fibers were cut into 7 mm length in a perpendicular direction to pulling direction to obtain core-sheath structure long fiber pellets (Form B) in which carbon fibers were almost parallelly arranged in an axis center direction and the length of the carbon fibers was substantially the same length as the length of the molding material. The PP resin pellets were adjusted to feed so that the sizing agent-coated carbon fibers became 20% by mass relative to the total amount.

Fourth Process: Injection Molding Process

Test specimens for property evaluation were molded from the long fiber pellets obtained in the previous process using J350EIII injection molding machine manufactured by Japan Steel Works, LTD. at a cylinder temperature of 240° C. and a mold temperature of 60° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 24. The results showed that the bending strength was 152 MPa and thus the mechanical properties were sufficiently high.

Examples 160 to 164

First Process: Process for Manufacturing Carbon Fibers to be Raw Material

This process was carried out in a similar manner to Example 127.

Second Process: Process for Attaching Sizing Agent to Carbon Fibers

In the second process of Example 159, the sizing agent-coated carbon fibers were obtained in a similar manner to Example 159 except that the component (A) and the component (B1) were changed as shown in Table 24. Each of the attached amounts of the sizing agent was 0.6 parts by mass to 100 parts by mass of the surface treated carbon fibers.

Third and Fourth Processes:

Test specimens for property evaluation were molded in a similar manner to the method of Example 159. Subsequently, the obtained test specimens for property evaluation were evaluated in accordance with the above-described evaluation method of the molded article. The results are summarized in Table 24. The results showed that the bending strengths were 146 MPa to 158 MPa and thus the mechanical properties were sufficiently high.

Comparative Example 66

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 159 except that the component (A) was not used and types and amounts of the component (B1) and amounts of other components as shown in Table 24 were used.

Third and Fourth Processes:

Test specimens for property evaluation were molded in a similar manner to the method of Example 159. Subsequently, the obtained test specimens for property evaluation were evaluated in accordance with the above-described evaluation method of the molded article. The result showed that the bending strength was as shown in Table 24 and that the mechanical properties were insufficient.

Comparative Example 67

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Comparative Example 56.

Third and Fourth Processes:

Test specimens for property evaluation were molded in a similar manner to the method of Example 159 Subsequently, the obtained test specimens for property evaluation were evaluated in accordance with the above-described evaluation method of the injection molded article. The result showed that the bending strength was as shown in Table 24 and that the mechanical properties were slightly low.

TABLE 24

| | | | | Example 159 | Example 160 | Example 161 | Example 162 | Example 163 | Example 164 | Comparative Example 66 | Comparative Example 67 |
|---|---|---|---|---|---|---|---|---|---|---|---|
| Carbon fibers | | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio A/B1 | (A) (% by mass) | | 71 | 56 | 71 | 71 | 71 | 71 | 0 | 100 |
| | | (B1) (% by mass) | | 29 | 44 | 29 | 29 | 29 | 29 | 100 | 0 |
| | | (A) (% by mass) | | 50 | 50 | 50 | 50 | 50 | 50 | 0 | 100 |
| | | (B) (% by mass) | | 50 | 50 | 50 | 50 | 50 | 50 | 100 | 0 |
| | Epoxy equivalent (g/eq.) | | | 245 | 210 | 265 | 260 | 320 | 250 | 400 | 165 |
| | Sizing agent attached amount (% by mass) | | | 0.6 | 0.6 | 0.6 | 0.6 | 0.6 | 0.6 | 0.6 | 0.6 |
| Component (D) Thermoplastic resin | | | | D-3 PP | D-3 PP | D-3 PP | D-3 PP | D-3 PP | D-3 PP | D-3 PP | D-3 PP |
| Sizing agent-coated carbon fiber content (% by mass) | | | | 20 | 20 | 20 | 20 | 20 | 20 | 20 | 20 |
| Form of long fiber pellets | | | | Form B | Form B | Form B | Form B | Form B | Form B | Form B | Form B |
| Evaluation item | Sizing agent-coated fibers | | Epoxy equivalent of sizing agent (g/eq.) | 475 | 350 | 430 | 420 | 530 | 400 | 710 | 240 |
| | | | Water content (% by mass) | 0.019 | 0.021 | 0.021 | 0.019 | 0.018 | 0.019 | 0.015 | 0.032 |
| | | | X-ray photoelectron spectrum of sizing agent surface (a)/(b) | 0.6 | 0.65 | 0.64 | 0.65 | 0.71 | 0.63 | 1.01 | 0.29 |
| | | | Eluted aliphatic epoxy compound (A) | 0.13 | 0.13 | 0.13 | 0.13 | 0.13 | 0.13 | — | 0.33 |

TABLE 24-continued

|  |  | Example 159 | Example 160 | Example 161 | Example 162 | Example 163 | Example 164 | Comparative Example 66 | Comparative Example 67 |
|---|---|---|---|---|---|---|---|---|---|
| Carbon fiber-reinforced composite material | (part by mass) Bending strength (MPa) | 152 | 158 | 157 | 152 | 146 | 152 | 134 | 135 |

Example 165

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Example 127.

Third Process: Process for Manufacturing Long Fiber Pellets

The impregnation promoter (D-4) was melted in a melting bath of 190° C. and fed to a kiss coater by a gear pump. The impregnation promoter (D-4) was applied onto a roll heated to 180° C. from the kiss coater to form a coating film. The sizing agent-coated carbon fibers were passed through the roll while the sizing agent-coated carbon fibers were brought into contact with the roll to attach a constant amount of the impregnation promoter (D-4) per unit length of the sizing agent-coated carbon fibers. The sizing agent-coated carbon fibers to which the impregnation promoter (D-4) was attached were fed into a furnace heated at 180° C. and were passed between 10 rolls (diameter 50 mm) that were freely rotated using bearings and alternately located at upper and lower positions on a straight line and were passed through 10 roll bars (diameter 200 mm) located in a zigzag manner in the furnace to sufficiently impregnate the impregnation promoter (D-4) to the sizing agent-coated carbon fibers. The attached amount of the impregnation promoter (D-4) was 20 parts by mass relative to 100 parts by mass of the carbon fibers.

Subsequently, the PA6 resin was melted with a single screw extruder at 300° C. and extruded into a crosshead die attached to the tip of the extruder. At the same time, the sizing agent-coated carbon fibers into which the impregnation promoter (D-4) was impregnated were also continuously fed into the crosshead die (rate: 30 m/min) and whereby the sizing agent-coated carbon fibers into which the impregnation promoter (D-4) was impregnated were covered with the melted PA6 resin. Subsequently, after cooling, the covered sizing agent-coated carbon fibers were cut into 7 mm length in a perpendicular direction to pulling direction to obtain core-sheath structure long fiber pellets (Form B) in which carbon fibers were almost parallelly arranged in an axis center direction and the length of the carbon fibers was substantially the same length as the length of the molding material. The PA6 resin pellets were adjusted to feed so that the sizing agent-coated carbon fibers became 30% by mass relative to the total amount.

Fourth Process: Injection Molding Process

Test specimens for property evaluation were molded from the long fiber pellets obtained in the previous process using J350EIII injection molding machine manufactured by Japan Steel Works, LTD. at a cylinder temperature of 300° C. and a mold temperature of 70° C. The obtained test specimens were left in a constant temperature and humidity chamber adjusted at a temperature of 23° C. and 50% RH for 24 hours, and thereafter the test specimens were used for property evaluation test. Subsequently, the obtained test specimens for property evaluation were evaluated in accordance with the above-described evaluation method of the injection molded article. The results are summarized in Table 25. The results showed that the bending strength was 362 MPa and thus the mechanical properties were sufficiently high.

Examples 166 to 170

First Process: Process for Manufacturing Carbon Fibers to be Raw Material

This process was carried out in a similar manner to Example 127.

Second Process: Process for Attaching Sizing Agent to Carbon Fibers

In the second process of Example 165, the sizing agent-coated carbon fibers were obtained in a similar manner to Example 165 except that the component (A) and the component (B1) were changed as shown in Table 25. Each of the attached amounts of the sizing agent was 0.6 parts by mass to 100 parts by mass of the surface treated carbon fibers.

Third and Fourth Processes:

Test specimens for property evaluation were molded in a similar manner to the method of Example 165. Subsequently, the obtained test specimens for property evaluation were evaluated in accordance with the above-described evaluation method of the molded article. The results are summarized in Table 25. The results showed that the bending strengths were 365 MPa to 368 MPa and thus the mechanical properties were sufficiently high.

Comparative Example 68

First Process: Process for Manufacturing Carbon Fibers to be Raw Material

This process was carried out in a similar manner to Example 127.

Second Process: Process for Attaching Sizing Agent to Carbon Fibers

The carbon fibers coated with the sizing agent were obtained in a similar manner to Example 165 except that the component (A) was not used and types and amounts of the component (B1) and amounts of other components as shown in Table 25 were used.

Third and Fourth Processes:

Test specimens for property evaluation were molded in a similar manner to the method of Example 165. Subsequently, the obtained test specimens for property evaluation were evaluated in accordance with the above-described evaluation method of the molded article. The result showed that the bending strength was small as shown in Table 25 and that the mechanical properties were insufficient.

Comparative Example 69

First Process: Process for Manufacturing Carbon Fibers to be Raw Material

This process was carried out in a similar manner to Example 127.

Second Process: Process for Attaching Sizing Agent to Carbon Fibers

This process was carried out in a similar manner to Comparative Example 56.

Third and Fourth Processes:

Test specimens for property evaluation were molded in a similar manner to the method of Example 165. Subsequently, the obtained test specimens for property evaluation were evaluated in accordance with the above-described evaluation method of the molded article. The result showed that the bending strength in case of water absorption was small as shown in Table 25.

TABLE 25

| | | | | Example 165 | Example 166 | Example 167 | Example 168 | Example 169 | Example 170 | Comparative Example 68 | Comparative Example 69 |
|---|---|---|---|---|---|---|---|---|---|---|---|
| Carbon fibers | | | | A | A | A | A | A | A | A | A |
| Sizing agent | (A) | A-1 | EX-611 | 50 | | | | | | | 100 |
| | | A-2 | EX-521 | | 50 | 50 | 50 | 50 | 50 | | |
| | | Total | | 50 | 50 | 50 | 50 | 50 | 50 | | 100 |
| | (B1) | B-1 | jER152 | | | | 20 | | | | |
| | | B-2 | jER828 | 20 | 40 | 20 | | | | 20 | |
| | | B-3 | jER1001 | | | | | 20 | | 70 | |
| | | B-4 | jER807 | | | | | | 20 | | |
| | | Total | | 20 | 40 | 20 | 20 | 20 | 20 | 90 | |
| | (C) | C-1 | Aromatic polyester | 20 | | 20 | 20 | 20 | 20 | | |
| | Other | — | Emulsifier (nonionic surfactant) | 10 | 10 | 10 | 10 | 10 | 10 | 10 | |
| | Ratio A/B1 | | (A) (% by mass) | 71 | 56 | 71 | 71 | 71 | 71 | 0 | 100 |
| | | | (B1) (% by mass) | 29 | 44 | 29 | 29 | 29 | 29 | 100 | 0 |
| | | | (A) (% by mass) | 50 | 50 | 50 | 50 | 50 | 50 | 0 | 100 |
| | | | (B) (% by mass) | 50 | 50 | 50 | 50 | 50 | 50 | 100 | 0 |
| | | | Epoxy equivalent (g/eq.) | 245 | 210 | 265 | 260 | 320 | 250 | 400 | 165 |
| | | | Sizing agent attached amount (% by mass) | 0.6 | 0.6 | 0.6 | 0.6 | 0.6 | 0.6 | 0.6 | 0.6 |
| Component (D) | | | | D-4 | D-4 | D-4 | D-4 | D-4 | D-4 | D-4 | D-4 |
| Thermoplastic resin | | | | PA | PA | PA | PA | PA | PA | PA | PA |
| Sizing agent-coated carbon fiber content (% by mass) | | | | 30 | 30 | 30 | 30 | 30 | 30 | 30 | 30 |
| Form of long fiber pellets | | | | Form B | Form B | Form B | Form B | Form B | Form B | Form B | Form B |
| Evaluation item | Sizing agent-coated fibers | | Epoxy equivalent of sizing agent (g/eq.) | 475 | 350 | 430 | 420 | 530 | 400 | 710 | 240 |
| | | | Water content (% by mass) | 0.019 | 0.021 | 0.021 | 0.019 | 0.018 | 0.019 | 0.015 | 0.032 |
| | | | X-ray photoelectron spectrum of sizing agent surface (a)/(b) | 0.6 | 0.65 | 0.64 | 0.65 | 0.71 | 0.63 | 1.01 | 0.29 |
| | | | Eluted aliphatic epoxy compound (A) (part by mass) | 0.13 | 0.13 | 0.13 | 0.13 | 0.13 | 0.13 | — | 0.33 |
| | Carbon fiber-reinforced composite material | | Bending strength (MPa) | 362 | 366 | 365 | 368 | 366 | 365 | 354 | 362 |
| | | | Reduction in bending | OK | OK | OK | OK | OK | OK | OK | NG |

TABLE 25-continued

|  | Example 165 | Example 166 | Example 167 | Example 168 | Example 169 | Example 170 | Comparative Example 68 | Comparative Example 69 |
|---|---|---|---|---|---|---|---|---|
| strength in case of water adsorption | | | | | | | | |

Example 171

In 50 mL of acetone, 2 g of the sizing agent-coated carbon fibers obtained in Example 127 were immersed and ultrasonic cleaning was applied to the sizing agent-coated carbon fibers for 30 minutes three times. Subsequently, the carbon fibers were immersed in 50 mL of methanol, and ultrasonic cleaning was applied for 30 minutes once, followed by drying carbon fibers. The attached amount of the sizing agent remaining after the cleaning was measured. The result was as shown in Table 26. Subsequently, the surface of the sizing agent of the sizing agent-coated carbon fibers before cleaning and the surface of the sizing agent of the sizing agent-coated carbon fibers obtained after the cleaning were analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=O were measured. The ratio (I) of (a)/(b) of the surface of the sizing agent of the sizing agent-coated carbon fibers before cleaning and the ratio (II) of (a)/(b) of the surface of the sizing agent of the sizing agent-coated carbon fibers after cleaning were calculated. (I) and (II)/(I) are as shown in Table 26.

Examples 172 and 173

In a similar manner to Example 171, the sizing agent-coated carbon fibers obtained in Example 128 and Example 129 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 26.

Comparative Example 70

In a similar manner to Example 171, the sizing agent-coated carbon fibers obtained in Comparative Example 55 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 26. The result showed that (II)/(I) is large and thus the sizing agent had no gradient structure.

Comparative Example 71

In a similar manner to Example 171, the sizing agent-coated carbon fibers obtained in Comparative Example 56 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 26. The result showed that (II)/(I) is large and thus the sizing agent had no gradient structure.

Comparative Example 72

In a similar manner to Example 171, the sizing agent-coated carbon fibers obtained in Comparative Example 59 were used, and X-ray photoelectron spectroscopic analysis was carried out by using an X ray at 400 eV before and after the cleaning. The ratio (a)/(b) was calculated where (a) is the height (cps) of a component at a binding energy (284.6 eV) attributed to CHx, C—C, and C=C and (b) is the height (cps) of a component at a binding energy (286.1 eV) attributed to C—O in the C1s core spectrum. The results are shown in Table 26. The result showed that (II)/(I) is small.

TABLE 26

|  |  | Example 171 | Example 172 | Example 173 | Comparative Example 70 | Comparative Example 71 | Comparative Example 72 |
|---|---|---|---|---|---|---|---|
| Sizing agent-coated carbon fibers |  | Example 127 | Example 128 | Example 129 | Comparative Example 55 | Comparative Example 56 | Comparative Example 59 |
|  | Sizing agent attached amount after washing sizing agent | 0.18 | 0.18 | 0.18 | 0.12 | 0.18 | 0.18 |
| XPS (400 eV) | (I) | 0.62 | 0.67 | 0.66 | 1.01 | 0.29 | 0.98 |
|  | (II)/(I) | 0.8 | 0.71 | 0.72 | 1 | 1 | 0.3 |

Example 174

Into a cylindrical filter paper, 10 g of the molding material obtained in Example 147 was placed, and Soxhlet extraction was carried out using 300 mL of dichloromethane to elute the thermoplastic resin and the sizing agent. Thereafter, the solvent was dried by drying the eluted thermoplastic resin and sizing agent at 80° C. for 30 minutes. The remaining attached amount of the sizing agent to the carbon fibers was measured. The attached amount is as shown in Table 27.

The surface of the sizing agent of the sizing agent-coated carbon fibers obtained by washing was analyzed by X-ray photoelectron spectroscopy at 400 eV. The height (b) of the peak at a binding energy of 286.1 eV attributed to a C—O component and the height (cps) of the component (a) at a binding energy of 284.6 eV attributed to CHx, C—C, and C=C were measured and the ratio (a)/(b) was calculated. The ratio (a)/(b) is as shown in Table 27.

Example 175

The surface of the sizing agent of the sizing agent-coated carbon fibers obtained by using the molding material obtained in Example 149 and washing in a similar manner to Example 174 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 27.

Example 176

Into a beaker, 10 g of the molding material obtained in Example 165 was placed and ultrasonic cleaning was applied to the molding material for 30 minutes three times with 250 mL of formic acid and final ultrasonic cleaning was applied to the molding material for 30 minutes one time with 250 mL of methanol. Thereafter, the solvent was dried by drying the washed molding material at 80° C. for 30 minutes. The surface of the sizing agent of the sizing agent-coated carbon fibers obtained by washing was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 27.

Example 177

The surface of the sizing agent of the sizing agent-coated carbon fibers obtained by using the molding material in Example 167 and by washing in a similar manner to Example 176 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are as shown in Table 27.

Comparative Example 73

The surface of the sizing agent of the sizing agent-coated carbon fibers obtained by using the molding material obtained in Comparative Example 62 and washing in a similar manner to Example 174 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are large values as shown in Table 27.

Comparative Example 74

The surface of the sizing agent of the sizing agent-coated carbon fibers obtained by using the molding material obtained in Comparative Example 63 and washing in a similar manner to Example 174 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are small values as shown in Table 27.

Comparative Example 75

The surface of the sizing agent of the sizing agent-coated carbon fibers obtained by using the molding material obtained in Comparative Example 68 and washing in a similar manner to Example 176 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are large values as shown in Table 27.

Comparative Example 76

The surface of the sizing agent of the sizing agent-coated carbon fibers obtained by using the molding material obtained in Comparative Example 69 and washing in a similar manner to Example 176 was analyzed by X-ray photoelectron spectroscopy at 400 eV. The height of the peak (b) at a binding energy of 286.1 eV attributed to a C—O component and the height (cps) of the component (a) at a binding energy of 284.6 eV attributed to CHx, C—C, and C=C were measured and the ratio (a)/(b) was calculated. The remaining attached amount of the sizing agent and the ratio (a)/(b) after washing are small values as shown in Table 27.

TABLE 27

|  |  | Example 174 | Example 175 | Example 176 | Example 177 | Comparative Example 73 | Comparative Example 74 | Comparative Example 75 | Comparative Example 76 |
|---|---|---|---|---|---|---|---|---|---|
| Molding material |  | Example 147 | Example 149 | Example 165 | Example 167 | Comparative Example 62 | Comparative Example 63 | Comparative Example 68 | Comparative Example 69 |
|  | Sizing agent attached amount | 0.18 | 0.18 | 0.18 | 0.18 | 0.12 | 0.18 | 0.12 | 0.18 |
| XPS (400 eV) | (a)/(b) | 0.50 | 0.48 | 0.50 | 0.48 | 1.01 | 0.29 | 1.01 | 0.29 |

INDUSTRIAL APPLICABILITY

The carbon fiber-reinforced resin composition, the method for manufacturing the carbon fiber-reinforced resin composition, the molding material, the method for manufacturing the molding material, and the carbon fiber-reinforced resin molded article of the present invention are lightweight but have excellent strength and elastic modulus and thus are suitably used in various fields such as aircraft members, spacecraft members, automobile members, ship members, constructional materials, and sporting goods.

The invention claimed is:

1. A carbon fiber-reinforced resin composition comprising:
   (i) sizing agent-coated carbon fibers in which carbon fibers are coated with a sizing agent; and
   (ii) a matrix resin comprising a thermoplastic resin or a radical polymerizable resin; wherein
   the sizing agent comprises at least:
   an aliphatic epoxy compound (A), wherein the aliphatic epoxy compound (A) is a polyether polyepoxy compound having two or more epoxy groups in a molecule and/or a polyol polyepoxy compound having two or more epoxy groups in a molecule;
   an aromatic epoxy compound (B1) as an aromatic compound (B), wherein the aromatic epoxy compound (B1) is a bisphenol A epoxy compound or a bisphenol F epoxy compound;
   a mass ratio of the aliphatic epoxy compound (A) and the aromatic epoxy compound (B1) in the sizing agent is 60/40 to 80/20;
   each of the aliphatic epoxy compound (A) and the aromatic epoxy compound (B1) has a surface tension of 37 mJ/m$^2$ to 45 mJ/m$^2$ at 125° C.;
   the difference in the surface tensions between the aliphatic epoxy compound (A) and the aromatic epoxy compound (B1) is 3 mJ/m$^2$ or less at 125° C.; and
   the sizing agent-coated carbon fibers have a ratio (a)/(b) of 0.50 to 0.90 where (a) is a height (cps) of a component having a binding energy (284.6 eV) attributed to CHx, C—C, and C=C and (b) is a height (cps) of a component having binding energy (286.1 eV) attributed to C—O in a $C_{1s}$ core spectrum of a surface of the sizing agent of the sizing agent-coated carbon fibers measured by X-ray photoelectron spectroscopy using AlK$\alpha_{1,2}$ as an X-ray source at a photoelectron takeoff angle of 15°.

2. The carbon fiber-reinforced resin composition according to claim 1, wherein a water content of the sizing agent-coated carbon fibers is 0.010% by mass to 0.030% by mass.

3. The carbon fiber-reinforced resin composition according to claim 1, wherein the aliphatic epoxy compound (A) is a glycidyl ether epoxy compound obtained by causing epichlorohydrin to react with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethyloipropane, pentaerythritol, sorbitol, and arabitol.

4. The carbon fiber-reinforced resin composition according to claim 1, wherein
   in the sizing agent-coated carbon fibers, values (I) and (II) determined by a ratio (a)/(b) where
   (a) is the height (cps) of a component having a binding energy (284.6 eV) attributed to CHx, C—C, and C=C, and
   (b) is the height (cps) of a component having binding energy (286.1 eV) attributed to C—O in a $C_{1s}$ core spectrum of the sizing agent-coated carbon fibers measured by X-ray photoelectron spectroscopy using an X-ray of 400 eV at a photoelectron takeoff angle of 55° satisfy a relation (III):

$$0.50 \leq (I) \leq 0.90 \text{ and } 0.60 < (II)/(I) < 1.0 \quad \text{(III)}$$

where
(I) is a value of (a)/(b) of the surface of the sizing agent-coated carbon fibers before ultrasonic treatment, and
(II) is a value of (a)/(b) of the surface of the sizing agent-coated carbon fibers after washing to reduce an attached amount of the sizing agent to 0.09% by mass to 0.20% by mass by the ultrasonic treatment of the sizing agent-coated carbon fibers in an acetone solvent.

5. The carbon fiber-reinforced resin composition according to claim 1, wherein the surface of the sizing agent-coated carbon fibers after washing to reduce the attached amount of the sizing agent on the surface of the sizing agent-coated carbon fibers to 0.09% by mass to 0.20% by mass by the ultrasonic treatment in a solvent that dissolves the matrix resin constituting the carbon fiber-reinforced resin composition has a ratio of (a)/(b) of 0.30 to 0.70 where (a) is the height (cps) of a component having a binding energy (284.6 eV) attributed to CHx, C—C, and C=C and (b) is the height (cps) of a component having binding energy (286.1 eV) attributed to C—O in a $C_{1s}$ core spectrum of the surface of the sizing agent-coated carbon fibers measured by X-ray photoelectron spectroscopy using an X ray of 400 eV at a photoelectron takeoff angle of 55°.

6. The carbon fiber-reinforced resin composition according to claim 1, wherein a surface carboxy group concentration (COOH/C) is 0.003 to 0.015 and a surface hydroxy group concentration (COH/C) is 0.001 to 0.050 where the surface carboxy group concentration and the surface hydroxy group concentration are determined by chemical modification X-ray photoelectron spectroscopy of the carbon fibers.

7. The carbon fiber-reinforced resin composition according to claim 1, wherein the matrix resin is one or more resins selected from a polyarylene sulfide resin, a polyether ether ketone resin, a polyphenylene ether resin, a polyoxymethylene resin, a polyester resin, a polycarbonate resin, a polystyrene resin, a polyolefin resin, and a polyamide.

8. The carbon fiber-reinforced resin composition according to claim 1, wherein
the sizing agent-coated carbon fibers are formed by attaching the sizing agent in an amount of 0.1 parts by mass to 10.0 parts by mass relative to 100 parts by mass of the carbon fibers, and
the carbon fiber-reinforced resin composition comprises the sizing agent-coated carbon fibers in an amount of 1% by mass to 80% by mass and the matrix resin in an amount of 20% by mass to 99% by mass.

9. A method for manufacturing the carbon fiber-reinforced resin composition according to claim 1, the method comprising:
coating carbon fibers with a sizing agent comprising at least the aliphatic epoxy compound (A) in an amount of 35% by mass to 65% by mass and an aromatic compound (B) in an amount of 35% by mass to 60% by mass relative to a total amount of the sizing agent except a solvent to produce sizing agent-coated carbon fibers; and
adding the sizing agent-coated carbon fibers to a matrix resin.

10. The carbon fiber-reinforced resin composition according to claim 1, wherein
the carbon fiber-reinforced resin composition is any one of the following forms of molding materials (H), (J1), (J2), and (K):
the molding material (H): a molding material that has a cylindrical shape and in which the carbon fibers are almost parallelly arranged in an axis center direction and a length of the carbon fibers has substantially the same length as a length of the molding material,
the molding material (J1): a molding material in which the carbon fibers are in a form of single fiber and that is substantially oriented in two dimensions,
the molding material (J2): a molding material in which the carbon fibers are in a bundle-like form and that is substantially oriented in two dimensions, and
the molding material (K): a prepreg.

11. A molding material that is the molding material (H) according to claim 10, comprising:
any one of the following structures (L), (M), and (N):
(L): a core-sheath structure formed by covering a circumference of a structure Y with a structure X where the structure Y comprising the carbon fibers as a main component is a core structure and the structure X comprising the matrix resin as a main component is a sheath structure,
(M): a structure having a length of 1 mm to 50 mm, and
(N): a structure having a form of a long fiber pellet, wherein
the molding material (H) comprises an impregnation promoter (D) in an amount of 0.1 parts by mass to 100 parts by mass relative to 100 parts by mass of the carbon fibers and is made by impregnating a part of or whole of the impregnation promoter (D) into the carbon fibers.

12. A method for manufacturing the molding material (H) according to claim 10, the method comprising:
at least:
coating continuous carbon fibers with a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent;
obtaining continuous strands by impregnating a melted matrix resin into the continuous sizing agent-coated carbon fibers obtained in said coating; and
cooling the strands obtained in said obtaining continuous strands and then cutting the cooled strands to obtain the cylindrical molding material (H).

13. The method for manufacturing the molding material according to claim 12, further comprising:
impregnating a melted impregnation promoter (D) into the continuous sizing agent-coated carbon fibers before said obtaining continuous strands.

14. A method for manufacturing the molding material (J1) according to claim 10, comprising
at least:
processing carbon fibers to a web-like cloth, a nonwoven cloth-like cloth, a felt-like cloth, or a mat-like cloth;
applying a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent to the cloth obtained in the processing in an amount of 0.1 parts by mass to 10 parts by mass relative to 100 parts by mass of the cloth obtained in the processing; and
applying a matrix resin in an amount of 20% by mass to 99% by mass to 1% by mass to 80% by mass of the cloth to which the sizing agent is applied in the applying to form a composite product.

15. A method for manufacturing the molding material (J2) according to claim 10, comprising:
at least:
coating carbon fibers with a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent in an amount of 0.1 parts by mass to 10 parts by mass relative to 100 parts by mass of the carbon fibers;
cutting the sizing agent-coated carbon fibers obtained in said coating in a length of 1 mm to 50 mm; and mixing the sizing agent-coated carbon fibers cut in said cutting in an amount of 1% by mass to 80% by mass and the matrix resin in an amount of 20% by mass to 99% by mass to form a composite product.

16. A method for manufacturing the molding material (K) according to claim 10, comprising:
at least:
firstly coating continuous carbon fibers with a sizing agent comprising at least an aliphatic epoxy compound (A) in an amount of 35% by mass to 65% by mass and an aromatic compound (B) in an amount of 35% by mass to 60% by mass relative to a total amount of the sizing agent except a solvent; and secondly passing continuous sizing agent-coated carbon fibers obtained in the firstly coating through a melted matrix resin to further increase the width of the sizing agent-coated carbon fibers to obtain a prepreg having a width of 1 mm to 50 mm.

17. A carbon fiber-reinforced resin molded article formed by molding the carbon fiber-reinforced resin composition according to claim 1.

18. The carbon fiber-reinforced resin composition according to claim 1, wherein the sizing agent contains an ester compound (C) having no epoxy group in a molecule in an amount of 2% by mass to 35% by mass relative to a total amount of the sizing agent except a solvent.

* * * * *